United States Patent
Cohen et al.

(10) Patent No.: US 11,522,821 B2
(45) Date of Patent: Dec. 6, 2022

(54) METHOD AND APPARATUS FOR INTERACTION IN A MESSAGING SYSTEM

(71) Applicant: Wrinkl, Inc., Blue Bell, PA (US)

(72) Inventors: Marc A. Cohen, Blue Bell, PA (US); Jeffrey A. Cohen, Blue Bell, PA (US)

(73) Assignee: Wrinkl, Inc., Blue Bell, PA (US)

( * ) Notice: Subject to any disclaimer, the term of this patent is extended or adjusted under 35 U.S.C. 154(b) by 0 days.

(21) Appl. No.: 17/065,494

(22) Filed: Oct. 7, 2020

(65) Prior Publication Data

US 2021/0044551 A1 Feb. 11, 2021

Related U.S. Application Data

(63) Continuation-in-part of application No. 16/931,283, filed on Jul. 16, 2020, now Pat. No. 10,805,247, which is a continuation-in-part of application No. 16/712,952, filed on Dec. 12, 2019, now Pat. No. 10,728,192, which is a continuation of application No. 16/376,427, filed on Apr. 5, 2019, now Pat. No. 10,547,575, which is a continuation-in-part of
(Continued)

(51) Int. Cl.
| | | |
|---|---|---|
| *G06F 15/16* | (2006.01) |
| *H04L 51/046* | (2022.01) |
| *H04L 65/401* | (2022.01) |
| *H04L 51/18* | (2022.01) |
| *H04L 65/1093* | (2022.01) |
| *H04L 65/1069* | (2022.01) |
| *H04L 51/56* | (2022.01) |
| *H04L 51/212* | (2022.01) |
| *H04L 51/216* | (2022.01) |

(52) U.S. Cl.
CPC ............ *H04L 51/046* (2013.01); *H04L 51/18* (2013.01); *H04L 51/212* (2022.05); *H04L 51/216* (2022.05); *H04L 51/56* (2022.05); *H04L 65/1069* (2013.01); *H04L 65/1093* (2013.01); *H04L 65/4015* (2013.01)

(58) Field of Classification Search
CPC ......... H04L 51/12; H04L 51/16; H04L 51/18; H04L 51/36; H04L 51/046; H04L 65/1069; H04L 65/1093; H04L 65/4015
See application file for complete search history.

(56) References Cited

U.S. PATENT DOCUMENTS

| | | |
|---|---|---|
| 7,164,781 B2 | 1/2007 | Kim et al. |
| 7,809,722 B2 | 10/2010 | Gokturk et al. |
| | (Continued) | |

OTHER PUBLICATIONS

[No Author Listed], "WeChat's world: WeChat shows the way to social media's future," The Economist: Business, Aug. 6, 2016, retrieved from <https://www.economist.com/business/2016/08/06/wechats-world>, 10 pages (Exhibit 1013).

(Continued)

*Primary Examiner* — Yves Dalencourt
(74) *Attorney, Agent, or Firm* — Fish & Richardson P.C.

(57) ABSTRACT

Senders' password protected messages may be transmitted and access to those messages available after a password is received. Senders' required-reading messages may also or alternatively be transmitted and recipients' device interaction restricted until indication is received that they are read.

40 Claims, 81 Drawing Sheets

Related U.S. Application Data application No. 16/014,578, filed on Jun. 21, 2018, now Pat. No. 11,388,120, which is a continuation-in-part of application No. 15/858,696, filed on Dec. 29, 2017, now Pat. No. 10,025,475, which is a continuation-in-part of application No. 15/431,077, filed on Feb. 13, 2017, now Pat. No. 9,860,198, application No. 17/065,494, which is a continuation-in-part of application No. 16/931,283, filed on Jul. 16, 2020, now Pat. No. 10,805,247, which is a continuation-in-part of application No. 16/746,412, filed on Jan. 17, 2020, now Pat. No. 10,999,226, which is a continuation-in-part of application No. 16/712,952, filed on Dec. 12, 2019, now Pat. No. 10,728,192, which is a continuation of application No. 16/376,427, filed on Apr. 5, 2019, now Pat. No. 10,547,575, which is a continuation-in-part of application No. 16/014,578, filed on Jun. 21, 2018, now Pat. No. 11,388,120, which is a continuation-in-part of application No. 15/858,696, filed on Dec. 29, 2017, now Pat. No. 10,025,475, which is a continuation-in-part of application No. 15/431,077, filed on Feb. 13, 2017, now Pat. No. 9,860,198, application No. 17/065,494, which is a continuation-in-part of application No. 16/931,283, filed on Jul. 16, 2020, now Pat. No. 10,805,247, which is a continuation-in-part of application No. 16/746,412, filed on Jan. 17, 2020, now Pat. No. 10,999,226, which is a continuation-in-part of application No. 16/376,427, filed on Apr. 5, 2019, now Pat. No. 10,547,575, application No. 17/065,494, which is a continuation-in-part of application No. 16/931,283, filed on Jul. 16, 2020, now Pat. No. 10,805,247, said application No. 16/014,578 is a continuation-in-part of application No. 15/609,663, filed on May 31, 2017, now Pat. No. 10,009,300, which is a continuation of application No. 15/293,620, filed on Oct. 14, 2016, now Pat. No. 9,712,466.

(60) Provisional application No. 62/446,067, filed on Jan. 13, 2017, provisional application No. 62/518,905, filed on Jun. 13, 2017, provisional application No. 62/783,410, filed on Dec. 21, 2018, provisional application No. 62/666,137, filed on May 3, 2018, provisional application No. 63/045,513, filed on Jun. 29, 2020, provisional application No. 62/358,719, filed on Jul. 6, 2015, provisional application No. 62/253,229, filed on Nov. 10, 2015.

(56) References Cited

U.S. PATENT DOCUMENTS

| | | |
|---|---|---|
| 7,945,620 B2 | 5/2011 | Bou-Ghannam et al. |
| 9,235,782 B1 | 1/2016 | Zomet et al. |
| 9,252,455 B1 | 2/2016 | Palay |
| 9,645,127 B2 | 5/2017 | Amin et al. |
| 9,712,466 B2 | 7/2017 | Cohen et al. |
| 10,009,300 B2 | 6/2018 | Cohen et al. |
| 10,025,475 B1 | 7/2018 | Coehn |
| 10,659,243 B1 | 5/2020 | Soroker et al. |
| 10,805,247 B1 | 10/2020 | Cohen et al. |
| 2008/0080748 A1 | 4/2008 | Sukegawa et al. |
| 2011/0047227 A1 | 2/2011 | Arthurs et al. |
| 2012/0017149 A1 | 1/2012 | Lai et al. |
| 2012/0158857 A1 | 6/2012 | Loofbourrow |
| 2012/0192287 A1* | 7/2012 | Cai .................. H04M 1/72436 726/28 |
| 2012/0240062 A1 | 9/2012 | Passmore et al. |
| 2013/0097260 A1 | 4/2013 | Lee |
| 2013/0247175 A1 | 9/2013 | Nechyba et al. |
| 2014/0040784 A1 | 2/2014 | Behforooz et al. |
| 2014/0059040 A1 | 2/2014 | Cha et al. |
| 2014/0067977 A1 | 3/2014 | Ramussen et al. |
| 2014/0208402 A1 | 7/2014 | White et al. |
| 2014/0298210 A1 | 10/2014 | Park et al. |
| 2015/0088998 A1 | 3/2015 | Isensee et al. |
| 2015/0188928 A1 | 7/2015 | Shapiro |
| 2016/0028660 A1 | 1/2016 | Weishaupl et al. |
| 2016/0330147 A1 | 11/2016 | Antebi et al. |
| 2017/0054664 A1 | 2/2017 | Lee et al. |
| 2017/0163594 A1 | 6/2017 | Anderson |
| 2018/0300341 A1 | 10/2018 | Hadar et al. |
| 2018/0351903 A1 | 12/2018 | Allen et al. |
| 2018/0359292 A1 | 12/2018 | Chen et al. |
| 2019/0258808 A1 | 8/2019 | Han et al. |
| 2020/0153768 A1 | 5/2020 | Cohen |

OTHER PUBLICATIONS

Chinese Patent Publication No. 105553834, issued on May 4, 2016, Ji et al., 63 pages (English Translation) (Exhibit No. 1006).

Hix et al., "Developing User Interfaces: Ensuring Usability Through Product and Process," Wiley and Sons, 1993, 2.3.9:44-45, 3 pages (Exhibit 1015).

Johnson, "GUI Bloopers: Don'ts and Do's for Software Developers and Web Designers," Cerra et al. (ed.), 2000, 5.3.2:288-304, 14 pages (Exhibit 1014).

Nielsen, "Usability Engineering," Academic Press, 1993, Chapter 5:115-163, 56 pages (Exhibit 1016).

Shae et al., "IBM Research Report: Design of Multimedia Instant Messaging System with Annotation," IBM, Nov. 4, 2003, No. RC22966 (W0311-028), 6 pages (Exhibit 1010).

U.S. Pat. No. 5,960,411, issued on Sep. 28, 1999, Hartman et al., 45 pages (Exhibit No. 1012).

U.S. Patent Publication No. 2014/0143684, issued on May 22, 2014, Oh et al., 26 pages (Exhibit No. 1008).

U.S. Patent Publication No. 2017/0131884, issued on May 11, 2017, Jeon et al., 90 pages (Exhibit 1017).

U.S. Patent Publication No. 2018/0159812, issued on Jun. 7, 2018, Sarafa et al., 29 pages (Exhibit No. 1007).

"Free Open-Source Distributed Alternative to Twitter: Mastodon," T5 by Robin Good, Oct. 10, 2016, retrieved from: URL <tools.robingood.com/site/contents/content/765621/2016-10-06/free-open-source-distributed-alternative-to-twittermastodon>, retrieved on Dec. 11, 2019.

"How to Retweet Anything iPhone iPad iPod Mac," Tech & Design, Jul. 18, 2015, retrieved from: URL <https://www.youtube.com/watch?v=6D MkQO0zjY>, (Video Submission), retrieved on Dec. 11, 2019.

(56) References Cited

OTHER PUBLICATIONS

"How to Retweet the Right Way (With a Comment) on Twitter," HubSpot.com, Apr. 15, 2015, retrieved from: URL <https://blog.hubspot.com/blog/tabid/6307/bid/27675/how-to-retweet-the-right-way-in-4-easy-steps.aspx>, retrieved on Dec. 11, 2019.

"How To Retweet With A Comment, aka Use The Life-Changing Feature Twitter Just Added," Bustle.com, Apr. 7, JO 15, retrieved from: URL <https://www.bustle.com/articles/7 4648-how-to-retweet-with-a-comment-aka-use-the-life-changing-feature-twitter-just-added>, retrieved on Dec. 11, 2019.

"How To Use the New Retweet Function on Twitter-Social Media Solutions," Plexus Worldwide, Apr. 7, 2015, retrieved from: URL <https://www.youtube.com/watch?v=Ji9mAP8vwiQ>, (Video Submission), retrieved on Dec. 11, 2019.

"Narwhal: The Best Reddit Client-Apps (App Walkthrough," Corban Tech, Dec. 16, 2016, retrieved from: URL <https://www.youtube.com/watch?v=78wgtwP1 hKE>, (Video Submission), retrieved on Dec. 11, 2019.

"Outlook for Android: Swipe Options, Swipe Left for Reply, Swipe Right for Forward. Please Add These Options," Outlook.uservoice.com, Sep. 30, 2015, retrieved from: URL<https://outlook.uservoice.com/forums/293346-.Jutlook-for-android/suggestions/9992319-swipe-options-swipe-left-for-reply-swipe-right-f>, retrieved on Dec. 11, 2019.

"Share Messages in Slack: From Channels to Search—Learn How Slack Works From Top To Bottom!," Slack.com, retrieved from: URL <https://slack.com/help/articles/20327 4767-Share-messages-in-Slack>, retrieved on Dec. 16, 2019.

"Sharing Messages in Slack," Slackhq.com, May 2016, retrieved from: URL <https://slackhq.com/sharing-messages-in-slack>, retrieved on Dec. 11, 2019.

"Top 50 Features of Slack to Boost Your Productivity", Blog.standuply.com, Sep. 11, 2016, retrieved from: <https://blog.standuply.com/50-additional-features-of-slack-to-boost-your-productivity-959ee56f7893>, retrieved on Dec. 11, 2019.

"Twitter Updates Tweetoeck, Allows Users to Edit and Retweet," Mashable.com, Mar. 22, 2012, retrieved from: URL <https://mashable.com/2012/03/22/tweetdeck-rt-updates/>, retrieved on Dec. 11, 2019.

"Using Slack," Slack.com, 2019, retrieved from: URL <https://slack.com/help/articles/20327 4767>, retrieved on Dec. 11, 2019.

"WhatsApp Can Quote Messages You Want to Respond To," Engadget.com, Jun. 2016, retrieved from: URL <https://www.engadget.com/2016/06/12/whatsapp-quote-messages/>, retrieved on Dec. 11, 2019.

Brown, A. (2016). WhatsApp quietly introduced a brand-new way to reply to your messages. Express. Available online from https://www.express.eo.uk/life-style/science-technology/679325/WhatsApp-How-To-Quote-Message-In-Reply-iOS-Android-Chat.

International Search Report and Written Opinion for PCT Application No. PCT/U52018/13462 dated Apr. 4, 2018.

Slack. "Share messages in Slack" in "Using Slack". Obtained from hllps://gel.slack.help/hc/en-us/articles/20327 4767-Share-messages-in-Slack. Jan. 2017.

Written Opinion of related PCT Application No. PCT/US2018/13462 dated Apr. 4, 2018.

Bell [online], "How to send a message in invisible ink in iOS 10," cultofmac.com, Aug. 28, 2016, retrieved from URL <https://www.cultofmac.com/?s=how+to+send+a+message+in+invisible+ink>, 7 pages.

* cited by examiner

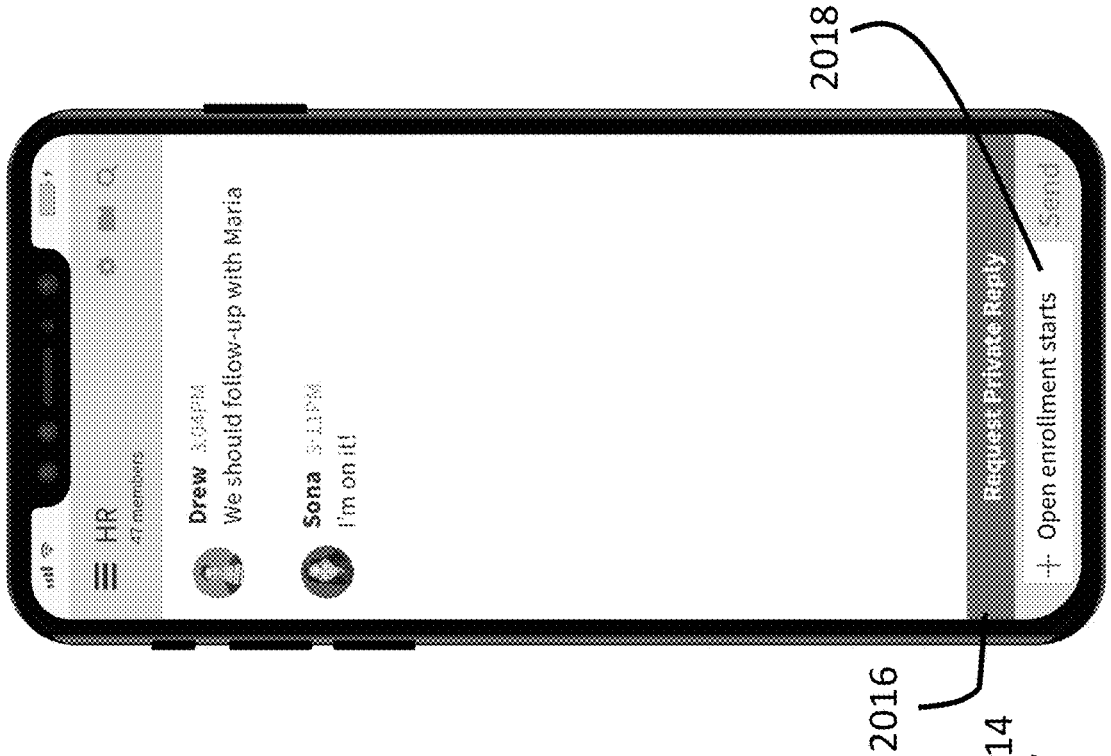
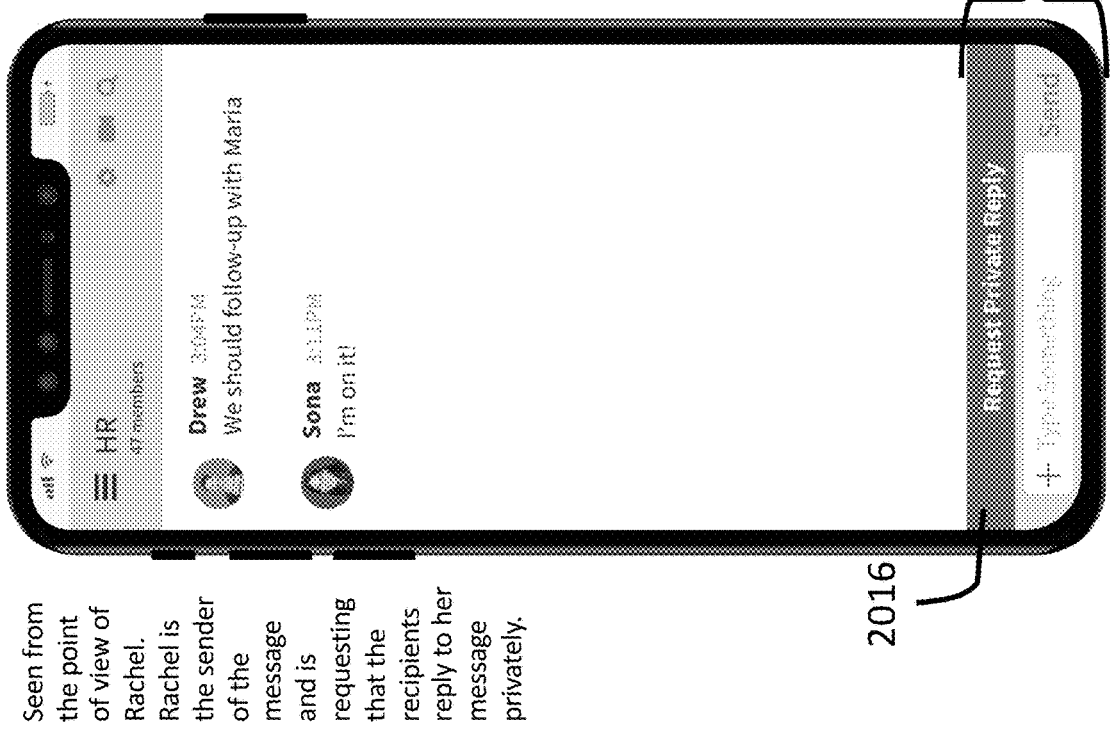

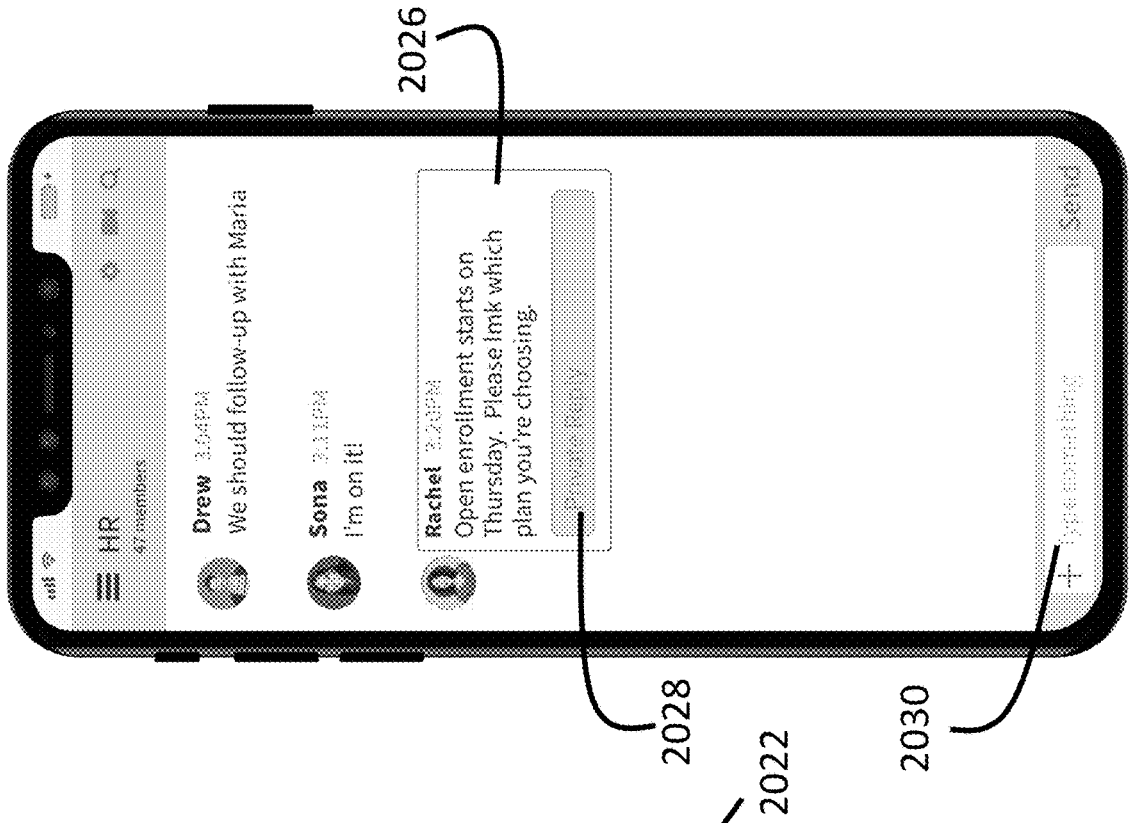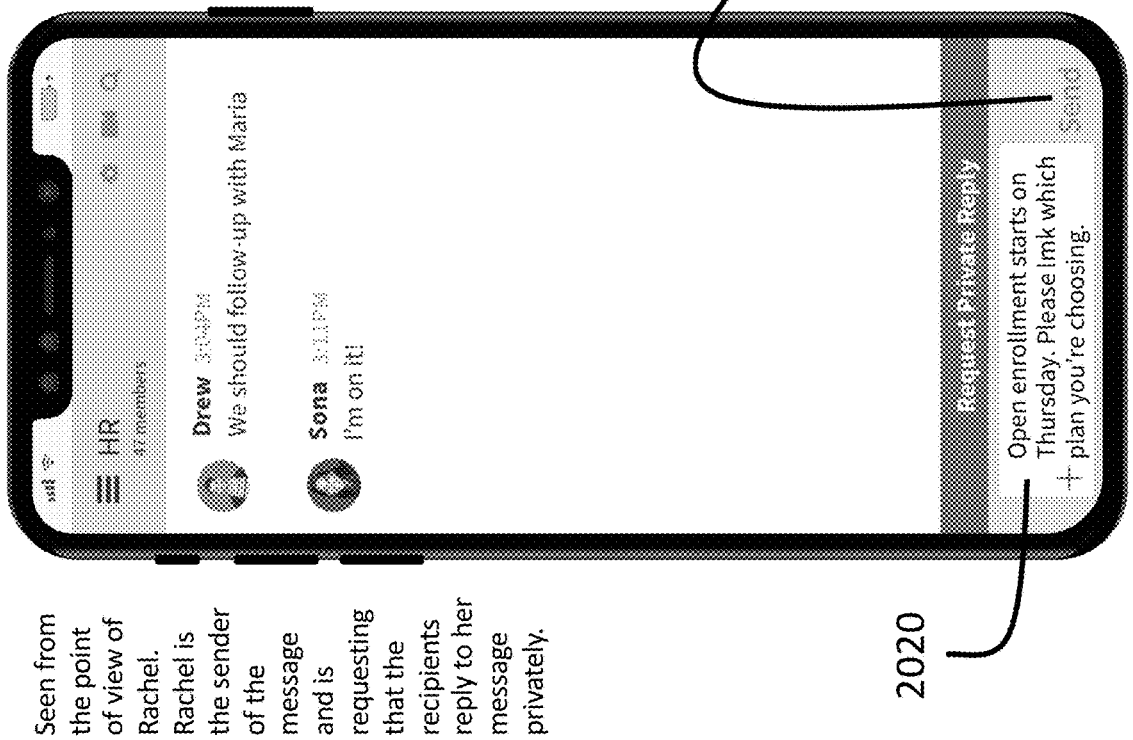

76C, 76D, 76E as seen from the point of view of Mary. Mary is a recipient of Rachel's message.

Seen from the point of view of Mary.
Mary is a recipient of Rachel's message.

Figures 79B, 79C and 79D as seen from the point of view of Mary. Mary is a recipient of Rachel's message.

Seen from the point of view of Rachel.

Rachel is the sender of the message and is requesting that the recipients reply to her message privately.

Seen from the point of view of Rachel.

Rachel is the sender of the message and is requesting that the recipients reply to her message privately.

Seen from the point of view of Rachel.

Rachel is the sender of the message and is requesting that the recipients reply to her message privately.

Seen from the point of view of Rachel.

Rachel is the sender of the message and is requesting that the recipients reply to her message privately.

Seen from the point of view of Mary. Mary is a recipient of Rachel's message.

Seen from the point of view of Mary.

Seen from the point of view of Paul, a member of the Sales channel

Alternative Embodiment: Seen from the point of view of Paul, a member of the Sales channel. In this embodiment Paul can specify one or more recipients of his Request Private Reply message.

Alternative Embodiment: Seen from the point of view of Paul, a member of the Sales channel. In this embodiment Paul can specify one or more recipients of his Request Private Reply message.

Alternative Embodiment: Seen from the point of view of Paul, a member of the Sales channel. In this embodiment Paul can specify one or more recipients of his Request Private Reply message.

Seen from the point of view of Paul ("me") in this example

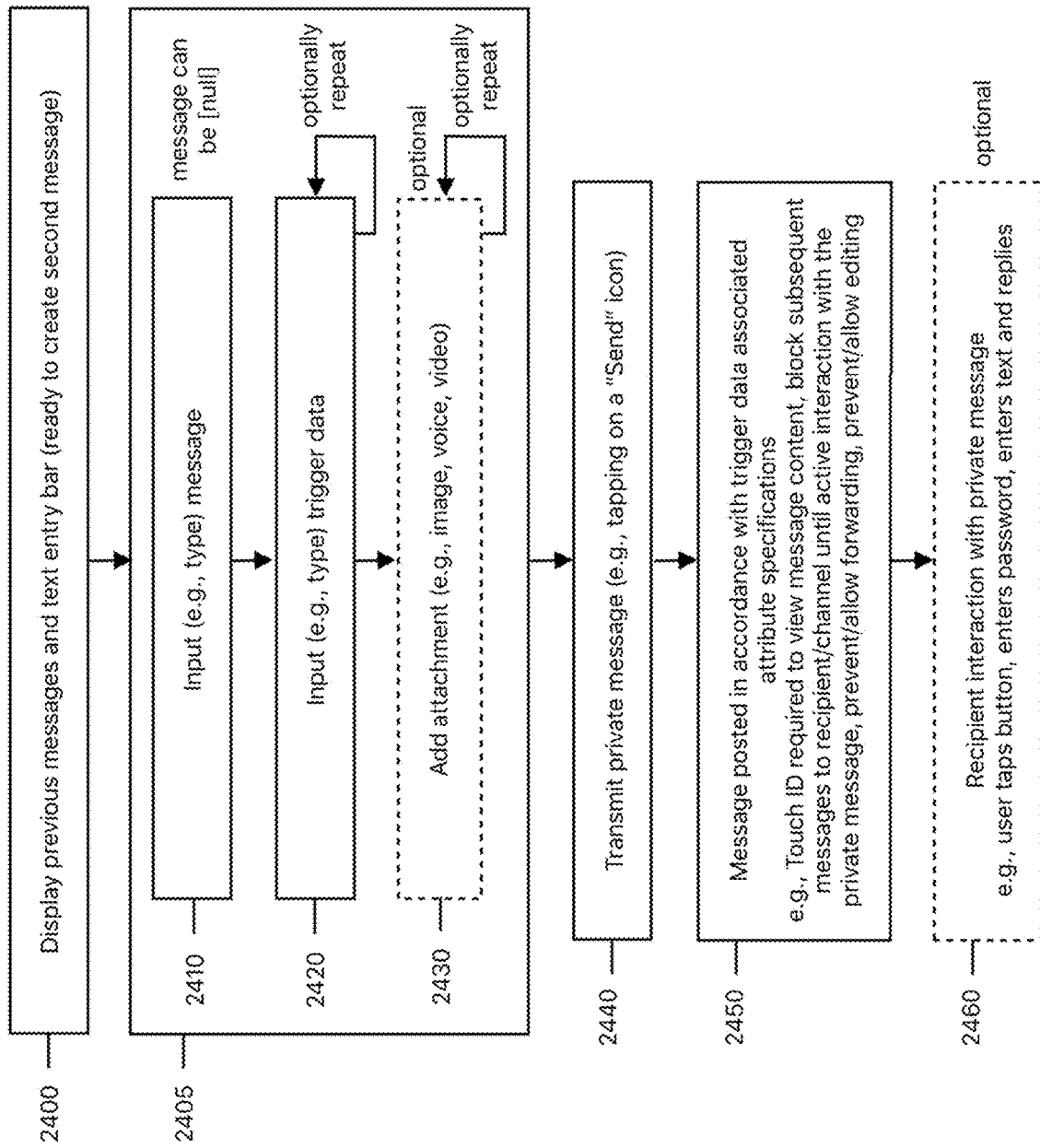

Figure 30

| Figure 30A | Figure 30B | Figure 30C | Figure 30D | Figure 30E |

Figure 31

| Figure 31A | Figure 31B | Figure 31C | Figure 31D |

Figure 32

| Figure 32A | Figure 32B | Figure 32C | Figure 32D |

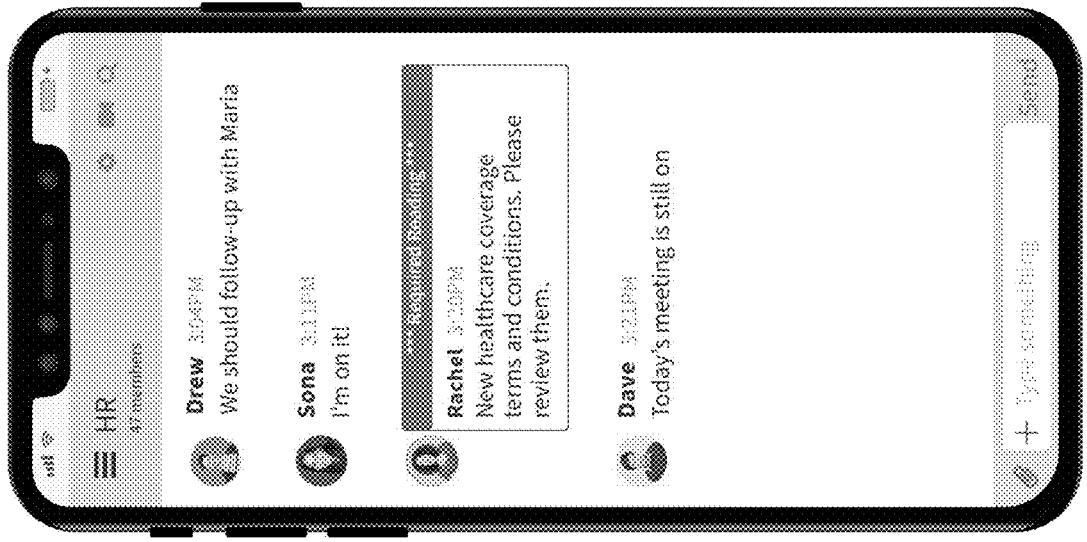

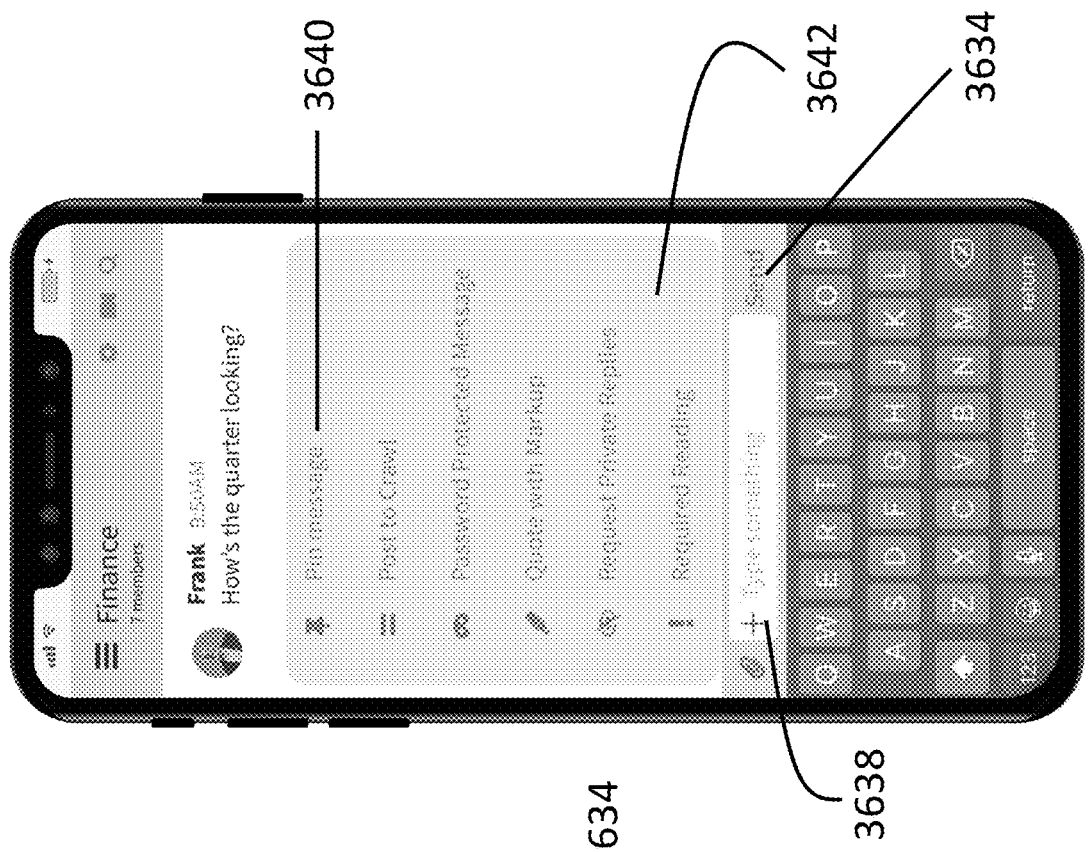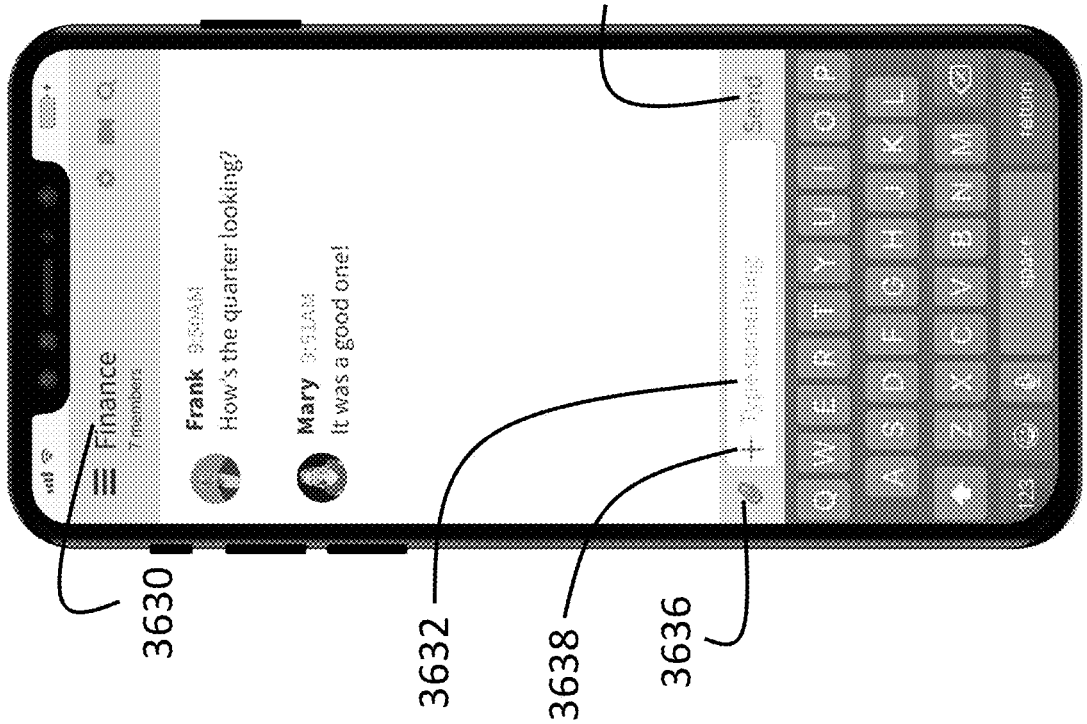

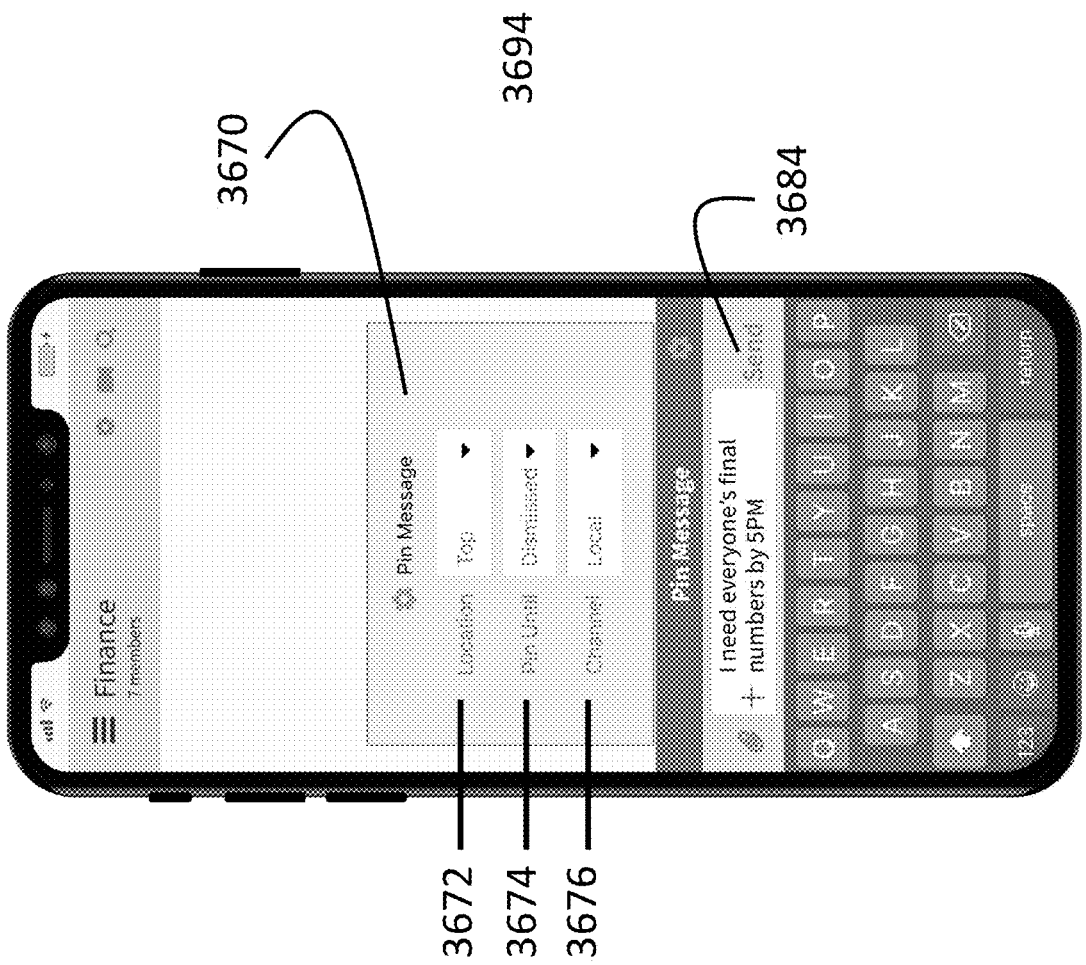

METHOD AND APPARATUS FOR INTERACTION IN A MESSAGING SYSTEM

CROSS REFERENCE TO RELATED APPLICATIONS

This application is a Continuation-In-Part of U.S. patent application Ser. No. 16/931,283 filed Jul. 16, 2020 which is a Continuation-In-Part of U.S. patent application Ser. No. 16/712,952 filed Dec. 12, 2019, now U.S. Pat. No. 10,728,192, which is a Continuation of U.S. patent application Ser. No. 16/376,427, filed Apr. 5, 2019, now U.S. Pat. No. 10,547,575, which is a Continuation-In-Part of U.S. patent application Ser. No. 16/014,578, filed Jun. 21, 2018, which is a Continuation-In-Part of U.S. patent application Ser. No. 15/858,696, filed Dec. 29, 2017, now as U.S. Pat. No. 10,025,475, issued Jul. 17, 2018, which is a Continuation-In-Part of Ser. No. 15/431,077, filed Feb. 13, 2017, now as U.S. Pat. No. 9,860,198, issued Jan. 2, 2018, which claims the benefit of priority under 35 U.S.C. 119(e) to U.S. Provisional Patent Application No. 62/446,067, filed Jan. 13, 2017.

This application is also a Continuation-In-Part of U.S. patent application Ser. No. 16/931,283 filed Jul. 16, 2020 which is a Continuation-in-Part of U.S. patent application Ser. No. 16/746,412 filed Jan. 17, 2020, which is a Continuation-In-Part of U.S. patent application Ser. No. 16/712,952 filed Dec. 12, 2019, now U.S. Pat. No. 10,728,192, which is a Continuation of U.S. patent application Ser. No. 16/376,427, filed Apr. 5, 2019, now U.S. Pat. No. 10,547,575, which is a Continuation-In-Part of U.S. patent application Ser. No. 16/014,578, filed Jun. 21, 2018, which is a Continuation-In-Part of U.S. patent application Ser. No. 15/858,696, filed Dec. 29, 2017, now as U.S. Pat. No. 10,025,475, issued Jul. 17, 2018, which is a Continuation-In-Part of Ser. No. 15/431,077, filed Feb. 13, 2017, now as U.S. Pat. No. 9,860,198, issued Jan. 2, 2018, which claims the benefit of priority under 35 U.S.C. 119(e) to U.S. Provisional Patent Application No. 62/446,067, filed Jan. 13, 2017.

This application is also a Continuation-In-Part of U.S. patent application Ser. No. 16/931,283 filed Jul. 16, 2020 which is a Continuation-In-Part of U.S. patent application Ser. No. 16/746,412 filed Jan. 17, 2020, which is a Continuation-In-Part of U.S. patent application Ser. No. 16/376,427 filed Apr. 5, 2019, now U.S. Pat. No. 10,547,575, which is a Continuation-in-Part of U.S. patent application Ser. No. 16/014,578 filed Jun. 21, 2018, which is a Continuation-In-Part of U.S. patent application Ser. No. 15/609,663, filed May 31, 2017, now U.S. Pat. No. 10,009,300, which is a Continuation of U.S. patent application Ser. No. 15/293,620, filed Oct. 14, 2016, now U.S. Pat. No. 9,712,466, which claims the benefit of priority under 35 U.S.C. § 119(e) to U.S. Provisional Patent Application No. 62/358,719, filed Jul. 6, 2016, and U.S. Provisional Patent Application No. 62/253,229, filed Nov. 10, 2015, the disclosures of all of which are incorporated by reference herein in their entireties.

This application is also a Continuation-In-Part of U.S. patent application Ser. No. 16/931,283 filed Jul. 16, 2020 which is a Continuation-In-Part of U.S. patent application Ser. No. 16/746,412 filed Jan. 17, 2020, which is a Continuation-In-Part of U.S. patent application Ser. No. 16/376,427 filed Apr. 5, 2019, now U.S. Pat. No. 10,547,575, which is a Continuation-In-Part of U.S. patent application Ser. No. 16/014,578 filed Jun. 21, 2018, which is a Continuation-In-Part of U.S. patent application Ser. No. 15/858,696 filed on Dec. 29, 2017, now U.S. Pat. No. 10,025,475, which a) is a Continuation-In-Part of U.S. patent application Ser. No. 15/431,077 filed Feb. 13, 2017, now U.S. Pat. No. 9,860,198, which claims the benefit of priority under 35 U.S.C. § 119(e) to U.S. Provisional Patent Application 62/446,067 filed Jan. 13, 2017, and b) claims the benefit of priority under 35 U.S.C. 119(e) to U.S. Provisional Patent Application 62/518,905 filed on Jun. 13, 2017, the disclosures of all of which are incorporated by reference herein in their entireties.

This application is also a Continuation-In-Part of U.S. patent application Ser. No. 16/931,283 filed Jul. 16, 2020 which is a Continuation-In-Part of U.S. patent application Ser. No. 16/746,412 filed Jan. 17, 2020, which is a Continuation-In-Part of U.S. Ser. No. 16/376,427, filed Apr. 5, 2019, now U.S. Pat. No. 10,547,575, which claims the benefit of priority under 35 U.S.C. 119(e) to U.S. Provisional Patent Application 62/666,137, filed May 3, 2018, and U.S. Provisional Patent Application 62/783,410, filed Dec. 21, 2018, the disclosures of all of which are incorporated by reference herein in their entireties.

This application is also a Continuation-In-Part of U.S. patent application Ser. No. 16/931,283 filed Jul. 16, 2020 which claims the benefit of priority under 35 U.S.C. 119(e) to U.S. Provisional Patent Application 63/045,513, filed Jun. 29, 2020, the disclosure of which is incorporated by reference herein in its entirety.

FIELD OF THE INVENTION

The present invention relates to computer messaging and more particularly to management thereof. In particular, an apparatus and method are disclosed for improving computer operational efficiency through message management.

BACKGROUND OF THE INVENTION

Electronic communication, including messaging, provides a very efficient manner of information exchange In such forms of electronic communication, messages are exchanged between multiple parties in order to convey information. In one known form of messaging, two users operate respective client devices and effectively engage in conversation by transmitting messages between each other. Such communication may be in the form of a single continuous stream of back and forth messaging. Also, in some situations, more than two users (operating, for example, more than two respective client devices) may be communicating in a single continuous stream. While a single stream of messages may be transmitted in an ongoing sequence, it is also possible to have multiple channels, each with their own respective stream of messages.

Users may conduct communication with each other in different environments In one example, two users Direct Message each other and communicate effectively only with each other. In other words, the two users exchange messages with each other in a message channel, and no one else is intended to see that exchange of messages. Such messaging is private to the two users in such a channel. Alternatively, more than two users can communicate with each other in a group channel. Such messaging is sometimes referred to as "group chat" or "group messaging." In such a situation, when users communicate with each other, those users are communicating as part of a group, and everyone in the group typically sees all messages exchanged in the group channel.

Two users may privately communicate with each other in a private channel, and those same two users may communicate with each other, and others, as part of a group chat in a group channel. In such a situation, users may switch back and forth between private channels and group channels, depending upon whether communication is desired on a private basis or on a group basis.

SUMMARY OF THE INVENTION

Senders' password protected messages may be transmitted and access to those messages available after a password is received. Senders' required-reading messages may also or alternatively be transmitted and recipients' device interaction restricted until indication k received that they are read

BRIEF DESCRIPTION OF THE DRAWINGS

The disclosure is illustrated by way of example, and not by way of limitation, and will become apparent upon consideration of the following detailed description, taken in conjunction with the accompanying drawings, in which like reference characters refer to like parts throughout, and in which:

FIGS. 4-9 are screenshots of one or more exemplary embodiments of the present invention.

FIG. 28 is a flowchart diagram that illustrates exemplary @@mention in accordance with a further exemplary embodiment of the present invention.

FIG. 30 is an index figure that shows the relationship between FIGS. 30A-30E.

FIG. 31 is an index figure that shows the relationship between FIGS. 31A-31D.

FIG. 32 is an index figure that shows the relationship between FIGS. 32A-32D.

FIGS. 33-37 are screenshots of one or more exemplary embodiments of the present invention.

FIGS. 62-68 are screenshots of one or more exemplary embodiments of the present invention.

OVERVIEW

Figure 1:
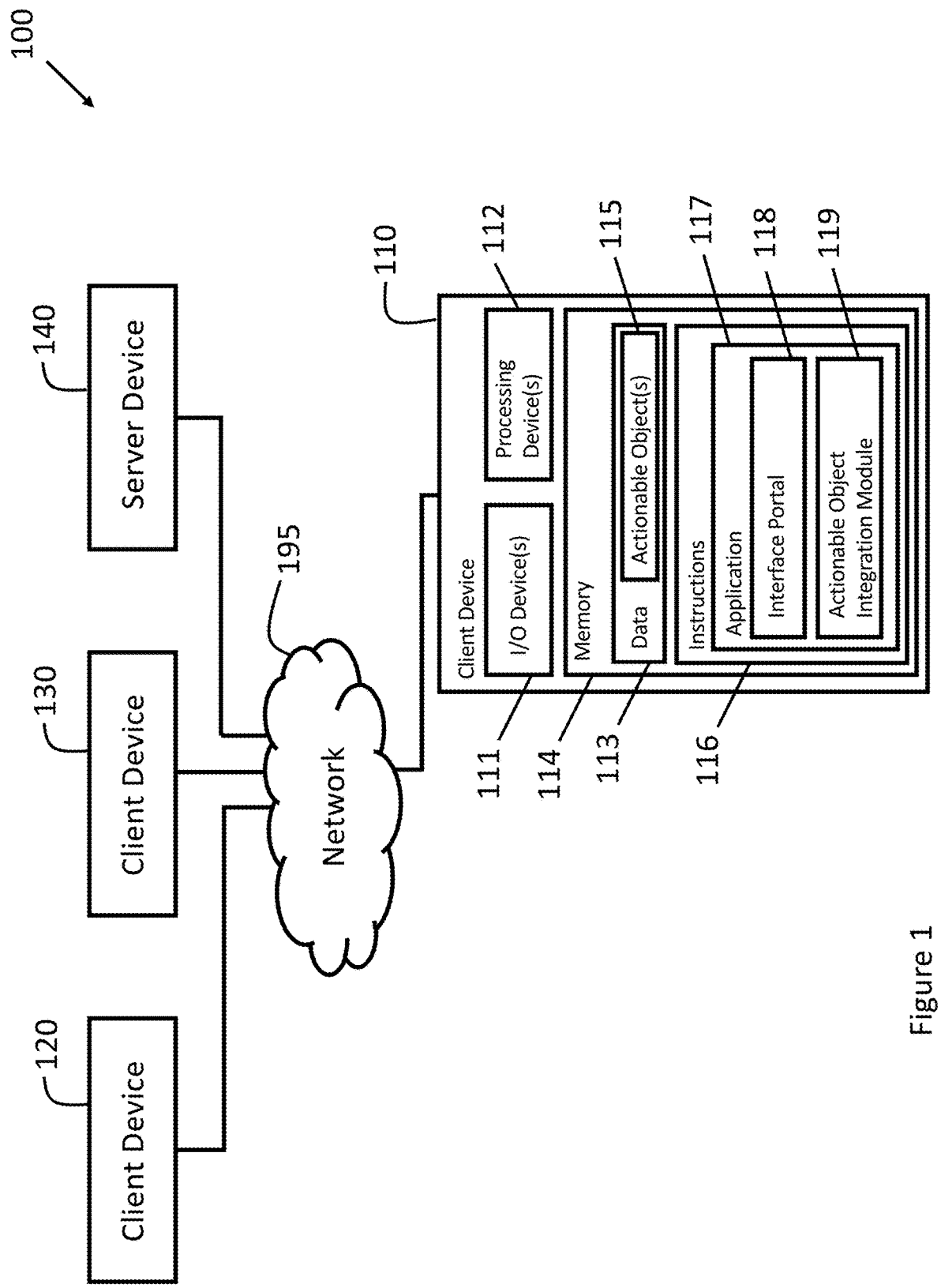
FIG. 1 is a block diagram illustrating a system in which implementations of the disclosure may operate.

The present invention relates to a method and apparatus with regard to management of communications. This overview is being provided to set forth an abbreviated explanation of the present invention, and is being provided for illustrative purposes only. Various technical features have been omitted. This overview merely describes one exemplary embodiment of the present invention, to enable partial understanding of the invention, and should not be construed as a limitation on the scope of the present invention. The Detailed Description should be carefully reviewed to obtain a more comprehensive explanation of the present invention.

Names of people and the action of transmitting a message that is either password-protected and/or required to be read are described below merely as an analogy, to facilitate an understanding of digital communications management in accordance with an exemplary embodiment of the present invention.

An exemplary embodiment of the present invention relates to the ability to send a message that is password-protected within a message stream. While two or more users may exchange messages in a message stream, it may be preferable for one or more exchanged messages to be password-protected. In this manner, the recipient of a password-protected message must enter a password in order to view (or to view more of) a message that person has received. In addition, an exemplary embodiment of the present invention relates to the ability to send a message for which reading of received message is required. While two or more users may exchange messages in a message stream, it may be preferable for one or more exchanged messages to be sent in a manner so that the recipient of a message is required to read the received message before the recipient is permitted to have further interaction with the message channel in which the message is received.

Assume, for example, that Rachel and Jeff are exchanging messages in a message stream. Rachel has sent Jeff a message (as part of a message exchange) using their respective display devices (e.g. smart phones) and Rachel wishes to send the message in a manner so that Jeff must enter a password before the message can be read. Rachel enters the message into her smart phone and indicates that the message is "password-protected." The message is transmitted to Jeff with Rachel's password protection in place. Jeff receives an indication that the message he has received is "password-protected." After entering a correct password, Jeff is then able to read the message that has been (or will be) sent to him by Rachel. Assume as a further example that Rachel has sent Jeff a message, and Rachel requires that Jeff read the message. Rachel enters the message into her smart phone and indicates that the message is "required reading" i.e. a message that Jeff must read. Jeff receives an indication that the message he has received is "required reading." Jeff is prevented from some type of access to his smart phone (e.g. the ability to read other messages in his smart phone) until Jeff reads the "required reading" message from Rachel. After Jeff reads the "required reading" message, Jeff again has the ability to read other messages in his smartphone.

DETAILED DESCRIPTION

Implementations of the disclosure provide techniques for allowing users to participate in a group chat (e.g. in a group messaging channel). One or more users can request that one or more users reply to a message in a private (or possibly semi-private manner). Users may then respond to such a request in a private or semi-private manner. This may be advantageous in improving chat messaging technology by reducing the steps that users may need to perform to switch from a group channel to a private channel (or vice versa). This may also be advantageous in improving chat messaging technology by reducing clutter in a group channel. This may also be advantageous in improving organization of a chat messaging system. Keeping public and private messages that are related to Sales, for example, in the "Sales" channel, as opposed to those messages being distributed among various group channels and direct message channels, results in a more predictable and organized approach to locating Sales related messages in the future. This may also be advantageous in improving chat messaging by allowing users to control whether (or request that) responses to messages are transmitted publicly (in a group) or privately (between designated individuals). By providing control and/or requests, improved security may be obtained (i.e. the person replying is more likely to reply privately, as opposed to reluctantly or accidently providing private, confidential or sensitive information in a reply in a public/group environment.

To communicate typically, users may communicate in a variety of places (channels). The present invention provides a technical advantage by automating the switching of replies from a public/group environment to a private (DM) or semi-private environment. The switching between public/group channels and private channels also helps to reduce clutter, i.e., a reduction in the number of messages that are displayed, that may be of little or no use or significance to others in the public/group channels. In this manner, an improvement is obtained when users read messages in group channels, as messages unnecessary for the (entire) group to see are omitted from the public/group channel, and thus information relevant to the group can be read more quickly and efficiently. Among other benefits, the reduction of channel clutter and the ability to respond privately in group channels can change the nature of users' perception of and experience with group chat.

Additional advantages may be obtained by aggregating private messages on a display. The use of aggregation in a display allows messages each privately sent in response to a common query (the message requesting the private replies) to be viewed together. This allows more efficient operation, for example, of the communication device sending the query, as the aggregation allows the querying user to see multiple responses without having to operate his/her device to see responses in separate channels.

Although implementations of the disclosure may be particularly beneficial in certain types of communication platforms (e.g., chat room communications), other types of communication platforms can be utilized in conjunction with the disclosure. For example, some of these communication platforms may include platforms for text messages, short message services (SMS), rich communications services (RCS), e-mails and other types of similar on-line communication platforms for facilitating information exchanges between client devices of a plurality of participants.

In the following description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The disclosure is related to a system for performing the operations herein. This system may be specially constructed for the required purposes or it may comprise a general-purpose computing device selectively activated or reconfigured by a computer program stored therein. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

In some implementations, the computer program product, or software may include a non-transitory machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

In one implementation, the computer program product may be installed and/or a service may be selected from a cloud-computing environment in order to obtain the benefits of the techniques described herein. In an implementation, the computer program product may be downloaded onto a client device. For example, a participant may elect to download the computer program product from a service associated with an online server. The client device may transmit a request for the computer program product over a network and, in response, receive the computer program product from the service. The computer program product may be installed locally on the client device or stored at the service and may be accessed through the client device, for example, via a mobile web browser.

While the present explanation may repeatedly refer to "text" messages, it is understood that text messages may be text, an alternative to text, and/or a combination of text and alternatives. Numerous types of data may be transmitted via text messages, and are contemplated as being transmitted when "text" messaging is referred to herein. The data may correspond to characters, audio, video, images, GIFS, emojis, stickers, etc.

FIG. 1 is a block diagram illustrating a system 100 in which implementations of the disclosure may operate. In some implementations, the system 100 may facilitate the transfer of electronic communications between computing devices of two or more users or participants over a communication network. The system 100 can include one or more servers (e.g. server device 140), which provide access or a communication link between a plurality of client devices (e.g., client devices 110, 120 and 130) in order to facilitate communication between two or more client devices.

As shown in FIG. 1, the system 100 may include a plurality of client computing devices, such as client devices 110, 120 and 130, coupled to network 195, and one or more server computing devices, such as server device 140, capable of communicating with the client computing devices 110, 120 and 130 over the network 195. In some implementations, the network 195 may be a private network (e.g., a local area network (LAN), Wi-Fi, Bluetooth, Radio Frequency), a wide area network (WAN), intranet, etc.), or a public network (e.g., the Internet).

Server device 140 may be at one node of network 195 and capable of directly and indirectly communicating with other nodes of the network 195. For example, the server device 140 may include a web server that may be capable of communicating with client devices 110, 120 and 130 via network 195 such that it uses the network 195 to transmit and display information to a participant on a display associated with client devices. In some implementations, the server device 140 may also include a plurality of computers that exchange information with different nodes of a network for the purpose of receiving, processing and transmitting data to the client devices 110, 120 and 130.

Referring to FIG. 1, the computing devices of system 100, such as client device 110, may include one or more I/O (input/output) devices 111, processors 112, memory 114, and other components typically present in general purpose computers. "Processor" or "Processing device" herein refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data or quantum data. Although, for simplicity, a single processor 112 is depicted in FIG. 1, in some other implementations computer system 100 may comprise a plurality of processors. Similarly, in some other implementations computer system 100 may comprise a plurality of I/O devices, rather than a single I/O device 111.

Processors may refer to processors included in user devices such as smart phones, processors included with servers, and processors in other locations between communicating clients. A device may include a processor or the device may be the I/O interface that communicates with a processor.

Instructions 116 of the client device 110 may be a set of instructions to be executed directly (such as machine code) or indirectly (such as scripts) by the processor 112. In that regard, the terms "instructions," "steps" and "programs" may be used interchangeably herein. The instructions 116 may be stored in object code format for direct processing by the processors 112, or in another computer language including scripts or collections of independent source code modules that are interpreted on demand or compiled in advance.

Data 113 may be retrieved, stored or modified by processors 112 in accordance with the instructions 116. For instance, although the present disclosure is not limited by a particular data structure, the data 113 may be stored in computer registers, in a relational database as a table having a plurality of different fields and records, XML documents, or flat files. The data 113 may also be formatted in a computer-readable format such as, but not limited to, binary values, ASCII or Unicode. By further way of example only, the data 113 may comprise information sufficient to identify the relevant information, such as numbers, descriptive text, proprietary codes, pointers, references to data stored in memory or information that is used by a function to calculate the relevant data. For example, the data 113 may include actionable objects 115 that may identify user perceivable action that can be included in a chat session.

Each of the actionable objects 115 may comprise an adjustable data structure (e.g., a memory array) comprising a plurality of fields that characterize a type category to associate with a chat message. By incorporating the actionable objects 115 into the creation of the chat messages, the system 100 is able to ascribe a value "type" to each message. In one implementation, when one or more actionable objects 115 are added or inserted into a chat message of the chat session, the actionable object executes a series of steps to be performed by a corresponding user perceivable action. The series of steps can be pre-programmed, or variable, based on the context of the type category for that action. As explained below, a request for private reply message is an example of an actionable object.

In some implementations, each client device may include an application 117 to facilitate different types of electronic communications between each client device and one or more other client devices via network 195, including providing interactive interface portals 118 for facilitating various operating functions of the disclosure. In one implementation, the application 117 may be installed and/or a service may be selected in order to obtain the benefits of the techniques described herein. In an implementation, the application 117 may be downloaded onto the client device 110. For example, a participant may elect to download the application from a service associated with an online server. The client device 110 may transmit a request for the application 117 over network 195 and, in response, receive the application 117 from the service.

The application 117 may be installed locally on the client device 110. Alternatively, the application 117 can be stored at the service and may be accessed through the client device 110, for example, via a mobile web browser. By using the application 117, the client device 110 may integrate into a chat session user perceivable actionable objects, such as actionable objects 115, which can be executed by the client device 110 to enhance communications between participants of that session. In an alternative implementation, the application 117 may be a firmware embedded in communication device.

As shown in FIG. 1, the instructions 116 may include an interface portal 118 for displaying network data and to allow a participant associated with the client device 110 to interactively navigate over the display of data. The interface portal 118 provides for the display of network content, such as chat messages of a chat session or any other type of network data, to an I/O device 111 (e.g., a touch screen display) of the client device 110 by sending and receiving data across the network 195. The network data may be received in response to a transmitted chat message that includes one or more actionable objects 115.

To facilitate integrating actionable objects into a chat session, the instructions 116 of the client device 110 may include actionable object integration module 119. The actionable object integration module 119 may generate and transmit user perceivable actionable objects in a chat session that can be executed by the client devices of system 100. The functionality of the module 119 can exist in a fewer or greater number of modules than what is shown, with such modules residing at one or more computing devices, which may be geographically dispersed. The systems may be operable in conjunction with components of the client device 110 from which it may receive chat message related data and other relevant information regarding the device 110.

Figure 2:
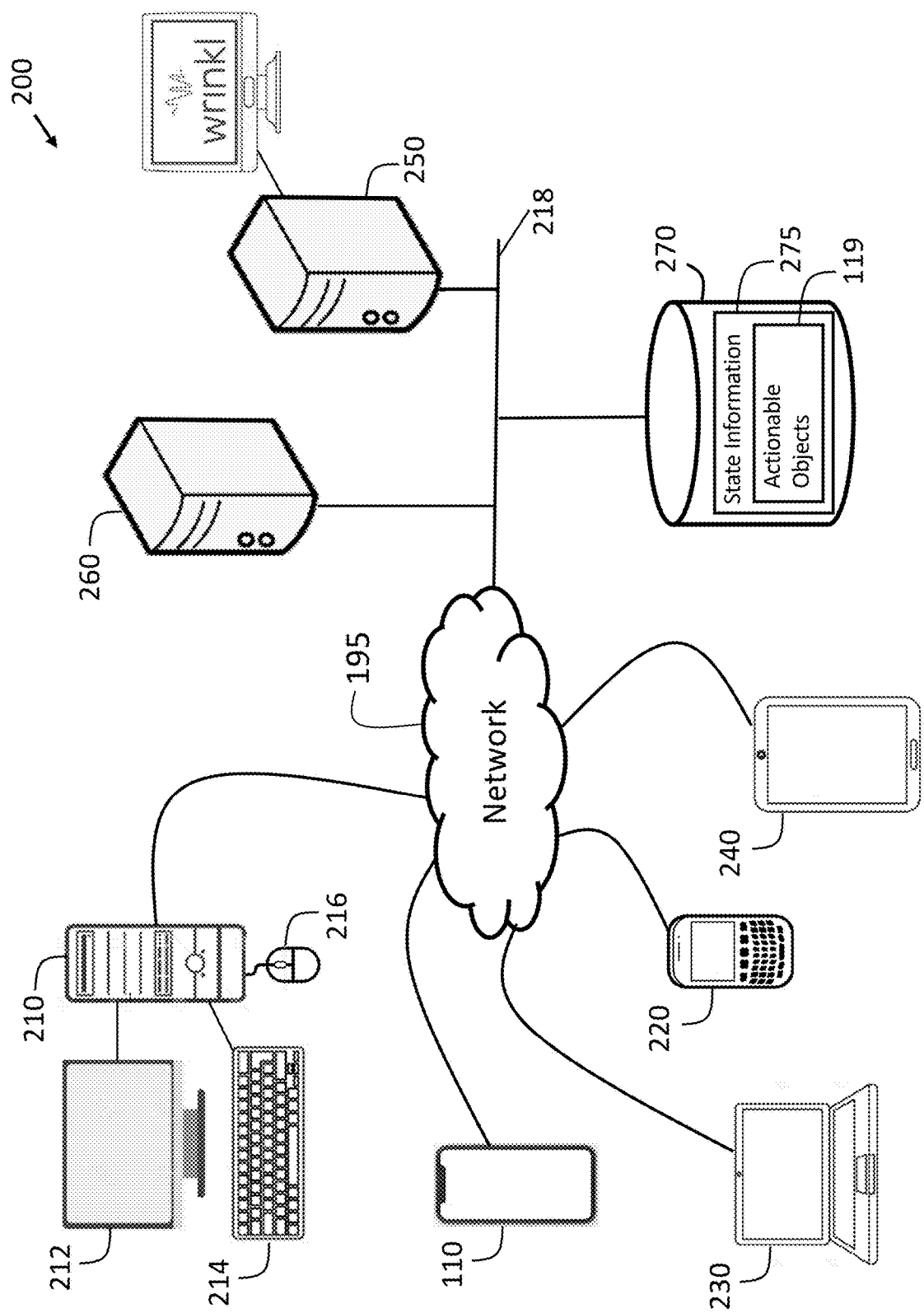
FIG. 2 is a pictorial diagram of a system including a plurality of client devices in accordance with aspects of the disclosure.

FIG. 2 is a pictorial diagram of a system 200 including a plurality of computing devices in accordance with aspects of the disclosure. In some implementations of system 200 two or more computing devices (e.g., participant/client devices) may engage in an electronic communication session (e.g., chat session) with each other. In some implementations, a first participant/client device may engage in a chat session with a second participant/client device via a network 195. As shown, FIG. 2 illustrates network 195 having a plurality of computing devices, such as client device 110, and other types of computing devices, a base station 210, a personal data assistant (PDA) 220, a laptop/netbook 230 and a tablet 240 as well as computing server devices 250 and 260 (e.g., computing devices that can be located at a number of different receiving stations). The various devices may be interconnected via a network or direct connection 218 and/or may be coupled via a communications network 195 (e.g., a LAN, WAN, the Internet, etc. that may be wired or wireless). In some implementations, the computing devices may communicate with each other before accessing the communication network 195.

Each device may include, for example, user input devices such as a keyboard 214 and mouse 216 and/or various other types of input devices such as pen-inputs, joysticks, buttons, touch screens, etc., as well as a display, which could include, for instance, a OLED, LED, LCD, TV, projector, touchscreen, etc. Each device may be a personal computer, application server, etc. By way of example only, computing device 110 may be a mobile phone while computing device 260 may be a server. Databases, such as database 270, may be accessible to one or more of the computing devices or other devices of system 200. The database 270 may comprise data, such as state information 275, associated a chat session implemented on the client devices as well as store chat messages transmitted via system 200.

In one implementation, a resource associated with the system 200 may be used to maintain a consistency of the state information 275 and in such cases when there is a system failure. This is so that the chat session can continue uninterrupted without losing chat participant details. For example, a state manager (not shown) may maintain and transfer the state information 275 to state backup storage (not shown) for later retrieval. State backup storage may be accessible by any of the computing devices of system 200 via network connection 218 so that the chat session between the participants may be rerouted while the state information 275 is maintained, if a computing device of system 200 fails.

In some implementations, the state information 275 may correspond to a chat session between participants associated with the client devices of system 200. In some implementations, the state information 275 may be stored in database 270 by the state manager running on the server device 260 and/or the client devices or some combination thereof. In one implementation, the state information 275 may include, for example, information regarding the identity of participants of the chat session, the number of chat participants, actionable objects 119 that are applied to the chat session, a unique identifier associated with each of the action objects 119 and/or the chat message or session, and an order in which chat messages are received as well as other relevant information. When an actionable object 119 is applied in a particular chat session, in one exemplary embodiment, the state information 275 for that session may be updated in accordance with the user perceivable action associated with the actionable object 119. This updating of the state information 275 in accordance with the actionable object 119 applied therein is further discussed below with respect to various interactive interfaces of the disclosure.

Embodiments of the disclosure provide actionable functionality to the contents of chat messages to distill and extract central elements of a single, one-to-one or group chat conversation. A participant of the chat sessions may be provided with a variety of different interactive interfaces to facilitate the transfer of an electronic communications between participants in a chat session. In some implementations, the interfaces allow the participants to integrate actionable objects, such as actionable objects 119 into the chat session to enhance the electronic communications between the participants. The interfaces may be flexibly configured to include various types of buttons, cursors, and tools as well as formatted content on a display on a client device. In one implementation, an application, such as application 117 of FIG. 1, on the client device of the participant may present the participant with a graphical user interface (GUI) that allows the participant to direct messages comprising the actionable objects 119 to other selected participants of the chat session.

Figure 3:
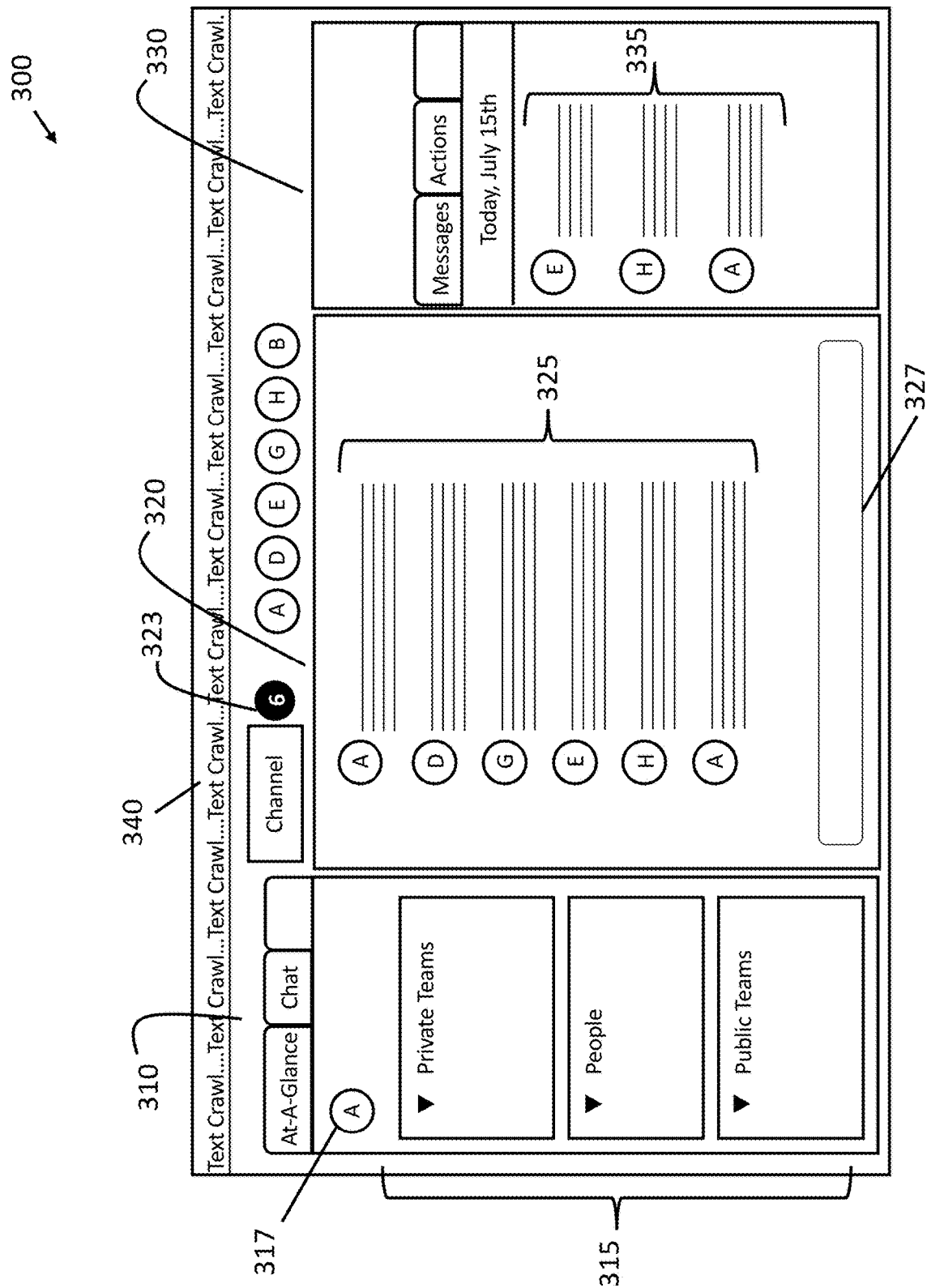
FIG. 3 is an example of a landing interface portal of a client device in accordance with aspects of the disclosure.

With regards to FIG. 3, an example of a landing interface portal 300 of a client device is shown. In some implementations, the landing interface portal 300 may correspond to the interface portal 118 in system 100 of FIG. 1. The landing interface portal 300 provides an example interface in which a chat messaging session can be engaged by a number of participants that are represented by the participant icons A, D, E, G, H and B on the portal 300. In some implementations, the interface portal 300 may include several panels that include a channel/dialog panel 310, a message window panel 320 and a side panel 330. The channel/dialog panel 310 displays the different chat session groups 315 that a particular participant 317 is a member of. The message window panel 320 displays the chat messages 325 exchanged by the participants. In this example, the messages are associated with a selected channel, although in other embodiments multiple channels with associated messages may be displayed simultaneously. In some implementations, the message window panel 320 also includes a count of the current participants 323 and a text entry region 327 that allows the participants to insert and reformat the text (i.e., bold, italics, color), add a link (hypertext link) or file, or insert an actionable object or bundle communications into a chat session. The side panel 330 can be adjusted to dynamically display elements regarding various messages or groups of messages (e.g., associated messages such as threads) 335 and other information possibly associated with the actionable objects as disclosed herein.

In some implementations, each message that is entered into the text entry region 327 is displayed in the message window panel 320. In some implementations, the messages 325 can be flagged or marked (for example, by color) to isolate the message for later use. An advantage of marking individual messages is that it provides participants with a way to indicate, highlight or associate messages, for current use or future recall for themselves or others.

As group messaging grows in popularity so too do complaints of message triviality and unnecessary channel clutter. Group channel participants are feeling inundated, distracted and interrupted. Cluttered and noisy channels are a hindrance to efficiency and productivity.

Simple questions posed in a message such as "Who's coming to the meeting?" can launch an avalanche of "I am" responses, with each response serving as an interruption and added channel clutter. Often times only the poster of a question needs, wants or should see the replies of other channel users. Often there is no need for everyone in the channel to see anyone else's or everyone else's replies, and in these cases, private replies may be preferable.

There are times when a message channel participant has a comment or question for the plurality of users in a channel but wishes for the responses to the question or comment to be private, that is, visible, respectively, only to the requestor and the particular respondent. For example, there needs to be a way for the Director of HR to send a message in a group channel that says something like "Open enrollment starts next week. Please let me know if you intend to join and if so which plan". While the request is intended for all in the channel, it may be desirable that the replies be private to the requestor due to the private nature of the information contained in the replies. It may also be desirable that replies be kept private to the requester to avoid cluttering the channel with replies, even where the information contained in the replies is not private in nature. Furthermore, it is often useful for the replies to be aggregated for the requestor to view together. It may also be useful for the reply messages to appear in the history of the message stream in the context, chronology and/or order that they are received. In some cases, additionally, the original message along with the associated replies can also or solely be aggregated and viewed together.

There are times when a message channel participant has a comment or question for a subset of users in a channel and wishes for the responses to the question or comment to be private, that is, visible only to the requestor and each particular respondent respectively, or visible only to the requester and all of the specified subset of users. For example, there may need to be a way for the VP of Sales to send a message in a group channel to just the regional sales leaders, that says something like "How close are you to hitting your Q3 regional sales goals?". While the request private replies message is intended to be hidden from most of the channel users, and is intended for just the regional sales leaders in the channel, it may also be desirable that the respective private replies be visible to all of the specified subset of users (i.e., the VP of Sales and the regional sales leaders). This approach allows the VP of Sales as well as the regional sales leaders to retain overall conversational context (i.e., the VP of Sales' question to the regional sales leaders may have been sparked by discussion in the common sales channel). By remaining in the common sales channel, and having her request private replies message posted and visible relative to the common channel messages, the VP of Sales secures a system of record of message flow and associated messages. Additionally, the specified subset of users is able to share messages privately among the subset of group users without cluttering or disclosing private information in the common channel, and the original message along with the associated replies can also or solely be aggregated and viewed together.

For each message sent in a group channel, there is the sender's view of his/her the message channel and each recipient's view of the channel. In some cases, these views are identical, or nearly identical and in other cases the views are different.

In the current art, it may be difficult to send a message requiring-private replies in a group channel that works well for both the sender and the recipient(s). For example, at present, if a sender sends a message to a group asking everyone for their home phone number, the channel will be deluged with responses visible to everyone in the channel. This is suboptimal for everyone and uncomfortable for those who do not wish to share their phone number with everyone in the channel. On the other hand, a sender may send a message to the group channel asking that everyone reply using a direct message channel (i.e., a private DM channel) to send their home phone number. This solution is suboptimal in that it requires each responding user to switch channels and, worse, it requires that the sender (i.e., the person requesting the phone numbers) to toggle between as many channels as there are responding people in the group channel in order to view the responses. Worse still, the ability to see the responses in relation to the flow of the group channel conversation is lost.

In an exemplary embodiment of the present invention, messaging devices are permitted to operate in a manner that enables the requesting and/or sending of private messages. For example, a plurality of devices are used for communicating with each other in a group messaging channel (and one or more of those devices may be used for private messaging with other devices of the plurality—as well as possibly outside of the plurality). For purposes of explanation, the devices may be referred to as a first device (that is operated by first group user) and remaining devices (that are operated by remaining group users). The users may be human beings or automated entities (e.g., bots). The first group user and the remaining groups users together may be referred to as a plurality of group users, and the plurality of group users communicate with each other, for example in a messaging channel.

The explanation below includes the use of several of the phrases set forth above. The use of those phrases within or outside of parentheticals, and the explanation below, are merely exemplary to illustrate operation of one or more exemplary embodiments of the present invention. Some names or phrases are used merely as labels to help simplify explanation of one or more exemplary embodiments, and should not be construed as limitations on the scope of the invention or the claims.

In normal operation, a user (Rachel) is a first group user that sends group messages to a group (remaining group users) in a group messaging channel. Rachel may or may not receive her own message as well. Rachel enters a group message (first group text message) into her device (first device). The message is transmitted to the remaining group users so that the message appears on remaining devices operated by the remaining group users, respectively. One or more of the remaining group users can send a message to Rachel (or back to Rachel), with the result that the message sent is displayed on Rachel's device and the devices of the remaining group users. Such communication is thus public, with all members of the message channel seeing each other's messages that are transmitted in the channel.

Figure 5:
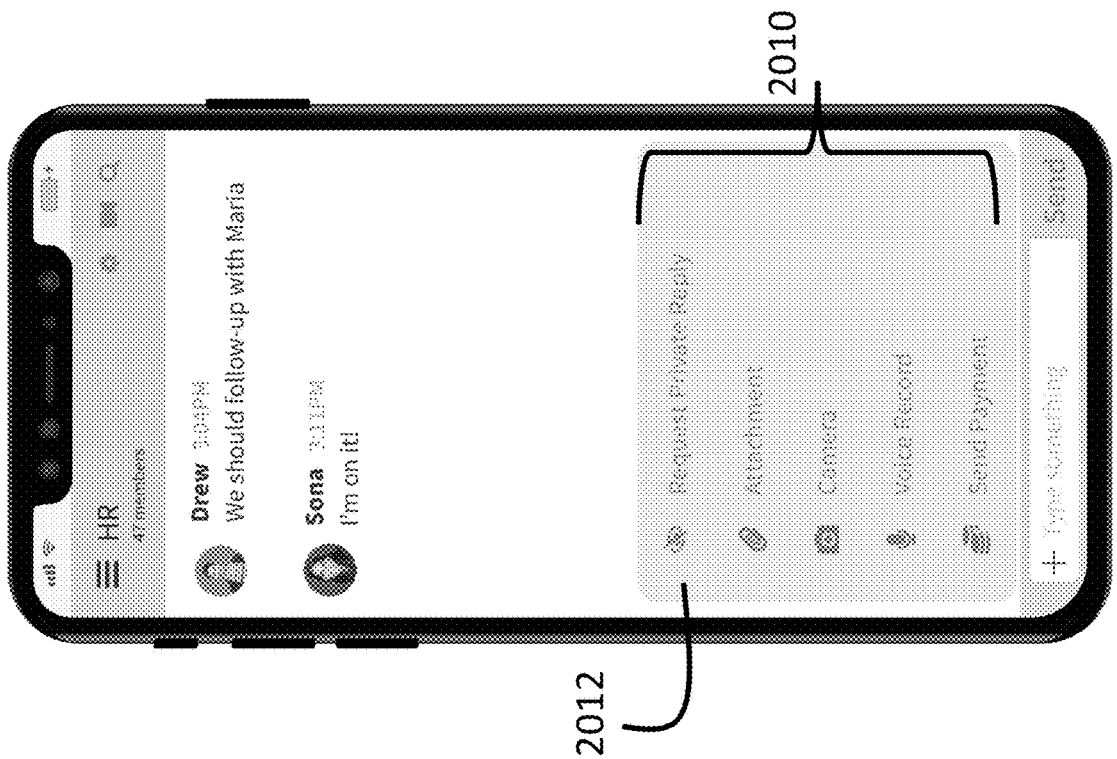
Figure 4:
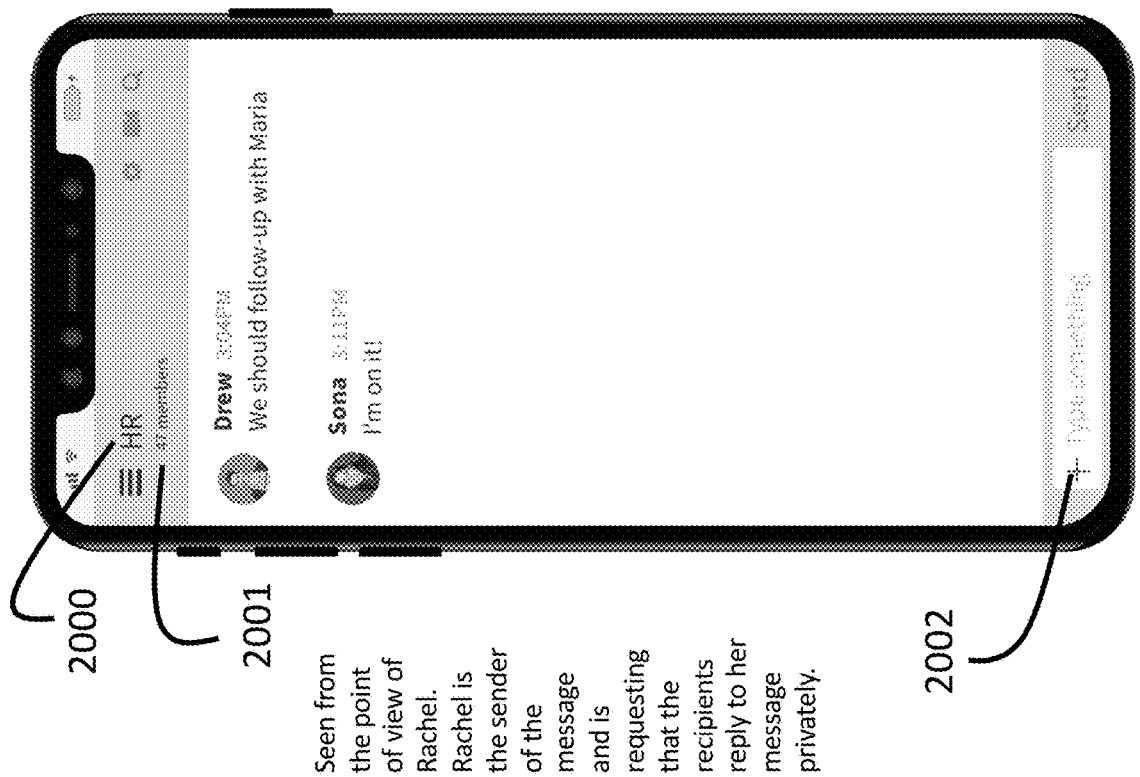

FIG. 4 shows an embodiment of a messaging system from the point of view of Rachel (first group user). Rachel is viewing a group channel (messaging channel) named "HR" (2000) which channel has 47 members (2001). In this embodiment, tapping on the "+" icon (2002) causes a text entry bar associated menu to be displayed (FIG. 5 #2010). The menu allows Rachel to, for example, augment or endow the message she is preparing to send. In this manner, the message can be constructed to invite (or possibly require) a private response outside of the view of other group messaging channel participants.

In the following explanation, the phrase "Request Private Reply" is described. The phrases "Request For Private Reply" and "Private Reply Requested" may interchangeably be used. Also, either phrase may be used in singular form ("Reply") or plural form ("Replies") interchangeably.

FIG. 5 shows an embodiment of a messaging system from the point of view of Rachel. In this example, Rachel has already tapped on the "+" icon (2002) in order to view the selection menu (2010). In this example Rachel wishes to send a message (private reply requested text message) to the group, with the qualification that replies to her group message be private. To do so, Rachel taps the menu in an area associated with the "Request Private Reply" text and "eye" icon (2012).

FIG. 6 shows an embodiment of a messaging system from the point of view of Rachel. In this embodiment, responsive to Rachel's selection of "Request Private Reply" an indication of her selection is displayed (2016) to provide her with an assurance and confirmation of her selection. In some embodiments an indication may be omitted or may be different than shown in the example. Any message entered into the text entry area (2014), once sent, will be posted into and/or associated with the channel in accordance with her desire to Request Private Replies. In some embodiments Rachel's message would be received by all members of the group. In some embodiments Rachel could specify which channel members would receive the "private reply requested" post. In other embodiments, Rachel could specify which channel member would be excluded from receiving the "private reply requested" post. In other words, in some embodiments certain channel members can be excluded from seeing her post and/or only specified members will be authorized to respond privately. In some embodiments the channel users to include are inferred. This may be based, for example, on the use of artificial intelligence (AI) and/or keywords, characters, group names, etc. that are used in the message. In other embodiments, inferred channel users are automatically identified by software. Such identification may be based on prestored information in a database, for example. As a further example, a database may include names (or other identifiers) of users that would receive a post and/or names (or other identifiers) of users to be excluded from receiving the post. In some embodiments channel members to include will be specified by the sender or programmatically determined. In some embodiments channel users to exclude will be inferred or programmatically determined in similar manner to the inferences described above. In some embodiments channel members to be excluded will be specified by the sender. In some embodiments channel members to be excluded will be specified by, for example, individual users and/or a system administrator (e.g., "do not disturb" or "do not accept messages requesting a private reply").

FIG. 7 shows an embodiment of a messaging system from the point of view of Rachel. In this Figure, Rachel has started to enter a message (private reply requested text message) into the text entry bar (2018). In some embodiments, other forms of or methods of input, such as voice, video or handwriting can be used in lieu of or in addition to text input.

FIG. 8 shows an embodiment of a messaging system from the point of view of Rachel. In this Figure, Rachel has completed the entry of her "private reply requested" message into the text entry bar (2020). By tapping on the Send button (2022) Rachel's message is posted to the channel. In some embodiments the user will click or tap on an icon, text or other visible object to cause the message to be posted to the channel. In some embodiments other methods could be employed such as voice activated, automatic sending after a predetermined amount of time, after a key or character is entered or encountered, as a result of a gesture or other interaction with the device such as shaking the device, immersing the device in a liquid, or exposing the device to a temperature that exceeds a threshold allowance.

FIG. 9 shows an embodiment of a messaging system from the point of view of Rachel. In this embodiment Rachel's message has been posted to the channel. In this manner, the private reply requested text message appears in the messaging channel and on the devices of some or all users (remaining group users) that are communicating via the channel. Display of the private reply requested text message on Rachel's device may also occur. In this embodiment, the "private reply requested" message is visibly distinguishable (2026) from standard message posts (that are not requesting private replies). In some embodiments the degree or extent of visual or other differentiation may be greater than or less than what is shown in this example. In some embodiments there may be no distinguishing characteristics. In some embodiments distinguishing characteristics are caused to become apparent after a further action such as a toggle switch is activated, or the device is physically manipulated. In this embodiment, in order to make the "private reply requested" message visibly distinguishable, a colored rectangle encloses a portion of the elements associated with the message. In this example a text entry bar (2028) is associated with the "Private Reply Requested" message in a manner to suggest and to encourage recipients of the message to enter their private reply into this "Private Reply text entry box" (2028). In some embodiments other approaches can be employed such as replacing or accompanying the standard (2030) or private reply text entry box with an icon or button that when pressed will cause a further interface to appear or to become accessible. In this embodiment the standard text entry box (2030) remains available for text entry of standard messages, however in some embodiments, an interaction with the Private Reply text entry box (2028) will deactivate or eliminate the standard text entry box (2030). In some embodiments the text entry box (2030) and Private Reply text entry box (2028) are the same. In some examples they are different. In some embodiments more than one Private Reply text entry box may be visible at the same time, as for example, in a case where several messages requesting private replies are posted one after another in a channel.

While a private reply requested message has been disclosed, this is merely exemplary of the type of message that may be sent from one user ("first group user") to another user ("remaining group user"). For example, the private reply requested text message may be one of a plurality of control messages (i.e., messages containing an actionable object) that are received by the remaining group users. Each control message may control interaction between each of the control messages and the remaining group users (i.e. what a remaining group user is permitted or enabled to with or due to a control message, or is prohibited or prevented from doing with or due to a control message) in respectively different manners depending upon the respective type of the control messages. Examples of type of control include: private reply, make message a recipient "to do", post to crawl, allow recipient/s to edit first group user's posted message, prevent the display of further messages in the recipient's message channel until an interaction with or condition of the control type message (such as entry of a password) has been satisfied.

Figure 10B:
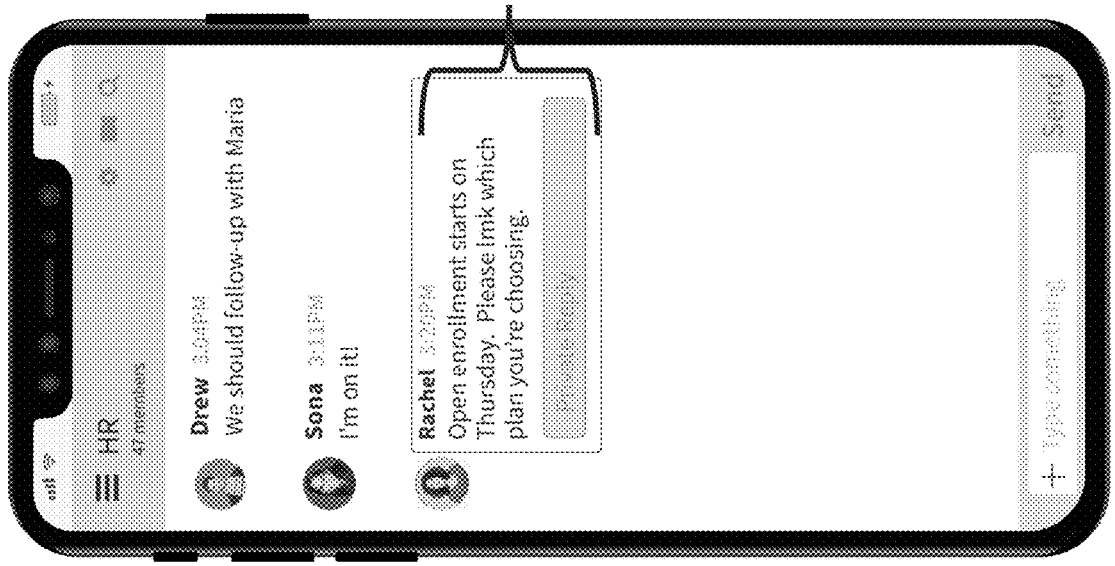
FIGS. 10A-10E are screenshots of one or more exemplary embodiments of the present invention.
Figure 10A:
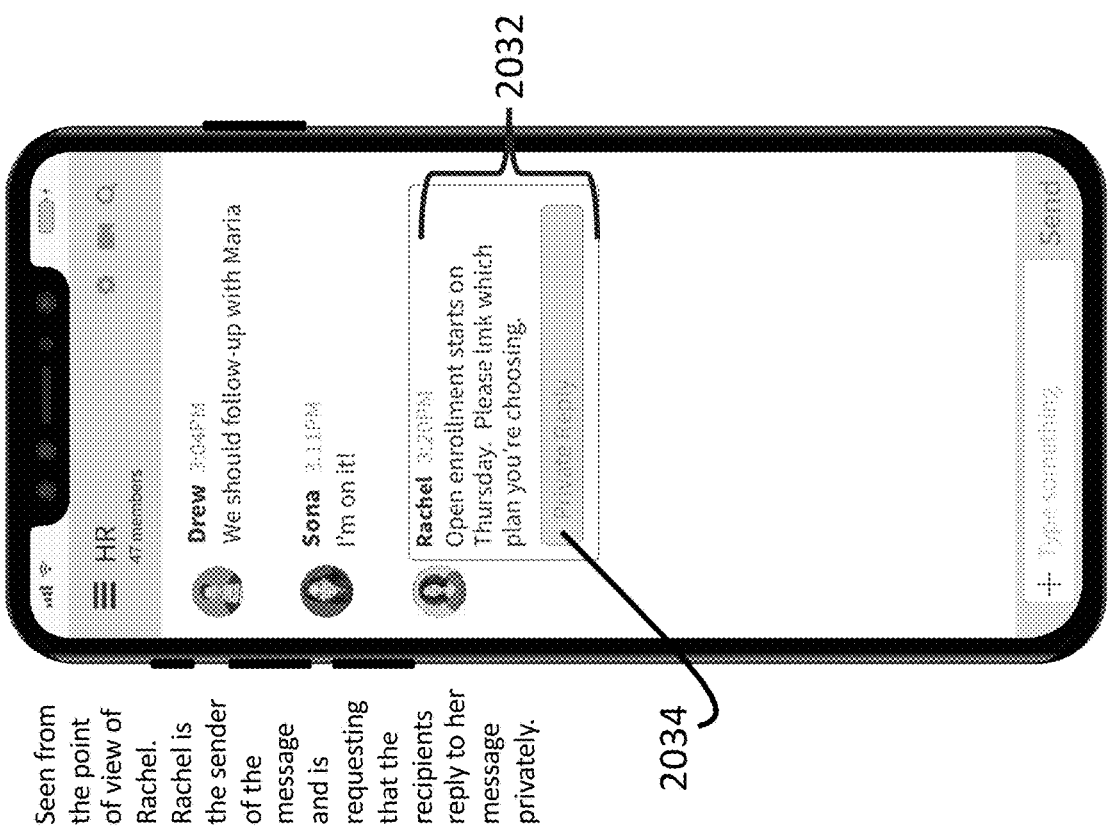

FIG. 10A shows an embodiment of a messaging system as seen from the point of view of Rachel. Rachel is the sender of the message (2032) and is requesting that the recipients reply to her message privately. Rachel may be sending her request to all of the members of the group messaging channel, or to some of the members of the group messaging channel. The receiving members may respond privately in the group messaging channel so that only Rachel and the member sending the reply sees the reply. In another embodiment, the response is only seen by Rachel and all the members that are sending a reply (e.g. members sending replies can see each other's replies, members that don't send a reply don't see messages from members that do send a reply). In another embodiment Rachel can send the request private replies message to all or some of the members of the group messaging channel, but direct the system to make the private replies be sent to (made visible to) and possibly aggregated for a further specified group user/s or third party/ies. For example, Rachel may send a message making the following request to all or a subset of channel recipients, "Please let me know if you are available to help at the charity event tonight." Rachel may have the private replies directed to (made visible to) a specified other user, such as solely her assistant, or in addition to Rachel herself. In another embodiment, for each of the remaining group users, and their respective remaining devices (the people/devices that Rachel sends her private reply requested message to) that replies to Rachel's private reply requested text message in the messaging channel with a respective private reply, each respective private reply to Rachel's private reply requested text message is displayed on Rachel's device while displaying fewer than all of the respective private replies on at least one of the remaining devices.

In FIG. 10A, Rachel posted a message to the group channel named "HR". In her message, Rachel requests that each channel member respond to her question privately. In some embodiments the request could exclude certain channel participants. In some embodiments the message can be sent to both channel recipients and via email to others.

In some embodiments a private reply text entry box is visibly associated with the message allowing recipients to enter a private reply into a text entry bar area (2034). In some embodiments some other form of response interface can be presented to recipients. In some embodiments an icon can be clicked, tapped or otherwise selected causing display of a text or other form of response interface to be presented. In some embodiments, other forms of selection such as a swipe or double tap gesture can be implemented to cause the private response interface to be activated. In some embodiments, selection is immediate and in other embodiments selection occurs upon interaction with one or more menus.

FIG. 10B shows an embodiment of a messaging system as seen from the point of view of Mary. Mary is a recipient of Rachel's "Private Reply Requested" message (2036) which message was posted in the HR channel. In this embodiment Rachel's message (FIG. 10A #2032) and (FIG. 10B #2036) appear identical to the sender (Rachel) and to a recipient (Mary), however in some embodiments, elements of the message could be different. For example, indicators associated with a message that a user sends (from that user's perspective) as opposed to a message that a user receives (from that user's perspective) could be displayed differently to different users depending on perspective.

Figure 10C:
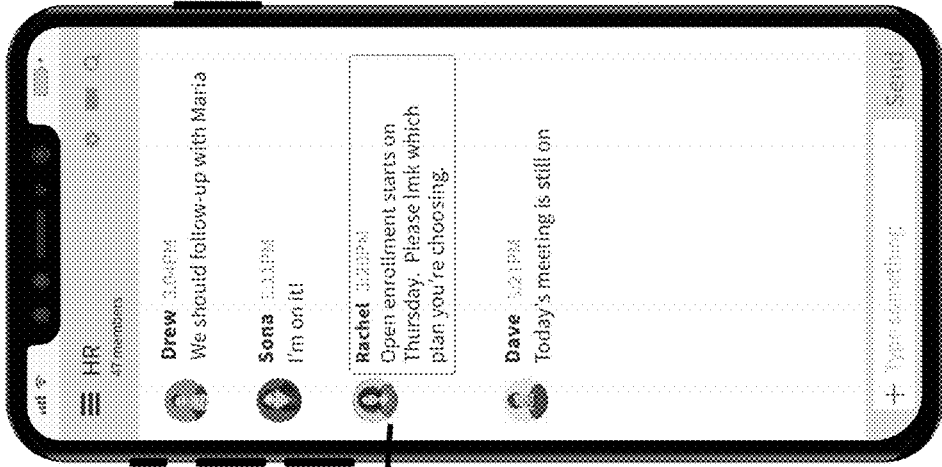
Figure 10D:
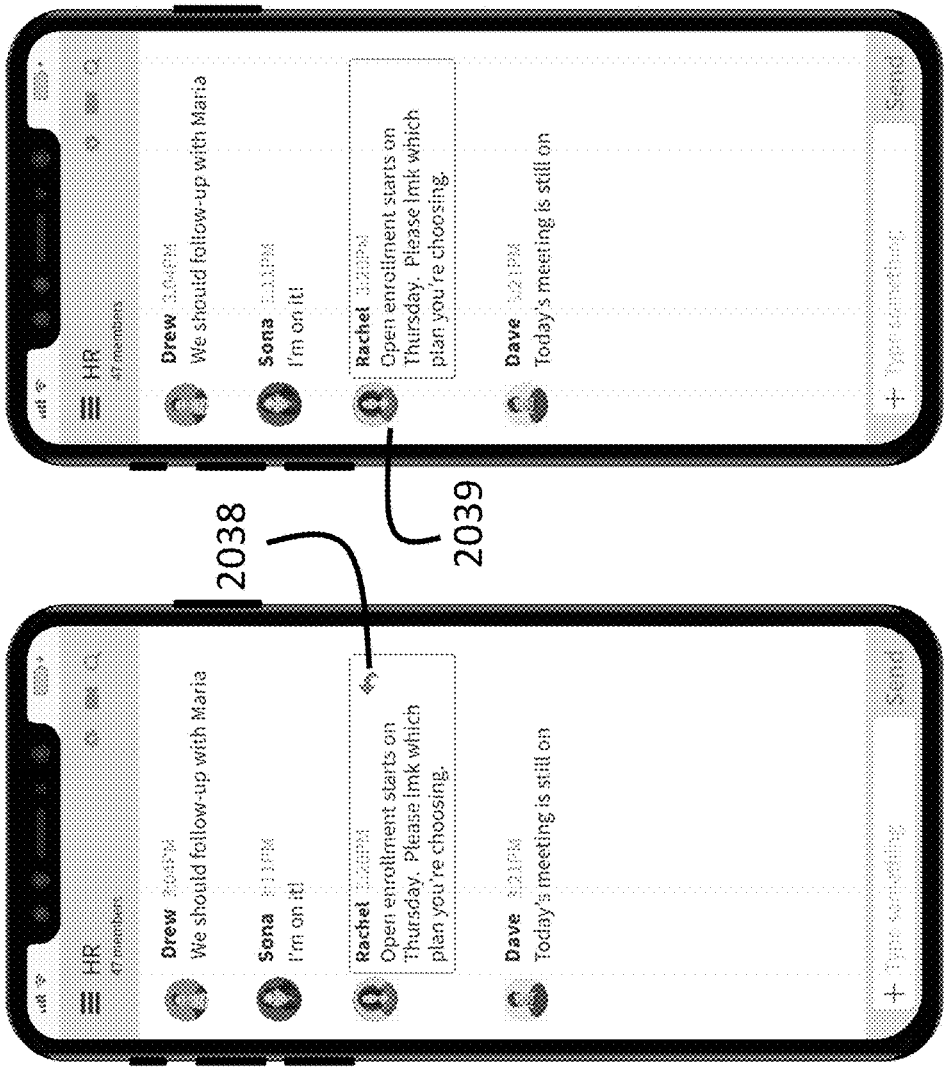
Figure 10E:
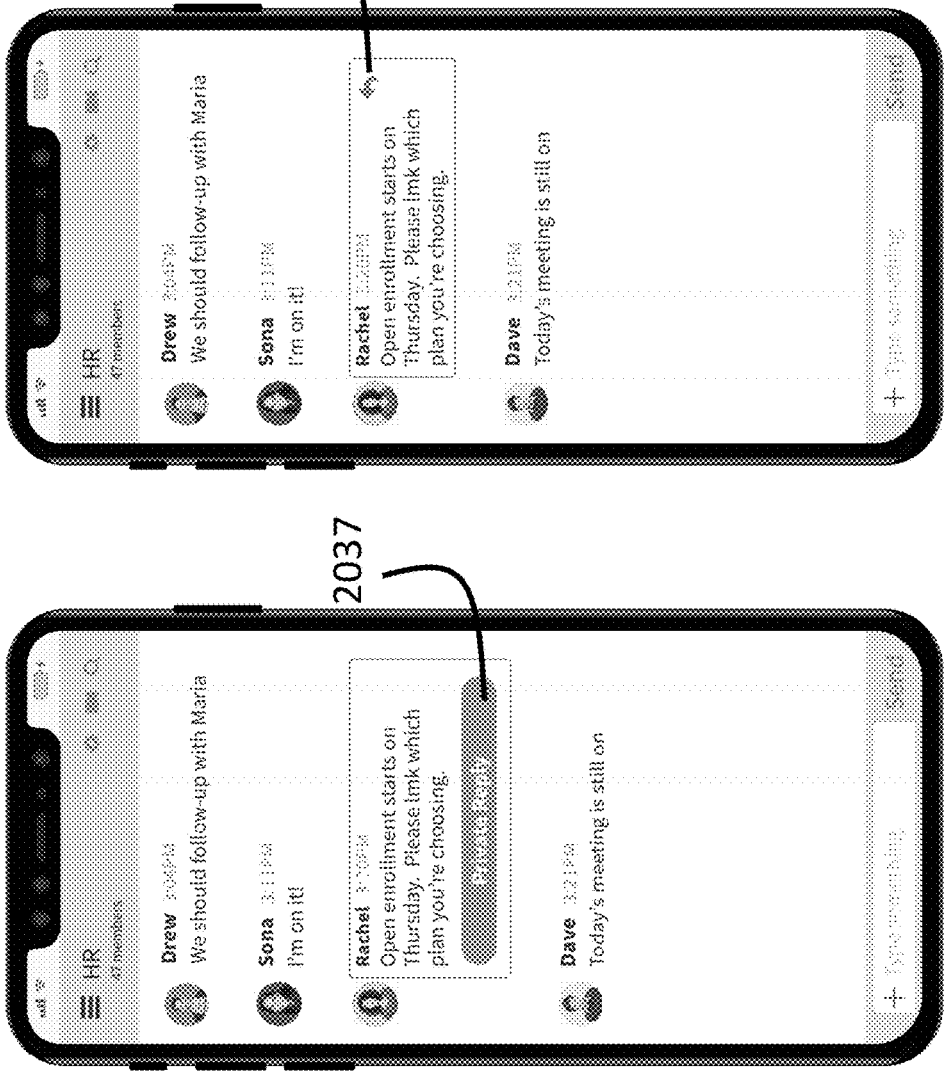

There can be many ways that a message that includes a Private Reply Request can be presented to channel users. FIGS. 10C, 10D and 10E show three such exemplary embodiments. All three of these examples show a display of a message channel from the point of view of Mary, a member of the HR channel and recipient of Rachel's "Private Reply Requested" message.

FIG. 10C In this embodiment Rachel's message includes a visible button (2037) that when tapped or otherwise selected, will initiate a private reply sequence.

FIG. 10D In this embodiment Rachel's message includes an icon (2038) that when tapped or otherwise selected, will initiate a private reply sequence.

FIG. 10E In this embodiment Rachel's message (2039) includes no visible indication of how to initiate a private reply but by swiping, tapping, shaking, speaking or otherwise interacting with an area associated with the message a private reply sequence is initiated nonetheless.

Thus, the private reply requested text message may appear differently in a messaging channel than other group text messages to indicate that the private reply requested text message seeks (or requires) a private reply from each of the remaining group users (i.e. a reply that is not visible to each other or that is not visible to users that don't reply or that is not visible to some users based on user selected or programmatic rules, criteria, algorithms, etc.). In other words, each reply is visible to the person that requested the private reply, but each reply is not visible to other remaining group users that did not receive a request for a private reply. In an exemplary embodiment, a reply is visible to the person who is replying with the reply. In an alternative embodiment, all users that receive a request for reply, and who reply, see each other's replies, but users who did not receive a request for reply do not see replies. In another embodiment, a subset of users is specified to receive a request for private reply text message, but their respective replies are visible to everyone, others, or a specified subset of users in the channel.

Figure 11B:
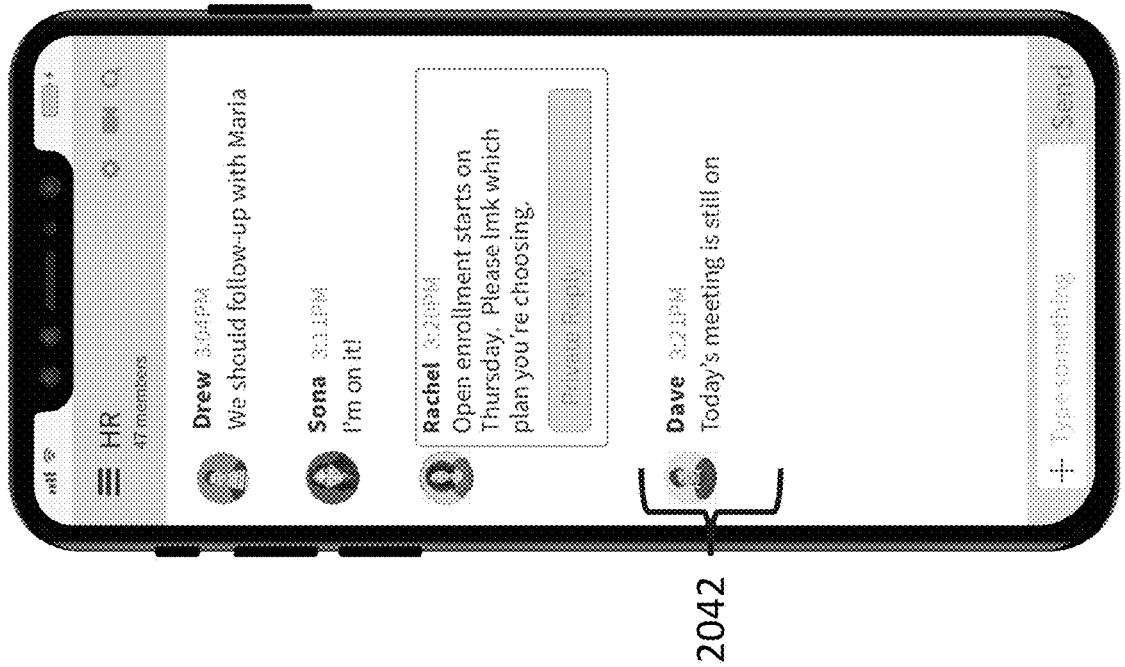
FIGS. 11A and 11B are screenshots of one or more exemplary embodiments of the present invention.
Figure 11A:
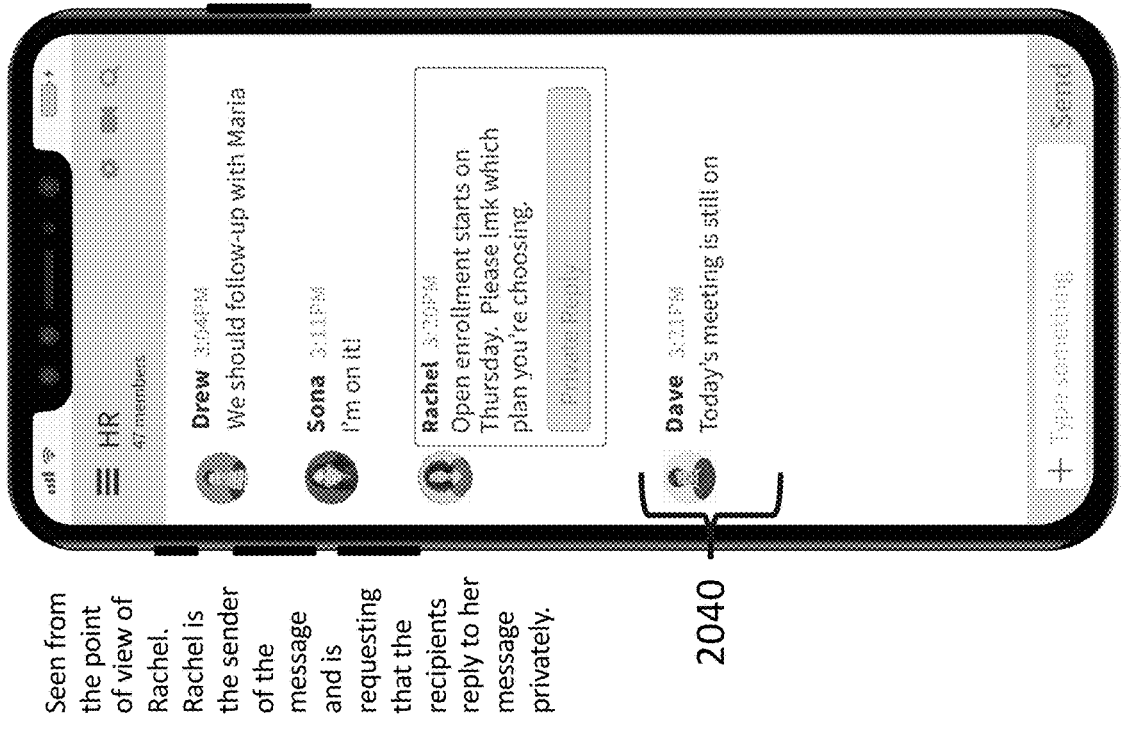

FIGS. 11A #2040 and 11B #2042 show an embodiment of a messaging system as seen from the point of view of Rachel. This Figure shows that time has elapsed, and messages continue to be posted to the HR channel. In this example, user Dave has posted a message to the channel.

Figure 12A:
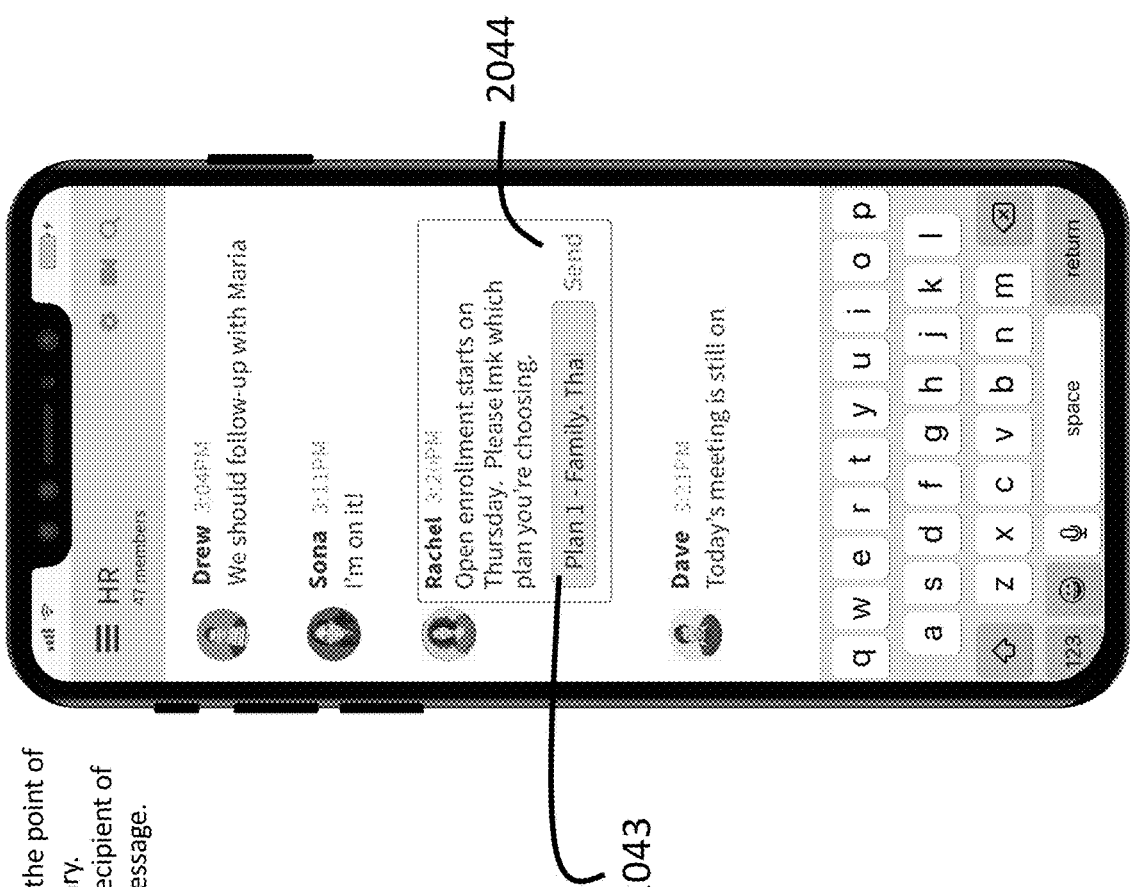
FIGS. 12A-12F are screenshots of one or more exemplary embodiments of the present invention.

FIG. 12A shows an embodiment of a messaging system as seen from the point of view of Mary. In this example, Mary has started to type a private response (2043) to Rachel's question. In this embodiment, the option to Send (2044) the reply is made visible as a result of the respondent initiating (i.e., activating the text entry area) a response. In some embodiments other methods of sending the reply are always available, remain available, or are made to be available such as displaying an icon indicating "tap here to send" or other methods such as by pressing the return button on a keyboard to post the reply message. In some embodiments the standard text entry bar can be activated to serve as the private reply text entry bar, with or without indication to the user of such activation (for example, a change of the color of the standard text entry bar upon activation for private reply).

Once a user has indicated their desire to send a private reply to a "request private reply" message, there can be many ways to facilitate and display the private reply interface. FIG. 12B, FIGS. 12C and 12D, and FIGS. 12E and 12F show three such alternative approaches. All three of these examples show a display of a message channel from the point of view of Mary, a member of the HR channel and recipient of Rachel's "Private Reply Request" message.

Figure 12B:
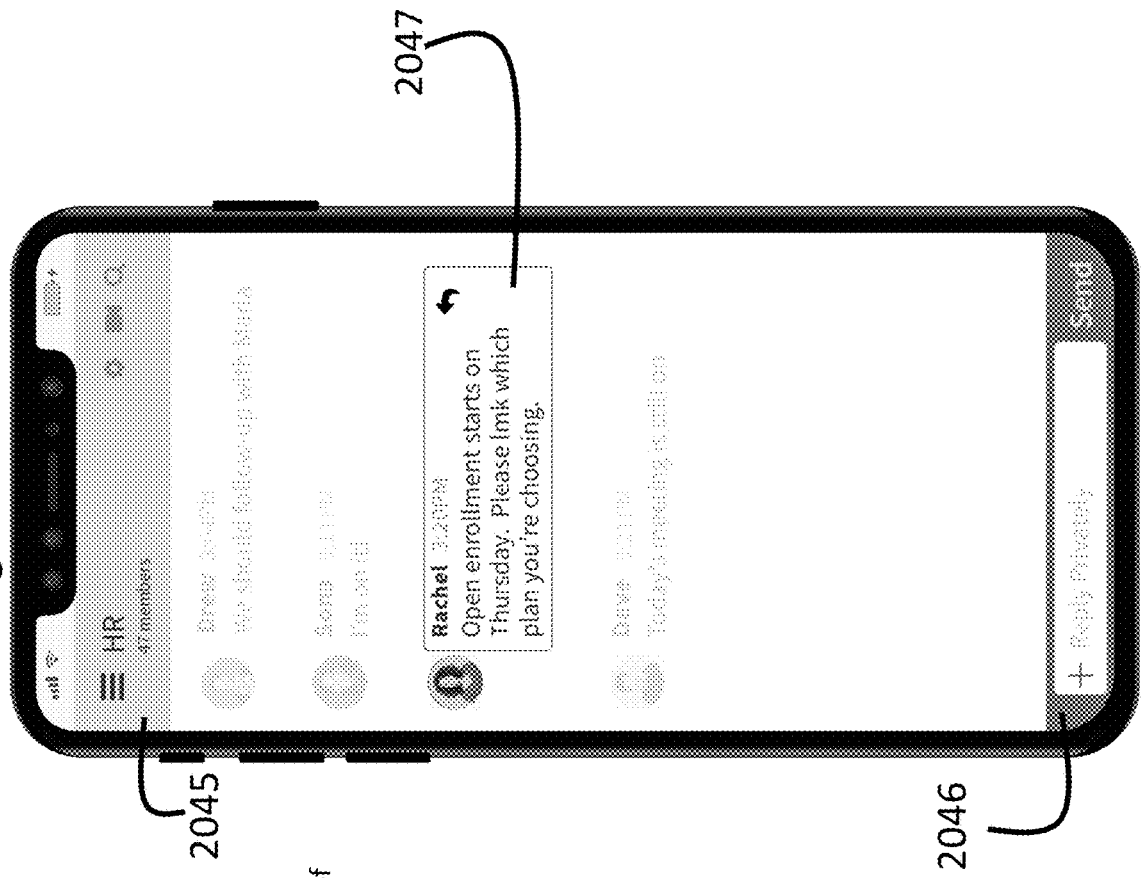

FIG. 12B In this embodiment, all HR channel (2045) messages other than Rachel's message are dimmed. This has the effect of highlighting Rachel's message (2047). In addition, the text entry bar is altered in some way. In this example the standard background color of the text entry area is modified (2046). Furthermore, in this example the text inside the text entry bar that usually reads "Type something" is modified and replaced with the words "Reply Privately". These modifications to the appearance and functionality of the channel serve to indicate to the user that the message they will enter is different in some way from a standard message that they might enter. In this example, the combination of interface modifications serve to inform and reinforce to the user that the message they are about to post will be treated as a private reply to Rachel's message.

Figure 12C:
Figure 12D:
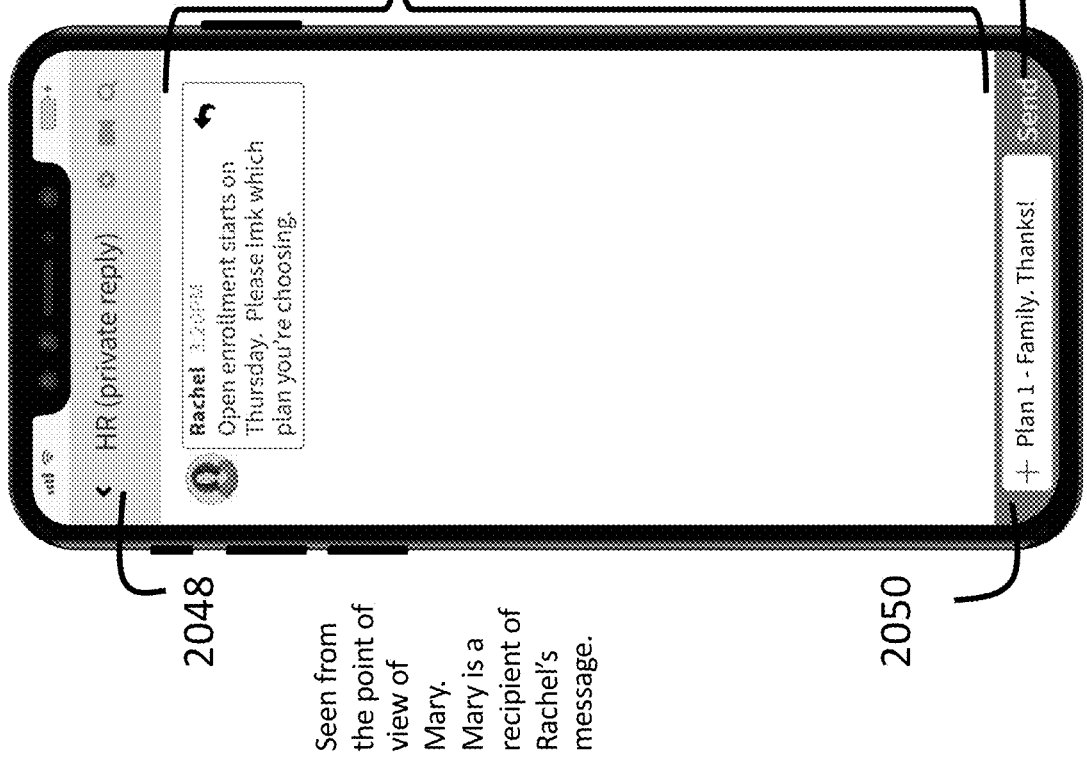

FIG. 12C and FIG. 12D In this embodiment, the display of the HR channel is modified or replaced to isolate and show just Rachel's Private Reply Requested message (FIG. 12C #2049). In addition, the channel indicator in this example is changed from "HR Channel" to "HR (private reply)" (FIG. 12C #2048) to indicate to the user that they are viewing just a subset of the messages from the HR channel; in this example, just the message thread associated with Rachel's spawning "Private Reply Requested" message. In addition, the standard text entry bar is altered in some way. In this example, the standard background color is modified (FIG. 12C #2050). Furthermore, in this example the text inside the text entry bar that usually reads "Type something" is modified and replaced the words "Reply Privately". These modifications to the appearance and functionality of the channel serve to indicate to the user that the message they will enter is different in some way from a standard message that they might enter. In this example user Mary typed "Plan 1—Family. Thanks!" before tapping "Send" to post her private reply to the private thread. In some embodiments other means of posting a message are possible. In this example, once Mary taps "Send" (2022) to post her private reply, Mary's message appears below Rachel's message (FIG. 12D #2051). In this example, Rachel's spawning "private reply requested" message was automatically placed and pinned to the top of the display of the "HR (private reply)" display of the thread. In some embodiments Rachel's message could appear elsewhere or not at all. In some embodiments Rachel's message could appear initially or not, or could be caused to be displayed (e.g., toggle switch). In this example, Mary can choose to add an additional private message to the private thread by entering it in the text entry bar associated with the private thread (FIG. 12D #2052).

In some embodiments there will also be an indication that Mary responded to Rachel's Private Reply Requested message in the spawning channel (in this example, in the HR Channel). The indication could, for example, be associated with Rachel's spawning message and/or there could be an indication (possibly visible only to a respective responder, Mary in this example) placed in the message stream at the point in the message stream (e.g., point in time) that Mary posted her private reply.

Figures 12E, 12F:
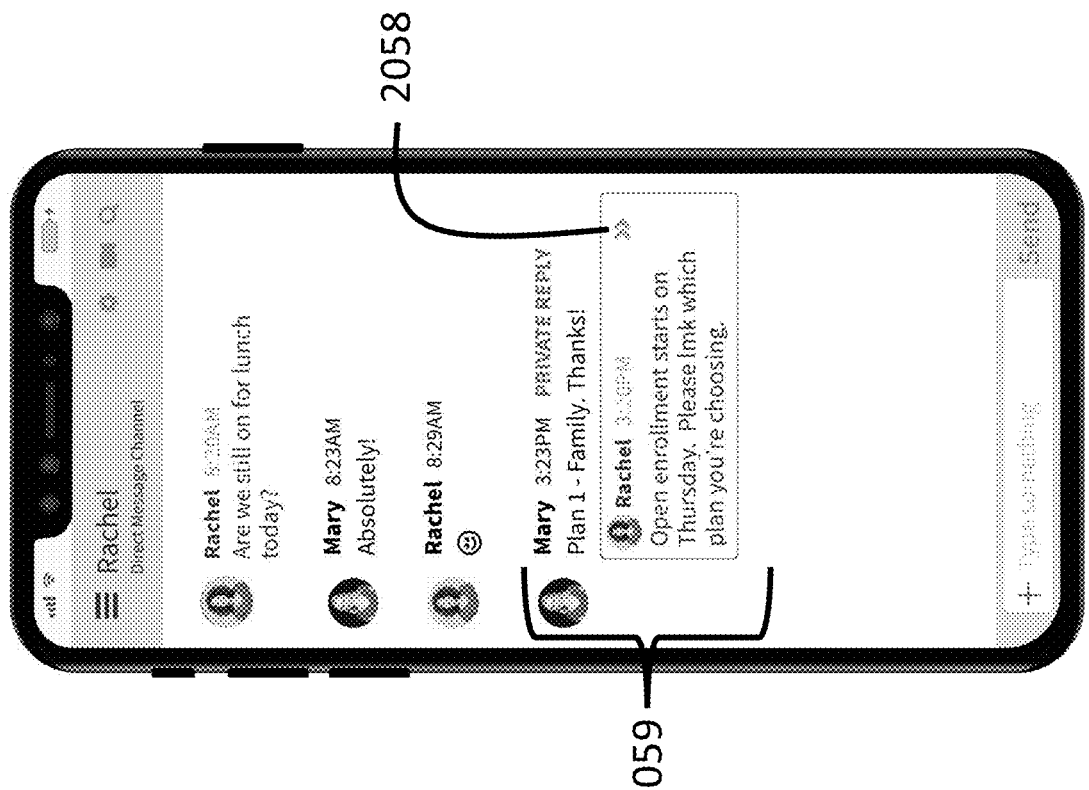

FIG. 12E and FIG. 12F In this embodiment, once the user has indicated their desire to create a private reply to Rachel's message, a direct message channel (a "DM channel") between user Rachel and user Mary (FIG. 12E #2054) is displayed. In some embodiments, such as in this example, the channel switches from the HR channel to a DM channel. In some embodiments the HR Channel remains visible, and a DM Channel window, for example, is added (e.g., one or more pop-out windows). In this example, the user's selection of a means to initiate a private reply, for example by tapping on the "reply" icon as shown in FIG. 10D #2038, causes the DM channel to be displayed along with a modified text entry area (FIG. 12E #2055) including a representation of the message being responded to (FIG. 12E #2056). In this example, user Mary will enter her private reply message "Plan 1—Family. Thanks!" here (FIG. 12E #2057) and post the message to the DM Channel. FIG. 12F shows the DM channel after Mary's message has been posted (FIG. 12F #2059). Note the DM channel in this example also contains messages between Mary and Rachel that are not in the HR channel and that are unrelated to the HR channel or Mary's DM message to Rachel. In this example, the DM channel is not a thread, per se, but a discrete messaging channel. In this example, Mary's post to the DM channel includes a copy (all or part) of Rachel's message from the HR channel. Mary's reply to Rachel's message from the HR Channel is posted in the DM channel along with Rachel's spawning "private reply requested" message from the HR Channel. In this example several indications are provided in the DM channel to distinguish Mary's reply together with Rachel's spawning message from the other messages in the channel. For example, Mary's reply message and Rachel's spawning message are visually associated and marked "PRIVATE REPLY". Thus, a private reply requested text message and each respective reply may be visually and/or logically linked when displayed, for example on Rachel's (the "first") device and/or when displayed for example on Mary's (a "remaining") device. In this example, the message format is distinct in order to provide an indication to the parties to the DM channel that Mary's message is a reply to a "private reply requested" message from another channel. In this example the parties to the DM channel are also provided with a means (FIG. 12F #2058) to "jump" to the message (and/or channel) that spawned the reply message (#2059). In this example tapping on the ">>" icon will cause the display to be updated to a display of Rachel's spawning message in the HR Channel.

Thus, for at least one of the remaining group users that reply to Rachel's private reply requested text message, the respective reply is entered into a respective Direct Message channel between the first group user (Rachel) and the person replying to Rachel (the person who is one of the remaining group users). Each person replying to Rachel may do so in respective DM channels between Rachel and the person replying to Rachel. For clarity, if message exchange occurs in a Direct Message channel between Rachel and the person replying to Rachel's request for a private reply, messaging may have already occurred in that Direct Message channel between Rachel and the person replying to her request for a private reply, and before the person replying to Rachel actually replies.

In some embodiments there will also be an indication that Mary responded to Rachel's "private reply requested" message in the spawning channel (in this example, in the HR Channel). The indication could be, for example, associated with Rachel's spawning message and/or there could be an indication (possibly visible only to a respective responder, Mary in this example) placed in the message stream at the point in the message stream (e.g., point in time) that Mary posted her private reply.

Figure 13A:
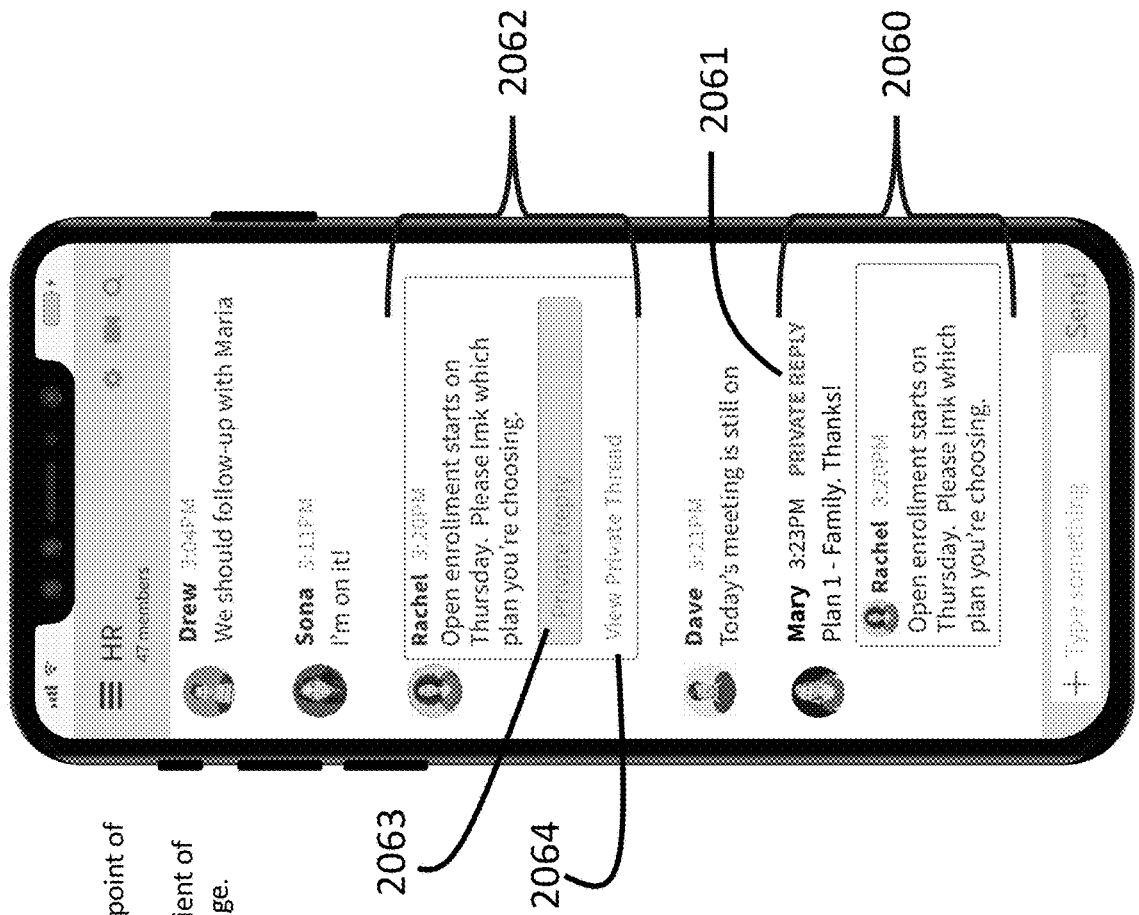
FIGS. 13A-13D are screenshots of one or more exemplary embodiments of the present invention.

FIG. 13A shows an embodiment of a messaging system as seen from the point of view of Mary. In this example Mary's reply is posted to the channel in a visually distinctive manner (2062) and in the chronological order in which it was posted to the channel. In addition, Mary's display of Rachel's 3:20 PM message (2062) is updated to indicate that Mary has posted a private response (2064). In this example Mary can tap on "View Private Thread" (2064) to cause a change of display that, in this example, will display Rachel's original (spawning) message along with Mary's response. In some embodiments tapping (or otherwise indicating selection) a specific object or area and/or tapping anywhere in the message area will cause the display of one or more of the messages associated with the private message thread. In some embodiments one or more private replies to the same spawning message are permitted. In this embodiment clicking, tapping or otherwise selecting the "View Private Thread" button will cause the display of the private messages associated with Rachel's spawning message to appear aggregated and all together. In some embodiments intervening unrelated messages are eliminated from display, blurred or presented in such a way as to not distract from the private message thread. In some embodiments the related private messages are presented in a way to highlight their association as a thread of related messages. In some embodiments private responses can be deleted, edited and/or replaced. In some embodiments private response will be automatically deleted or modified based on a condition or conditions being met such as elapsed time, keywords, or upon suspension or deletion of a user account.

Figure 13D:
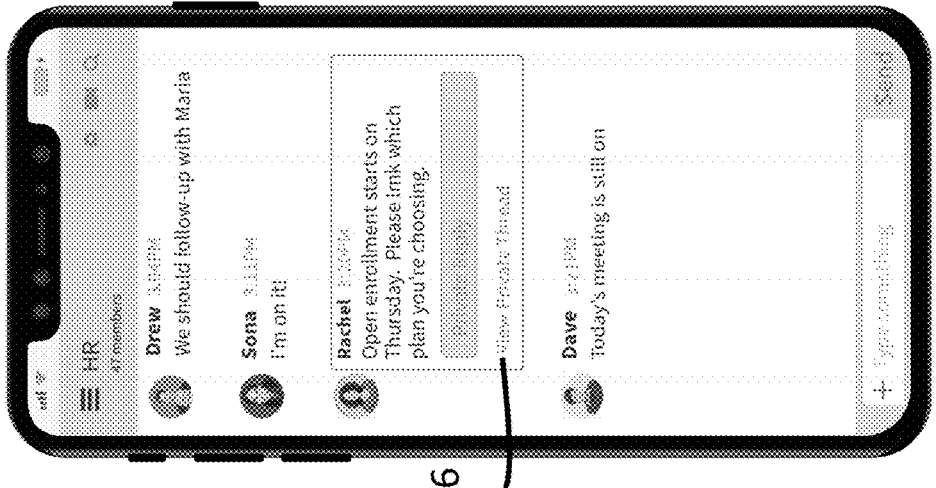
Figure 13C:
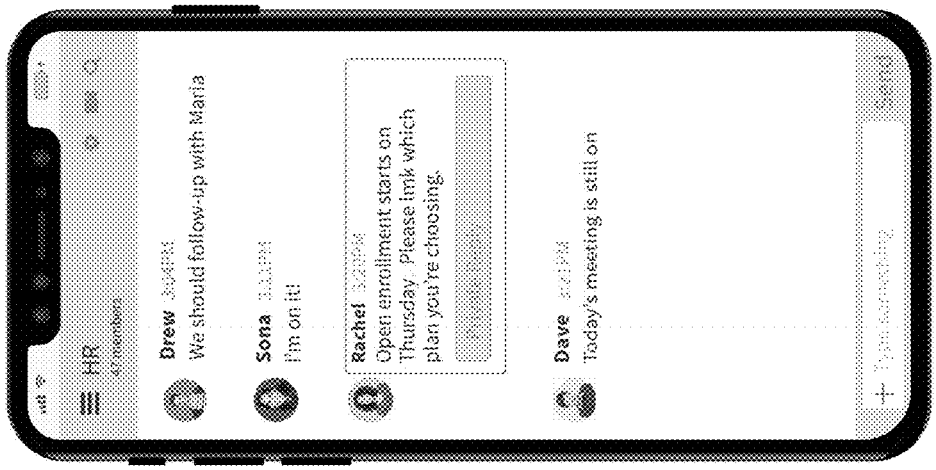
Figure 13B:
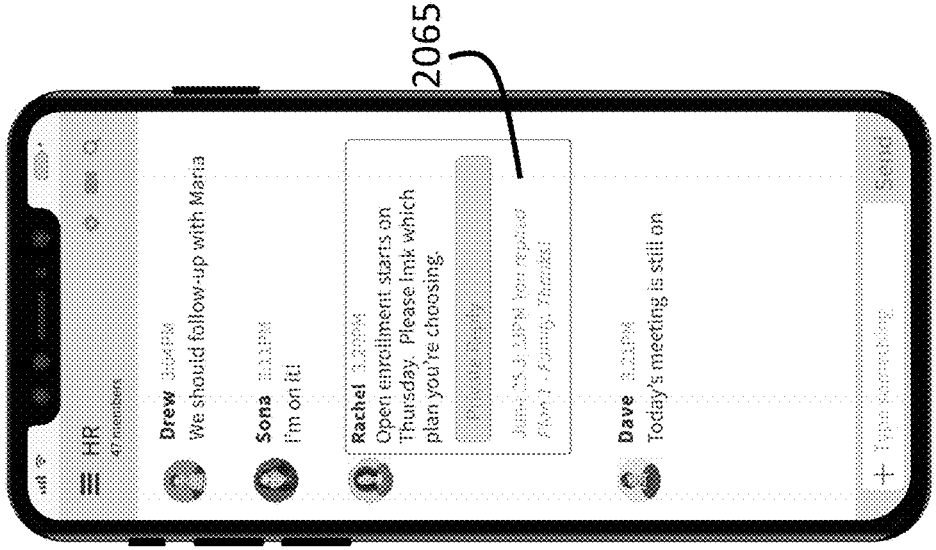

FIG. 13B shows an embodiment of a messaging system as seen from the point of view of Mary. This FIG. 13B shows an alternative embodiment to FIG. 13A. Unlike the embodiment depicted in FIG. 13A, in this embodiment neither Mary's private reply (nor any indication of her private reply) is posted as an independent message in the message stream. In this embodiment only Rachel's original message in the HR message channel is updated to reflect Mary's response (2065).

FIG. 13C shows an embodiment of a messaging system as seen from the point of view of Mary. This FIG. 13C shows an alternative embodiment to FIG. 13A. Unlike the embodiment depicted in FIG. 13A, in this embodiment neither Mary's private reply (nor any indication of her private reply) is posted as an independent message in the message stream.

FIG. 13D shows an embodiment of a messaging system as seen from the point of view of Mary. This FIG. 13D shows an alternative embodiment to FIG. 13A. Unlike the embodiment depicted in FIG. 13A, in this embodiment neither Mary's private reply (nor any indication of her private reply) is posted as an independent message in the message stream. In this embodiment only Rachel's original message in the HR message channel is updated to reflect Mary's response (2066). In this example Mary can tap on "View Private Thread" (2054) to cause a change of display that in this example will display Rachel's original (spawning) message along with Mary's response and any subsequent private interactions associated with the private thread.

Figure 14B:
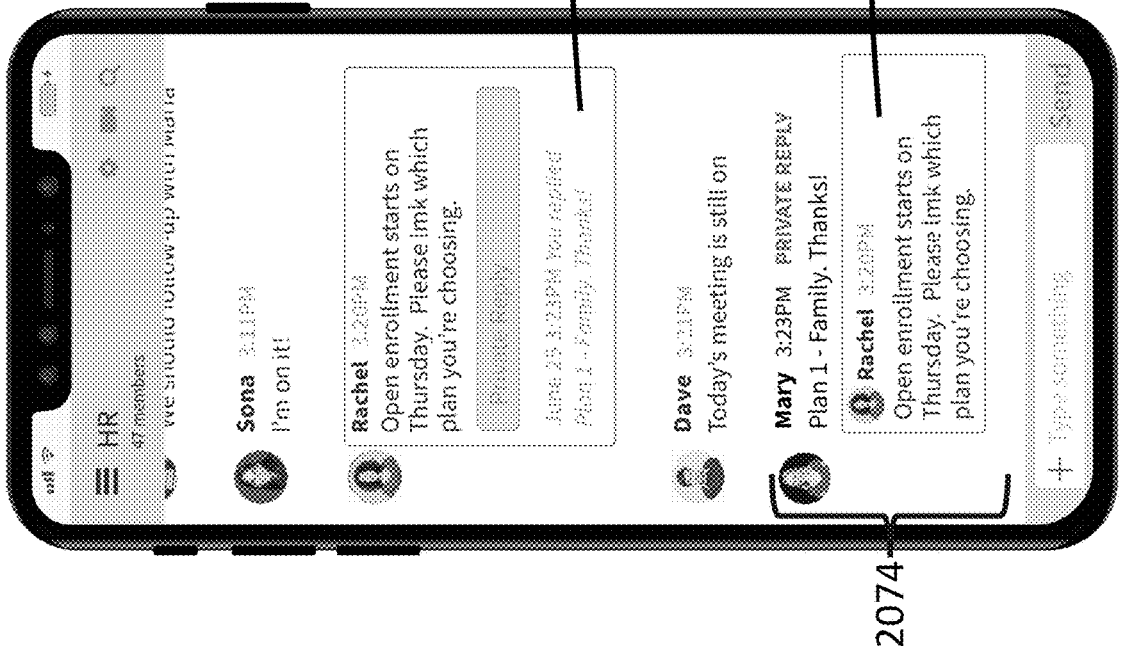
FIGS. 14A and 14B are screenshots of one or more exemplary embodiments of the present invention.
Figure 14A:
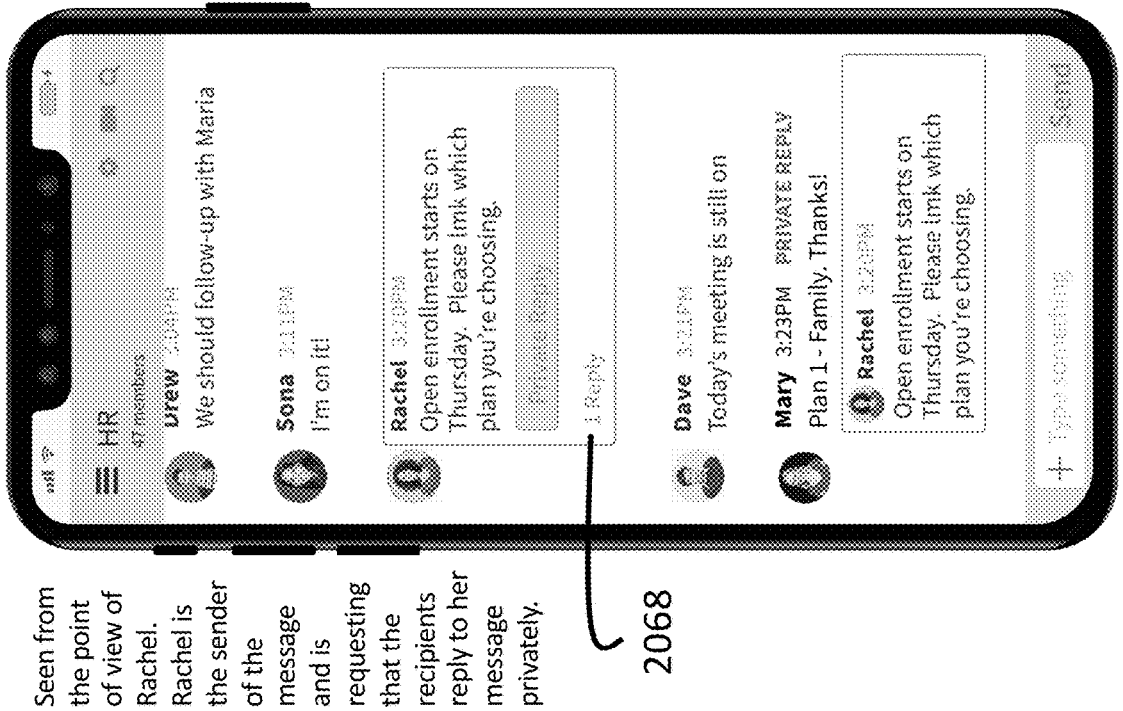

FIG. 14A shows an embodiment of a messaging system as seen from the point of view of Rachel. In this embodiment, Rachel is able to see that she has received one reply to her Private Replies Requested message. In some embodiments other methods of indication can be used, for example, an icon, a numeric counter display, or a portion or all of one or more private replies may be displayed. In some embodiments no indication is visible or sensorially discernable but can be caused to be presented by some means such as by tapping or otherwise interacting with the request private reply message, a private reply, or some other area or object displayed. In some embodiments the display of one or more of the private replies may appear or disappear over time or based on some other rule, rules, condition or conditions.

FIG. 14B shows an embodiment of a messaging system as seen from the point of view of Mary. In this embodiment, Mary is able to see at least a portion of her private reply associated with Rachel's 3:20 PM spawning "private reply requested" message (2070). In addition, Mary is able to view her 3:23 PM response in context in the channel message stream (2072). In this embodiment, Mary's private reply (2074) is made to be visually distinguishable, in order to highlight, for her, the fact that it is a private reply. In some embodiments the parties associated with private replies may wish to partially or fully hide the display of content of their respective reply (or replies), whether transmitted or received from/on their device. In some embodiments a mechanism, such as a, toggle or icon can be provided and can be selected by the user to hide the existence of, or content of, one or more private messages.

Figure 15B:
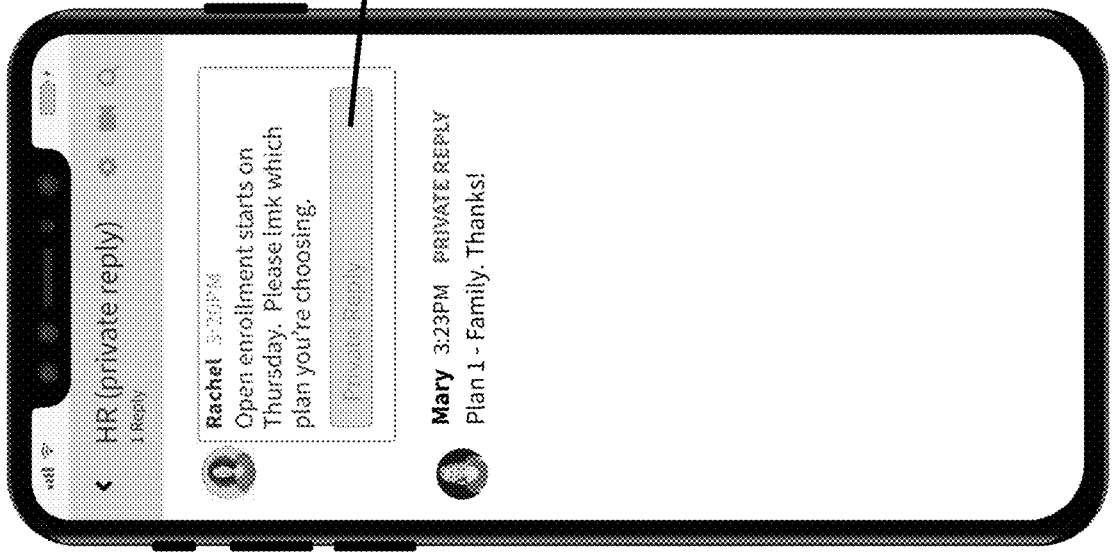
FIGS. 15A and 15B are screenshots of one or more exemplary embodiments of the present invention.
Figure 15A:
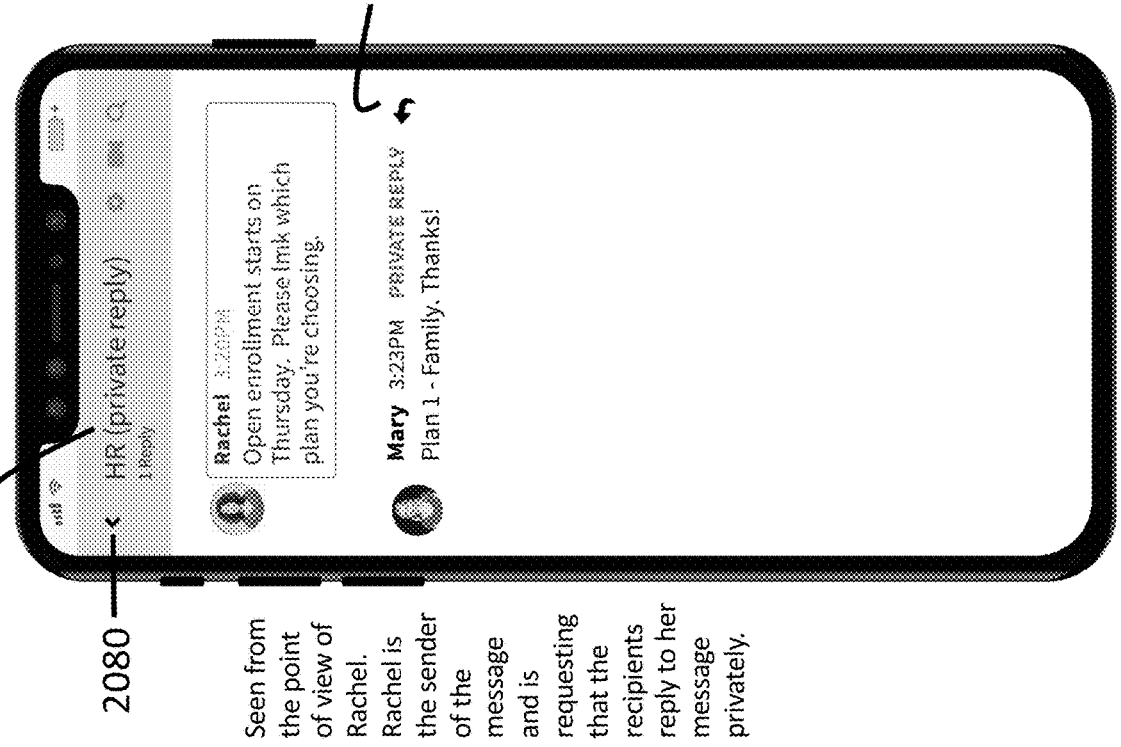

FIG. 15A shows an embodiment of a messaging system as seen from the point of view of Rachel. In this embodiment, Rachel has caused the display of the private thread by tapping or otherwise indicating selection of an area associated with the message, in this example by tapping on "1 Reply" (FIG. 14A #2068). In some embodiments swiping, speaking, shaking or tapping or interacting with an area associated with the spawning message or one or more associated private messages will cause a further or altered or modified display of the private message thread.

FIG. 15A also shows an embodiment that displays a modified header. The channel name "HR" has been modified (2078) to reflect the fact that the user is viewing a subset of information from the HR channel consisting of, in this example, the spawning message and its associated private reply(ies). In this example, Rachel, who is the author of the spawning message sees all of the private replies to her message. In this example, only the spawning private request private reply message and the private replies to it are displayed, which is an advantage over her having to navigate through unrelated messages in the channel to identify the private replies to her message. Aggregating the private replies in this way saves Rachel time and makes it easier for her to view and compare responses.

In this embodiment Rachel can post a further private reply to one or more of the private replies she received (2082). In other words, she can continue a dialog with responders and the associated further private messages will be associated with one another. In some embodiments further messaging (nesting) within the thread is not allowed.

In this example, selecting the "<" icon (2080) reverts the display to the base HR channel view.

FIG. 15B shows an embodiment of a messaging system as seen from the point of view of Mary. In this embodiment, Mary has caused the display of the private thread by tapping or otherwise indicating selection of an area associated with the message, in this example by tapping on an area associated with a private message associated with the private message thread (FIG. 14B #2070 or #2074).

In this embodiment, Mary can post further private replies to the private thread by entering her message in the Private Reply text entry bar associated with the private thread spawning message (2086). In some embodiments the text entry mechanism appears elsewhere on the display. In some embodiments the text entry mechanism is not initially presented but can be caused to be displayed and/or otherwise activated. In some embodiments a private thread is read only, in other words further private messaging associated with the thread cannot be enter from this display of the thread or at all.

Figure 16:
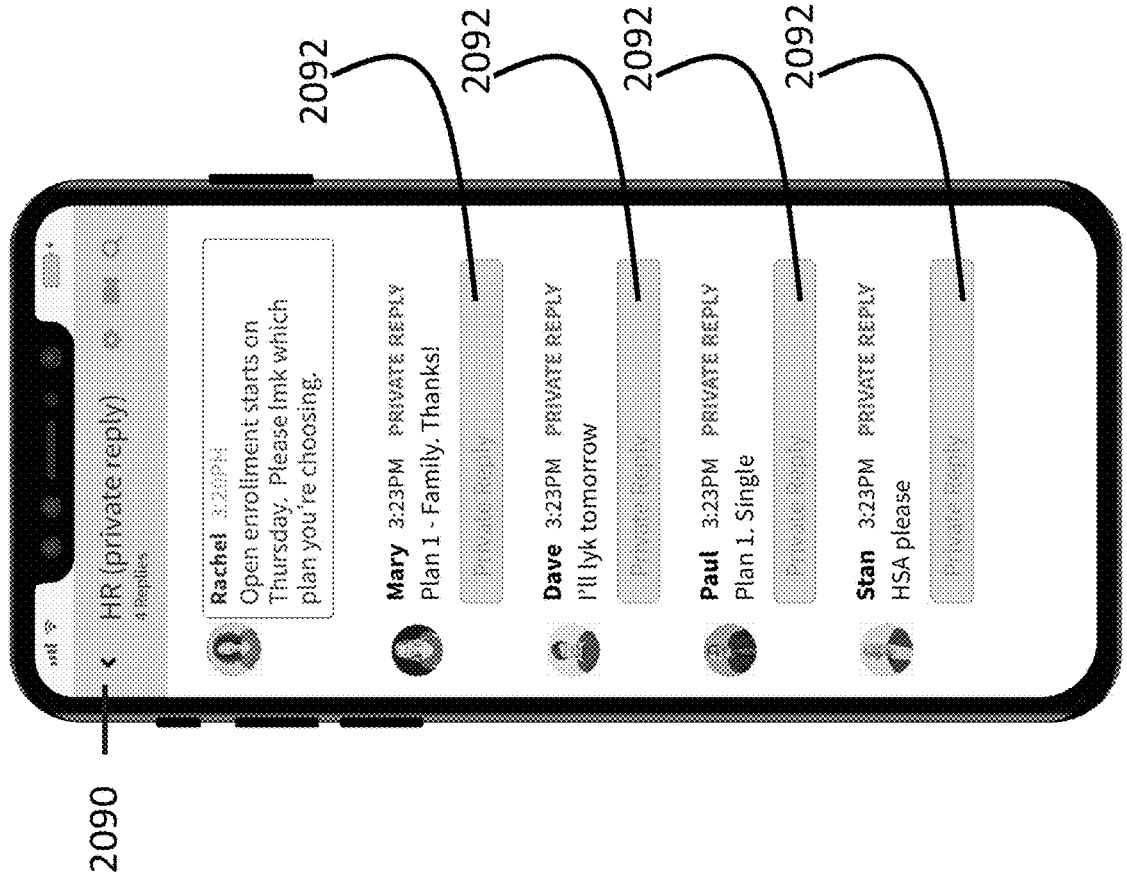
FIG. 16 is a screenshot of one or more exemplary embodiments of the present invention.

FIG. 16 shows an embodiment of a messaging system as seen from the point of view of Rachel. In this embodiment, Rachel sees an aggregated group of private replies to her spawning private replies requested text message. In this embodiment, Rachel can send a further private message in response to any of the private responses she received. In some embodiments further private messaging is not permitted. In this embodiment an indication in the form of a text entry box (2092) is displayed and associated with specific private replies. Entering text into these text entry areas will post a further private message to the thread and associate the further message to the thread and/to specific private reply. In some embodiments other methods can be applied to indicate and launch a further private message creation and posting function.

In this example, selecting the "<" icon (2090) updates the display to the base HR channel view.

Figure 17A:
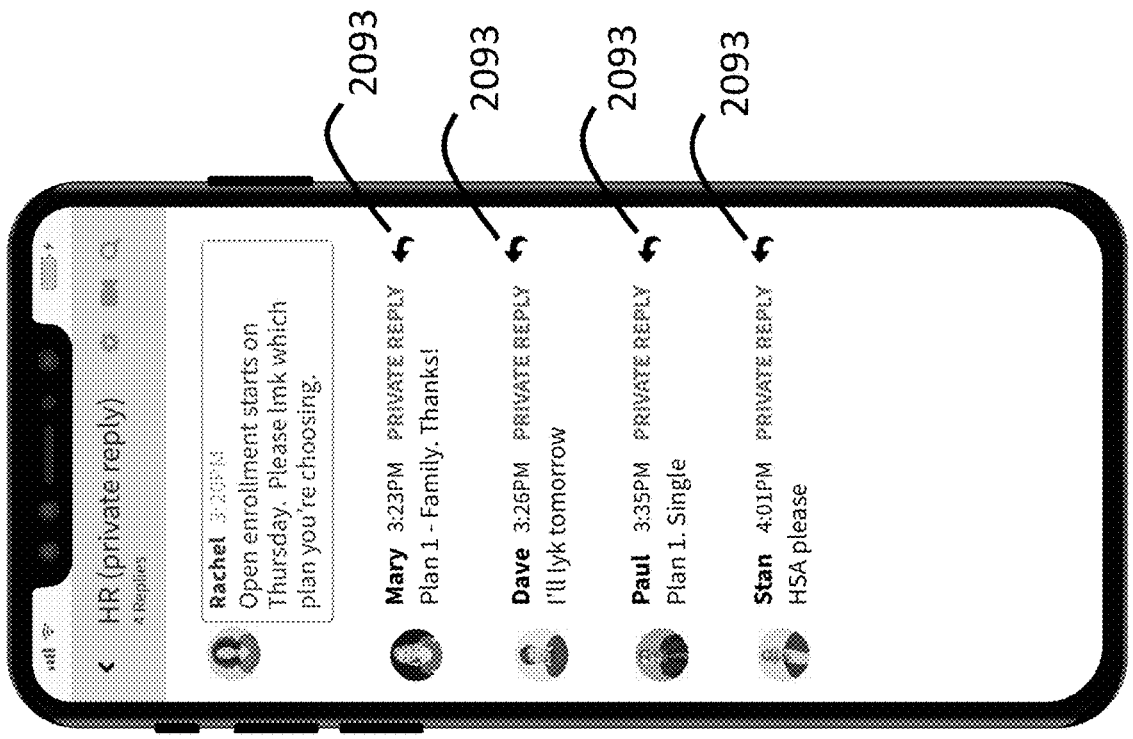
FIGS. 17A and 17B are screenshots of one or more exemplary embodiments of the present invention.

FIG. 17A shows an embodiment of a messaging system as seen from the point of view of Rachel. In this embodiment, Rachel sees an aggregated group of private replies to her spawning private reply requested message. In this embodiment, Rachel can send a further private message in response to any of the private replies she received. In some embodiments further private messaging is not permitted. In this embodiment an indication in the form of reply icon (2093) is displayed and associated with specific private replies. Tapping one or more of the reply icons will cause a private reply interface to be presented; for example, FIG. 18A.

Figure 17B:
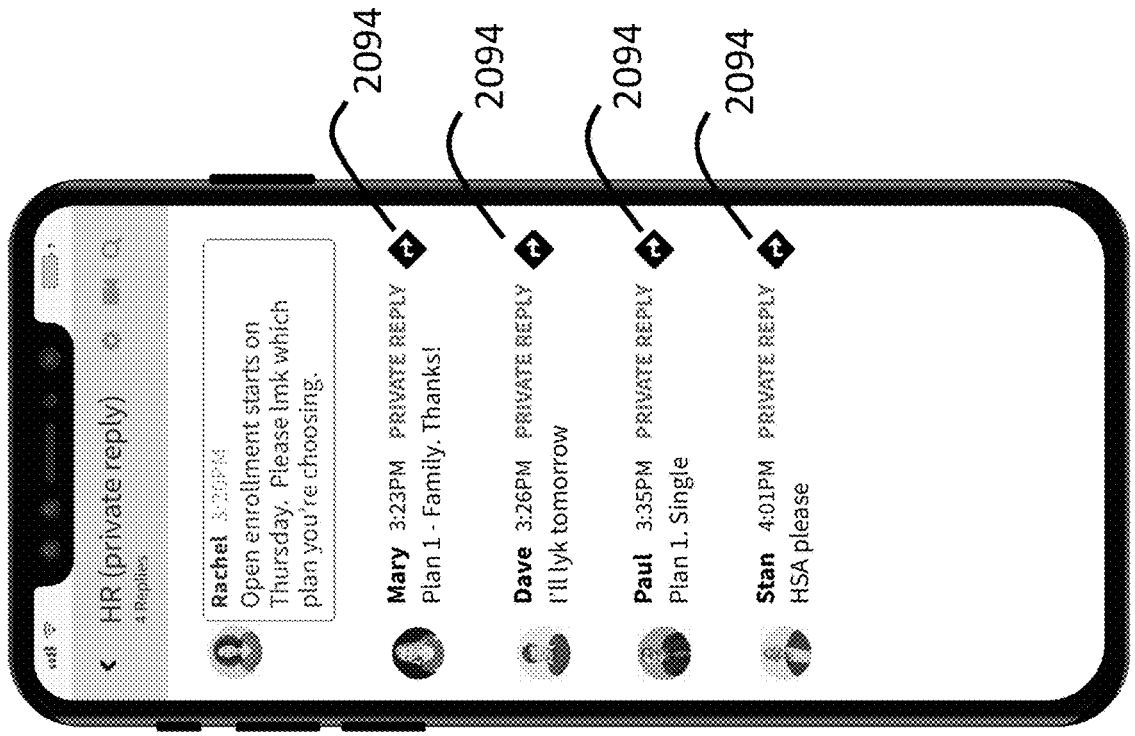

FIG. 17B shows an alternative embodiment of a messaging system as seen from the point of view of Rachel. In this embodiment, Rachel sees an aggregated group of private replies to her private replies requested spawning message. In this embodiment, Rachel wishes to reference one of the private replies in the group channel. She wishes to add a comment of her own and associate it with the private message and post them together in the group channel visible to the plurality of users. To reference one or more private messages, Rachel indicates her selection/s of [a] private message/s she wishes to make public in the group channel. In this example, Rachel indicates her selection by tapping on one or more of the "reference this message" icons (2094). Her selection, in this embodiment causes the selected message to appear in a visually distinguishable manner (FIG. 18B #2105) and adds a display of a visual indication intended to confirm for Rachel that the selected message will be referenced (FIG. 18B #2104). In addition, in this embodiment, a text entry bar prompting Rachel to "Add Comment" (FIG. 18B #2103) is displayed, and is where Rachel can add/enter (e.g., type, record) a message of her own that will be associated with the private message being referenced and subsequently posted publicly in the HR group channel. In some embodiments private messages can be referenced. In some embodiments private messages cannot be referenced.

Figure 18A:
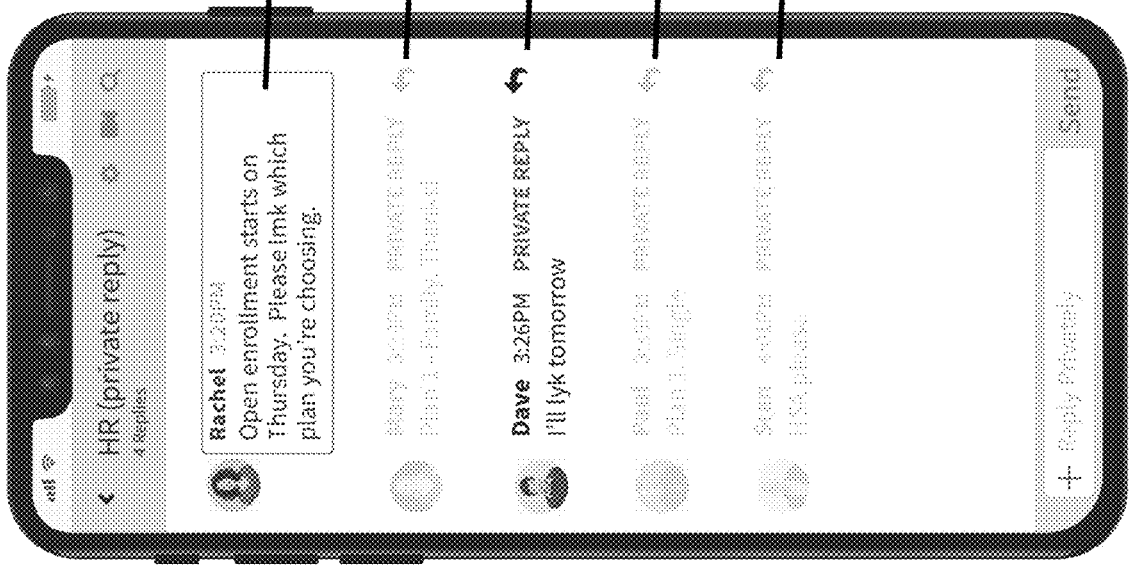
FIGS. 18A-18D are screenshots of one or more exemplary embodiments of the present invention.

FIG. 18A shows an embodiment of a messaging system as seen from the point of view of Rachel. In this example Rachel has elected to post a further private message in response to a private reply message she received from Dave. In this example, tapping on the reply icon (2095) caused the other messages to fade making it clear to Rachel that her further private reply will be associated with the message in focus. In some embodiments, the user can select and reply to more than one private response. This could be useful in cases where a common question is asked and the user (Rachel in this example) wishes to type the response once and have it sent to more than one person at the same time. So for example if 6 people respond to Rachel's spawning message with a similar message asking "can I have more time to decide on a health plan?" she can tap on one or more of the reply icons, and reply privately to each individual but only have to enter her message once.

Thus, for example, when a user (each of the remaining group users) replies to a private reply requested text message, the messaging between the user sending the private reply requested text message and the person responding to the private reply requested text message can occur in a private thread.

FIG. 18B The display depicted in this embodiment is based on the alternative embodiment depicted in FIG. 17B and indicates Rachel's selection of a private reply message she wishes to reference (2105).

Figure 18C:
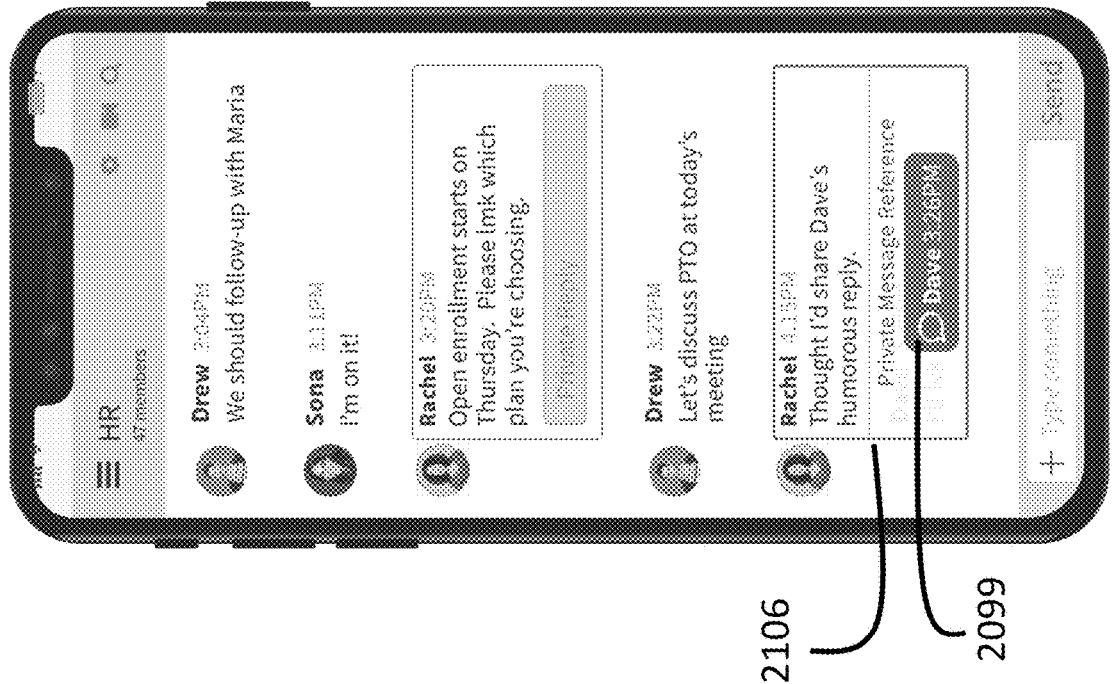
Figure 18B:
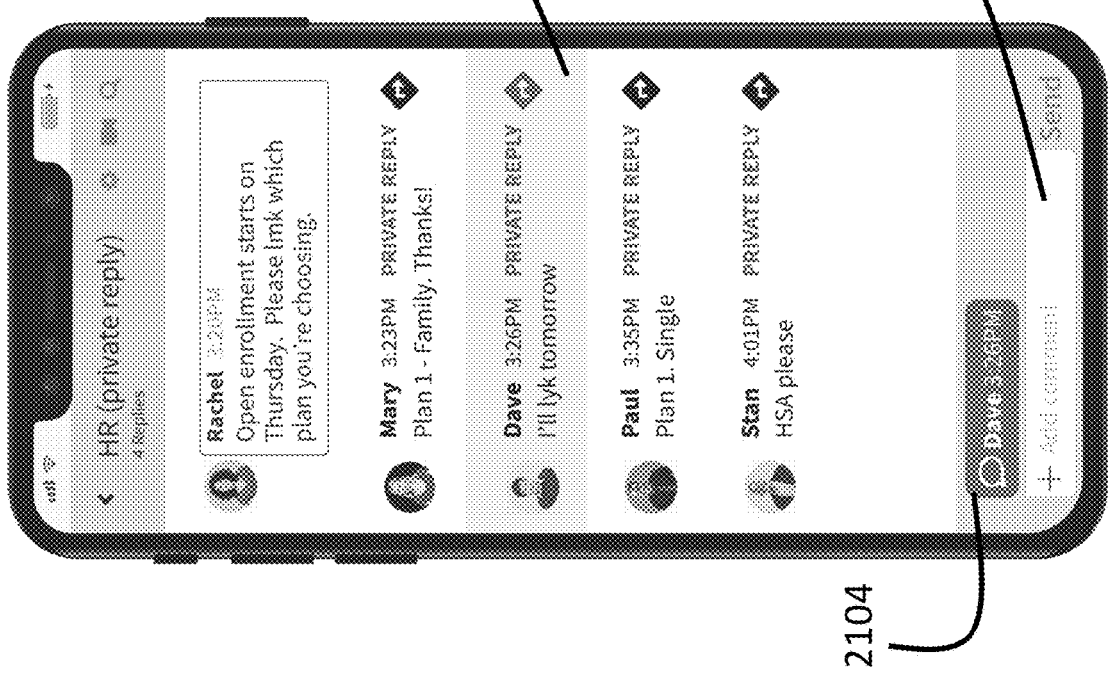
Figure 18D:
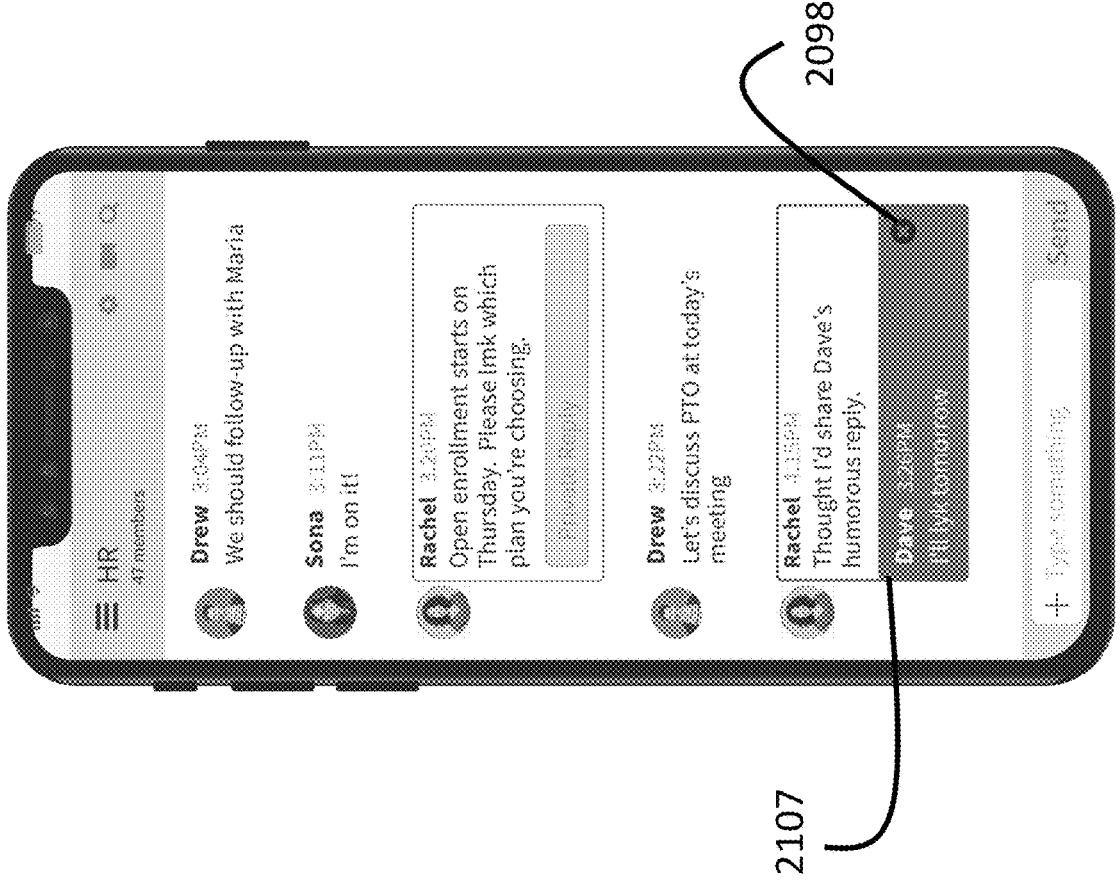

FIG. 18C shows an alternative embodiment of a messaging system as seen from the point of view of HR channel members. The point of this Figure is to indicate that a private message (FIG. 18B #2105, in this example) has been referenced and made "public," which in this case that means, that as a result of being referenced by a recipient of the private reply (Rachel in this case) the private message was posted to the HR channel and made visible to all of the group channel members. There can be variations between the member's individual displays of their respective views of the group channel message stream. In this embodiment the referenced private message appears in the group channel, is visible to all group channel members and is displayed in a visually distinguished manner (2106) that calls attention to the fact that it is a reference message. In this example, the posted message (2106) includes Rachel's comment along with a display object (2099) that when interacted with (in this example, tapped) causes the content of the associated private reply message to be displayed (FIG. 18D #2107). In this embodiment the display of the referenced private reply message can be hidden by tapping on the "x" icon (FIG. 18D #2098).

Thus, in the above example, Rachel has selected a private reply message and an indication is displayed that the private reply message has been selected. The indication may be associated with a text entry area for receiving a further message associated with the selection of the private reply message. The selected private reply message may then be further posted and displayed in the group messaging channel (where it is no longer private). The selected private reply message may be displayed in the messaging channel, together with the further message (if a further message was entered into the text entry area). Interaction may then be allowed with the message and associated referenced private reply message in the messaging channel by someone who has access to the messaging channel.

FIG. 18D shows an alternative embodiment of a messaging system as seen from the point of view of HR channel members. In this example, the posted message (2107) includes Rachel's comment along with a display of all or a portion of the content associated with the private reply that is being referenced. In this embodiment the display of the referenced private reply message can be hidden by tapping on the "x" icon (FIG. 18D #2098).

Figure 19:
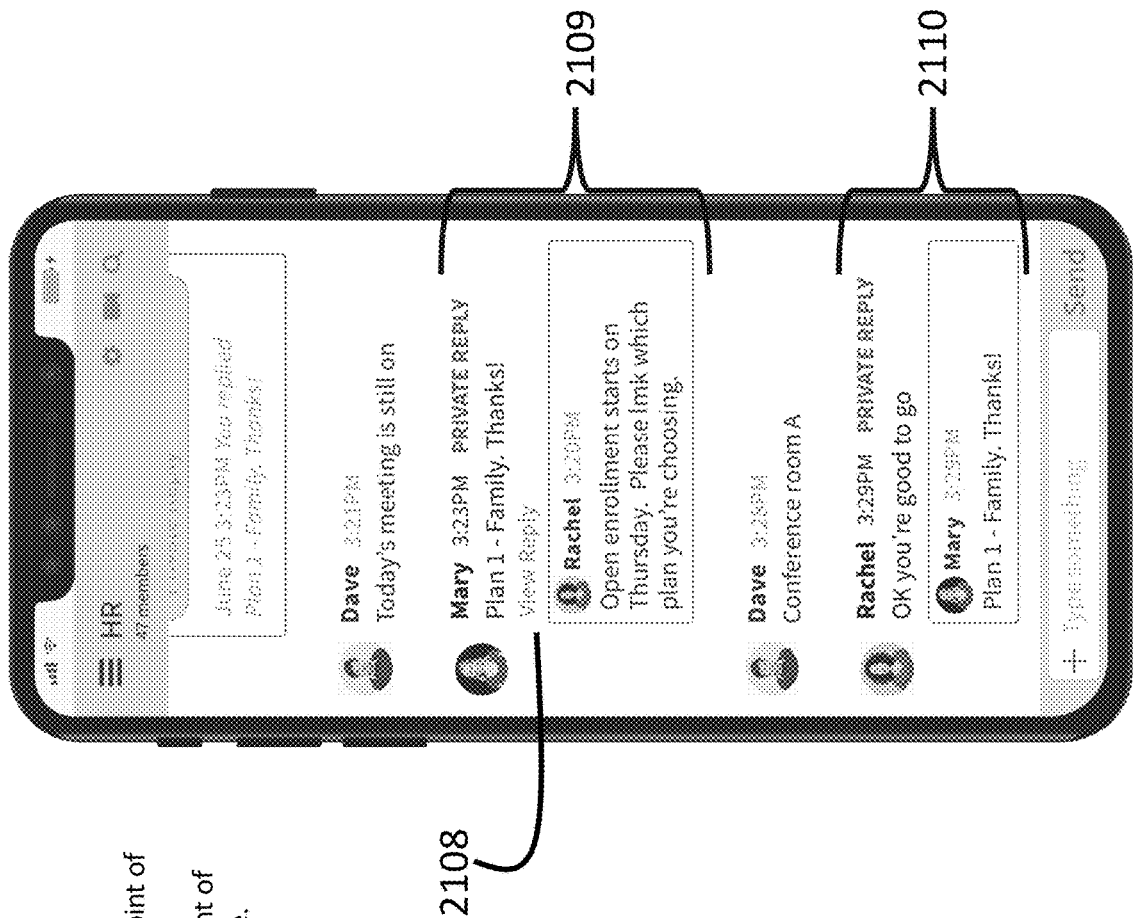
FIG. 19 is a screenshot of one or more exemplary embodiments of the present invention.

FIG. 19 shows an embodiment of a messaging system as seen from the point of view of Mary. In this example nested replies are permitted. In this example Mary replied privately to Rachel's spawning message and Rachel then responded further, "OK you're good to go", to Mary's private reply. In this example an indication (2108) is added to the indication of Mary's private reply (2109). In this embodiment, Rachel's further private message to Mary is also added to the channel message stream (2110). To view the private thread together and for example, without the potential distraction of intervening and/or unrelated messages (FIG. 20) Mary can tap on or otherwise select "View Reply" (2108). In some embodiments, other methods of selection or indication of intent to view the private thread can be applied.

Figure 20:
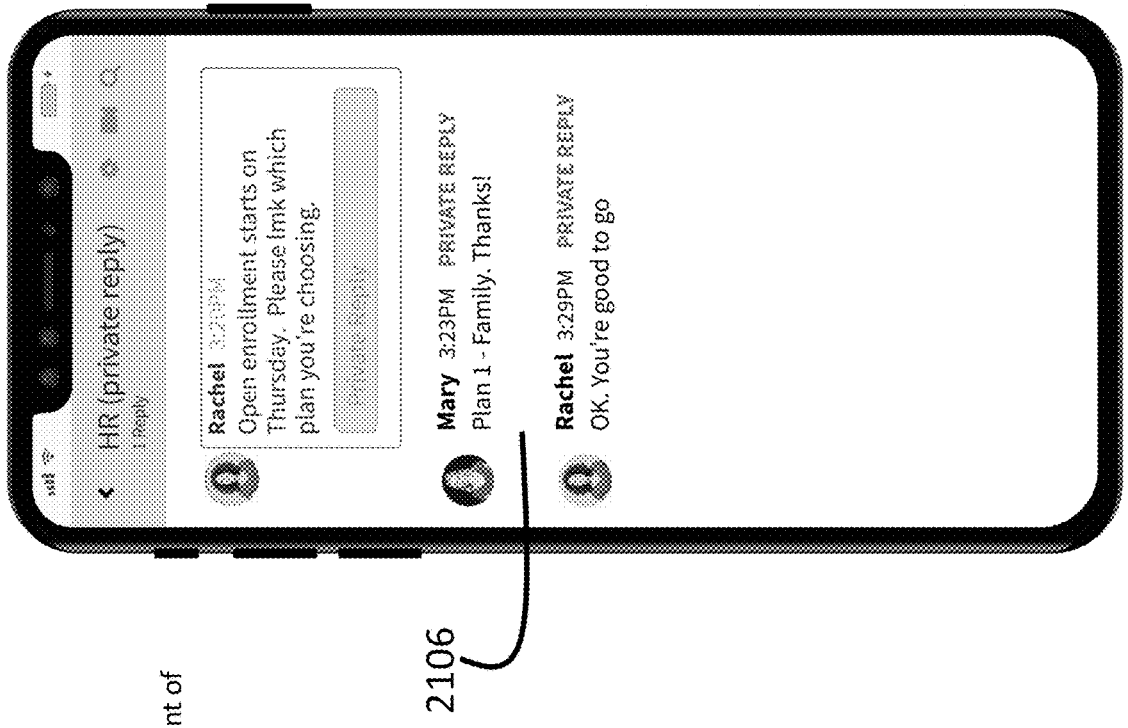
FIG. 20 is a screenshot of one or more exemplary embodiments of the present invention.

FIG. 20 shows an embodiment of a messaging system as seen from the point of view of Mary. This embodiment shows the private thread together and without the distraction of intervening and possibly unrelated messages.

FIGS. 21 through 26B show embodiments where a request for a private reply can exclude one or more channel members. These figures describe embodiments whereby a user can specify one or more group channel members to receive a private reply requested message. In these examples, only the specified group channel members will see the private reply requested message in their display of the group channel. In contrast, in some embodiments the user could select who to exclude as a private reply requested message recipient. These figures are limited to embodiments describing how users can initiate the targeted private reply recipient selection process and the sending of a private reply requested message to a selected subset of channel members (or superset if inclusive of members of additional and/or alternative channels). Once the intended private reply requested recipients have been specified, the process can, in some embodiments, continue in a fashion similar to the process described in FIGS. 16A-20.

Figure 21:
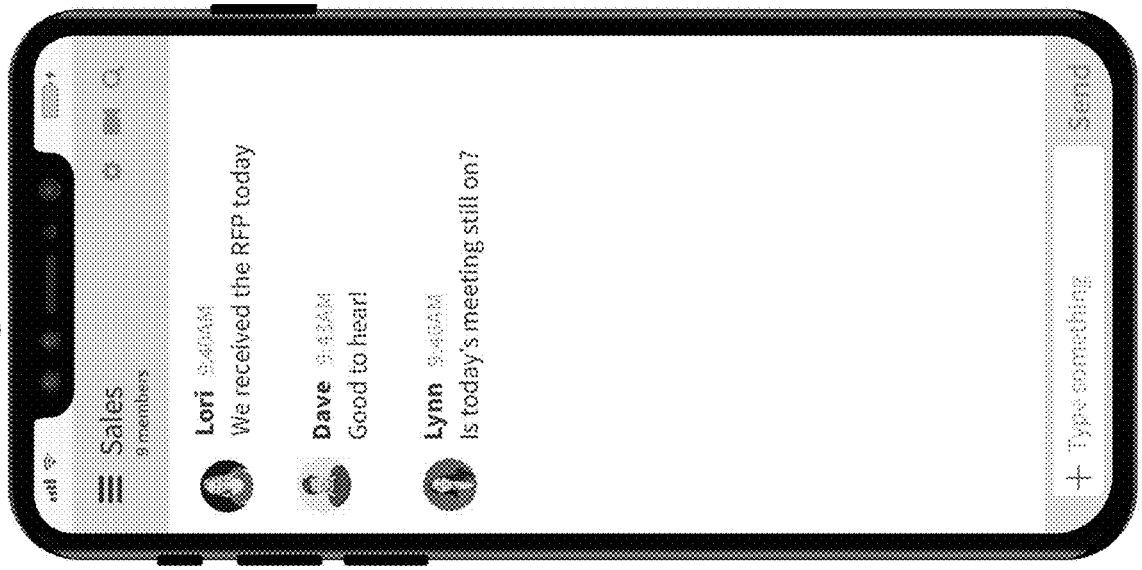
FIG. 21 is a screenshot of one or more exemplary embodiments of the present invention.

FIG. 21 shows an embodiment of a messaging system as seen from the point of view of Paul. Paul is a member of the Sales channel.

FIGS. 22A-23C show an embodiment that recognizes when more than one user is specified to receive a Request Private Replies message. In this embodiment, once the system recognizes that more than one channel member has been specified, a toggle selection switch is caused to be displayed offering the user the choice of having private replies be siloed (i.e., visible only to each respective responding specified user and the requester) or having all of these replies visible to all of the specified channel members.

Throughout this specification, the characters "@@" are used to explain operation of various embodiments, but it should be clearly understood that the characters "@@" are merely examples and other characters or objects (visible or not visible) and/or other forms of input such as spoken input may be used. Furthermore, the process of entering characters to initiate a private reply message may be referred to in this application as an "@@mention" but again this is merely exemplary and other names (and characters/forms of input) may be used.

Figure 22B:
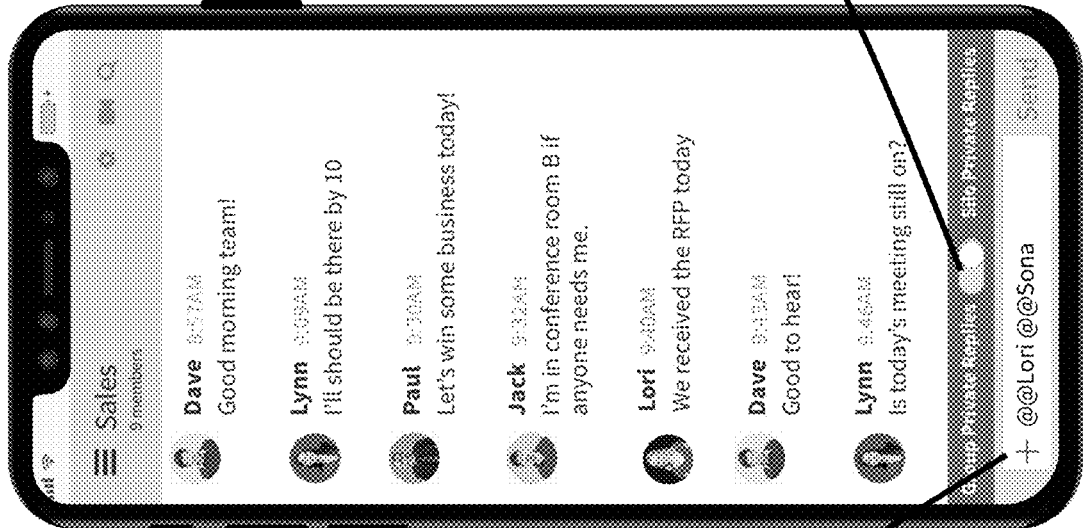
FIGS. 22A and 22B are screenshots of one or more exemplary embodiments of the present invention.
Figure 22A:
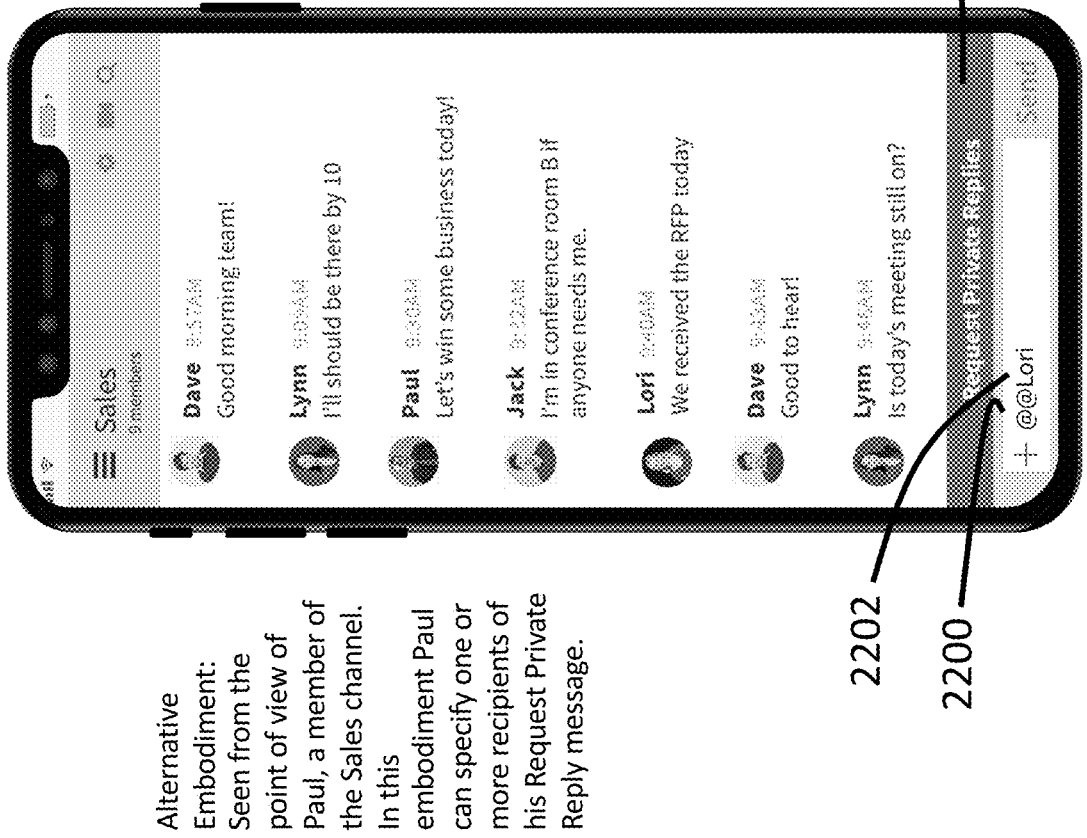

FIG. 22A shows an embodiment of a messaging system as seen from the point of view of Paul. There can be many ways to initiate a request for private replies. In this embodiment Paul initiates a request for a private reply by typing one or more characters that the system recognizes may be a request to initiate the creation of a request for private reply message. In this example the characters "@@" (2200) followed by the name (or other identifier) of the intended private reply requested recipient (2202). In some embodiments the system recommends or completes "names" once the user starts typing, potentially speeding up the process of entering the names of the intended recipients. For example, in an embodiment, the user types in "@@da" and based on the user's input, the system displays a list of user names that extend from the letters typed so far, such as Daniel, Danielle and David. In some embodiments the "name" is an identifier associated with an individual or can be a "name" associated with a group of users. For example in some embodiments the use of "@@channel" may indicate to the system that the sender wishes to send the private replies requested message to all channel members and/or @@managers may indicate to the system that the sender wishes to include all of the users in the channel that are managers. In this embodiment the system displays a visual indication to confirm for the user that the message being crafted is a "Request Private Reply" text message (2204). In some embodiments the entry of, for example, a certain character, character string or verbal command could cause a further menu or form of selection to be displayed that suggests or offers the names or other identifiers of eligible channel recipients. In some embodiments cross channel posting (e.g., posting of the message in one or more channels) is permitted. In some embodiments the "@@" or other character or characters could indicate to the system that the message is to be sent solely to or in addition to one or more users and/or third parties via email. In this example a single @ signifies to the system that Paul wishes to @mention (at mention) a particular channel member. In other words, a single "@" (or analogous command) followed by the name (or other identifier) of the channel member along with a message will be posted and visible to all members of the channel. The "@" before a member name, alias or other identifier could serve to notify all channel members that the contents of the message is specifically targeted to or especially intended for the specified channel member or channel members. In some embodiments the system would send a special notification to the user/s specified. In this embodiment we take the concept of @ mentions a step further and allow the input of a unique character or sequence of characters (@@ in this example) to not only indicate a targeted recipient but to do so in a way that prevents others in the channel from seeing the message in their view of their own channel stream. In other words, only the intended channel member/s and the request private replies message sender see the private replies requested message. In some embodiments the private message can be sent to selected individuals without an accompanying request for a private reply. This is an improvement over single @mentions that are visible to all in the channel but intended for a targeted member or members. Many times, these messages clutter the channel and annoy the unintended channel participants. By allowing users to Double @mention users, channel clutter can be reduced, while facilitating a useful exchange between interested parties and/or while maintaining the flow and context of the conversation for all respective channel participants.

FIG. 22B shows an embodiment of a messaging system as seen from the point of view of Paul. In this embodiment Paul intends for the Private Reply Requested message to be sent to more than one channel member, but fewer than all of the channel members. In this example Paul intends to send a private reply requested message to channel members Lori and Sona (2205). In this embodiment a toggle switch is caused to be displayed when more than one channel member is specified to receive a Request Private Reply message. In other embodiments a toggle switch can be caused to be displayed when the first of one or more members is specified to receive a Request Private Reply message. In this embodiment "Siloed Private Replies" is the default setting (2206), meaning that replies will be visible to only the respondent and the Private Replies Requested message sender (Paul in this example).

In some embodiments the "name" is an identifier associated with an individual or can be a "name" associated with a group of users. For example, in some embodiments the user may wish to send a request private replies message to all channel users. In some embodiments, this can be accomplished by entering "@@channel" to indicate to the system that the sender wishes to send the private replies requested message to all channel members. In another example, the sender may be able to enter "@@managers" to indicate to the system that the sender wishes to include all of the users in the channel who are managers.

As an example, a plurality of messaging devices includes a first device operated by a first group user (Paul) and remaining devices operated by remaining group users (Lori, Sona). Paul, Lori, Sona (and possibly others) are a plurality of group users communicating with each other in a messaging channel (Sales). The first group user (Paul) enters a first group text message into a first device. Paul also identifies remaining group users that receive the private reply requested text message. In the example, Lori and Sona are identified group users. The first group text message is transmitted to the identified group users. When Lori and Sona reply with respective replies, the respective replies are displayed on Paul's device, and the respective replies are prevented from being displayed on remaining devices outside of Lori's and Sona's devices. In one embodiment as explained below, Lori and Sona can see each other's replies. In another embodiment, Lori and Sona cannot see each other's replies.

Figure 23A:
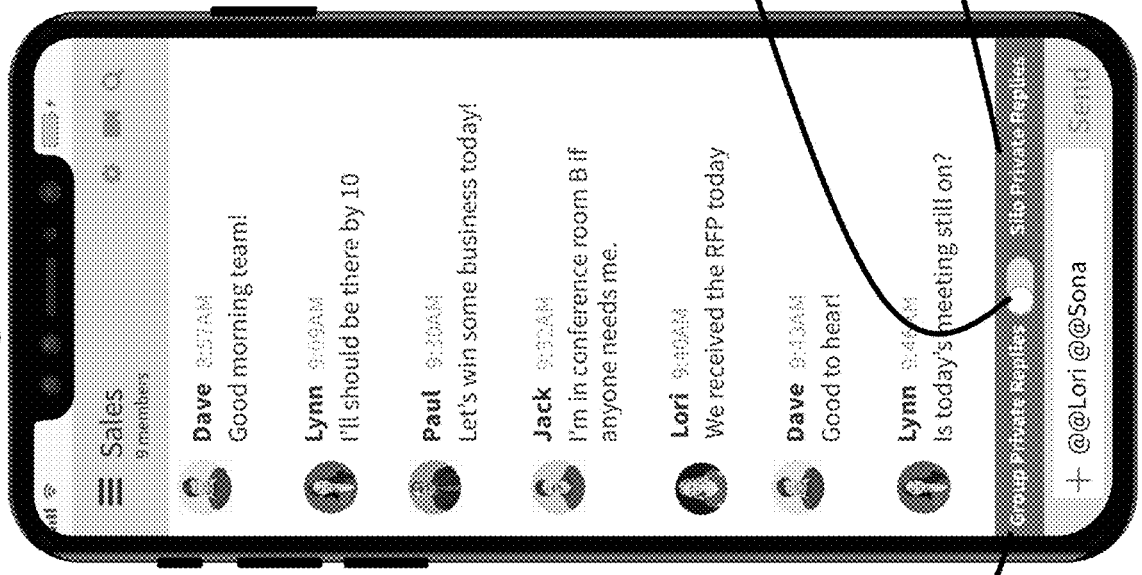
FIGS. 23A-23C are screenshots of one or more exemplary embodiments of the present invention.

FIG. 23A shows an embodiment of a messaging system as seen from the point of view of group channel member Paul. In this embodiment the system recognizes when more than one other channel member has been specified as a recipient of a Request Private Reply message. In this example, when two or more channel members are specified a toggle switch is caused to be displayed. In this example, the toggle switch defaults to Siloed private replies, meaning that Paul's message will be posted and made visible in these user's channel view and these users can each reply privately to Paul's message. In siloed mode (2209), their responses are visible only to each respondent him/herself and Paul. In other words, Lori and Sona's private responses will be visible to Paul and to each one of them respectively. Lori will not see Sona's private reply, nor will Sona be able to see Lori's private reply. In this example, Paul switched the toggle to "Group Private Replies" (2207). In "Group Private Replies" mode (2208), all of the replies are visible to the specified users. In other words, Lori can see Sona's reply and Sona can see Lori's replies. In Group Private Replies mode Paul and all specified parties can see each other's associated private replies. In some embodiments the "name" is an identifier associated with an individual or can be a "name" associated with a group of users. For example, in some embodiments the user may wish to send a request private replies message to all channel users. In some embodiments, this can be accomplished by entering "@@channel" to indicate to the system that the sender wishes to send the private replies requested message to all channel members. In another example, the sender may be able to enter "@@managers" to indicate to the system that the sender wishes to include all of the users in the channel who are managers.

Figure 23C:
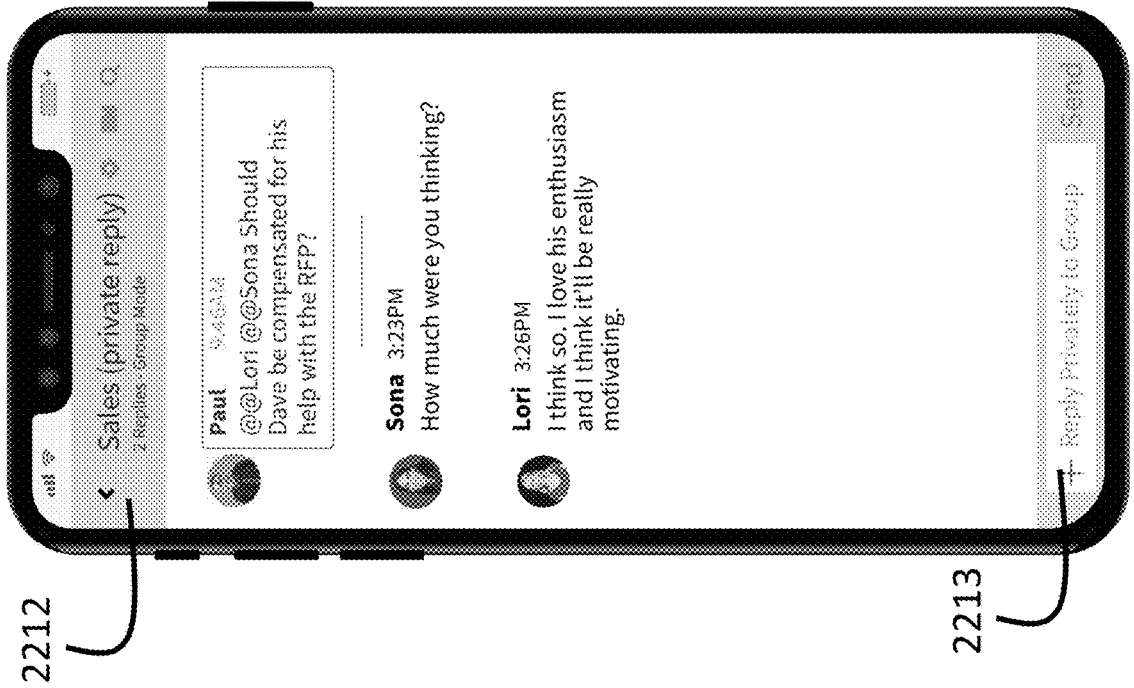
Figure 23B:
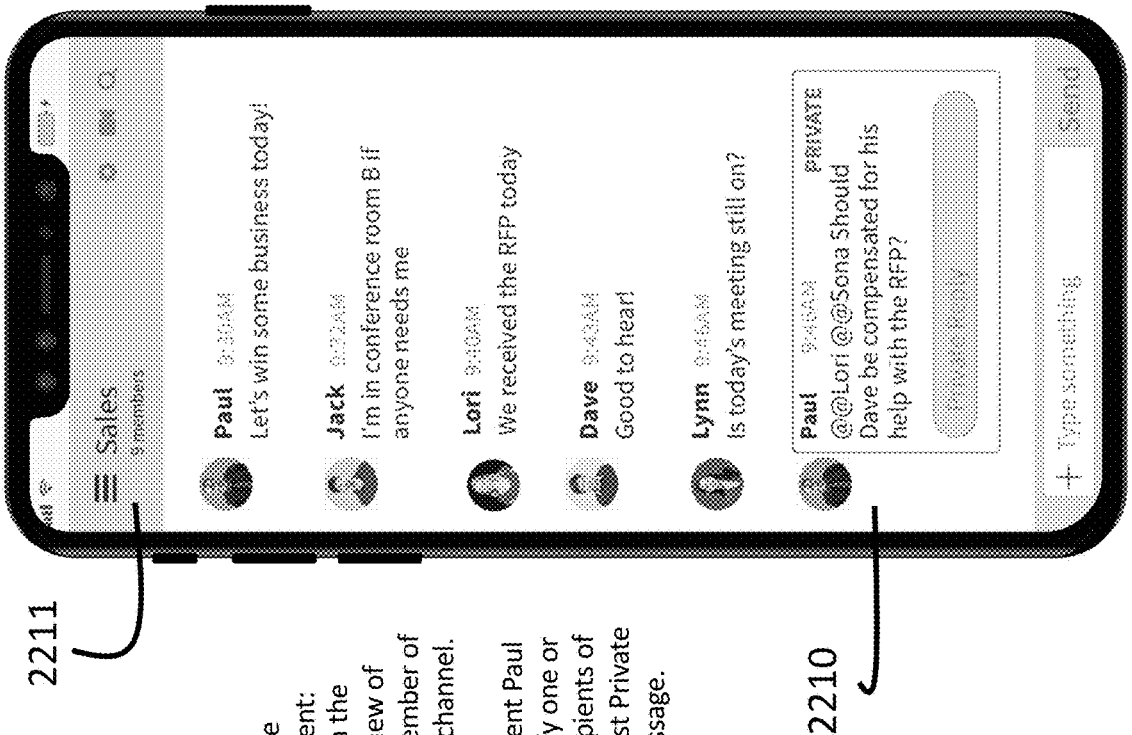

FIG. 23B shows an embodiment of a messaging system as seen from the point of view of group channel member Paul. In this embodiment Paul posted his Private Reply Requested message to the Sales channel (2211) at 9:46 AM. The message is only visible to Paul and the two users he specified; Lori and Sona FIG. 23C shows an embodiment of a messaging system as seen from the point of view of group channel member Paul. This FIG. 23C is caused to be displayed as a result of Paul having tapped on an area associated with his Private Replies Requested message (or on an area associated with one of the private replies he received from Sona or Lori in his display of the Sales channel. Doing so caused the further "Sales (private reply)" screen to be displayed. In some embodiments other methods can be implemented to display an aggregated collection of the private replies. In this embodiment, Paul views the private replies to his Private Replies Requested message. In this embodiment Paul's spawning Request for Replies message is pinned to the top of the screen and none, one or more than one private reply messages associated with his Request Private Replies message appear below it. In this embodiment, private reply messages can be scrolled up or down to reveal newer or older private replies. In this embodiment, Paul and the specified users can continue to post messages to the private sidebar thread (2213). These messages will appear in the sidebar and in some embodiments can also appear in the Sales channel, but visible only to the participants of the associated sidebar thread.

Thus, in the examples above, Paul has entered a private reply requested text message into his device and has identified who ("identified group users") will receive the message. The private reply requested text message is then transmitted to the identified (one or more) group users. For each of said identified group users that replies to the private reply requested text message in the messaging channel with a respective reply, each respective reply is displayed on Paul's device and is displayed privately, for example so that other people (some or all other people) who have access to the message channel cannot see the reply. The person who sent the reply is typically able to see his reply.

When several people reply to Paul's private reply requested text message, in one embodiment the people that reply can see each other's replies. In another embodiment, the people that reply cannot see each other's replies. In another embodiment, a switch allows Paul to select between a) the people that reply can see each other's reply; and b) the people that reply cannot see each other's reply.

In another exemplary embodiment, for each of said identified group users that replies to the private reply requested text message with a respective reply, the respective reply is entered into a respective Direct Message channel or respective private thread between the first group user and each of the identified group users that replies to the private reply requested text message. If entered into a Direct Message channel, further messages may be exchanged between the channel's respective members. There may be messages already in a Direct Message channel before the above described reply is entered into that channel.

Figure 24B:
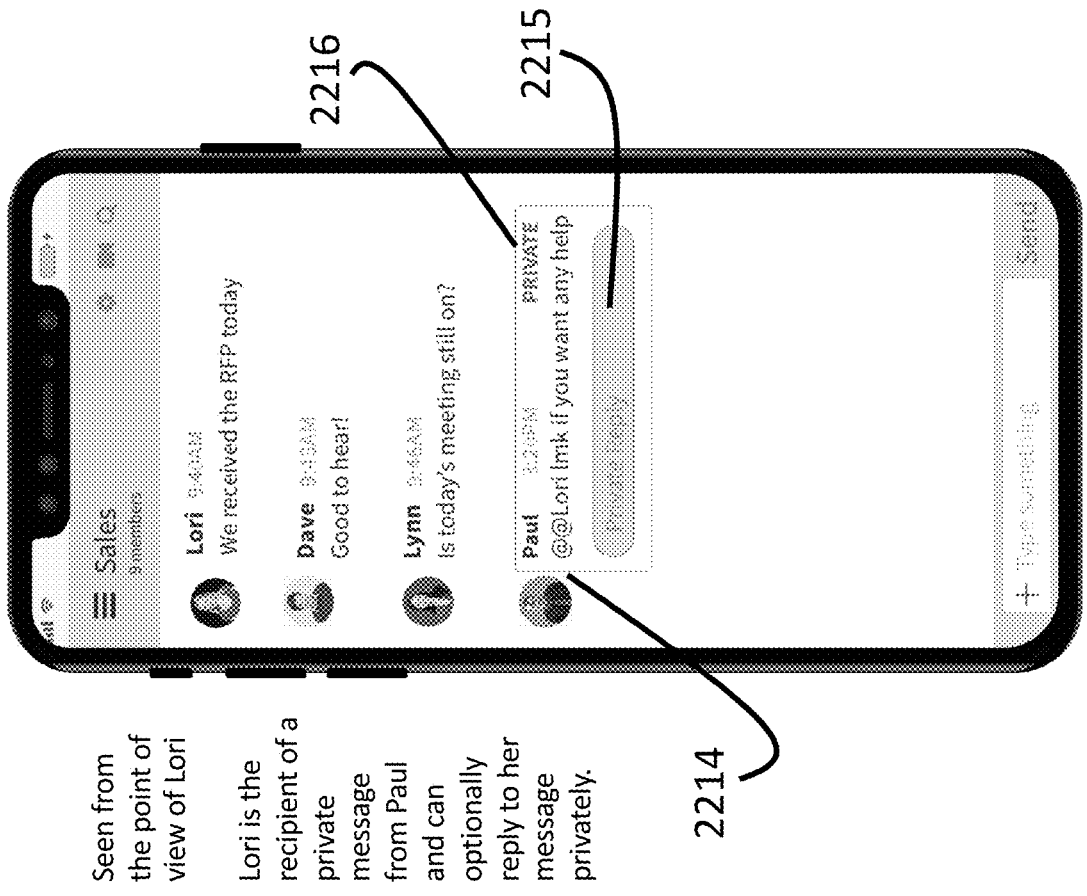
FIGS. 24A-24C are screenshots of one or more exemplary embodiments of the present invention.
Figure 24A:
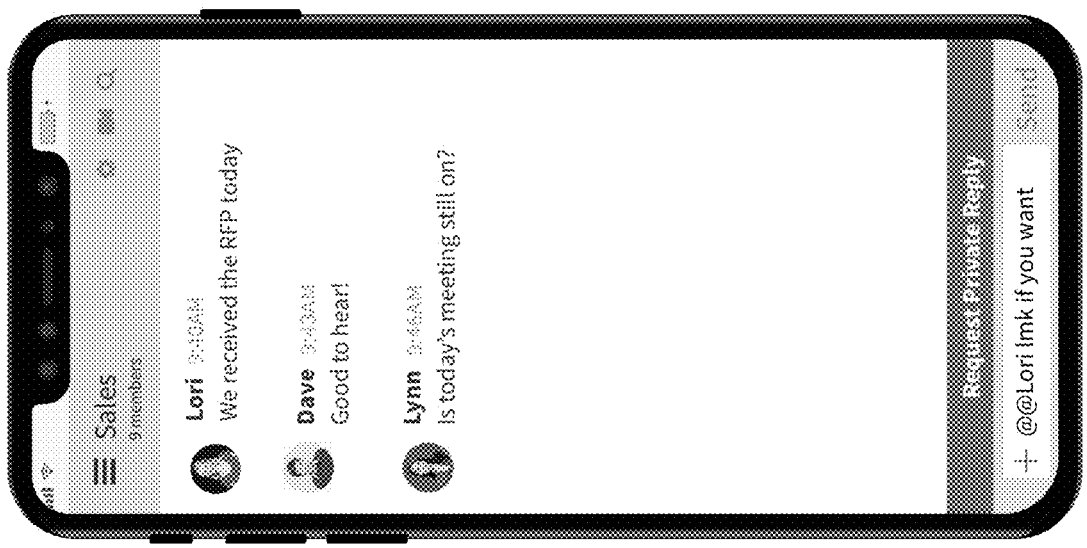

FIG. 24A shows an embodiment of a messaging system as seen from the point of view of Paul. In this embodiment Paul has indicated through the use of the characters "@@" that he wishes to send a private reply requested message to Lori in the Sales group channel. In this embodiment, the specified-user private reply requested signifying characters "@@" appear at the beginning of the message in conjunction with "Lori"- to specify Lori; but in other embodiments the character(s) and names (or other identifier/s) of the specified recipients can be placed elsewhere in the message, and in the case of more than one specified private reply requested recipient, apart or together. For example, in some embodiments "@@" placed anywhere in the message, and identification of one or more users elsewhere in the message, can specify these identified users as the only recipients of the private reply requested message. There are many ways to indicate the intent to send a private reply requested message and many ways to indicate the intended recipient/s. This embodiment describes one such approach. In some embodiments the system recommends or completes a "name" once the user starts typing, potentially speeding up the process of entering the name of the intended recipient/s. For example, in an embodiment, the user types in "@@m" and based on the user's input, the system displays a list of user names that extend from the letters typed so far, such as Marc, Maria, Melissa and Morris.

FIG. 24B shows an embodiment of a messaging system as seen from the point of view of Lori. Lori is a Sales channel member and the targeted recipient of Paul's private reply requested message. Paul's private reply requested message is visible only to Paul and Lori. In this example the fact that the message is a private reply requested message is visually indicated through a distinguishing design associated with the message: a box surrounds a portion of the message along with the word "PRIVATE" (2216). In addition, a text entry box is included with the message (2215) to suggest to the recipient that entry of a message in the box will send a private reply. In this example a text entry box appears with the message but in other embodiments text entry (or other form of input such as voice) can occur elsewhere and/or differently. In this example, the combining of the text entry box with the posted message serves the purpose of, among other things, distinguishing the private reply requested message from other types of messages in the channel and providing a simple and functional approach to facilitating a private reply. Is this embodiment the text of Paul's message is exactly as he typed it and includes "@@Lori" (2214). In some embodiments the text displayed is different than what was entered, for example in some embodiments the "@@Lori" is omitted from the message as displayed in one or more user views of the channel. In other embodiments the text posted can be derived, calculated, inferred, augmented or in additional or other ways changed or different from what was entered by the sender of the private reply requested message.

Figure 24C:
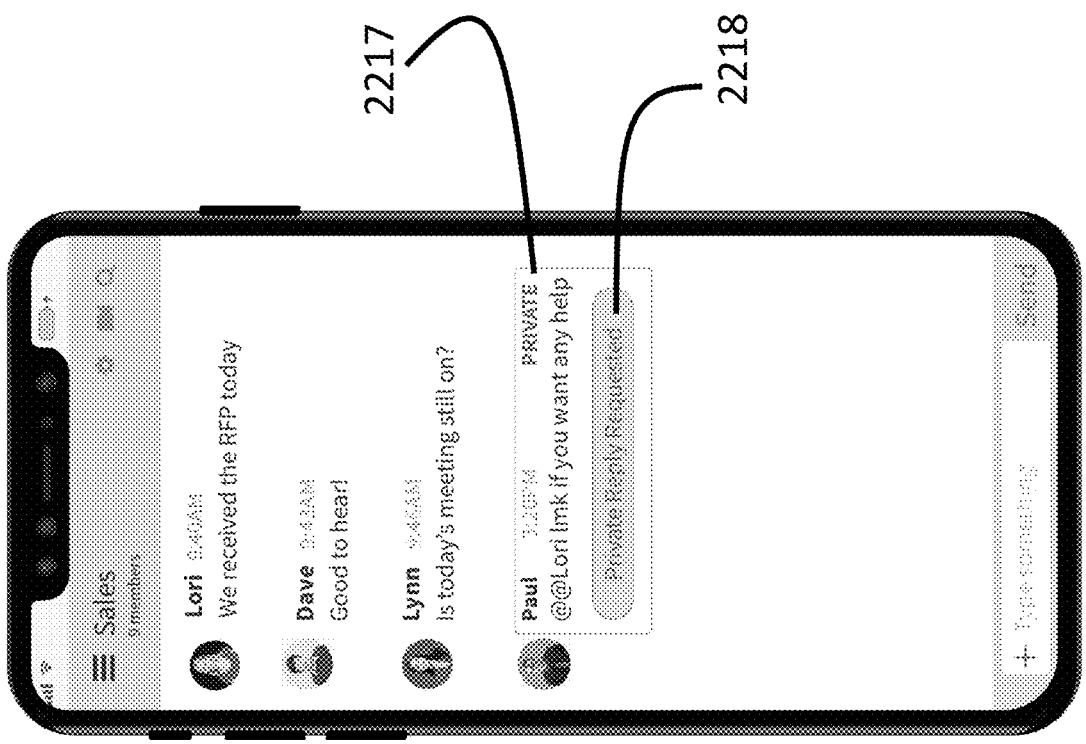
Figure 26A:
FIGS. 26A and 26B are screenshots of one or more exemplary embodiments of the present invention.
Figure 26B:
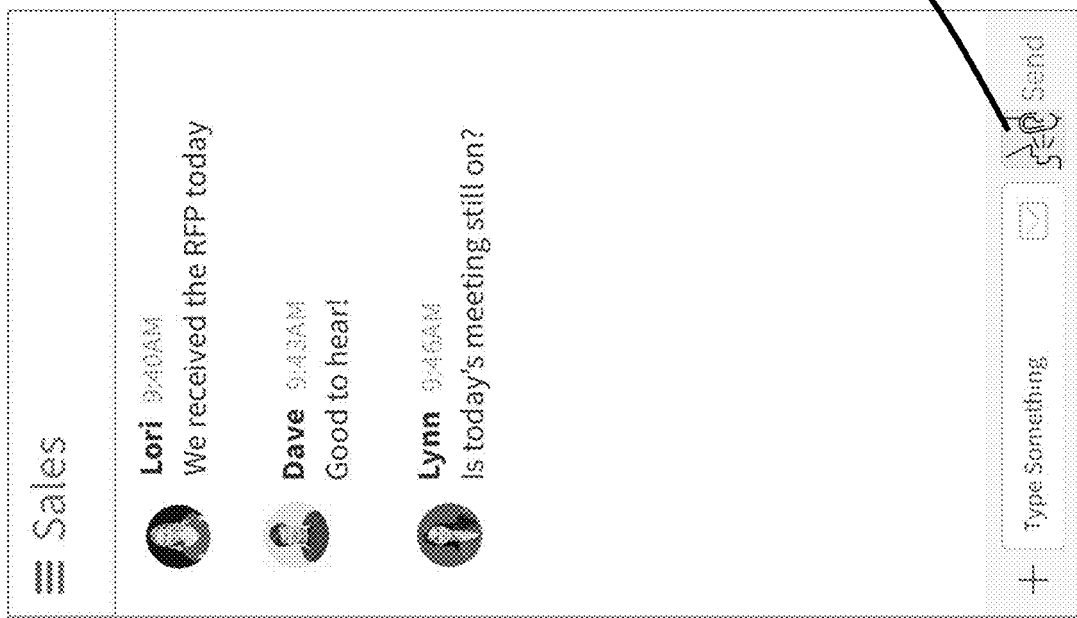

FIG. 24C shows an embodiment of a messaging system as seen from the point of view of Paul. In this embodiment Paul's private reply requested message is visible to only him and his intended recipient, Lori. In this example, Paul's (FIG. 24C #2217) and Lori's (FIG. 24B #2216) display of the private reply requested message are different as is, in this example, the functionality of the Request Private Replies message. In some embodiments the display and functionality of the Private Replies Requested message are identical or nearly identical. In some embodiments they are substantially or completely different. In some embodiments private reply messages can be toggled on or off by a, for example, system or channel administrator or by one or more of the system or channel members (e.g., mute private replies). In this example an indication that the message is a private reply requested message is displayed with an inactive text entry box and Paul is not permitted to enter a reply to his own private reply requested message (2218) but in other embodiments an active text entry box—or method of entering a private reply to his own private reply requested message would be permitted. There are use cases where sending private messages to yourself in a group chat channel could be useful (FIGS. 26A-26B)

FIGS. 25A-25E show an embodiment of a messaging system as seen from the point of view of Lori.

Figure 25A:
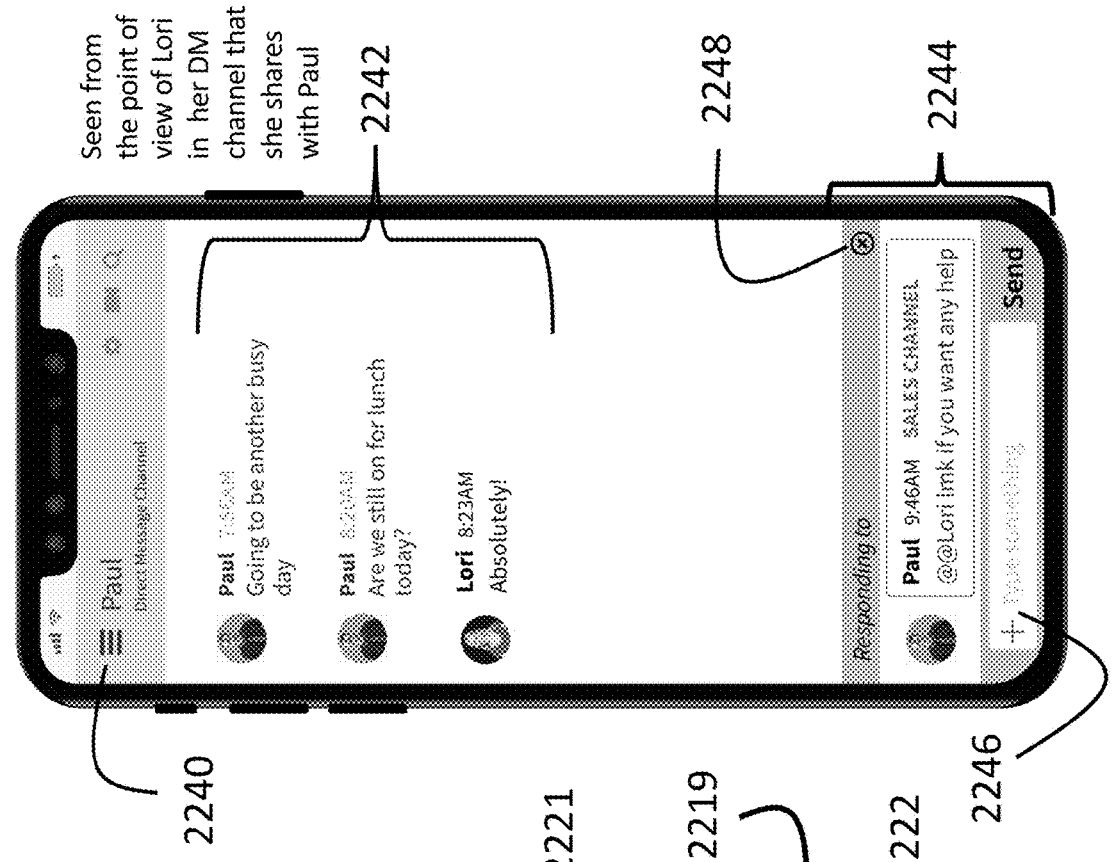
FIGS. 25A-25E are screenshots of one or more exemplary embodiments of the present invention.

FIG. 25A shows an embodiment of a messaging system as seen from the point of view of Lori. In this embodiment Lori is the recipient of a private reply requested message (2219) sent by Paul in the Sales channel (2220). In this embodiment the Private Reply Requested message is visually distinguished from standard messages and includes an indication that the message is private (2221). In this embodiment an indication is displayed to Lori suggesting that she can reply privately through interaction with the reply privately icon (2222). In this example, tapping on the icon (2222) causes the channel to switch to Lori's private DM (direct message) channel that she shares with Paul (2240). In some embodiments other means of indicating selection and initiating a private reply entry are possible.

Figure 25B:
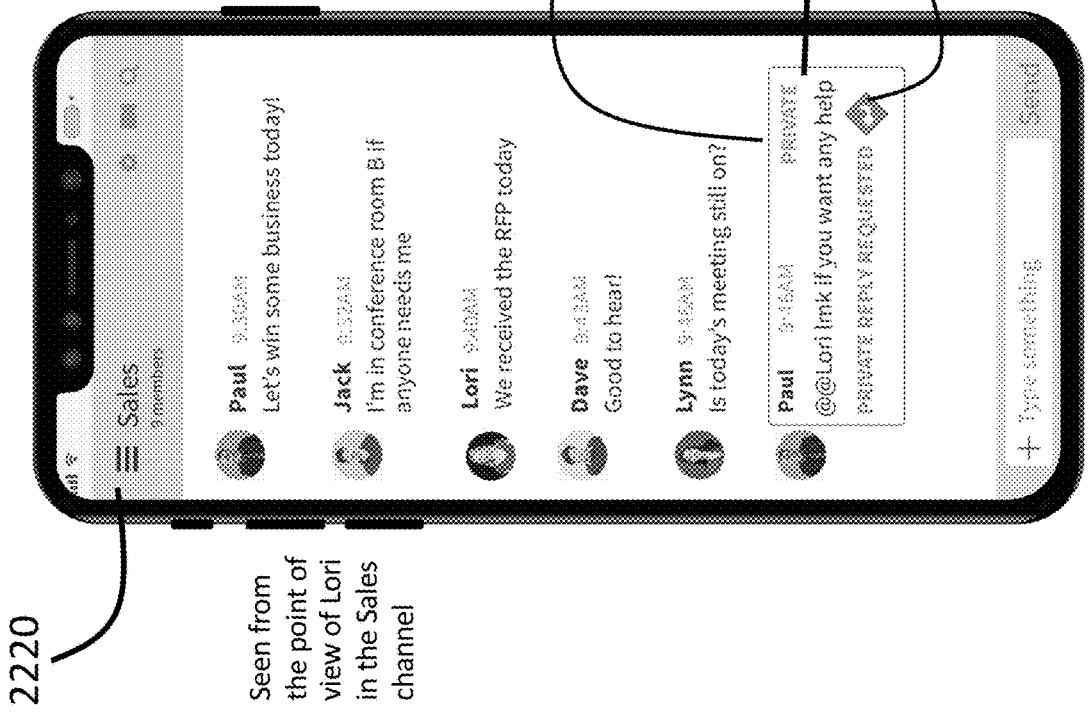

FIG. 25B shows an embodiment of a messaging system as seen from the point of view of Lori. In this example, Lori has switched to her and Paul's private DM channel (2240) as a result of her tapping on the Private Reply icon shown in FIG. 25A #2222). Lori and Paul's shared DM channel has an existing history of unrelated messages (i.e., unrelated to the spawning private reply requested message sent by Paul in the Sales channel) exchanged between Paul and Lori (2242). In this example, Paul's spawning private reply message is displayed and associated with a text entry bar (2246). In this example, Lori, can cancel her private reply by tapping on the "cancel" icon (2248). In this embodiment, tapping on the close icon (2248) will cancel her reply and return her to the Sales channel.

Figure 25D:
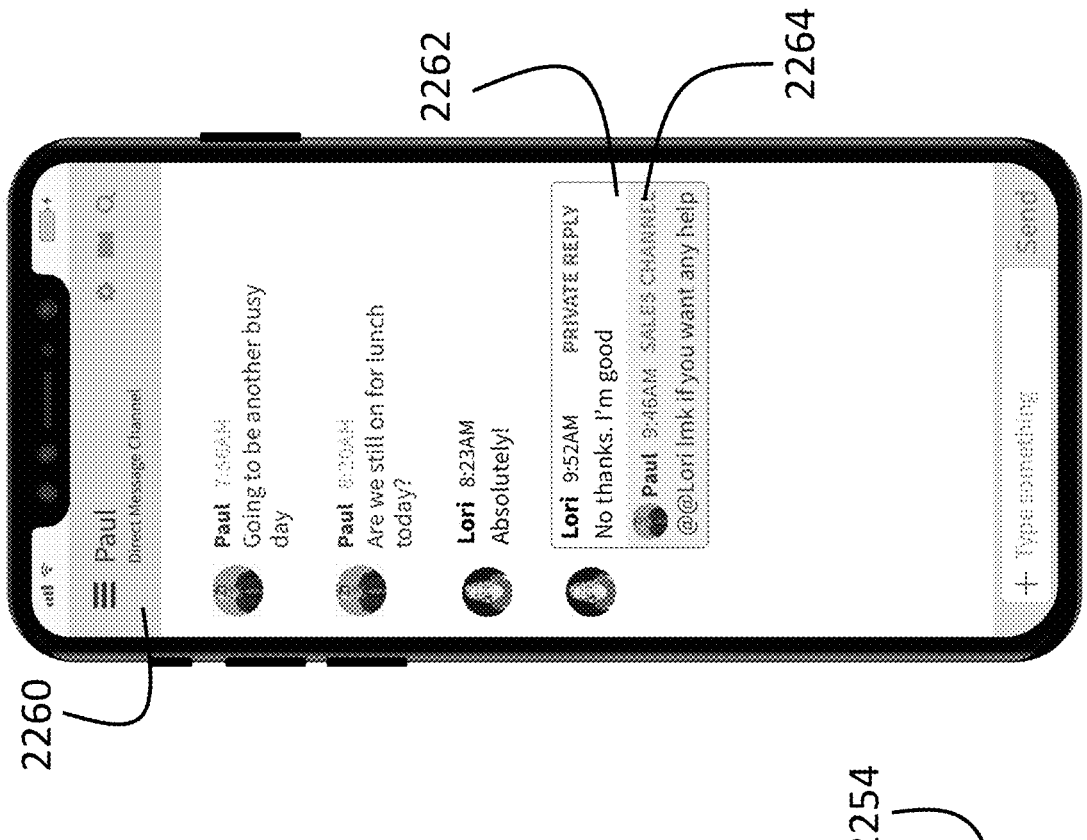
Figure 25C:
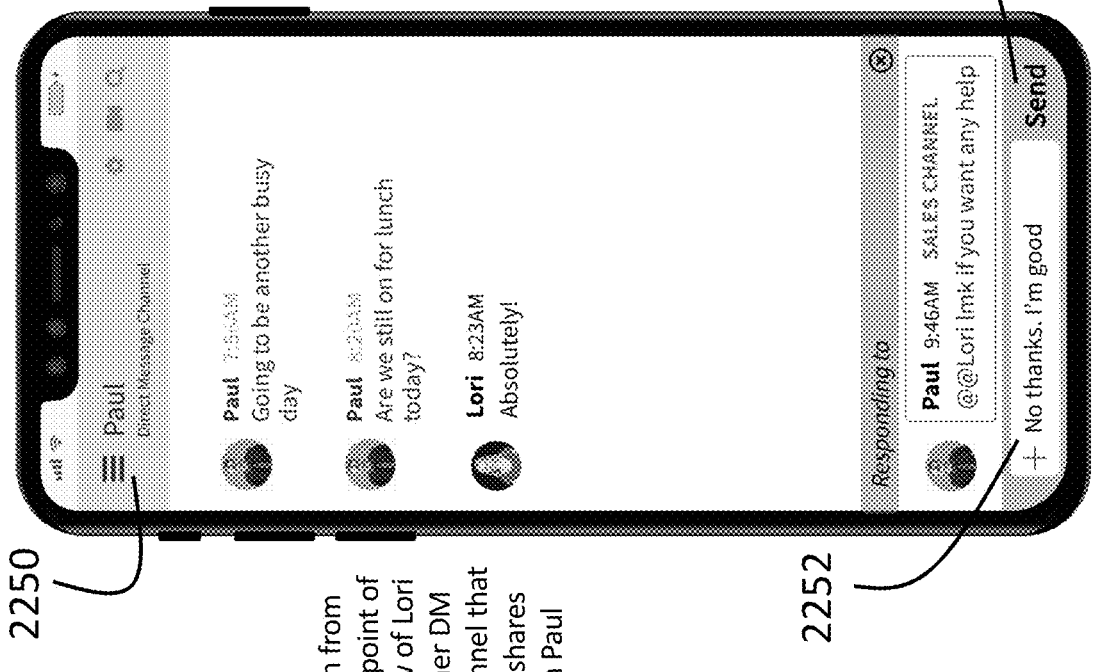

FIG. 25C shows an embodiment of a messaging system as seen from the point of view of Lori. In this example, Lori is still viewing the private DM channel that she shares with Paul (2250). In this example, Lori enters her private reply to Paul, "No thanks. I'm good" and taps "Send" (2254) to transmit the message.

FIG. 25D shows an embodiment of a messaging system as seen from the point of view of Lori. In this example, Lori is still viewing the private DM channel that she shares with Paul (2260). In this example, Lori's private reply is posted to the DM channel. In this example, her private reply is visually distinguishable from standard messages and includes a copy of all or a portion of the message she is replying to (Paul's 9:46 AM message from the Sales channel (2262). In this example, Rachel can return to the Sales channel by tapping on an area associated with the message (2262) in this example she can tap on the text "SALES CHANNEL", which causes the display to update and for the Sales channel to be at least partially displayed.

Figure 25E:
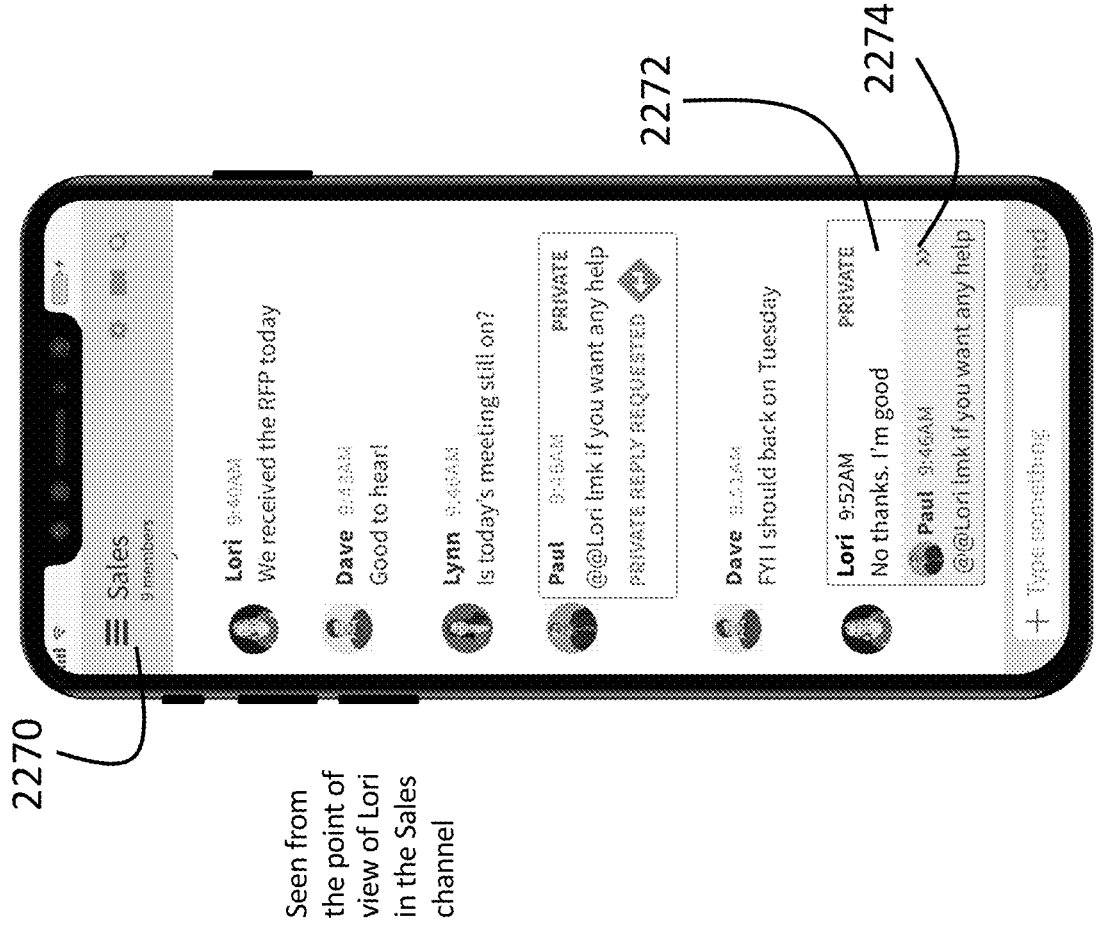

FIG. 25E shows an embodiment of a messaging system as seen from the point of view of Lori. In this embodiment Lori has returned to the Sales Channel (2270). In this embodiment, an indication of her private reply in the DM channel is displayed, in this case a copy of the message (2272) that Lori posted in her and Paul's shared DM channel is posted in the Sales Channel. In some embodiments another or no indication of her private reply in the DM channel is displayed. In this embodiment Lori can switch to the DM channel by tapping on the "show in DM channel" icon (2274).

FIGS. 26A and 26B show an embodiment of a messaging system as seen from the point of view of Paul. Paul is a member of the Sales channel. There can be many ways to initiate a request for private replies. In this embodiment Paul initiates a request for a private reply by tapping on (or otherwise selecting) the "whisper in someone's ear" icon (FIG. 26A #2224). In this example, tapping on this icon causes a channel member selection menu (FIG. 26B #2226) to be displayed from which Paul can select one or more intended private reply requested message recipients. In some embodiments private reply requested messages can be sent to additional or other recipients in additional/other channels (FIG. 26B #2228).

Figure 27B:
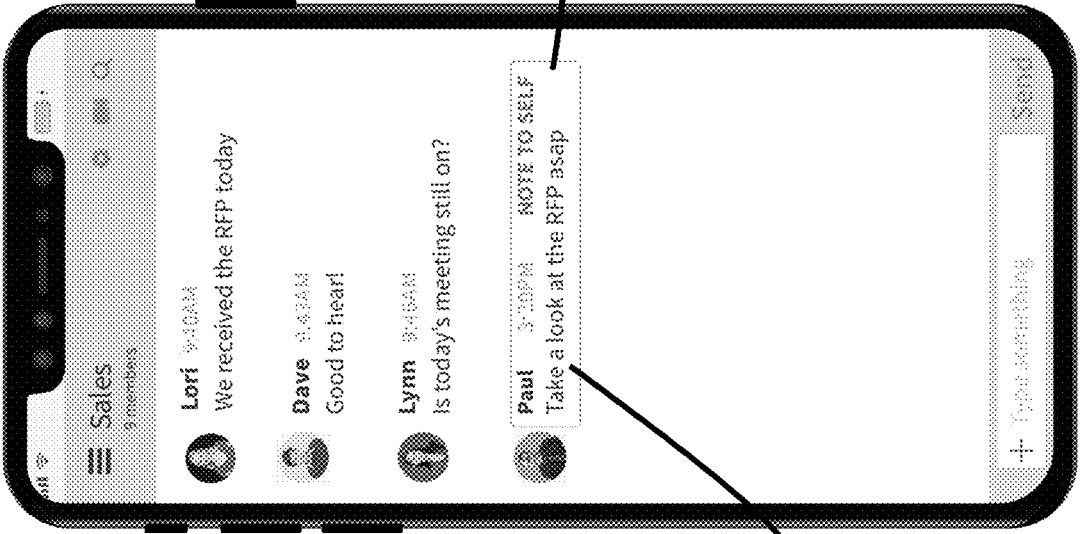
FIGS. 27A and 27B are screenshots of one or more exemplary embodiments of the present invention.
Figure 27A:

FIGS. 27A and 27B show an embodiment where a user can post a private "Note to Self" message in a group channel that is displayed only to themself in their respective channel message stream.

FIG. 27A In this embodiment Paul initiates a "note to self" by typing one or more characters that the system recognizes may be a request to initiate a message that will appear in the group channel but be visible only to Paul (i.e. a "Note to Self"). Periodic notes to oneself that are embedded into the flow of a group conversation but that are private to oneself can be useful. In this example the characters "@#" (2232) followed by the name or alias of the private note to self sender (2234). In this embodiment the system displays a visual indication to confirm for the user that the message being crafted is a "Request Private Reply" message (2230). For descriptive purposes #2232 and #2234 are described distinctively but in some embodiments the two components could be considered, for example, together and as a single component.

FIG. 27B shows an embodiment of a messaging system as seen from the point of view of Paul in the Sales group channel. In this example the fact that the message is a "Note to Self" is visually indicated through a distinguishing design associated with the message. In this example a box surrounds a portion of the message along with the words "NOTE TO SELF" (2236). In this embodiment Paul cannot reply to his own Note to Self, but in some embodiments Paul would be able to reply to his own message. Is this embodiment the text of Paul's message omits the "@#me" text (2238) that was typed by Paul in FIG. 27A #2232. In some embodiments the text displayed is different than what was typed, for example in some embodiments the "@#me" is included in the message. In other embodiments the text posted can be derived, calculated, inferred, augmented or in additional or other ways changed or different from what was entered by the sender of the "Note to Self" message.

Thus, Paul or someone else who has access to the messaging channel is a "self-noting user." The self-noting user can create a self-noting message. The self-noting message may be displayed in the messaging channel but with restricted access (i.e. ability to view). The restricted access may be that less than everyone who has access to the channel has access to the self-noting message. The restricted access may be that only the self-noting user has access to the self-noting message.

In some embodiments the self-noting user can specify the placement in the message stream of the self-noting message. For example, Paul may be able to enter a note and specify that it is to be placed at July 15 at 10:30 AM. Paul can specify a time in the past (in which case it is embedded in the stream among previous messages), in the future, or in the present. In this example, the self-note which could be visually distinguishable as compared to standard messages would be embedded into the message stream and displayed to the self-noting user at the specified placement date and time.

Before proceeding, several definitions may be helpful to understand exemplary embodiments that correspond to aspects of the present invention.

Control Type/Control Message Type. There are many possible control types (aka message types). Control types are applied to messages by message senders to impose system, channel and/or message functionality restrictions and/or requirements on control type messages and/or to otherwise effect the behavior and/or functionality of the system, channel and/or message.

A "control type" can be thought of as a default set of one or more attribute and/or restriction (or requirement) settings associated with system, channel, and/or message functionality, each specified control type/message type having corresponding specified default functionality (e.g., Required Reading messages, Password Protected messages). Control types do not purport to define every attribute, restriction and/or requirement respecting the functionality of message types, nor must all instances of messages of any control type include all functionality included in the default settings for that control type (i.e., the control type settings are default settings, wherein instances of the control type message may or may not include all such default settings and/or may include other non-default settings). The terms control type and message type are used interchangeably herein throughout. Control types are applied to messages by message senders to impose system, channel and/or message functionality attributes, restrictions and/or requirements on control type messages and/or otherwise effect the behavior and/or functionality of the system, channel and/or message. In some embodiments, control types can be applied to messages "privately", i.e., the control type message will be sent to a specified subset of channel users, or may be otherwise augmented or augmented at the sender's option with additional functionality, as discussed below, and as such may maintain their identity as a specific control type or message type (e.g., a Password Protected message sent "privately" to a subset of channel members remains of the control type/ message type "Password Protected message."

Trigger Data

Trigger data is received by the system responsive to one or more actions by a message sender and, either alone or in conjunction with recipient identification data, indicates both (a) control message type (aka control type) (e.g., Password Protected, Required Reading, etc.); and (b) the intended recipient or recipients of sender's message. As explained herein and elaborated upon, the receipt of trigger data alone can be understood as receipt of trigger data that includes default recipient data, indicating the control message type and a default recipient mode such as "all channel members," or can be understood as receipt of trigger data only, which, in the absence of recipient identification data, may indicate both the control message type and a default recipient mode such as "all channel members." Although the following is discussed in the explanatory or definitional section pertaining to control type/control message type, we underscore that in some embodiments any instance of a control type message (aka control message type) may be modified to add and/or subtract functionality attributes, restrictions and/or requirements to and/or from the default settings for that type. For example, and without limitation, in some embodiments, control message types can be applied to messages "privately", i.e., the control message type message will be sent to a specified subset of channel users, or may be otherwise augmented or augmented at the sender's option with additional functionality, as discussed below, and as such may maintain their identity as a message of a specific control type or control type message (e.g., a Password Protected message sent "privately" to a subset of channel members remains of the control type/control message type "Password Protected message Recipient Identification Data Recipient identification data is received by the system responsive to one or more actions by a message sender and, either alone or in conjunction with trigger data, indicates both (a) the intended recipient or recipients of sender's message; and (b) control message type (aka control type) (e.g., Password Protected, Required Reading, etc.). As explained herein and elaborated upon, the receipt of recipient identification data alone can be understood as receipt of recipient identification data that includes default trigger data, indicating both the sender's intended recipients and a default control message type; or can be understood as receipt of recipient identification data only, which in the absence of trigger data may indicate (a) either a default control message type or no control message type (i.e., no control message type would mean the recipient identification data would not indicate any control message type); and/or (b) either the intended recipient or recipients of sender's message, or that recipient identification data should not be treated as indicating the intended recipient or recipients of sender's message. Although the following is discussed in the explanatory or definitional section pertaining to control type/control message type, we underscore that in some embodiments any instance of a control type (aka control message type) may be modified to add and/or subtract functionality, attributes, restrictions and/or requirements to and/or from the default settings for that type.

Private Messages are messages of any control type or of no control type that are sent solely to one or more sender-identified recipients, whether sent from any group channel, DM channel, or other channel, or elsewhere, and whether sent to recipient or recipients in, and/or posted to, any group channel, DM channel, or other channel, or elsewhere; wherein, the it is due to the sender's action with intent, received by the system, that the message is both (a) sent as a Private Message; (b) sent to the sender identified recipient or recipients. For example, a message sent from and to a DM channel is not a Private Message unless the sender takes the action specified herein for both adding the privacy functionality and identifying the private recipient. In other words, even in a channel DM in which Marry and Scott are the members, a message to Scott from Mary is not a Private Message unless Mary, the sender, takes the action referred to above as "specified herein," even though the messages in their DM channel are "private" to Scott and Mary without Mary's additional action. Some systems may enable administrators or others access to the Private Messages of employees, or may create channels into which such messages are posted or may other means for administrators or others to view such messages, and this should not be deemed to change the status of a Private Message to some other status—it remains a private message within the meaning of Private Message as used herein.

Qualified Manner: Interacting with a message in a "qualified manner" (or "qualified interaction") means that the message recipient interacts with the control type message in a manner recognizable by the control message to cause a further action (for example, tapping on an icon or button or entering a password. Interacting with the message, by winking at it, for example, unless programmed to recognize and accept a wink would not constitute a "qualified manner")

Figure 29:
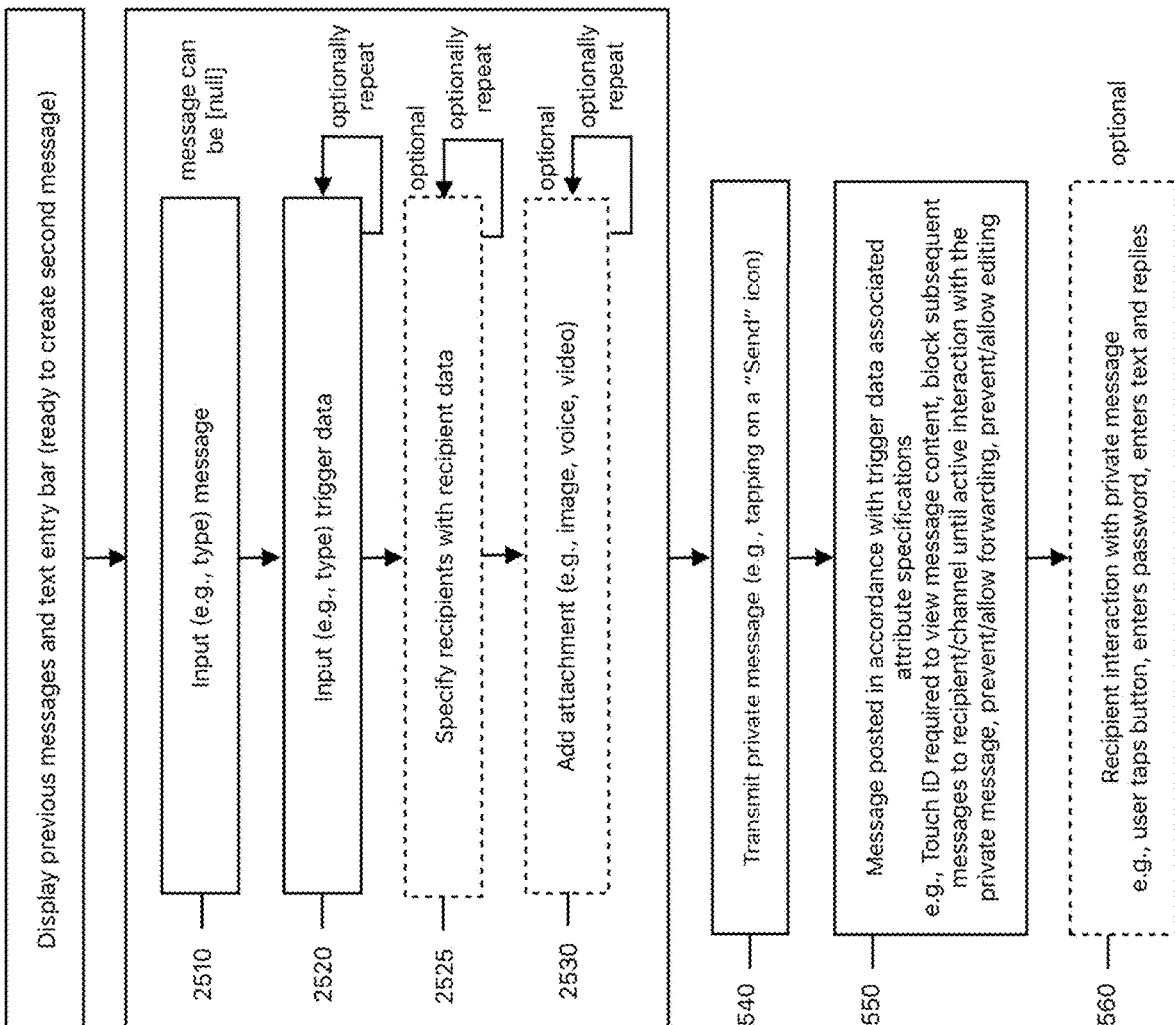
FIG. 29 is a flowchart diagram that illustrates exemplary @@mention in accordance with a further exemplary embodiment of the present invention.

FIG. 28 and FIG. 29 each describe a "Private Message" type of control message (in some embodiments referred to as a Request Private Replies control type). The flowchart diagrams depicted in FIGS. 28 and 29 are substantially similar. The difference between the two Figures is that in FIG. 28, the absence of user specified recipient identification data causes the system to infer, lookup, calculate or apply default recipient identification data, e.g., "all", as the recipient identification data. FIG. 29 shows an embodiment of Private Message that optionally allows recipient-identification data to be specified. In an implementation, there may be times when a sender specifies recipient identification data and times when the sender does not specify recipient identification data. In some embodiments, when recipient identification data is not specified by the user it still exists, but it is supplied by the system automatically. In some embodiments, when recipient identification data is not specified by the user the trigger data is ignored i.e., does not cause the message to be a control message.

In some embodiments, both trigger data and recipient-identification data are specified by the sender, e.g., "@@Jeff" (private message to Jeff). In some embodiments, trigger data is specified by the sender, but recipient-identification data is not specified by the sender. When recipient-identification information is not specified by the sender, it is inferred (or otherwise supplied by the system) e.g., "@@" (e.g., private message to everyone in the channel via DM channels).

In some embodiments trigger data and, if specified by the sender, recipient identification data may be entered and/or displayed contiguously (e.g., @@Jeff) or separated (e.g., @@ message-content Jeff).

In some embodiments trigger data is entered before text message content is entered. In some embodiments trigger data is entered after text message content is entered.

In some embodiments trigger data is entered before recipient identification data is entered. In some embodiments trigger data is entered after recipient identification data is entered.

In some embodiments recipient identification data is entered before text message content is entered. In some embodiments recipient identification data is entered after text message content is entered.

In some embodiments trigger data is also recipient identification data in that the trigger data determines the recipient data, for example, in an embodiment "/!/" is trigger data with default recipient identification data of "all".

Entering trigger data indicates that when a text message is transmitted, the message should be transmitted in a manner so that it is received as a private message to one or more private recipients of said remaining group users;

In some embodiments the sender is not a recipient. In some embodiments recipients may receive respectively different content associated with a common control message. In some embodiments recipients may have respectively different restrictions or requirements associated with a common control message. In some embodiments sub-sets of recipients may have respectively different restrictions or requirements associated with a common control message.

In some embodiments, certain input such as string of characters (e.g., a user's name), can have more than one possible interpretation by the system. In some embodiments the system may be unable to determine the message creator's intent and may need to provide a mechanism for the user to provide clarification. For example, in some embodiments a username can be trigger data and/or recipient identification data or it can be a simple and routine use of a user's name. In an example such as this, the system may highlight or otherwise call attention to the character sequence (user's name) and/or provide for a mechanism, such as tapping on the user's name to facilitate a further interaction, in order for the message creator to indicate whether or not the user's name should be construed as trigger data and/or recipient identification data or whether to just accept the user's name as routine message content.

In some embodiments one or both of trigger data and identification data may be displayed or not displayed to either or both sender and recipient, or may be displayed in some other order or placement or otherwise differently than entered, or may be replaced as displayed with other data (e.g., message addressed @@Jeff or Jeff@@ or @@ [message-content] Jeff may be displayed to recipient with message-content as "Private to you from name-of-sender" and to sender as "Private from you to name-of-recipient."

FIG. 28 is a flowchart diagram that illustrates exemplary @@mention in accordance with a further exemplary embodiment of the present invention. At step 2400, a user is in a group channel. There is a display of previous messages and the text entry bar (or other area or field receptive to input), ready to create a second message. Step 2405 relates to a user creating a message. A message is input into a text entry bar at step 2410. For example, in step 2410, the message may be typed, although other methods of entry may be used. At step 2420, trigger data (such as data in digital form that is accessed via a user interface, electronic interface, etc.) is input. Again, as an example, the trigger data may be typed in, although other forms of entry (such as voice, gesture, etc.) may be used. At step 2430, attachments are optionally added. Examples of the optional attachment(s) may include a file, image, voice, video, etc. It is noted that while a message is created in step 2405, numerous sub steps (some of which may be optional) are shown. It is noted that the steps shown within 2405 can be performed in the sequence shown in the figure or rearranged in a different order. At step 2440, the private message is transmitted. As an example, the private message may be transmitted by tapping on a "send" icon. Other methods of digital entry via user interface (or electronic interface) into a device in order to send the message may also be used, such as gesture, shaking the phone, etc. At step 2450, the message is posted. The message is posted in accordance with trigger data, recipient data (if any) and attribute specifications (if applicable). Thus, at step 2450, the message is posted, i.e. it is delivered to the one or more destinations that it was sent to. Examples of attribute specifications include touch ID required to view message content, block subsequent message(s) to recipient/channel until active interaction with the private message occurs, prevent/allow forwarding, prevent/allow editing, etc. Note that these are merely examples. At step 2460, there is recipient interaction with the private message. Note that step 2460 is optional. For example, the user taps a button, enters password, enters text and replies, or other optional interactions.

FIG. 29 is a flowchart diagram that illustrates exemplary @@mention in accordance with a further exemplary embodiment of the present invention At step 2500, a user is in a group channel. There is a display of previous messages and the text entry bar (or other area or field receptive to input), ready to create a second message. Step 2505 relates to a user creating a message. A message is input into a text entry bar at step 2510. For example, in step 2510, the message may be typed, although other methods of entry may be used. At step 2520, trigger data is input. Again, as an example, the trigger data may be typed in, although other forms of entry (such as voice, gesture, etc.) may be used. At optional step 2525, recipients are specified with recipient data. At step 2530, attachments are optionally added. Examples of the optional attachment(s) may include a file, image, voice, video, etc. It is noted that while a message is created in step 2505, numerous sub steps (some of which may be optional) are shown. It is noted that the steps shown within 2505 can be performed in the sequence shown in the figure, or rearranged in a different order. At step 2540, the private message is transmitted. As an example, the private message is transmitted by tapping on a "send" icon. Other methods of entry into a device in order to send the message may also be used, such as gesture, shaking the phone, etc. At step 2550, the message is are posted. The message is posted in accordance with trigger data, recipient data, (if any) and attribute specifications (if applicable). Thus, at step 2550, the message is posted, i.e. it is delivered to the one or more destinations that it was sent to. Examples of attribute specifications include touch ID required to view message content, block subsequent message(s) to recipient/channel until active interaction with the private message occurs, prevent/allow forwarding, prevent/allow editing, etc. Note that these are merely examples. At step 2560, there is recipient interaction with the private message. Note that step 2560 is optional. For example, the user taps a button, enters a password, enters text and replies, or other optional interactions.

Further to the above description, a "control type" can be thought of as a default set of one or more attribute settings associated with particular functionality. Control types are applied to messages by message senders to impose system, channel and/or message functionality restrictions, requirements, and or specifications on control type messages and/or otherwise effect the behavior and/or functionality of the system, channel and/or message.

"Control types" of the same name can have different default attribute settings, e.g. the "Required Reading" control type may have default attribute settings in one messaging environment but a different set of default attribute settings in another messaging environment. Control types of different names can have identical default attribute settings. For example, a control message type name "Request Private Replies" may be called "Reply in Private" in another messaging environment. In some embodiments control types can be named and/or renamed. In some embodiments control type default settings can be modified, augmented, overwritten or otherwise changed.

In a further exemplary embodiment of the present invention, a method of operating a plurality of messaging devices includes a first device operated by a first group user and remaining devices operated by remaining group users. The first group user and the remaining group users are a plurality of group users communicating with each other in a messaging channel. The method comprises the steps of: receiving entry of a first group text message, the first group text message received into the first device from the first group user; transmitting the first group text message to the remaining group users so that the first group text message appears in the messaging channel on the first device and on the remaining devices operated by the remaining group users, respectively; for each of the remaining group users that enters a respective second group text message into a respective one of the remaining devices, displaying each second group text message in the messaging channel on the first device and on the remaining devices; allowing the first group user to enter a further text message into the first device; allowing the first group user to enter trigger data into the first device (this can occur before or after the further text message is entered), wherein the trigger data is associated with the further text message; allowing the first group user to enter recipient identification data into the first device, wherein the recipient identification data is associated with the further text message; wherein entering the trigger data results in (i.e. indicates) the further text message being transmitted as a private message to one or more private recipients of the remaining group users; wherein entering the recipient identification data identifies the one or more private recipients to whom the further text message is sent; and wherein i) the one or more private recipients are associated with the trigger data; and/or ii) the one or more private recipients are associated with recipient data also entered into the first device.

FIG. 30 is an index figure that shows the relationship between FIGS. 30A-30E. FIGS. 30A-30E are flowchart diagrams that illustrate exemplary use of control messages in accordance with a further exemplary embodiment of the present invention At step 2600, previous messages are displayed and a text entry bar (or other area or field receptive to input) is provided (e.g. displayed). Thus, a user is ready to create a second message. At step 2602, the ability is provided to indicate control message type(s). An example of this step is further illustrated in FIG. 38 and FIG. 39 and will be further described below. More specifically, FIG. 38 corresponds to step 2600 and FIG. 39 corresponds to step 2602. At step 2601, one of the types of control messages shown in the figure are indicated. Examples of control message types include pin message (2603), post to crawl (2604), password protected message (2605), quote with markup (2606), request private replies (2607), required reading (2608), etc. (2609). One control message type may be indicated or multiple control message types may be indicated for a message. Furthermore, multiple control message types me be indicated in an order other than as shown in the figure.

Figure 30A:
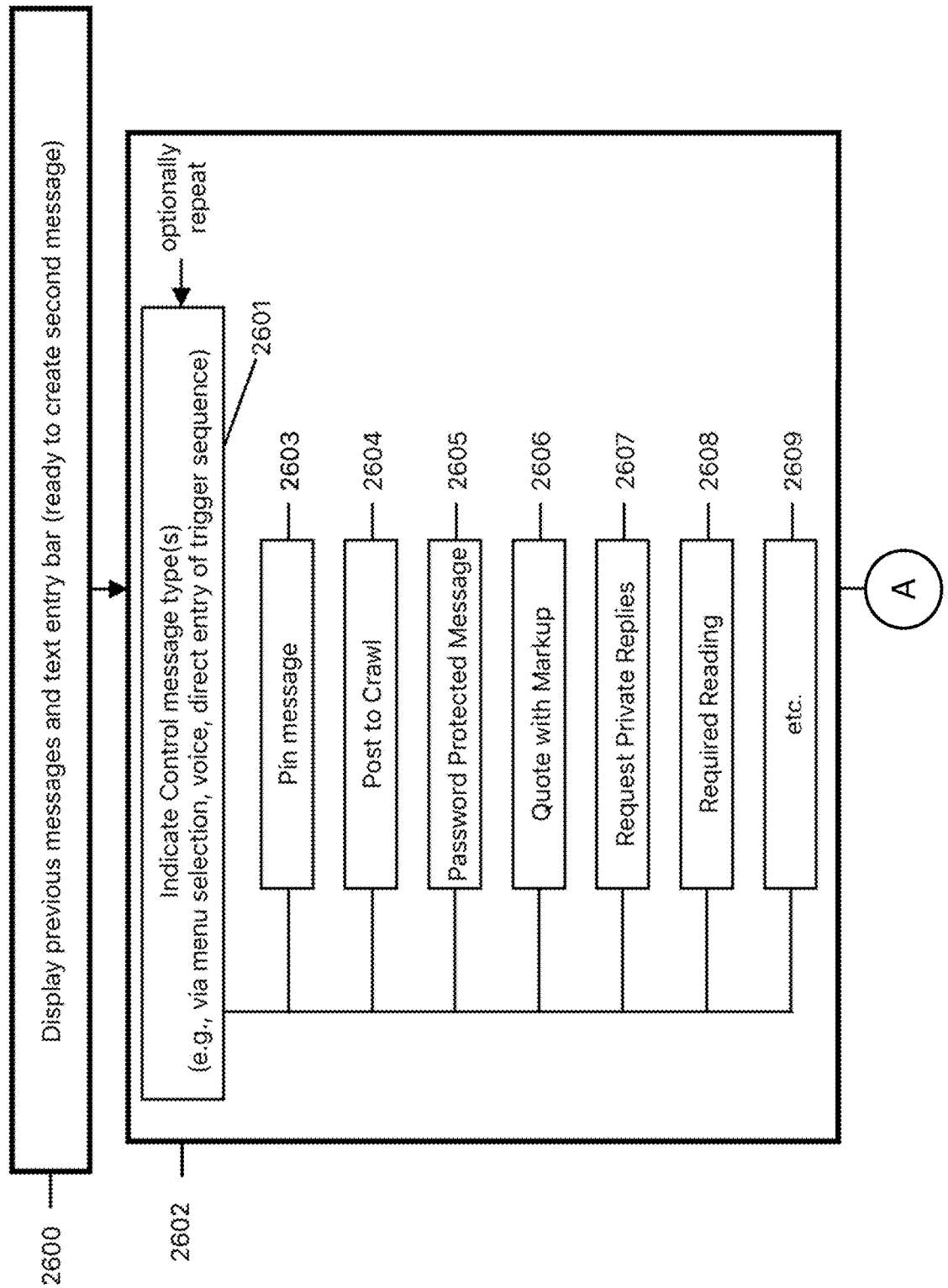
FIGS. 30A-30E is a flowchart diagram that illustrates exemplary use of control messages in accordance with a further exemplary embodiment of the present invention.
Figure 30B:
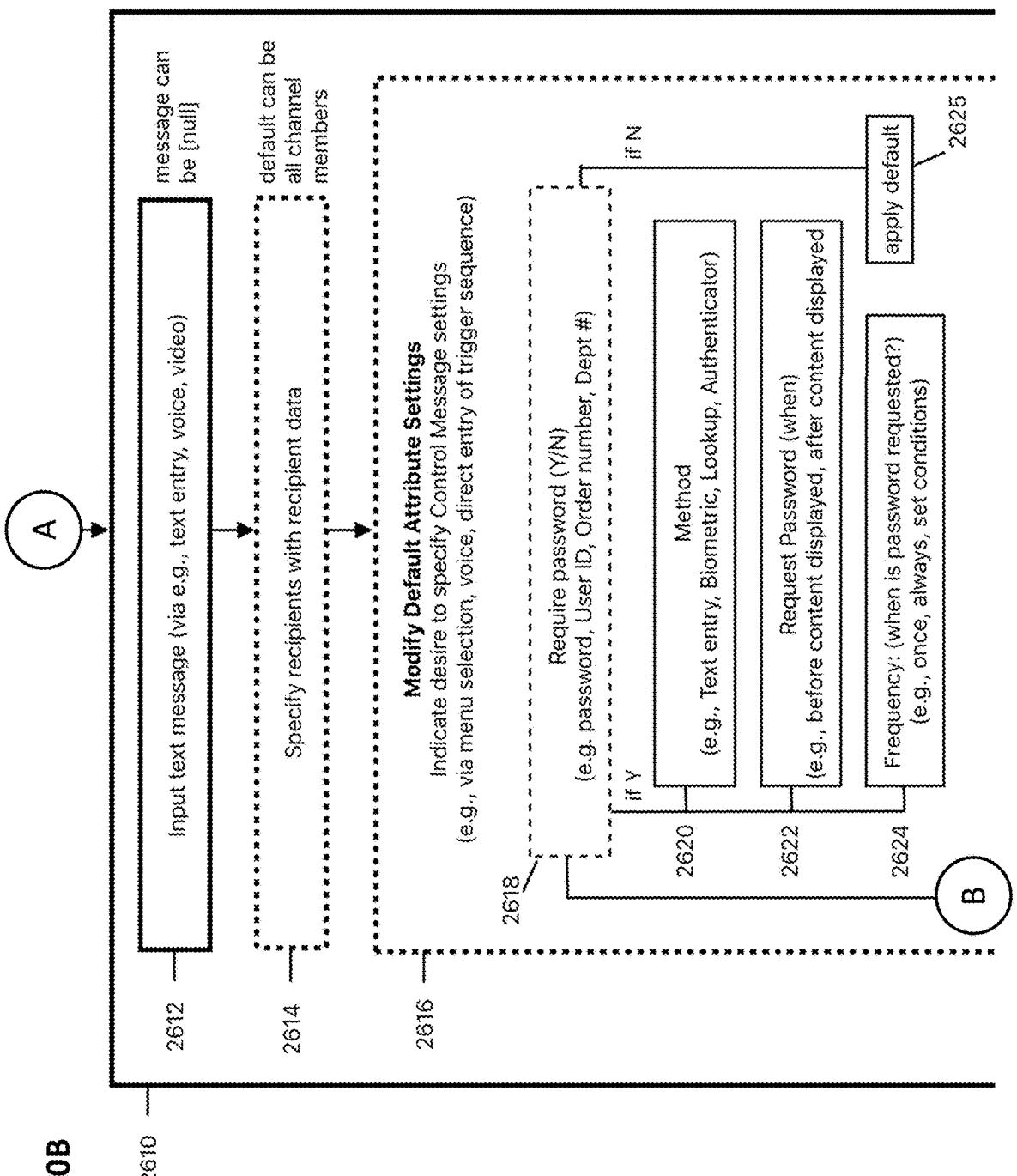
Figure 30C:
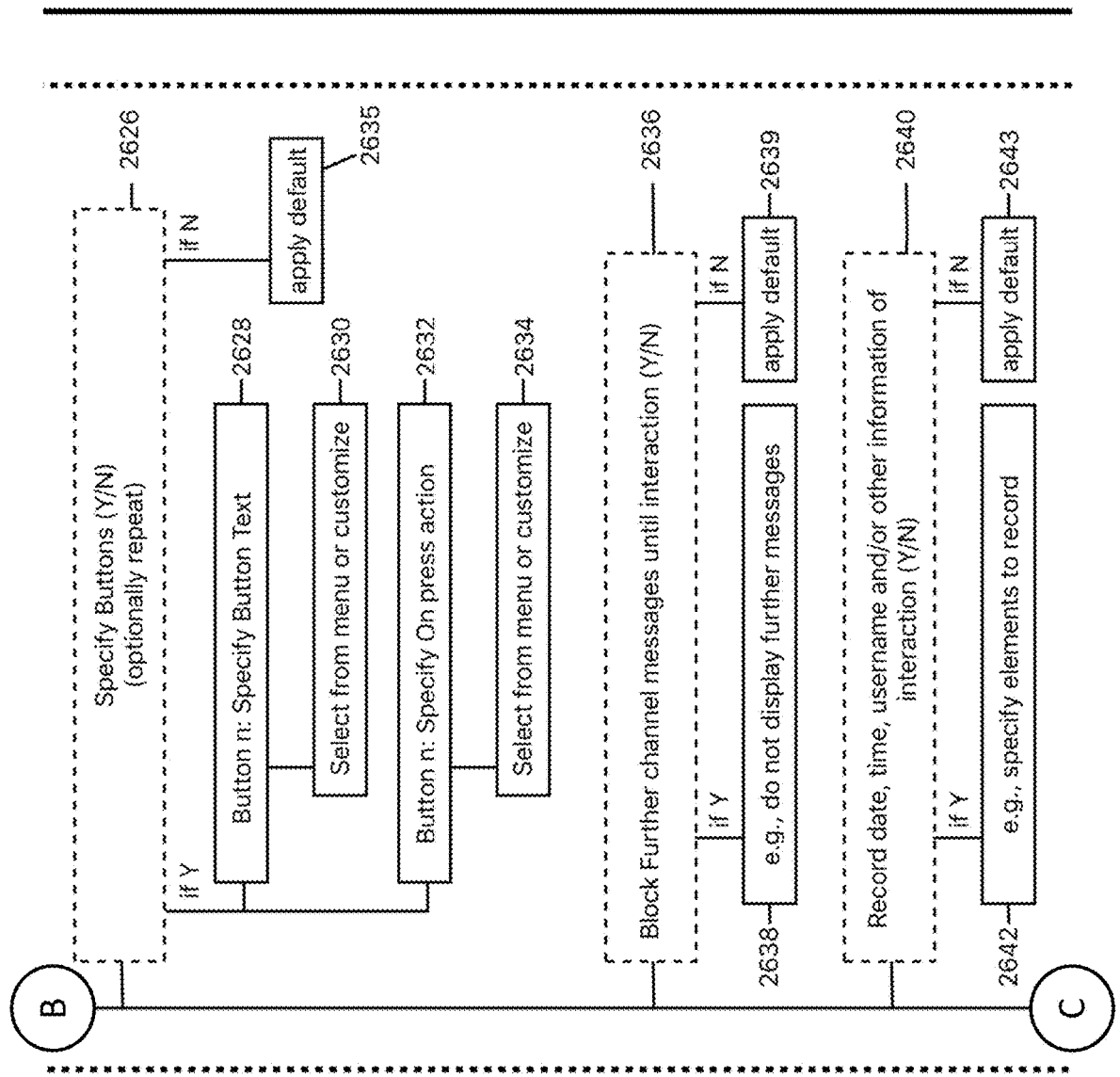
Figure 30D:
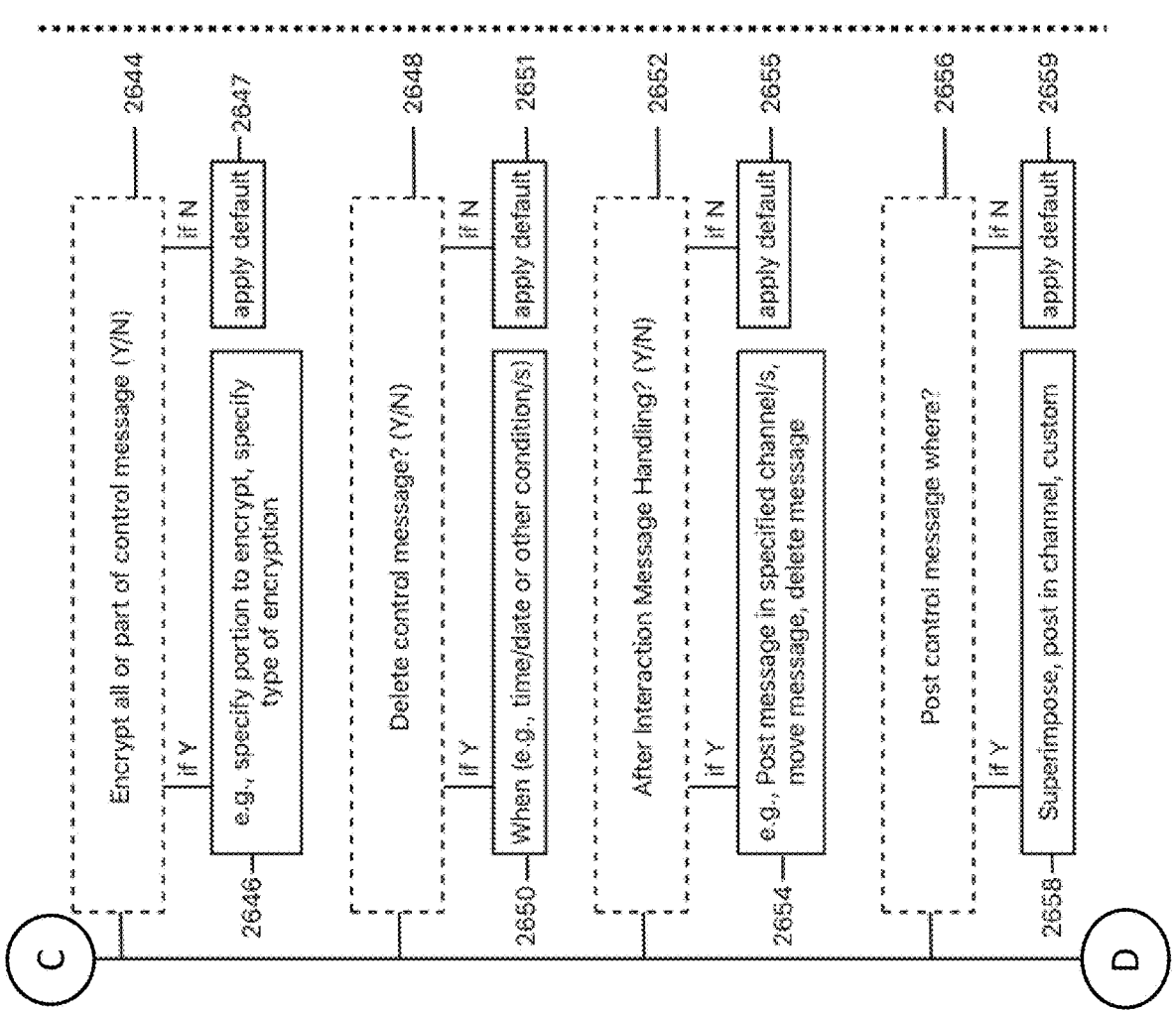
Figure 30E:
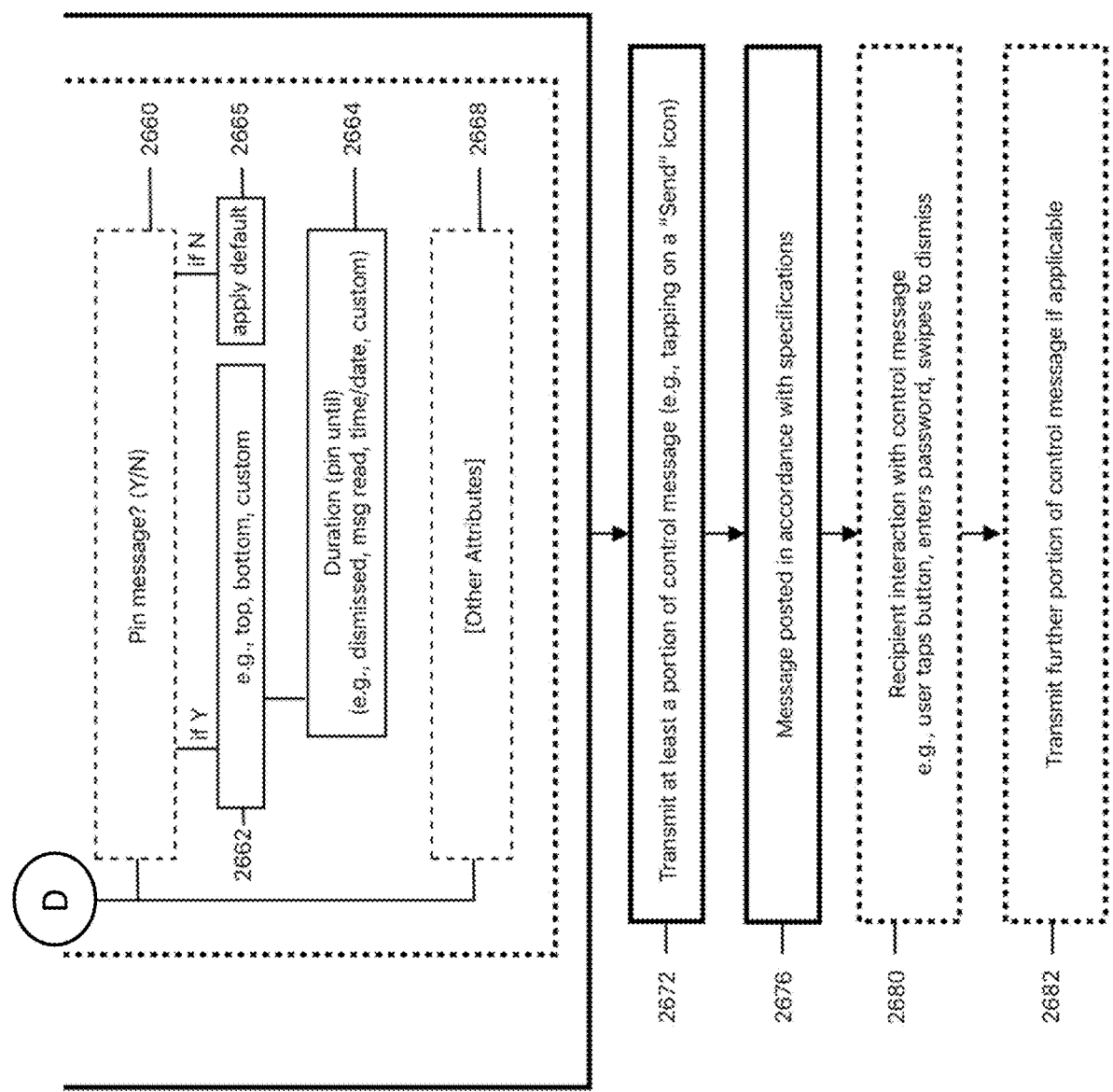
Figure 31A:
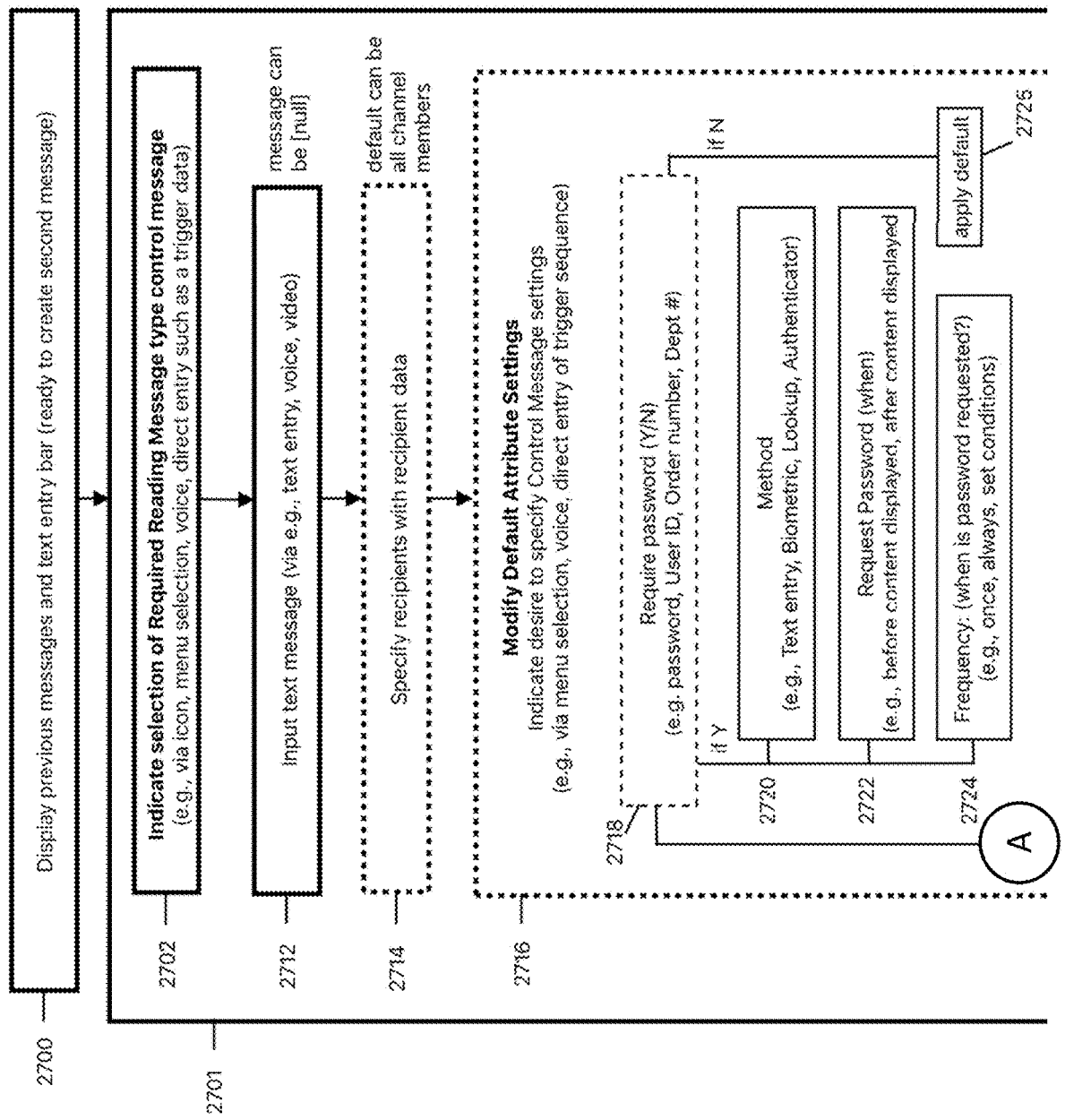
FIGS. 31A-31D is a flowchart diagram that illustrates exemplary use of Required Reading control messages in accordance with a further exemplary embodiment of the present invention.
Figure 31B:
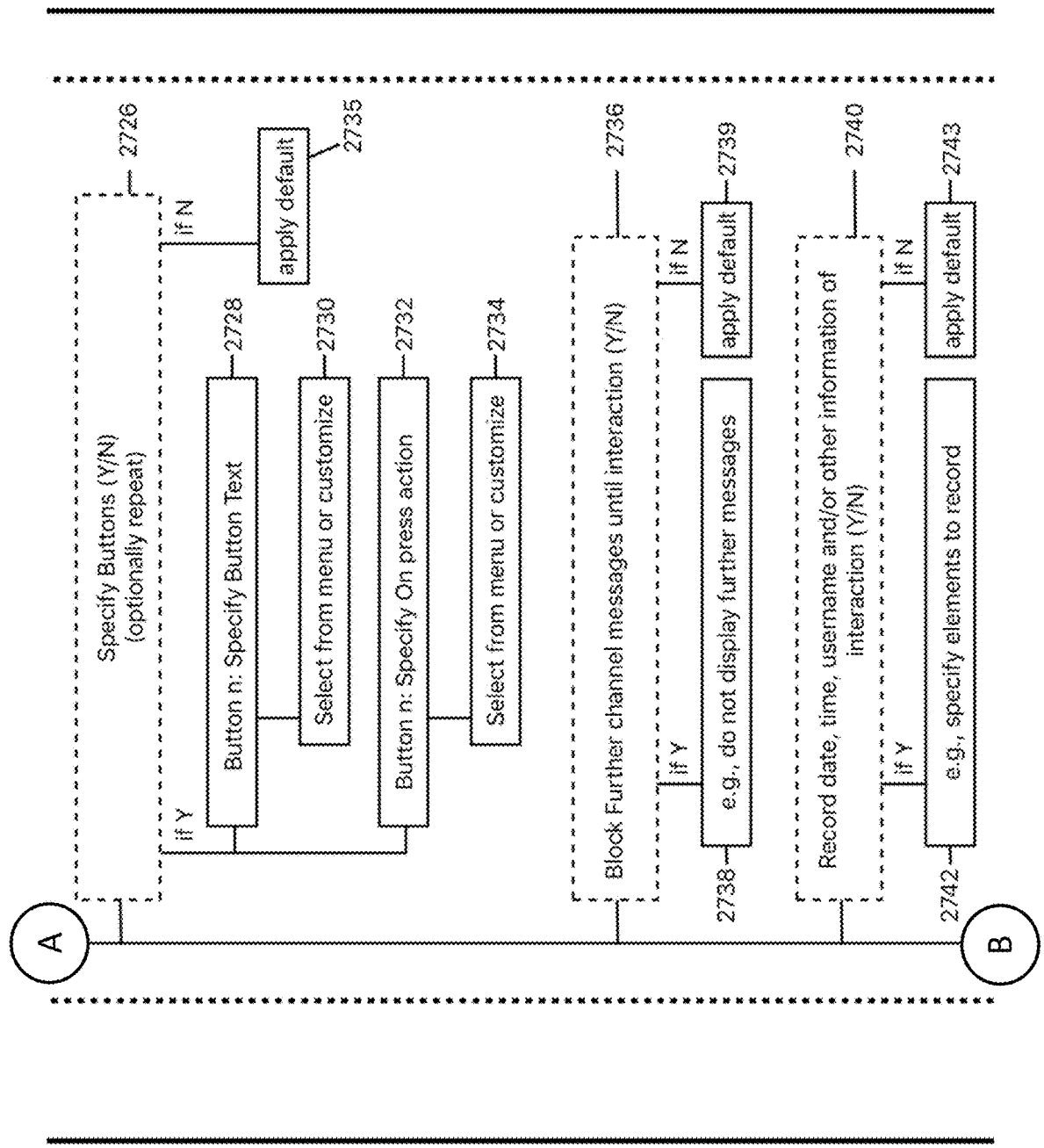
Figure 31C:
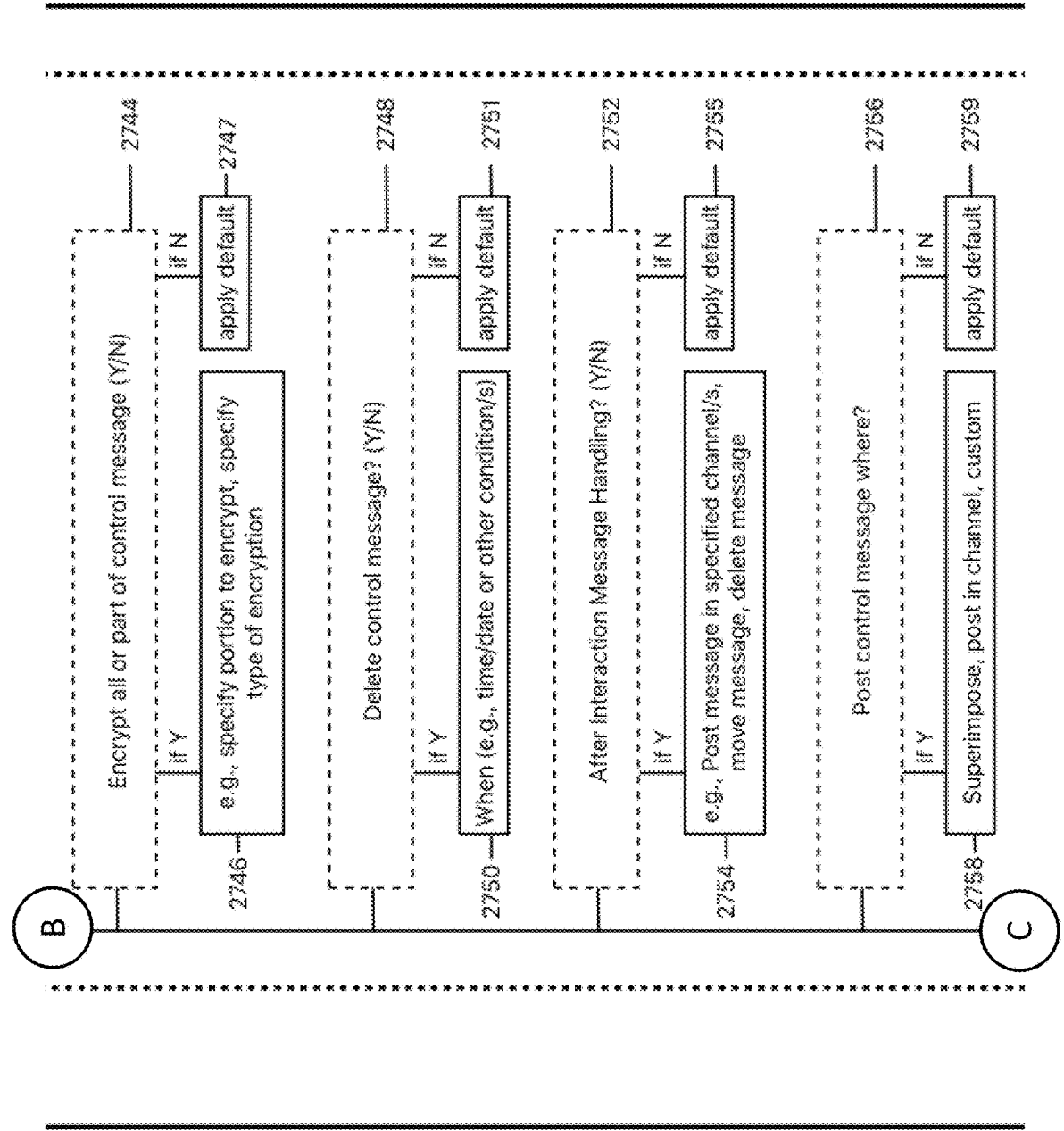
Figure 31D:
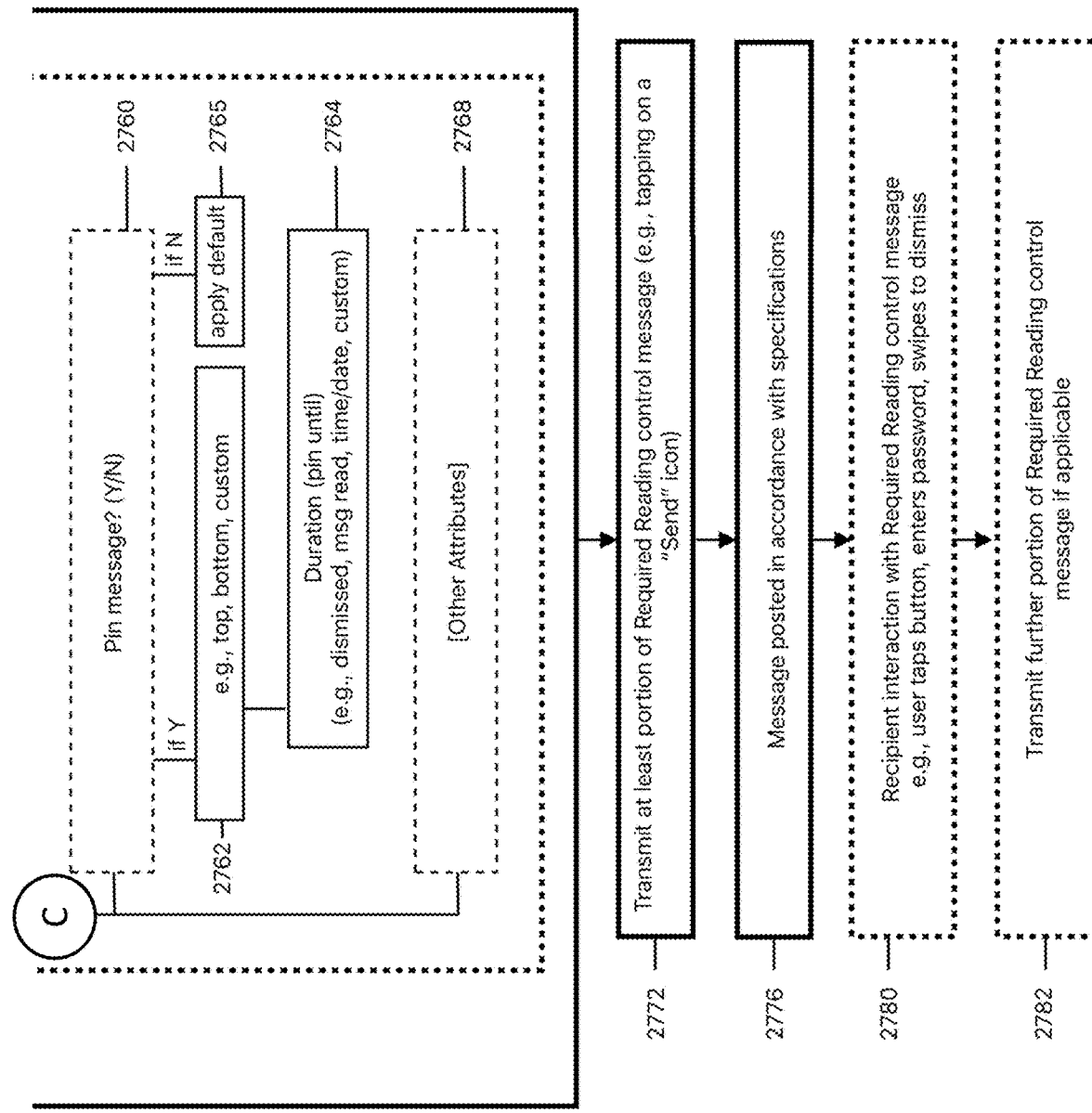
Figure 32A:
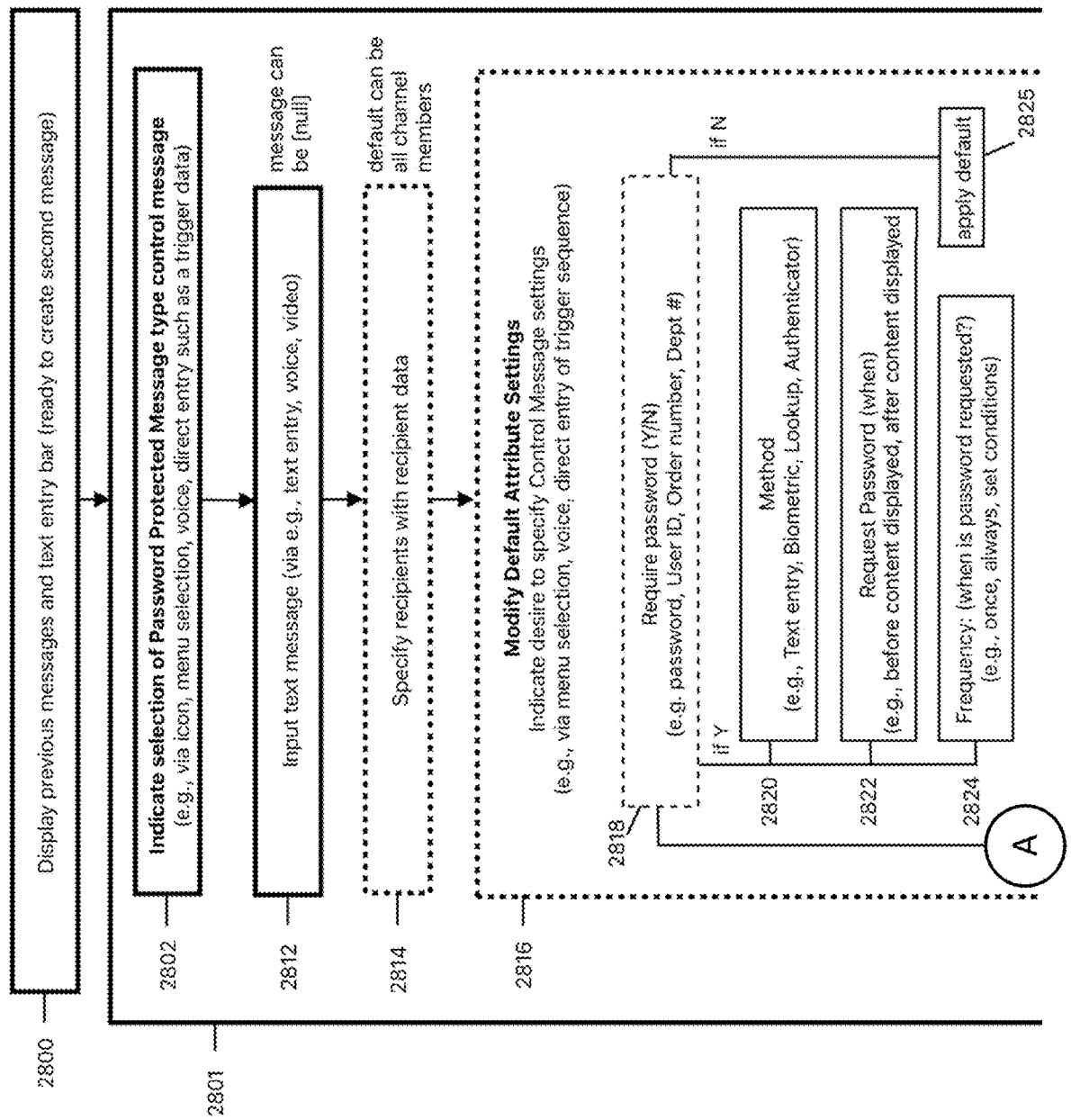
FIGS. 32A-32D is a flowchart diagram that illustrates exemplary use of Passcode Protected Message control messages in accordance with a further exemplary embodiment of the present invention.
Figure 32B:
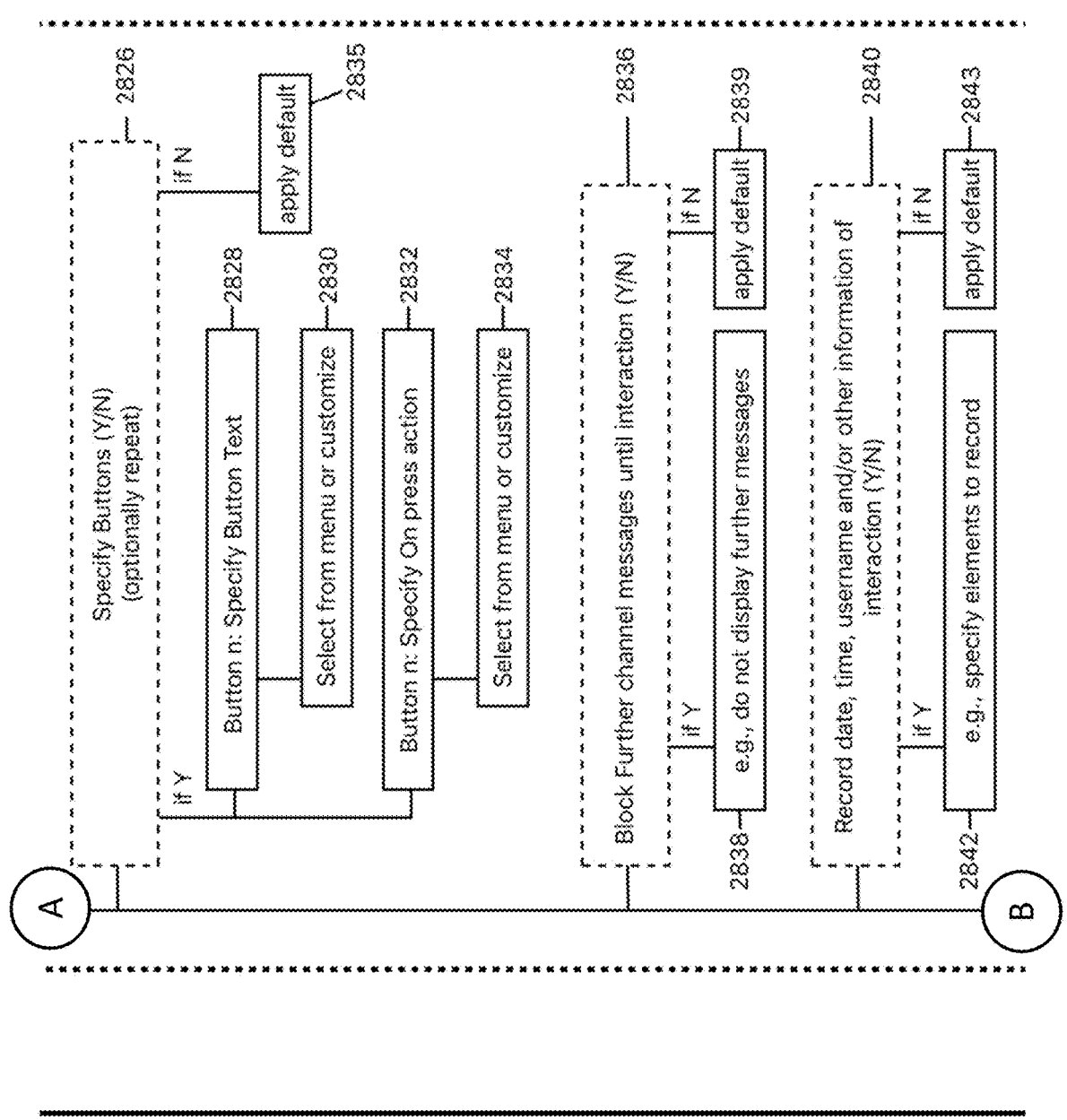
Figure 32C:
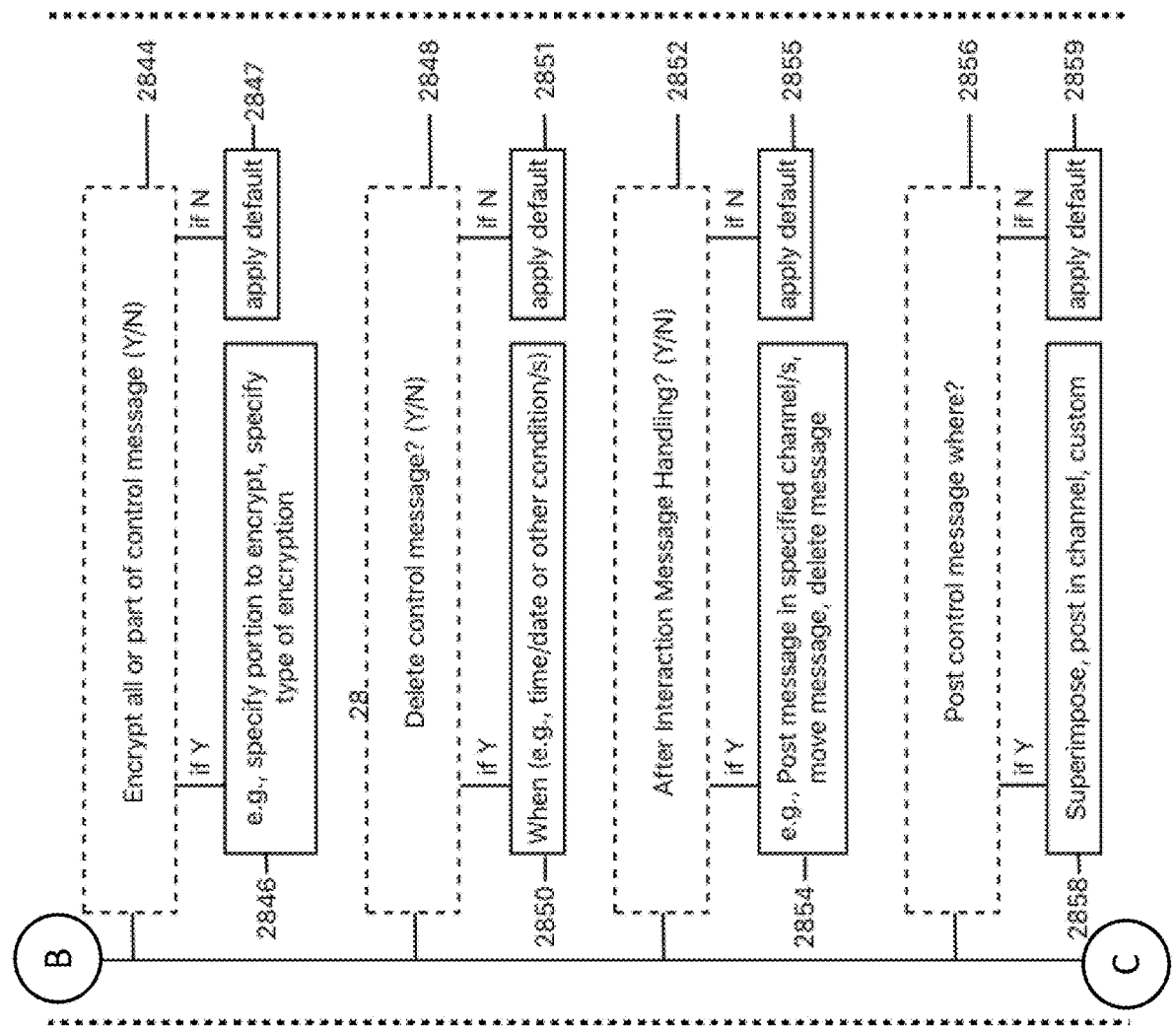
Figure 32D:
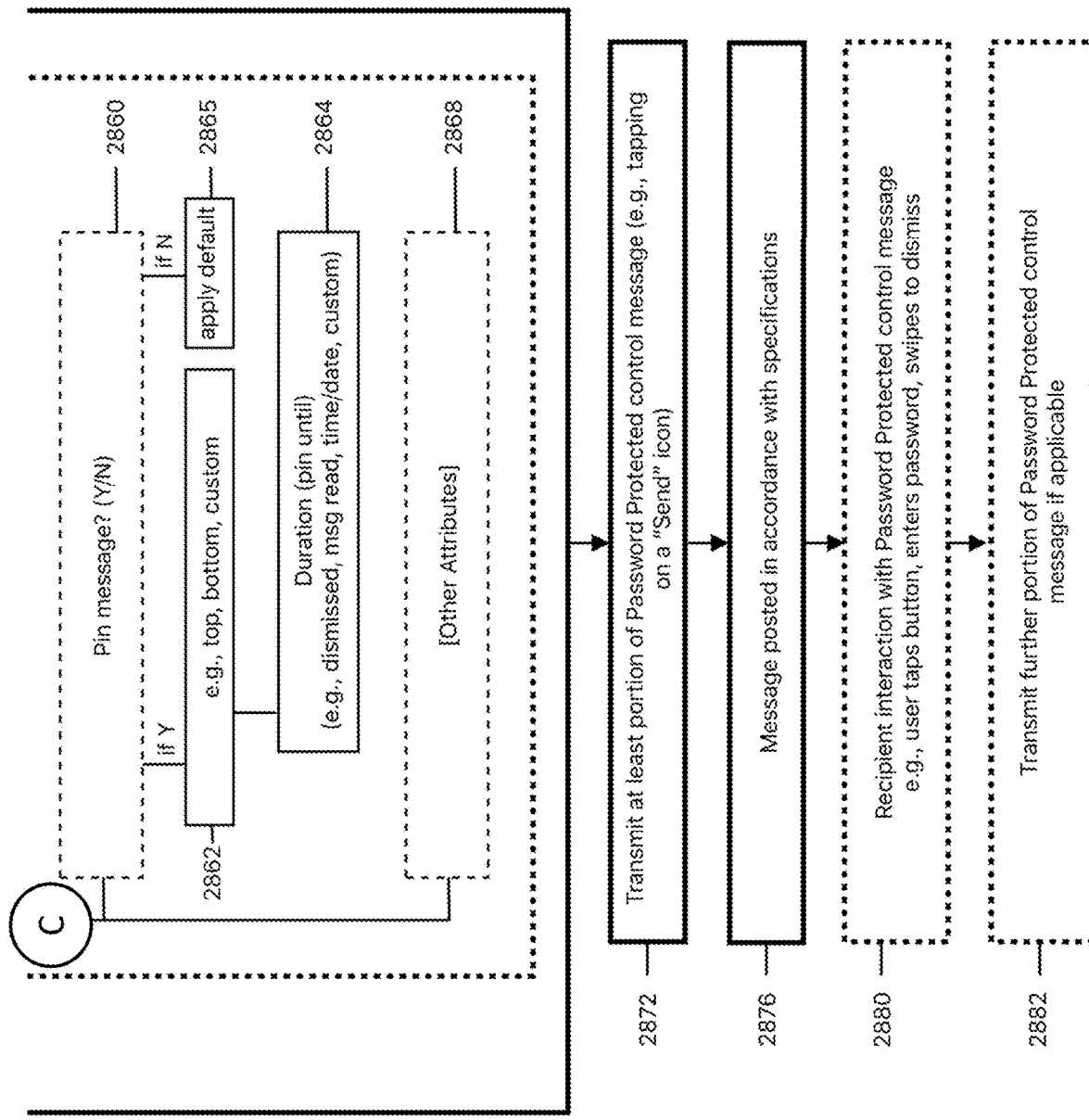

FIG. 30B includes step 2610 although it is noted that, except for step 2612, all steps shown within 2610 are optional. After the type of control message is selected, the optional steps shown in FIGS. 30B, 30C, 30D and 30E may be performed. At step 2612, a text message is input. As indicated, the text message may be input in various manners including text, voice, video etc. The message may also be null. In some embodiments, trigger data is entered by the sender to specify a control message type (step 2601), but recipient-identification data is not specified by the sender.

For example, a user may select a control message type from a menu but not specify recipient identification data (see step 2614 in which recipient identification data is specified). In some embodiments, when recipient-identification information is not specified by the sender, the default recipient identification data is all-channel-members. At step 2614, recipients are optionally specified with recipient data. In an optional step (not shown), one or more attachments may be added to a message. At step 2616, default attribute settings may be optionally modified. In an exemplary embodiment of the present invention, default attribute settings may be modified as illustrated by steps 2618 through 2668. These steps will be discussed separately below. These steps may be initiated through some sort of interaction with a user device (such as tapping on the "gear" icon identified as 3362 in FIG. 40). At step 2672, at least a portion of the control message is transmitted. In an exemplary embodiment, the control message is transmitted by tapping a "send" icon, although this is merely exemplary. At step 2676, the message is posted in accordance with specifications. At optional step 2680, the recipient has interaction with the control message. For example, the recipient/user may tap a button, enter password, swipe, etc. In some exemplary embodiments, user interaction may not occur and further steps may be taken, for example, as a result of the timeout, or an external event occurring without action on the part of the user (e.g. a certain day or time is reached). At optional step 2682, a further portion of the control message is transmitted if applicable. For example, at step 2682, a part of the control message that was not transmitted at step 2672 is now transmitted.

Optional step 2616 may include a plurality of steps which may or may not occur depending upon exemplary embodiments. For example, at step 2618, a password (or password type of input) attribute may be specified to be required. At step 2620, the password may be required by text entry, biometric, lookup, authenticator, etc. At step 2622, a password may be requested, for example before or after content is displayed. At step 2624, a password is requested with some type of frequency, once, always, etc. If a password is not required, then a default may be applied at step 2625. Processing proceeds by off page connector B. At optional step 2626, a form of entry may be specified, for example. At step 2628, button text may be specified. At step 2630, selection from a menu may occur or there may be another type of customized user interface. At step 2632, buttons may be specified with a reaction to a pressing action. At step 2634, selection may be offered from a menu or through other customized means. At step 2636, the optional feature is provided of whether or not further channel messages are blocked until interaction. If there is blocking then at step 2638 further messages are not displayed. Otherwise, step 2639, the default is applied. At step 2640, optional options are provided to record data. In other words, in some embodiments, information associated with recipient interaction with a control message is recorded, e.g., username, date, time, message and action/s taken by recipient. In some embodiments information associated with recipient interaction with a control message is not recorded. At step 2642, the elements to be recorded are specified. At step 2643, a default is applied. At step 2644, the optional option is given to encrypt all or part of the control message. At step 2646, for example, the ability is provided to specify the portion of the message to encrypt, specify the type of encryption, etc. Otherwise, at step 2647, a default is applied. At step 2648, the optional option is provided to delete the control message. At step 2650, an option exists to specify when or under what conditions the control messages are to be deleted. Otherwise, at step 2651 the default is applied. At step 2652, the optional option is provided to specify the type of interaction that occurs after message handling. At step 2654, options are provided such as post message in specified channel(s), move the message, delete the message, etc. At step 2656, the optional option is provided to specify where the control messages to be posted. At step 2658 options may be provided, for example to superimpose the message, post the message in the channel, or provide other customized display. Otherwise, at step 2659 a default is applied. At step 2660, the optional option is provided to pin a message. At step 2662, a further ability may be provided to pin the message to the top, bottom, or customize location. Otherwise, at step 2665, a default is applied. At step 2664, a duration is applied for pinning a message such as until after the message is dismissed, until after the messages read, a specific time or date, customized information, etc. At step 2668, other attributes may be specified. It is emphasized that all of the above features are merely exemplary in order to convey that many possible attribute specification options may be provided and/or may be available.

In a further exemplary embodiment of the present invention, steps are performed with some or all of the features set forth in FIG. 31. FIGS. 31A-31D are flowchart diagrams that illustrates exemplary use of Required Reading control messages in accordance with a further exemplary embodiment of the present invention. FIG. 31 is an index figure that shows the relationship between FIGS. 31A-31D.

At step 2700, previous messages may be displayed. Some type of indication may also be displayed either to indicate that further message creation may occur. Processing then proceeds to step 2701 before the further message is sent. At step 2702, a user indicates selection of a required reading message type control message. Examples include via an icon, via menu selection, via voice, via direct entry such as trigger data, etc. At step 2712, a text message is input. The message may be input by various means, examples include text entry, voice, video, etc. Optional steps 2714, 2716, 2718, 2720, 2722, 2724, 2725, 2726, 2728, 2730, 2732, 2734, 2735, 2736, 2738, 2739, 2740, 2742, 2743, 2744, 2746, 2747, 2748, 2750, 2751, 2752, 2754, 2755, 2756, 2758, 2759, 2760, 2762, 2764, 2765, and 2768 while not necessarily identical to the corresponding steps set forth in FIG. 30, are analogous to the steps and in the interest of conciseness their description will not be repeated here. Furthermore, step 2716 may be initiated through some sort of interaction with a user device (such as tapping on the "gear" icon identified as 3362 in FIG. 40). At step 2772, at least a portion of the required reading control message is transmitted. The message may be transmitted via a variety of different means. At step 2776, the message is posted in accordance with specifications. At optional step 2780 recipient active interaction with the required reading control message may occur. This may occur via a user tapping a button, entering a password, sweating to dismiss etc. This step may be optional if an external event may occur in lieu of a recipient having active interaction with the control message. Examples of external events may include signaling from an external source, a certain time or date elapsing, etc. At optional step 2782, a further part of the control message is transmitted if applicable. For example, at step 2782, a part of the control message that was not transmitted at step 2772 is now transmitted.

Exemplary features related to required reading messages are illustrated in FIGS. 33-37 and FIGS. 40-47B and are further described below.

FIG. 32 relates to password-protected messages as opposed to required reading messages. FIGS. 32A-32D are flowchart diagrams that illustrates exemplary use of Passcode Protected Message control messages in accordance with a further exemplary embodiment of the present invention. FIG. 32 is an index figure that shows the relative relationship of FIGS. 32A-32D.

At step 2800, previous messages are displayed and a user interface for entering text (such as a text entry bar) may be displayed. An optional indication may be provided that a user device is ready to create a second message. Processing then proceeds to step 2801. At step 2802, selection of a password-protected message type control message is indicated. As in the previously described exemplary embodiments, this type of control message may be selected by various means such as icon, menu selection, voice, etc. At step 2812, a text message is input via various means. Optional steps 2814 through 2868 while not necessarily identical to the corresponding steps set forth in FIG. 31, are analogous to those steps, and in the interest of conciseness their description will not be repeated here. These optional steps may be initiated through some sort of interaction with a user device (such as tapping on the "gear" icon identified as 3362 in FIG. 40). Steps 2872, 2876, 2880 and 2882 are analogous to step 2772, 2776, 2780 and 2782 previously described.

Exemplary features related to password-protected messages are illustrated in FIGS. 48-53 and FIGS. 54-61 and are further described below.

FIGS. 33-37 show an embodiment of "Required Reading" control type messages. In many group messaging environments, messages with varying degrees of importance and urgency are intermixed, i.e., trivial messages are intermixed with important and time sensitive messages. Group messaging environments are often cluttered and fast paced. Messages can seem to fly by and off the screen, and sometimes age off the page unread. Therefore, sending messages requiring attention, timely reply, and/or affirmative confirmation of acceptance, for example, can be difficult to do with confidence. Required Reading control type messages provide a mechanism by which senders can elevate the importance of a message, and in some embodiments, assure attention to or action with respect to the message. Required Reading control type messages impose restrictions on the recipient's use of or access to the group messaging environment and/or on recipient's use of or access to one or more messaging channels and/or on recipient's use of or access to all or part of one or more messages, unless and until there is a qualified interaction by recipient with or related to the Required Reading message (e.g., tapping on an "OK" button associated with the Required Reading message")

Figure 33:

FIG. 33 shows an embodiment of a messaging system from the point of view of Rachel (first group user). Rachel is viewing a group channel (messaging channel) named "HR" (3210), which channel has 47 members. In this embodiment Rachel wants to send a Required Reading control type message and selects this message type by tapping on the "Required Reading" icon (3212).

Figure 34:
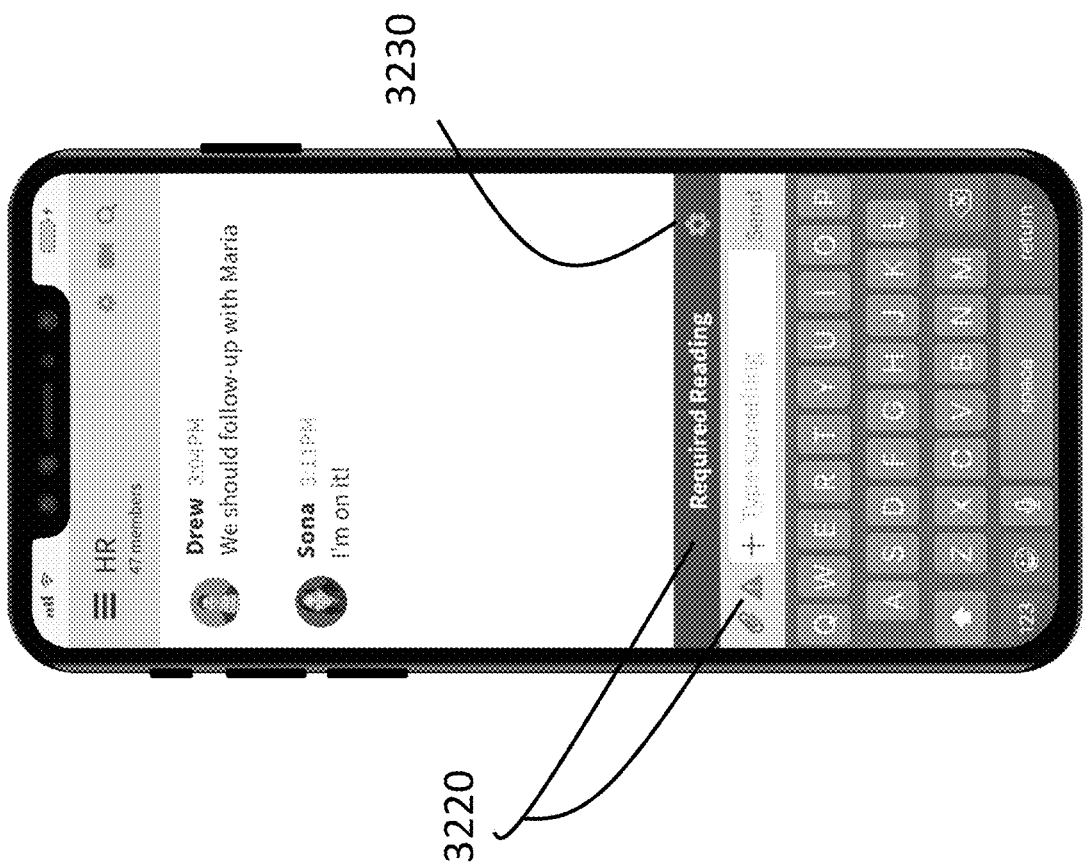

FIG. 34 shows an embodiment of a messaging system from the point of view of Rachel (first group user). This embodiment shows a screen caused to be displayed as a result of Rachel's tapping on the Required Reading icon shown in FIG. 33 #3212. In this figure, indication is provided to reinforce to Rachel that the message she is preparing is a Required Reading type message (3220). In some embodiments no indication or some other indication is provided.

In this embodiment, Required Reading type messages have system default attributes assigned. For example, in this embodiment, i) Required Reading messages will be sent to everyone in the channel (including to the sender); ii) Required Reading messages will be displayed superimposed on top of an obscured view of the underlying channel; iii) though obscured, messages posted to the underlying channel will continue to be posted to the channel and displayed readably or un-readably; iv) access to the underlying channel will be restricted until the recipient interacts with the Required Reading message by tapping on a button labeled "OK"; v) once interacted with, the required Reading message will be posted in the group channel in a visually distinguishable way (e.g., visually different from regular messages) and; v) the Required Reading message will be posted in the chronological order in which the sender posted it (date/time). In this embodiment, Rachel may elect to specify customized control message attributes.

In this embodiment, tapping on the "settings" icon (3230) will cause a "Required Reading" attribute settings menu to be displayed.

In some embodiments the sender of the Required Reading message is exempt from one or more of the restrictions and/or requirements imposed on other recipients (in other words, Rachel may not have to interact with her own sent message and access to her own message stream may not be restricted). In some embodiments the sender is not also a recipient of her own Required Reading message. In some embodiments, the sender receives a different version of the Required Reading message than other recipients. In some embodiments each recipient receives a different version of the Required Reading message.

In some embodiments, interaction with the Required Reading message will cause more, less, further, different, derived, calculated, looked-up, and/or customized content to be displayed. In some embodiments, the recipient's interaction with the Required Reading message will influence the content of the message.

Figure 35:
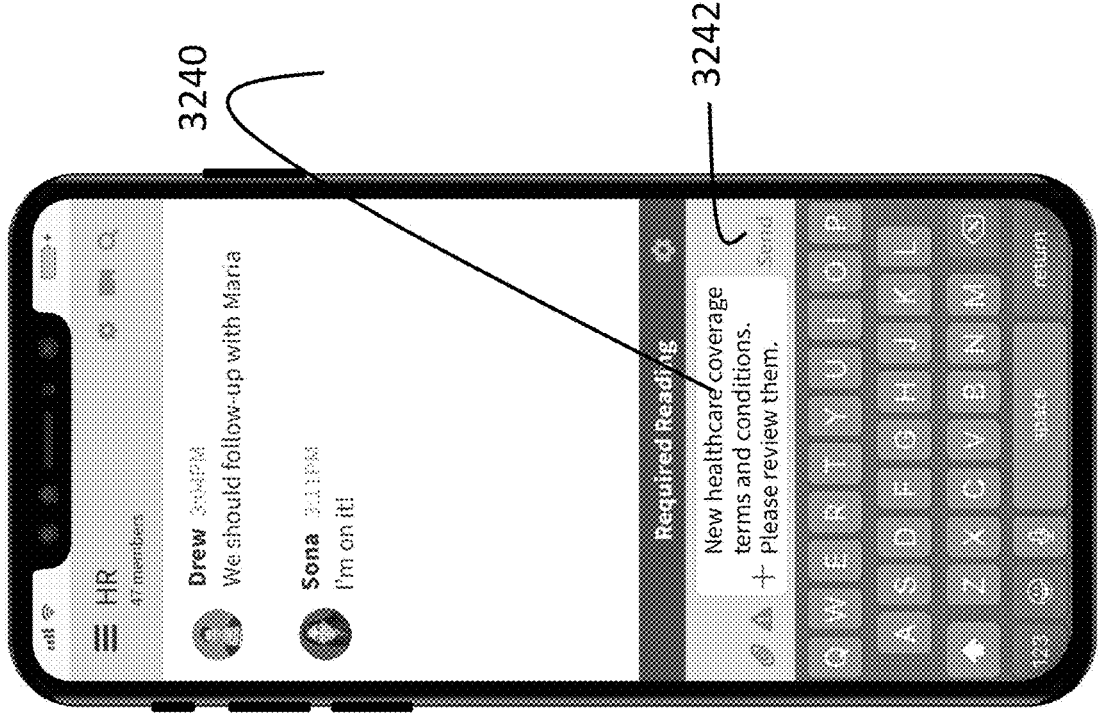

FIG. 35 shows an embodiment of a messaging system from the point of view of Rachel (first group user). In this embodiment the user (Rachel in this example), enters a text message "New healthcare coverage terms and conditions. Please review them." into a text entry area (3240). In this embodiment, Rachel's message will be sent to everyone in the HR channel. In some embodiments, Rachel could identify specific channel members to receive her message privately (in the group channel, another group channel or in DM channel/s). Once satisfied with her message, Rachel taps on "Send" (3242) to cause the system to send her message.

Figure 36:
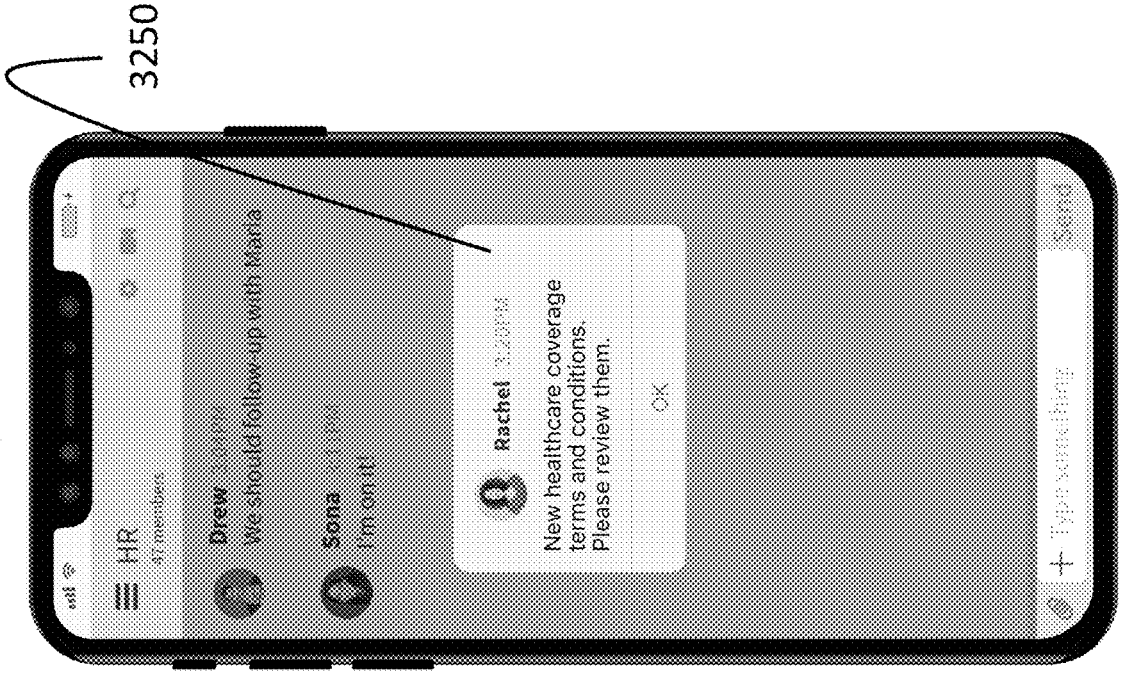

FIG. 36 shows an embodiment of a messaging system from the point of view of a recipient of Rachel's Required Reading message (Sona is the message recipient in this example). In this embodiment the Required Reading message is posted in accordance with default Required Reading attribute settings. In this embodiment among the default attribute settings is a default to superimpose the required reading message on top of the partially obscured channel message stream. In this embodiment further messages are posted to the stream but obscured until an interaction with the Required Reading message occurs. In this embodiment, once the recipient interacts with the Required Reading message by tapping "OK", the Required Reading Message is posted to the associated channel in chronological order, FIG. 37 shows an embodiment of a messaging system from the point of view of a recipient of Rachel's Required Reading message (Sona is the message recipient in this example). In this embodiment Sona has had a qualified interaction with the Required Reading message by having tapped on the "OK" button, which caused the restrictions imposed by the Required Reading control message to be removed and the message posted to Sona's message stream.

FIGS. 38-47B show various embodiments of "Required Reading" control type messages.

Figure 39:
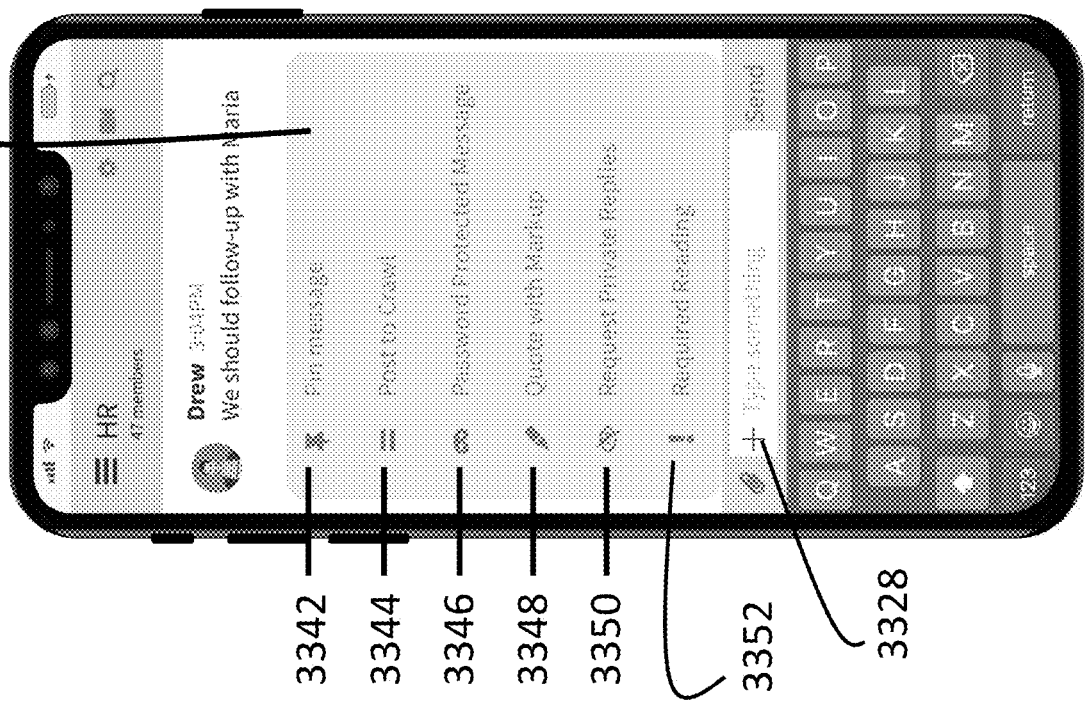
FIGS. 38-47B are screenshots of one or more exemplary embodiments of the present invention.
Figure 38:
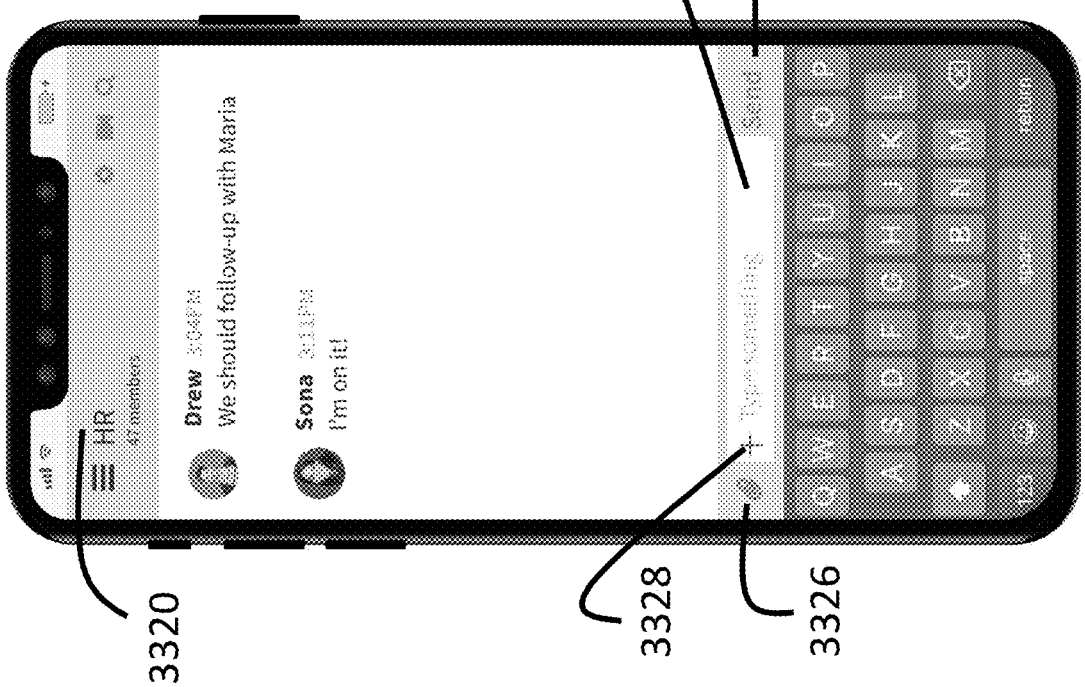

FIG. 38 shows an embodiment of a messaging system from the point of view of Rachel (first group user). Rachel is viewing a group channel (messaging channel) named "HR" (3320), which channel has 47 members. In this embodiment, Rachel enters the text of a message she wishes to send to the group in the text entry bar (3330). In some embodiments, Rachel could specify specific group channel members to receive her message (thereby excluding other channel members). In some embodiments, Rachel could specify recipients in other channels to receive her message. In this embodiment, by tapping on the paperclip icon (3326), Rachel can optionally add one or more attachments, such as image/s or a file/s to her message. In this embodiment, tapping on the "+" icon (3328) causes a text entry bar associated menu to be displayed (FIG. 39 #3340). The menu allows Rachel to, add "control" functionality to the message she is preparing to send. In this manner, the message can be constructed to, for example, enable (or possibly require) a private response, or for example, require that message recipients interact with Rachel's message prior to further messages being permitted to be seen by these recipients in the selected channel, or for example, require that these recipients verify their identity or enter a password prior to being permitted to view the contents of Rachel's message. In this embodiment, tapping on "Send" (3332) causes the transmission of Rachel's message to the channel.

FIG. 39 shows an embodiment of a messaging system from the point of view of Rachel. In this example, Rachel is preparing to send a control type message and access to the "control message type" selection menu is caused by Rachel tapping on an icon, which in this example is a "+" icon (3328) associated with the text entry area. In other embodiments, the ability to select or define a control access message type can be accomplished in other ways, for example by tapping on an icon, button, hypertext, selection from a menu, by voice or by using a device gesture such as swiping, double tapping, or long pressing on an area of the display screen, or by other means such as entering "trigger data" such as a text "trigger character" or "trigger sequence", whether visible or not, such as "/!/" into, for example, a text entry bar, which trigger data can be interpreted by the system as a command to make the message a control message of an associated type. For example, typing "/!/New healthcare coverage terms and conditions. Please Accept or Reject." followed by an instruction to transmit the message (e.g., pressing return or tapping on "Send") may result in a Required Reading control message being sent to the channel.

In some Required Reading embodiments there is no need to proactively specify recipient identification data, because the Required Reading messages may be intended for all channel members, and the trigger data can be used without need for deliberate user specification of recipient identification data, e.g., "/!/" (Required Reading control message to be sent to all channel members). So, for example, in this embodiment, recipient identification data is inferred to be "all" due to the absence of user specified recipient identification data. In some Required Reading embodiments trigger data and recipient identification data can be used to specify recipients and/or render messages private to recipients e.g., "/!jeff/" (Required Reading message to be sent privately to Jeff). In other words, the message recipient is not specified, but is inferred based on default, keywords, history, etc. In this example, Rachel has tapped on the "+" icon (FIG. 38 #3328) causing the display of a "control message type" selection menu (3340). There are many possible "control message" types. Control types are applied to messages by message senders to impose system, channel and/or message functionality restrictions, requirements and/or specifications on control type messages and/or otherwise effect the behavior and/or functionality of the system, channel and/or message. In this embodiment six control message types are presented and are selectable from the selection menu. In some embodiments only one type of control message can be specified and applied to a message. In some embodiments more than one control message type can be specified and applied independently or applied in combination to a message. In some embodiments selection of control message type or types do not involve a selection menu. In this embodiment, the control message types presented are:

1) (3342) Pin message. By selecting "Pin message", Rachel can cause the message she is preparing to be transmitted and "pinned" in the message channel of the message recipients. A pinned message may be "pinned" (i.e., positioned and/or presented in a static or relatively static area—whether visible or not) of a message channel or display screen such as the top or bottom of the channel or screen, or may be pinned in a relative position within a channel, for example, always the $3^{rd}$ message from the top. A pinned message is placed in its designated position and in some embodiments does not scroll when other channel messages scroll. The pinning of a message is often intended to ensure its persistent visibility until an action is taken, such as when a user clicks an area of the message to dismiss or unpin it, or until the user interacts with the message in some other specified way such as by entering a password or responding to the message, and/or until some other condition is met such as a specified period of time elapsing;

2) (3344) Post to Crawl. By selecting "Post to Crawl", Rachel can cause the message she is sending to be placed in the crawl of the message channel. In some embodiments the user can specify that the message be posted to the crawl that appears in more than one message channel and/or is visible when navigating to/between other screens. Posting of a message to a crawl is typically intended to ensure heightened visibility and/or exposure of a message and in some embodiments will remain in the crawl until an action is taken, such as when a user clicks an area of the message to dismiss it, and/or until a condition is met such as a specified period of time has elapsed;

3) (3346) Password Protected Message. By specifying "Password Protected Message", Rachel's message will require that recipients of the message enter a password or enter other means of verification (e.g., biometric) in order to view full or partial content of, and/or content associated with the message and/or in some embodiments, signify that the recipient has viewed the contents of the message. In some embodiments, none or some information and/or content related to the message such as a sender identifier, message subject, message date, time, and/or other content of, or associated with the message is presented to recipients of password protected type control messages prior to entry of a password. In some embodiments, full or partial content of or associated with the message is displayed, and the verification (e.g., password) provided by the recipient is used as a means to track, for example, access to, and/or receipt or acceptance of the password protected message. In some embodiments password protected messages are viewed in the message stream and in some embodiments password protected messages are viewed outside of the message stream, for example, superimposed on top of a channel view, which channel view may appear, for example, as faded, blurred or otherwise only partially visible and/or accessible. In some embodiments password protected messages may appear in another channel or in another application altogether. In some embodiments password protected messages disappear after being viewed once or after being viewed a specified or algorithmically determined number of times. In some embodiments password protected messages are encrypted or secured in a manner different from other channel or system messages. In some embodiments when access to a message is permitted, what occurs is that more of a message is displayed than prior to access being permitted. Alternatively or in addition, in some embodiments, when access to a message occurs, prior to access being allowed, data associated with the message (not the actual message content itself) is displayed. Data associated with the message may include non-content items such as sender, time sent or received, message size, etc.

4) (3348) Quote with Markup. By specifying Quote with Markup, Rachel's message will be sent in a manner that it can be edited by the recipients. In some embodiments recipients of a Quote with Markup message are able to interact with and modify the content of the Quote with Markup message. In some embodiments the content of the Quote with Markup message is modified and re-transmitted into the message stream by a recipient in a way that shows the recipient's modifications while at the same time retains the original sender's original content, for example, the original content may be displayed side by side or above or below the recipient's modified content. In some embodiments, the elements of content from the original that have been modified are so indicated, for example, crossed out and new content also indicated, for example, underlined, bolded or presented in a different font and/or color. In some embodiments the modification and the original are intertwined visually, in other embodiments the original and modified content are presented apart. In some embodiments the instance of the original Quote with Markup message is transmitted into the stream and that original message is itself substantially or wholly immutable with modified "quoted" copies of the recipient's original content appearing subsequently and in modified form in the message stream. In some embodiments the instance of the original Quote with Markup message is transmitted into the stream and that original message is itself mutable with modified versions of the original message being replaced and/or updated to reflect recipients' modifications (e.g., additions, deletions, changes);

5) (3350) Request Private Replies. Some questions, such as "What is your home address" may be most efficiently sent to everyone in a channel at once, but most comfortably and effectively responded to privately. By specifying the Request Private Replies control message type, Rachel's message will be posted in the channel in a form that encourages and provides a means by which the recipients can reply to her message privately. In some embodiments private replies are "siloed" and visible only to the sender and each respective respondent. In some embodiments private replies are "grouped" and visible to the sender and the group of respondents. In some embodiments, private replies are aggregated for the sender;

6) (3352) Required Reading. In a typical messaging system, messages can seem to fly by and can sometimes scroll off the screen or otherwise disappear from view unnoticed. While some messages are trivial and can be ignored or missed without consequence, other messages, in contrast are important and should not be missed. By specifying the Required Reading control message type, Rachel is able to create and transmit a message that requires an interaction by the recipient before it is, for example, dismissed or disappears from the screen. In some embodiments the Required Reading message appears in the message channel and prevents further messages from being displayed in a recipient's view of the channel until the recipient interacts with the Required Reading message, for example by, tapping on a button or using a biometric device to verify their identity. In some embodiments, the Required Reading message remains "locked" in a static or relatively static area of the recipient's display screen until the recipient interacts with the Required Reading message. In some embodiments Required Reading messages are viewed in the message stream and in some embodiments Required Reading messages are viewed outside of the message stream, for example, superimposed on top of a channel view, which channel view may appear, for example, as faded, blurred or otherwise only partially visible and/or accessible. In some embodiments Required Reading messages may appear in another channel or in another application altogether. In some embodiments Required Reading messages disappear after being viewed once or after being viewed a specified or algorithmically determined number of times. In some embodiments Required Reading messages are encrypted or secured in a manner different from other channel or system messages. In some embodiments, interaction with a Required Reading control type message may result in a subsequent message being posted to the channel, and/or an update to the original Required Reading message, based on the particular interaction or form of interaction, for example, in response to a Required Reading message that states "Please confirm your acceptance of our new policy.", clicking on the "OK" button may cause a further message to be posted or perhaps an update to the originally posted Required Reading message that says "12:34 PM, you accepted the new policy" but clicking on the "Reject" button may cause a different further message to be posted or perhaps an update to the originally posted Required Reading message that says "12:34 PM, you rejected the new policy". In some embodiments, before and/or after a restriction is removed, a text message (or portion thereof) is visible either within or outside of the messaging channel. If multiple messages with restrictions are received, restriction on one received message may be maintained until restriction(s) on another received text message are removed. In some embodiments, interactions are specified via various forms of input, such as menu, icon, direct entry (keyboard), voice, gesture, etc. In some embodiments, the recipient is not specified, but software infers who the recipient is (for example based on defaults, keywords, history, etc.). In some embodiments, partial content is available (for display, for example) prior to removal of a restriction, and additional content is available after removal of a restriction.

FIGS. 40-47B illustrate one or more example embodiments of the "Required Reading" feature(s).

Figure 40:

FIG. 40 shows an embodiment of a messaging system from the point of view of Rachel (first group user or first user). Rachel is viewing a group channel (messaging channel) named "HR" which channel has 47 members on a first device. In this embodiment, Rachel specified her desire to create a message of the control type "Required Reading" (FIG. 39 #3352) which selection caused the display of this screen (FIG. 40). In this embodiment an indication of the selected control type is indicated (3360). There are many other ways that an indication of the selected message control type could be provided, some indications conveyed immediately, some delayed, some persistent, some ephemeral. In some embodiments no indication of the selected message control type is provided.

In this embodiment, a settings icon (3362) is displayed. In this embodiment, tapping on this icon will cause a further "Required Reading" attribution settings menu to be displayed.

Figure 41A:
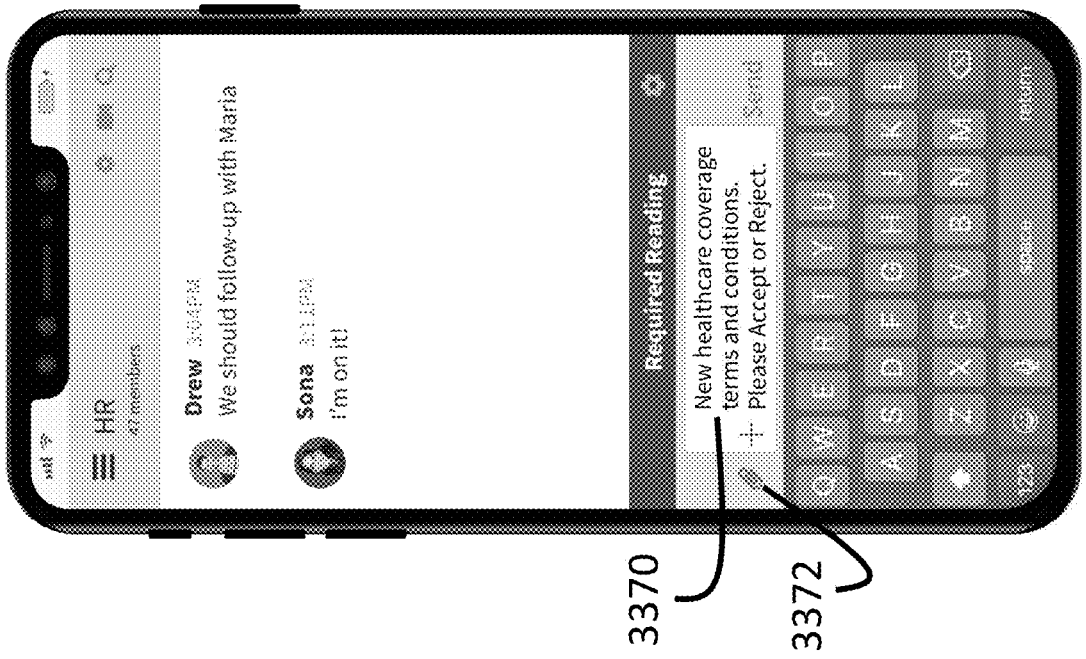

FIG. 41A shows an embodiment of a messaging system from the point of view of Rachel (first group user). In this embodiment, Rachel has crafted a message (first text message) that reads, "New healthcare coverage terms and conditions. Please accept or Reject." (3370). In this embodiment, Rachel taps on the paperclip icon (3372) to indicate her intent to add an attachment to her message. In this embodiment, once she taps on the paperclip icon, she is able to select and add, one or more file or image from her device or from a cloud server to include with her message.

Figure 41B:
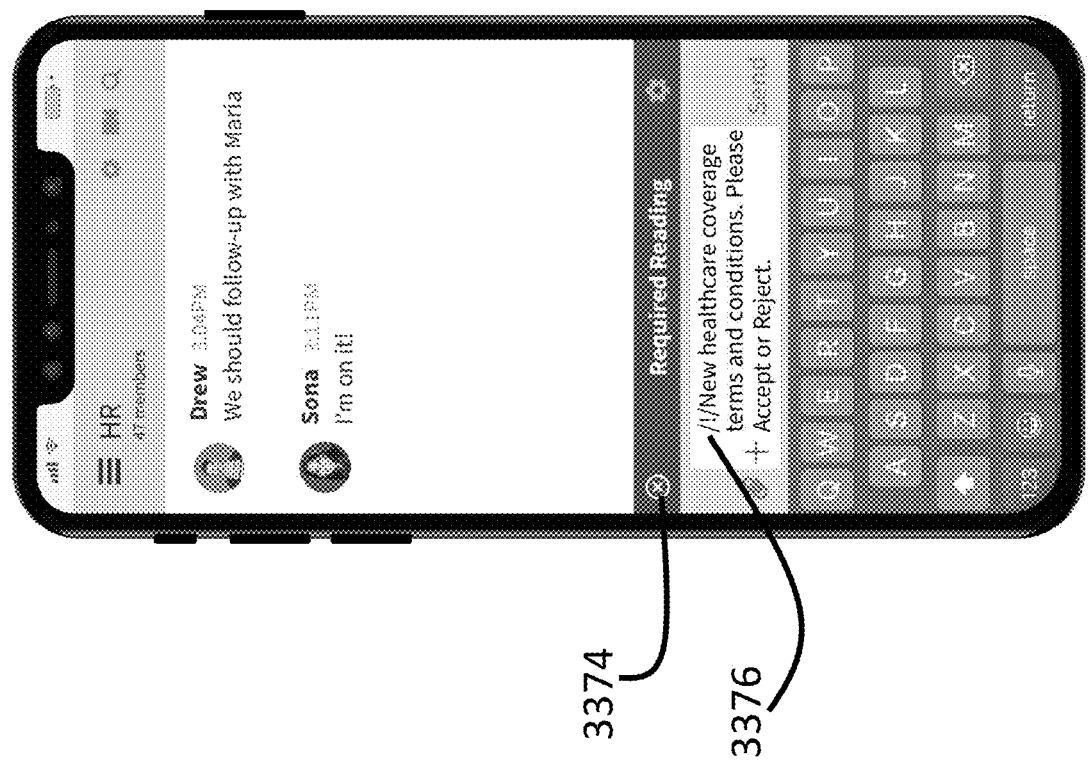

FIG. 41B shows an embodiment of a messaging system from the point of view of Rachel (first group user). This embodiment shows an alternative approach to specifying that the message being crafted is intended to be a "Required Reading" control type message. In this embodiment, the specification of the message control type is accomplished by entering text "trigger data" (e.g., one or more characters or objects (visible or not) in a system recognizable pattern and/or context) such as "/!/" directly into, for example, a text entry bar, which trigger data can be interpreted by the system as a command to make the message a control message of an associated type. In this example typing "/!/ New healthcare coverage terms and conditions. Please Accept or Reject." (3376) indicates to the system the message is intended to be a Required Reading control type message. In some embodiments the control type is determined as the user types or enters the message and as the system recognizes the trigger data. In some embodiments the system recognizes the control type upon or after transmission of the message. In some embodiments the system asks the user for confirmation, that the user desires to specify a message as a control type of message prior to making and/or treating the message as a control type of message. In this embodiment a cancel icon (3374) is displayed offering the user the option to dismiss the system's treatment of the message as a Required Reading type control message. In this embodiment, the absence of user specified recipient identification data causes the system to infer that the recipient identification data is "all". In other words the Required Reading message will be sent to everyone in the channel.

Figure 41D:
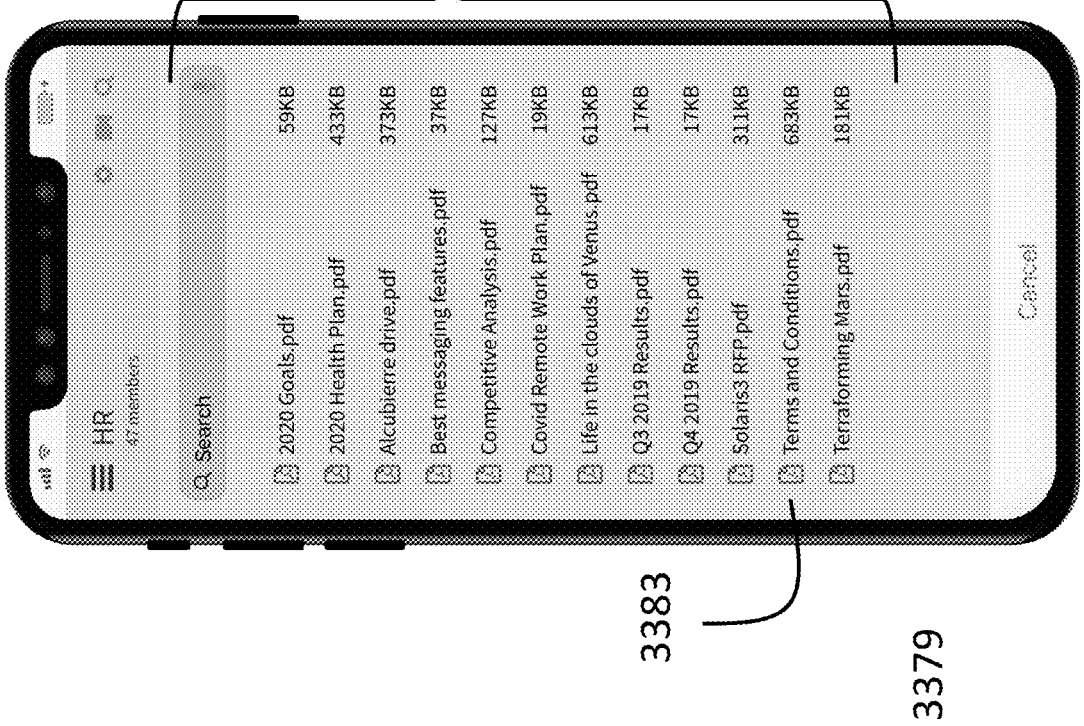
Figure 41C:
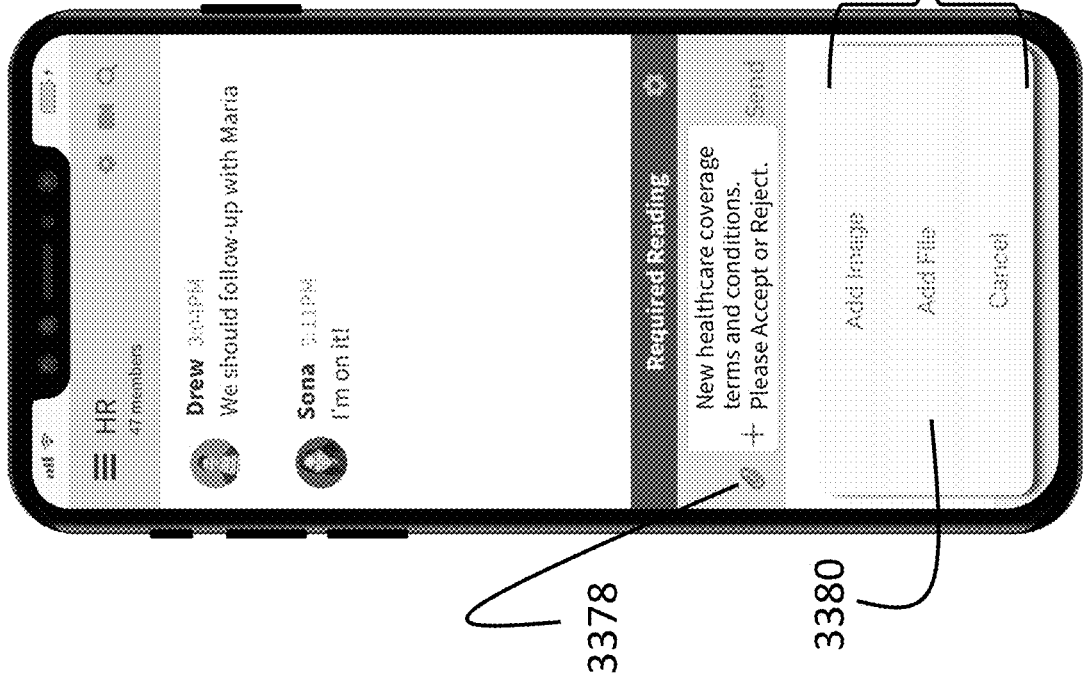

FIG. 41C shows an embodiment of a messaging system from the point of view of Rachel (first group user). In this embodiment Rachel elects to add an attachment to the message she is preparing. In this embodiment she indicates her desire to add an attachment by tapping on the paperclip icon (3378). In this embodiment tapping on the paperclip (attachment) icon causes a menu to be displayed (3379). In this example Rachel taps on "Add File" (3380) which causes the file selection directory to be displayed (FIG. 41D).

FIG. 41D shows an embodiment of a messaging system from the point of view of Rachel (first group user). In this embodiment Rachel has elected to add an attachment to the message she is preparing. In this FIG. 41D Rachel is presented with a scrollable list of files (3381) from which she can choose the file she wishes to attach. In this example Rachel selects the file named "Terms and Conditions.pdf" by tapping on it (3383).

Figure 42B:
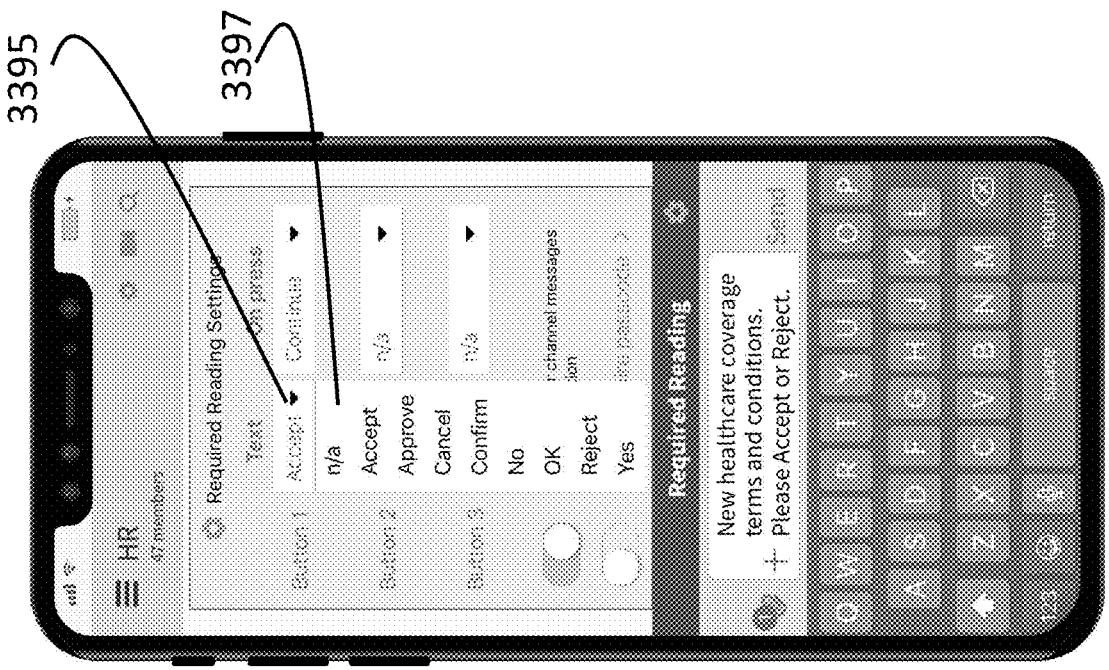
Figure 42A:
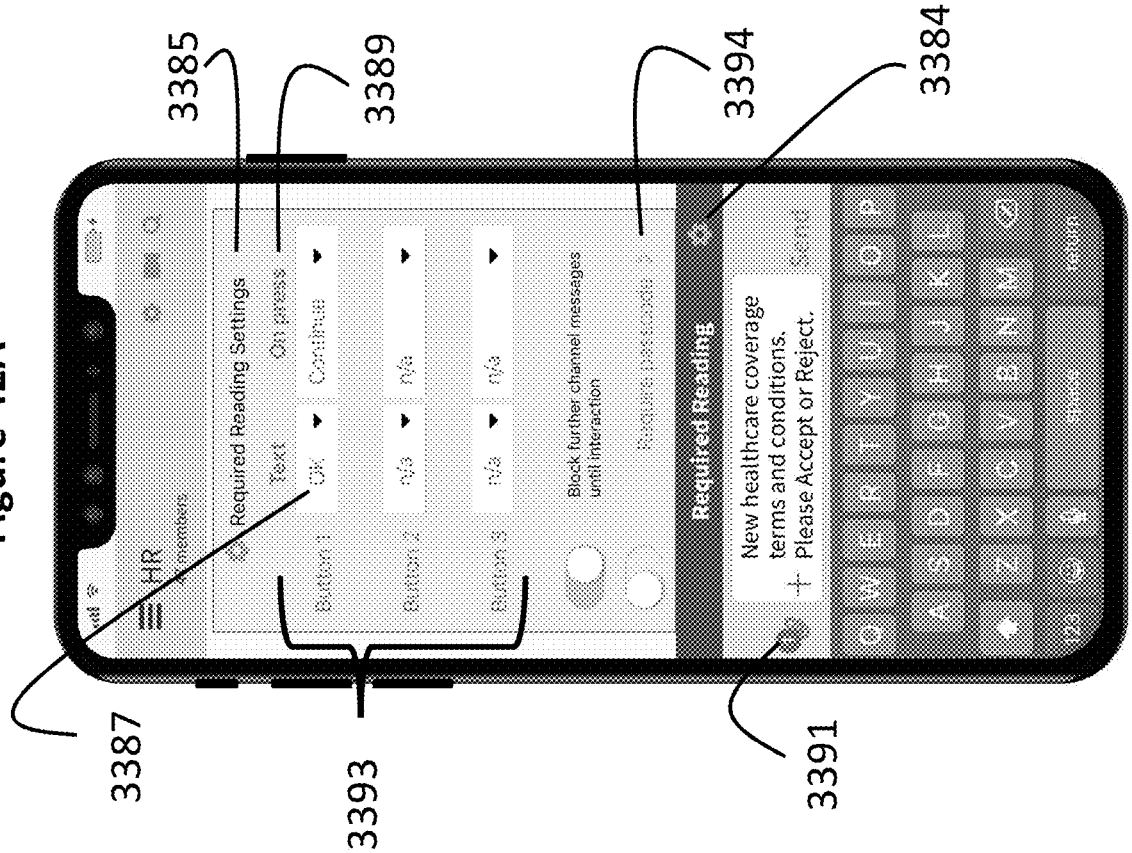

FIG. 42A shows an embodiment of a messaging system from the point of view of Rachel (first group user). In this embodiment an indication that a file has been selected and will be attached to the Required Reading message is provided (3391). In some embodiments no indication is provided. In some embodiments other and/or additional forms of indication are provided.

In some embodiments, the system applies default attributes to certain control type messages. For example, in some embodiments, the default attributes of a "Required Reading" control message are that the message is placed in the channel message stream and that no other messages posted subsequent to the Required Reading message are shown in the channel until the message recipient clicks on a button that says "OK". In some embodiments, the user is given the opportunity to set, determine and/or override the default attributes associated with a particular one or more control message types. In this embodiment, the user is able to access a control message attribute settings menu (3385) by tapping on the settings icon (3384). In this example, the settings menu for the Required Reading control type allows the user to enable or disable and customize various control type specific attributes. For example, in this embodiment, the user is able to select or customize the text that will be displayed on up to three buttons (3393) that will be included with the Required Reading message, once posted. In this embodiment, the user is also permitted to optionally specify "On press" actions (3389) to occur in response to a respective message recipient's pressing of one or more of the buttons associated with a Required Reading control message. In this embodiment the default Button 1 text is "OK" and the default action to occur upon the button being pressed is "Continue". In this embodiment the default is that Button 2 and Button 3 are each configured as "n/a" meaning that Button 2 and Button 3 are not included in and/or with the posted Required Reading control message. In this embodiment, the default "On press" action associated with Button 1 is "Continue" which, in this example means that upon Button 1 being pressed (or otherwise selected), the Required Reading message will be posted to the channel message stream and the messages posted to the channel subsequent to the Required Reading message having been posted, will again be permitted (e.g., unblocked) and will be displayed in the channel message stream.

FIG. 42B shows an embodiment of a messaging system from the point of view of Rachel (first group user). In this example Rachel taps on the chevron down to reveal the Button Text dropdown menu (3397). In some embodiments the user can customize, i.e., enter her own button text. In this embodiment Rachel selects "Accept" from the dropdown menu to specify that the first button will say "Accept" (3395).

Figure 42C:
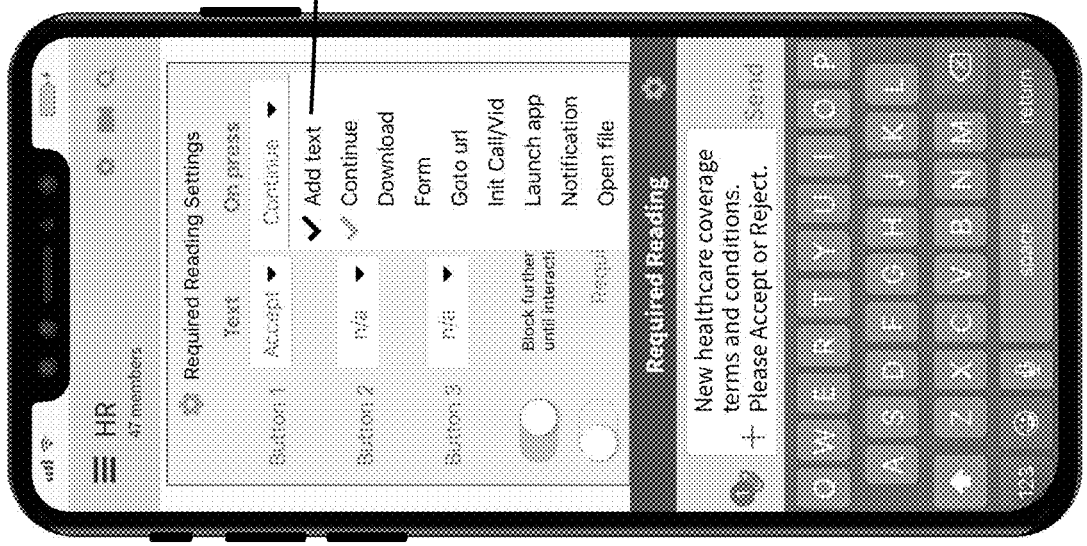

FIG. 42C shows an embodiment of a messaging system from the point of view of Rachel (first group user). In this example Rachel taps on the chevron down (3401) to reveal the "On press" action dropdown menu (3403). In this embodiment one or more actions may be specified to occur upon a button being pressed (or otherwise selected). In this embodiment "Continue" is by default always selected but additional "on press" actions can be added.

Figure 42D:
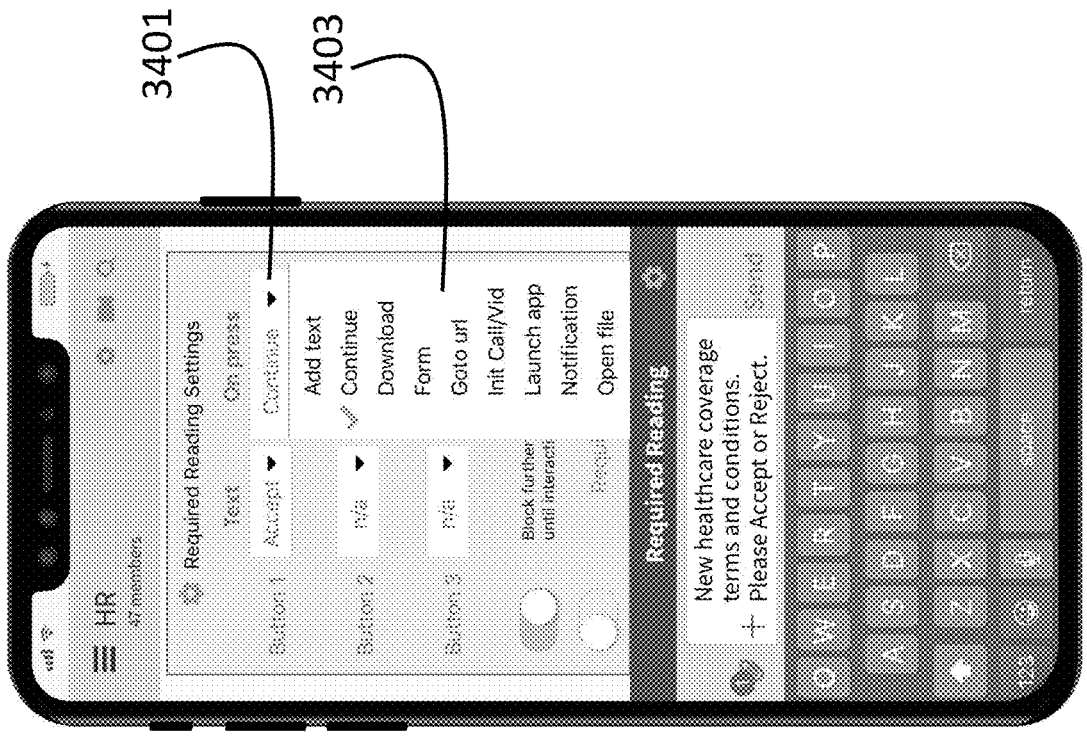

FIG. 42D shows an embodiment of a messaging system from the point of view of Rachel (first group user). In this embodiment Rachel adds the "Add text" (3405) "on press" action. There are many possible actions that can be permitted. This embodiment shows only a few of the possibilities. In some embodiments detailed scripts and code can be input to define and allow simple or complex interactions. In this embodiment numerous examples of "On press" actions are displayed such as, Add text, Continue, Download, Form, Goto url, Init Call/Vid, Launch app, Notification, Open file. In some embodiments one or more of these actions can be applied and/or combined for varying results, for example in some cases pressing a button may result in a file being downloaded to the control message recipient's device. In some embodiments, pressing a button may launch another application or launch a browser. In some embodiments, pressing on a button may open a file and/or bring up and perhaps ultimately submit a form. In some embodiments, pressing on a button may launch an audio or video call.

Figure 42F:
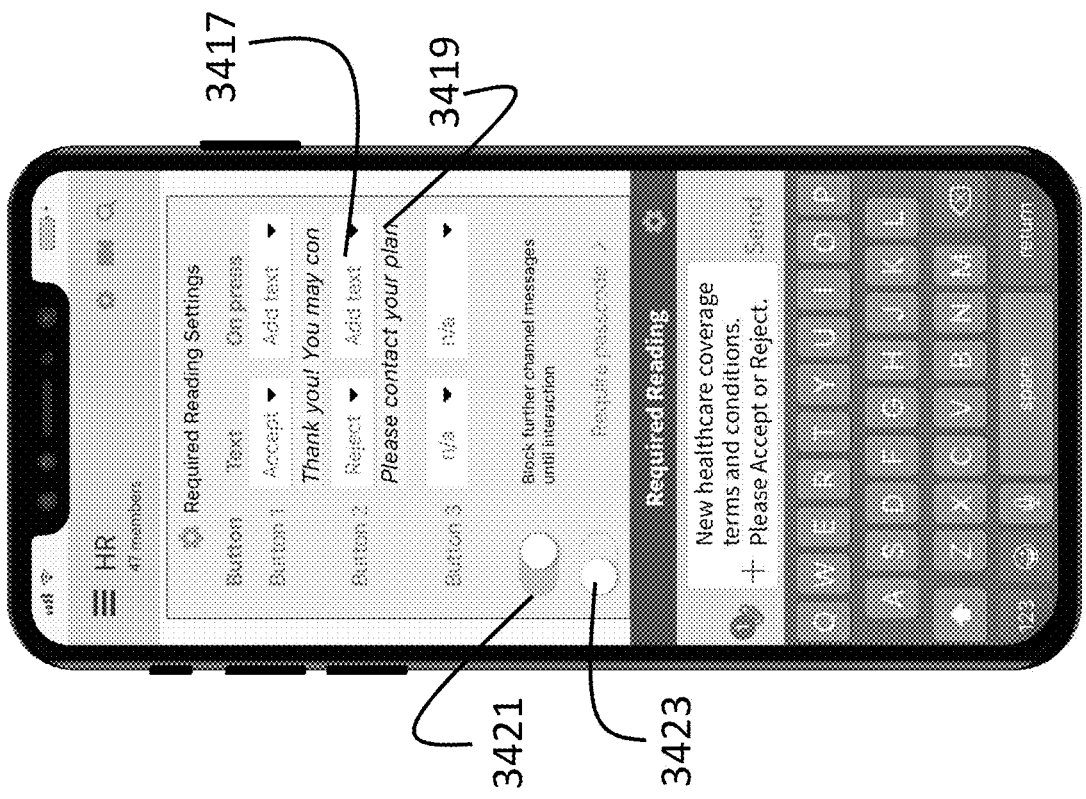
Figure 42E:
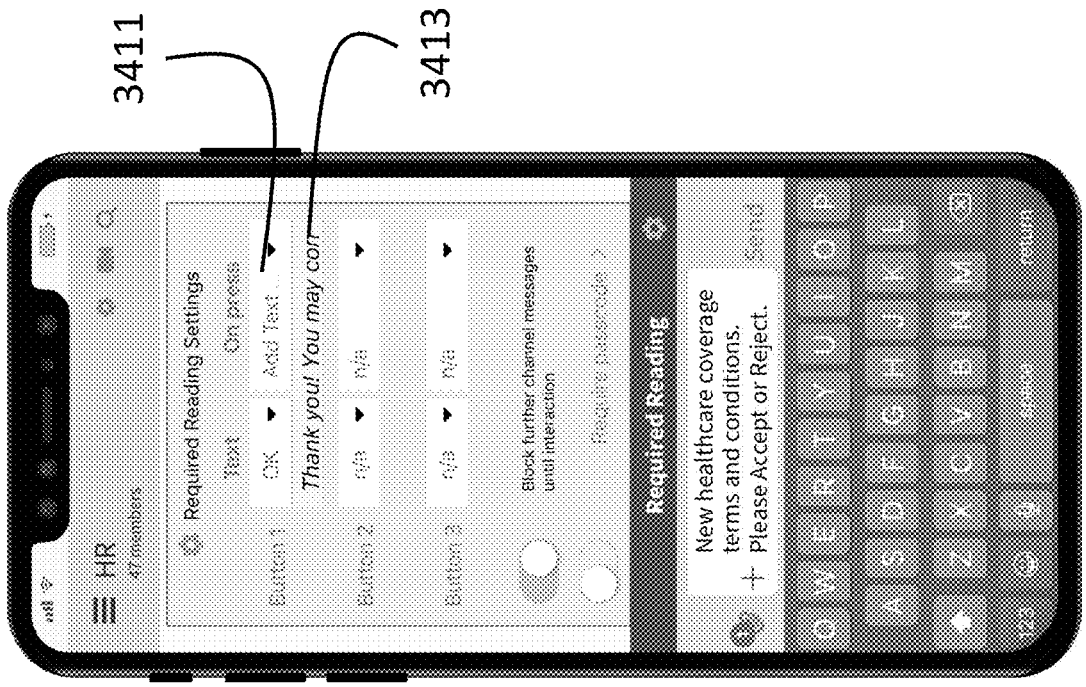

FIG. 42E shows an embodiment of a messaging system from the point of view of Rachel (first group user). In this embodiment, the text appearing in the "On press" dropdown header (3411) associated with Button 1 reflects the most recently selected action. In this example, the most recently selected on press action is "Add text". In this embodiment, "Add text" indicates to the system that the Required Reading control message should be updated and/or modified to include specified Button-pressed associated text. In this example, the user entered customized text into a text entry field (3413) which the user intended to have included with the posted Required Reading message if Button 1 is pressed (or otherwise selected). In this example the customized text is "Thank you! You may continue taking advantage of all of your plan features!" If the Required Reading message recipient, presses Button 1 "Accept", then this "Add text" text content will be added to and included with the posted Required Reading message content. Different Required Reading message recipients may see respectively different messages depending upon the button they pressed when interacting with the Required Reading control type message. In other words members of the same group channel may see respectively different versions of posted Required Reading messages based upon their interaction (and in some embodiments, based on others' interaction) with the Required Reading message.

FIG. 42F shows an embodiment of a messaging system from the point of view of Rachel (first group user). In this embodiment, the text appearing in the "On press" dropdown header (3417) associated with Button 2 reflects the most recently selected action. In this example, the most recently selected on press action is "Add text". In this embodiment, "Add text" indicates to the system that the Required Reading control message should be updated and/or modified to include specified Button pressed associated text. In this example, the user entered customized text into a text entry field (3419) which the user intended to have included with the posted Required Reading message if Button 1 is pressed (or otherwise selected). In this example the customized text is "Please contact your plan administrator (800-555-1212). Some of your benefits have been placed on hold." If the Required Reading message recipient, presses Button 2 "Reject", then this "Add text" text content will be added to and included with the posted Required Reading message content. Different Required Reading message recipients may see respectively different messages depending upon the button they pressed when interacting with the Required Reading control type message. In other words, members of the same group channel may see respectively different versions of posted Required Reading messages based upon their particular interaction (and in some embodiments, based on others' interaction) with the Required Reading message.

In this embodiment Button 3 is not utilized as indicated by the Button Text "n/a" (3421).

In this embodiment, by default, the indicated toggle switch (3421) to "on". In this example, the user has the option of toggling the switch to off. In this example, a condition of the Required Reading message is that once the Required Reading control message is posted to the channel, further messages posted to the channel will be queued, i.e., no subsequent messages are permitted to be displayed in a respective recipient's message channel view until that respective recipient has interacted with the Required Reading message by pressing on an associated button.

In some embodiments the message sender may require that the control message recipients enter a passcode or other form of verification, before or after being allowed to view the Required Reading control type message (3423). In some embodiments the sender may require entry of a passcode after first displaying the Required Reading message in order for the Required Reading message to be dismissed (e.g., ceased from being superimposed on the group channel message stream or preventing access to the underlying channel).

Figure 43:
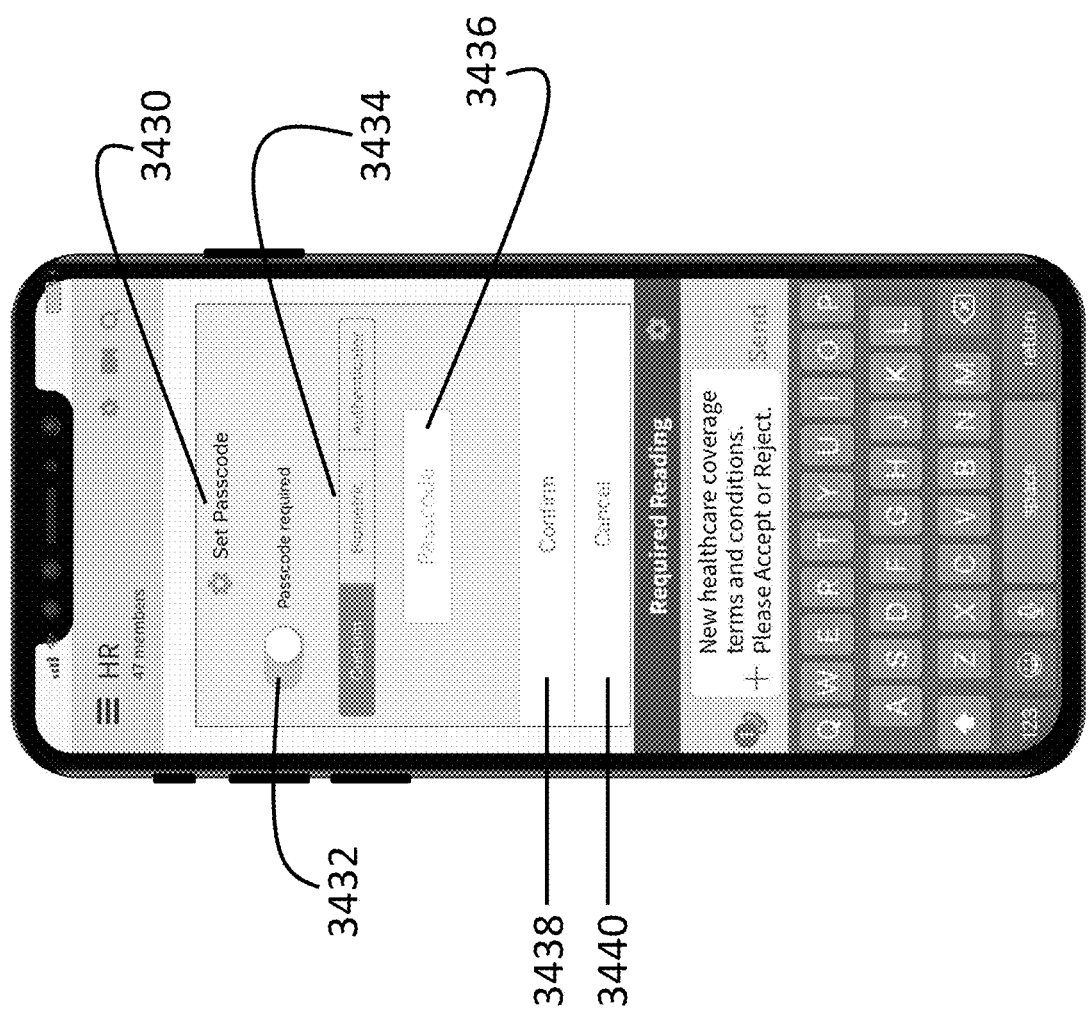

FIG. 43 shows an embodiment of a messaging system from the point of view of Rachel (first group user). This embodiment shows an example of a menu that could be caused to appear as a result of the user choosing to require a passcode to access or dismiss a Required Reading message (FIG. 42A #3394). This embodiment shows a "Set Passcode" control message attribute specification screen (3430). In this example the "Passcode required" toggle is set to "on" (3432). In this example, the user can select one of three password types: 1) Custom, Biometric or Authenticator (3434). In this example, the user has chosen to enter a custom password (3436) which custom passcode will be required to be entered by each respective Required Reading recipients in order for each respective Required Reading message recipient to view the content of the Required Reading message. In this example, if the "Biometric" passcode type was selected, then Required Reading message recipients would be required to verify themselves through use of a biometric means touch as fingerprint (e.g., Touch ID). In this example, if the "Authenticator" passcode type was selected, then Required Reading message recipients would be required to input an authentication code provided by, for example, an approved authentication code generation application. In this embodiment the user taps on "Confirm" (3438) or "Cancel" (3440) to confirm or cancel the attribute specifications specified by the user.

Figure 44:
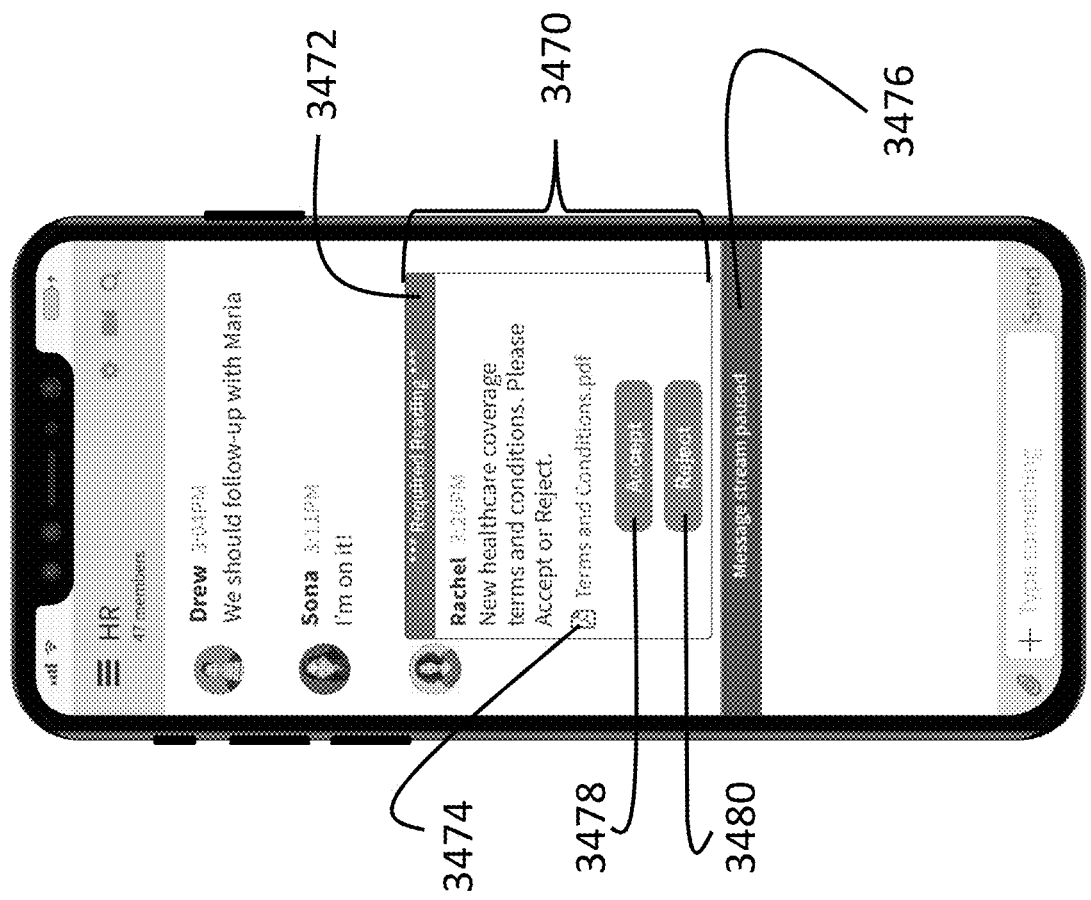

FIG. 44 shows an embodiment of a messaging system from the point of view of a group user message recipient, e.g., Sona (second user) on a second device. In this embodiment, Rachel's Required Reading message was posted to the channel (3470). In this example, one indication of the fact that the message is a Required Reading control type message is the visually distinct white text that says "\*\*\* Required Reading \*\*\*" (indication that the first text message is available) on a red background (3472). In other embodiments, more, fewer and/or different means of signifying that the message is a Required Reading type control message can be applied. In this example, Rachel's message "New healthcare coverage terms and conditions. Please Accept or Reject." is accompanied by the attachment she included "Terms and Conditions.pdf" (2474). In this embodiment, the two buttons, "Accept" and "Reject" specified by Rachel in FIG. 42A are also included with the message. In addition, since "Block further channel messages until interaction" is indicated as selected in FIG. 42A, all HR channel messages that may have been posted to the channel subsequent to the posting of Rachel's Required Reading control message, have been suppressed (e.g., not visible). In this example, an indication of that fact is displayed "Message stream paused" (3476).

Figure 45B:
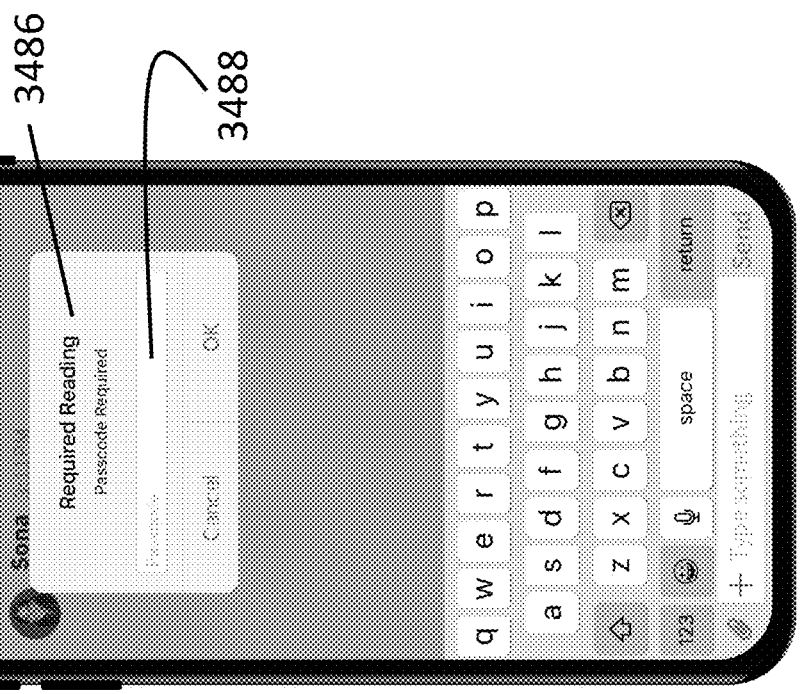
Figure 45A:
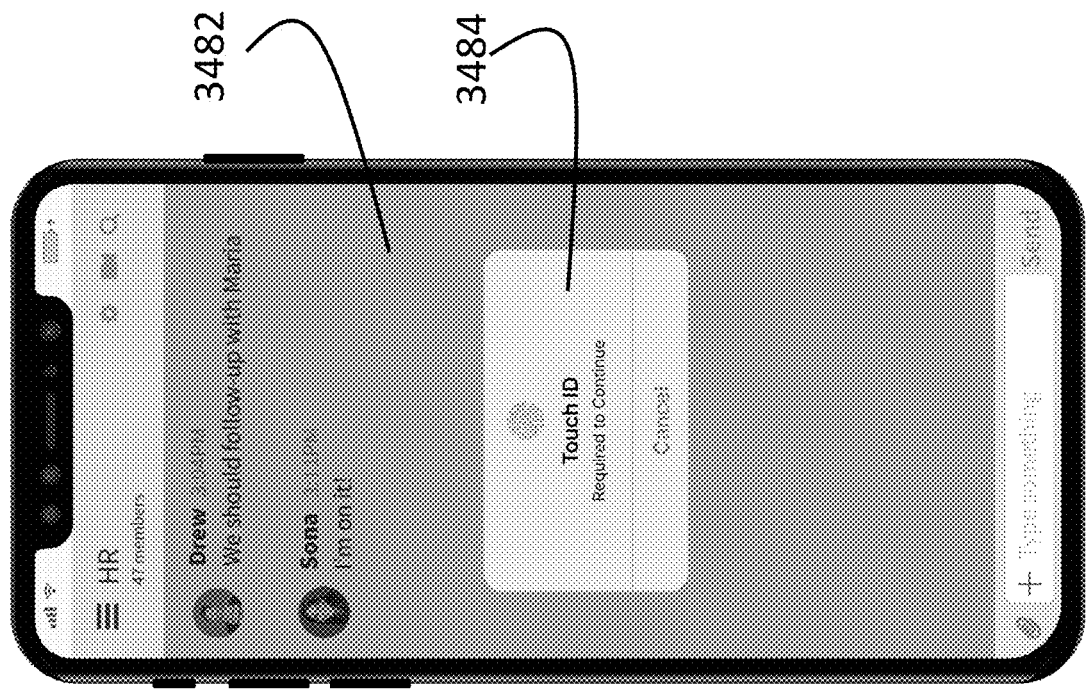

FIG. 45A shows an embodiment of a messaging system from the point of view of a group user message recipient, e.g., Sona. In this embodiment the Required Reading recipient is prevented from accessing the underlying channel (3482) until she has verified her identity using a biometric method (e.g., Touch ID) (3484).

In one exemplary embodiment, at least a portion (e.g., a prompt associated with the message available for interaction, metadata, content of the message) of the Required Reading message is transmitted to the recipient, and when the recipient interacts with the at least a portion of the message in a qualified manner, the message (or portion, thereof) is available to the recipient (for viewing, for example). In another exemplary embodiment, the Required Reading message (or portion thereof, e.g., a prompt associated with the message available for interaction, metadata, content of the message) is transmitted to the recipient and when the recipient interacts with the message in a qualified manner, a further at least a portion of the message is transmitted and/or is then available to the recipient (for viewing, for example). For example, in an exemplary embodiment a Required Reading message is transmitted to the recipient and after the user taps on the "Accept" button, a further portion of the message (for example content of the message and/or an attached document) is caused to be transmitted and the Required Reading message (or portion thereof and/or further at least a portion thereof) is then available to the recipient (for viewing, for example). In some embodiments, the "further at least a portion of the message" can include retransmission of all or part of the message (or portion thereof) previously transmitted.

FIG. 45B shows an embodiment of a messaging system from the point of view of a group user message recipient, e.g., Sona. In this embodiment the Required Reading recipient is prevented from accessing the underlying channel until she has verified her identity using a password (3488). In this embodiment an indication that the message is a Required Reading control type message is displayed "Required Reading—Passcode Required" (3486).

Figure 46:
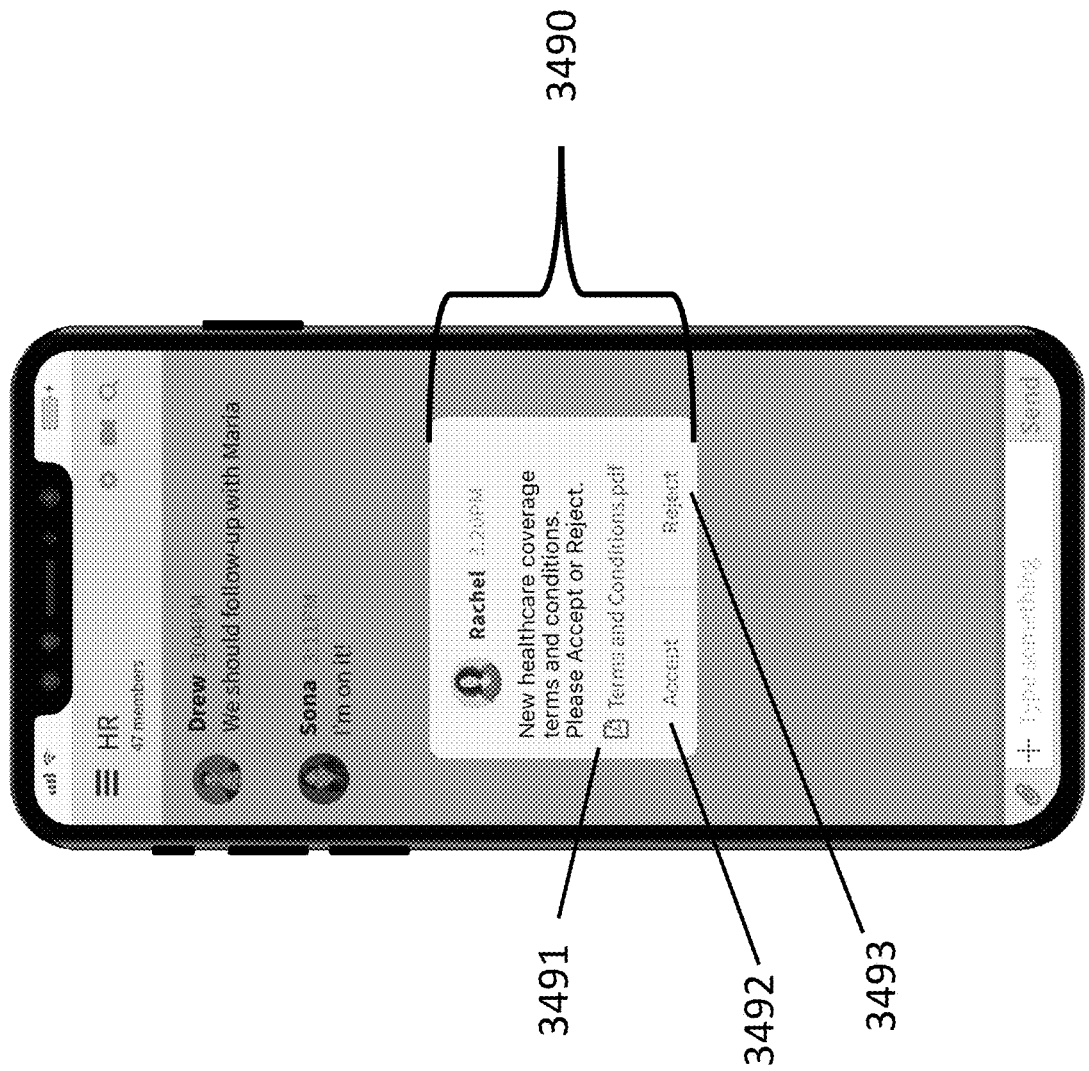

FIG. 46 shows an embodiment of a messaging system from the point of view of a group user message recipient, e.g., Sona. In this embodiment the Required Reading control message (3490) displays the full content of Rachel's Required Reading message along with access to the associated message attachment (3491). In this embodiment the Required Reading control type message is superimposed on top of an obscured view of the underlying channel. In this embodiment the Required Reading recipient is prevented from accessing the underlying channel until she has tapped either the "Accept" (3492) or "Reject" (3493) button. In some embodiments the Required Reading control message is dismissed altogether after the recipient interacts with the message in a qualified manner, e.g., tapping the "Accept" button. Interacting with a message in a "qualified manner" means that the message recipient interacts with the control type message in a manner recognizable by the control message to cause a further action (for example, tapping on an icon or button or entering a password. Interacting with the message, by winking at it, unless programmed to recognize and accept a wink, for example, would not constitute a "qualified manner"). In some embodiments, after a recipient's interaction with the Required Reading Control message, the message is added to the associated message channel message stream. In some embodiments, after a recipient's interaction with the Required Reading Control message, the message is added to (alone or in addition to being posted to the associated channel) another message channel message stream. In some embodiments, after a recipient's interaction with the Required Reading Control message, the message is shared with (alone or in addition to being posted to the associated channel) another application.

Figure 47A:
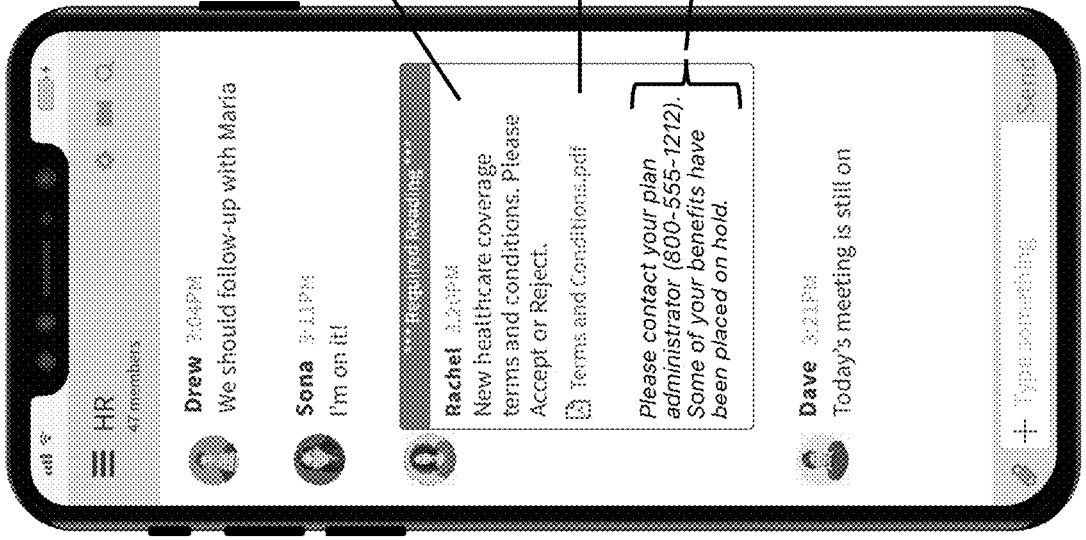

FIG. 47A shows an embodiment of a messaging system from the point of view of a group user message recipient, e.g., Sona. In this embodiment by tapping on the "Accept" Button (FIG. 46 #3492) (interaction), Sona caused the Required Reading control message to follow the rules specified by Rachel (specified interaction) when she created the Required Reading message. Upon pressing button 1 "Accept" the system followed the rules associated with Button 1 "Continue" and "Add text". Therefore, in this embodiment, the Required Reading control message ceased being superimposed on top of the HR channel (restriction removed), and the Required Reading message was posted in the HR channel message stream (3495) with the "Terms and Conditions.pdf" attachment (3496), and along with the added text "Thank you! You may continue taking advantage of all of your plan features!" (3498). In addition, any messages posted to the HR channel subsequent to transmission of Rachel's Required Reading control message were also visible in the HR channel message stream. Thus, completing a specified interaction, or one of a plurality of specified interactions, or a plurality of specified interactions (or ones of those interactions) causes display of the first message on the second device. Furthermore, a third user may be (partially) prevented access to the first message on a third device. Also, removing the restriction may cause more of the first message to be displayed on the second device than before the restriction is removed.

Figure 47B:
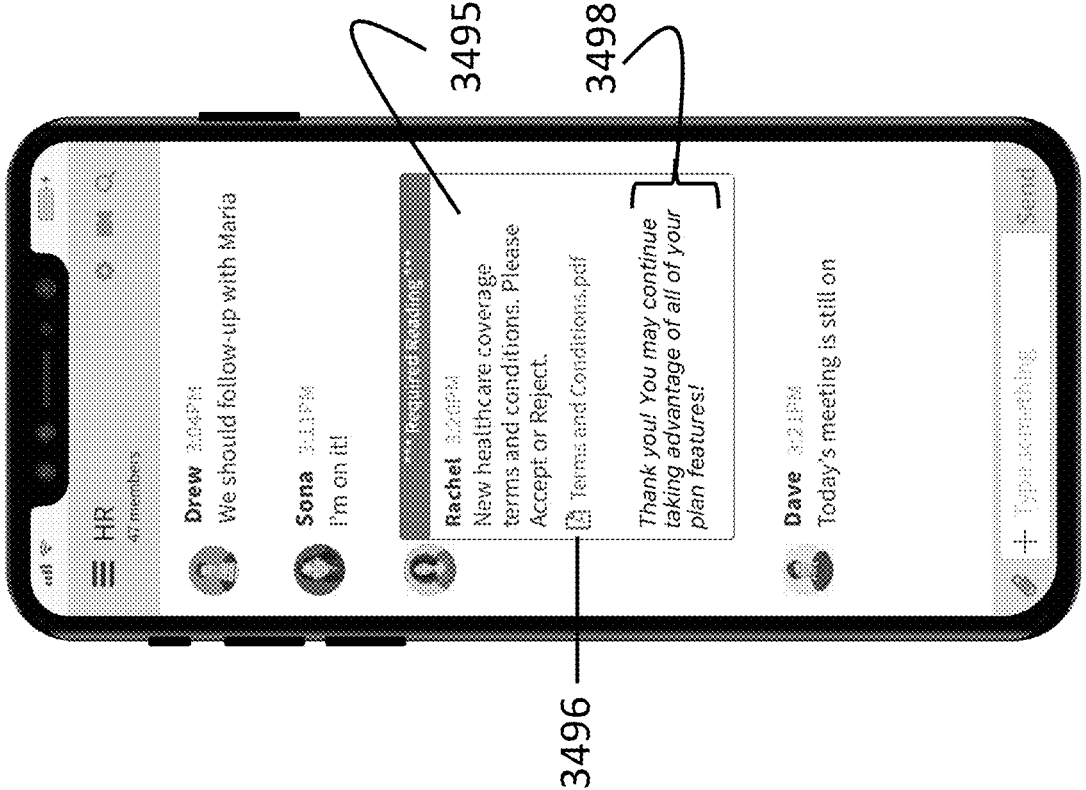

FIG. 47B shows an embodiment of a messaging system from the point of view of a group user message recipient, e.g., Sona. In this embodiment by tapping on the "Reject" Button (FIG. 46 #3493) Sona, caused the Required Reading control message to follow the rules specified by Rachel when she created the Required Reading message. Upon pressing button 2 "Reject" the system followed the rules associated with Button 2 "Continue" and "Add text". Therefore, in this embodiment, the Required Reading control message ceased being superimposed on top of the HR channel, and the Required Reading message was posted in the HR channel message stream (3502) with the "Terms and Conditions.pdf" attachment (3496), and along with the Added text "Please contact your plan administrator (800-555-1212). Some of your benefits have been placed on hold." (3504) In addition, any messages posted to the HR channel subsequent to transmission of Rachel's Required Reading control message were also visible in the HR channel message stream.

It is noted that a removed restriction can be an interaction restriction (i.e. a restriction on interaction with a device, channel, message, etc.). It is noted that a removed restriction can be a viewing restriction (i.e. a restriction on viewing with a device, channel, message, etc.).

FIGS. 48-53 show an embodiment of "Password Protected Message" control type messages. In some embodiments of Password Protected Message type messages, "password" refers to a unique identifier such as a unique user password, biometric identification, order number or customer number. In some embodiments a "password" is more general, for example an area code, zip code, year, group number, series number or an answer to a question. In other words, a password may or may not be uniquely associated with a particular user.

Message security and confidentiality are among the top concerns of users of group messaging systems. Some users are fearful of sending confidential information to even private group messaging channels. Some message content is more confidential than other message content. In group messaging systems, messages are typically posted to a continuous stream of messages. Lost devices, use of public or shared computers, line-of-sight computer screens and even the waning of people's adherence to privacy protocols due to the, for example, passage of time can make the unintentional disclosure of confidential information more susceptible. With Password Protected Message control type messages, users can send confidential message content that is protected on a message level basis. In some embodiments, access to message content requires a password (or other form of user access validation, such as Touch ID) to be entered every time display of a message's content is sought. In some embodiments password protected messages are also encrypted. In some embodiments the password determines what message information is displayed (e.g., more than one password can be entered, and a valid entry will cause associated message content to be displayed).

Figure 48:
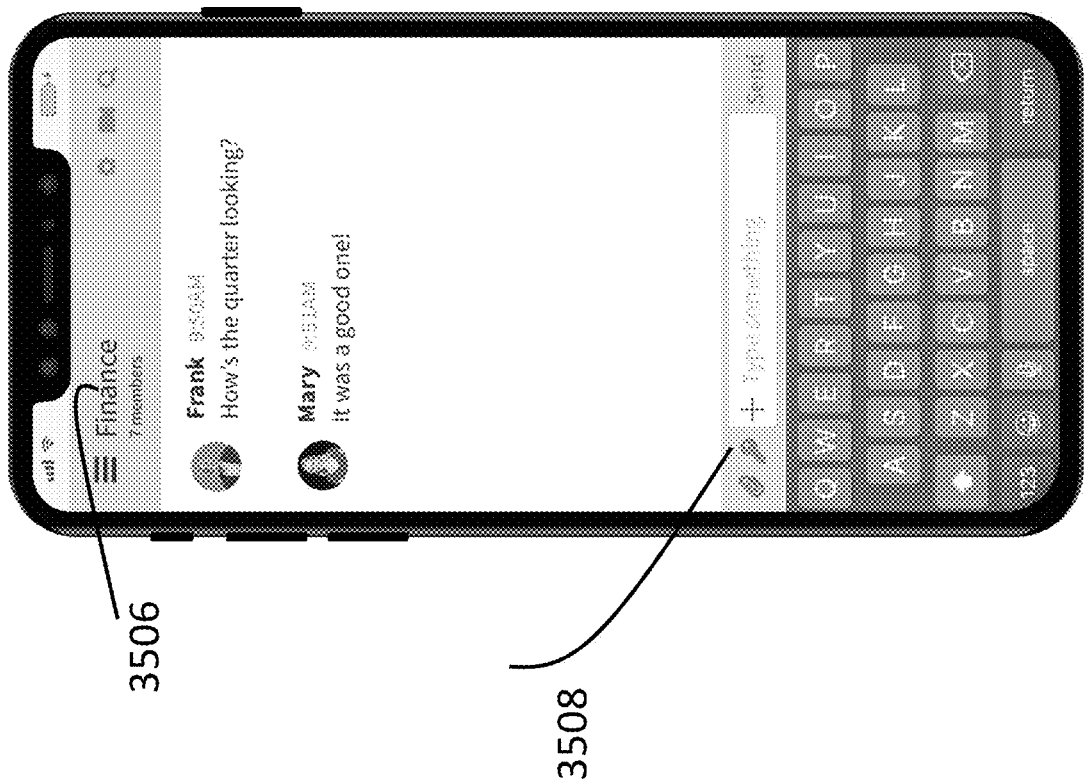

FIG. 48 shows an embodiment of a messaging system from the point of view of Paul (first group user or first user)). Paul is viewing a group channel (messaging channel) named "Finance" (3506), which channel has 7 members on a first device. In this embodiment Paul is able to indicate his desire to send a Password Protected Message control type message by tapping on the "Password Protected Message" icon (3508). In some embodiments other means of selection are utilized such as by spoken instruction, menu selection, device gesture, computer mouse click, etc.

Figure 49:
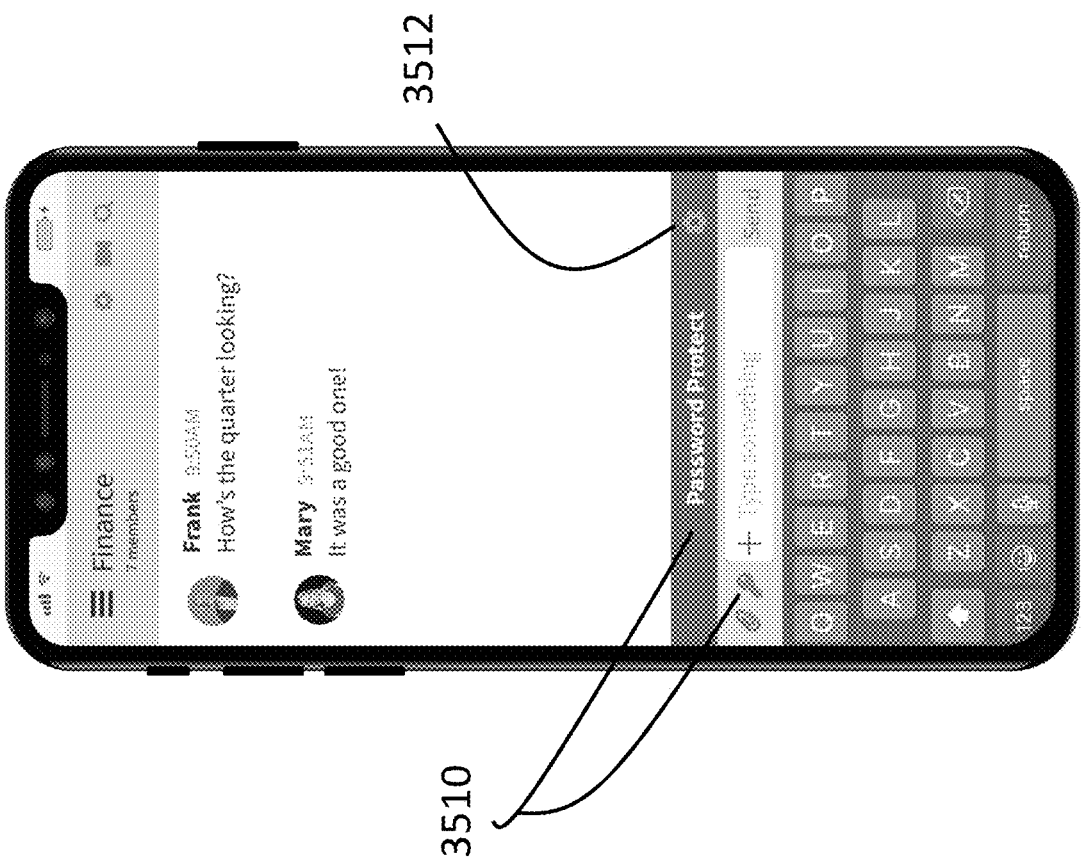
FIGS. 48-53 are screenshots of one or more exemplary embodiments of the present invention.

FIG. 49 shows an embodiment of a messaging system from the point of view of Paul (first group user). This embodiment shows a screen caused to be displayed as a result of Paul's tapping on the Password Protected Message icon shown in FIG. 48 #3508. In this figure, indication is provided to reinforce to Paul that the message he is preparing is a Password Protected Message type message (3510). In some embodiments no or other indication is provided.

In this embodiment, Password Protected Message type messages have system default attributes assigned. For example, in this embodiment, i) Password Protected Messages will be sent to everyone in the channel (including to the sender); ii) Password Protected Messages will be posted in the channel with metadata such as sender username and date and time the message was sent; iii) Password Protected Messages will be posted in the channel without sender entered message content; iv) Password Protected Messages will be posted in the channel with visual instruction to recipients that the message is password protected and with a text entry field receptive to data entry; v) message will be posted in the group channel in a visually distinguishable way (e.g., visually different from regular messages); vi) upon password verification content of the Password protected message will be displayed superimposed on top of an obscured view of the underlying channel; vii) though obscured, messages posted to the underlying channel will continue to be posted to the channel and displayed; iv) access to the underlying channel will be restricted until the recipient interacts with the Password protected message by tapping on a button labeled "Continue"; and; viii) After interaction, restrictions to access to the underlying channel are removed and the content of the Password protected message is once again hidden, pending repeat of the password entry/content disclosure cycle.

In this embodiment, tapping on the "settings" icon (3512) will cause a "Password Protected Message" settings menu to be displayed.

In some embodiments the sender of the Password Protected Message is exempt from one or more of the restrictions imposed on other recipients. In some embodiments the sender is not also a recipient of her own Password Protected Message. In some embodiments, the sender receives a different version of the Password Protected Message than other recipients. In some embodiments each recipient receives a different version of the Password Protected Message. Thus, assume a message is transmitted to a second user and a third user. The message may be displayed (or partially displayed) differently to the third user than to the second user. In addition, or alternatively, the correct password for the second user and the third user may be different. In addition, or alternatively, the message transmitted to the second and third user may be at least partially available for display to the first user (on the first user's device).

Similar features to those set forth above may apply to "required reading" messages. Again assume a "required reading" message is transmitted to a second user and a third user. The message may be displayed (or partially displayed) differently to the third user than to the second user. In addition, or alternatively, the message may be also password protected and the correct password for the second user and the third user may be different. In addition, or alternatively, the message transmitted to the second and third user with also be password protected and may be at least partially available for display to the first user (on the first user's device).

In some embodiments, interaction with the Password Protected Message will cause more, less, further, different, derived, calculated, looked-up, and/or customized content to be displayed. In some embodiments, the recipient's interaction with the Password Protected Message will influence the content of the message.

Similar features may apply with regard to the required reading feature. Thus, recipients may receive different versions of a message. Also, different interactions may be accepted by a user device and the restriction that is removed may be different depending upon the interaction that is received and accepted.

Figure 50:
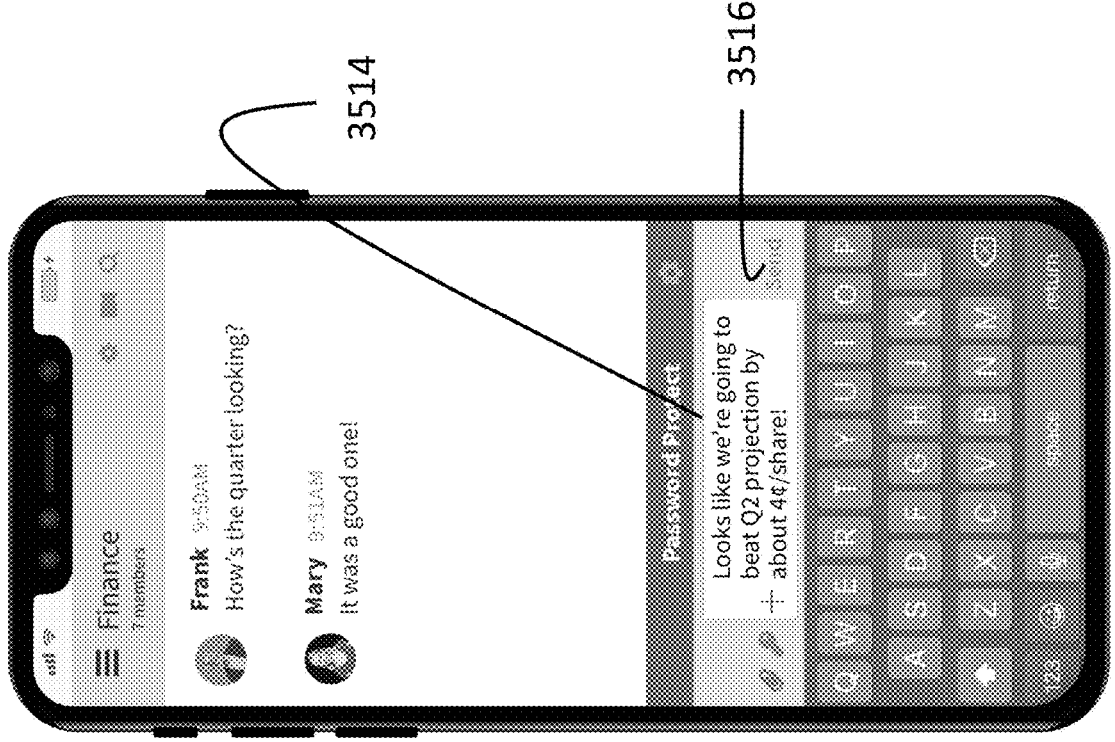

FIG. 50 shows an embodiment of a messaging system from the point of view of Paul (first group user). In this embodiment the user (Paul in this example), enters a text message "Looks like we're going to beat Q2 projection by about 40/share!" into a text entry area (3514). In this embodiment, Paul's message will be sent to everyone in the Finance channel. In some embodiments, Paul could identify specific channel members to receive his message privately (in the group channel, another group channel or in DM channel/s). Once satisfied with his message, Paul taps on "Send" (3516) to cause the system to send his message.

Figure 51:
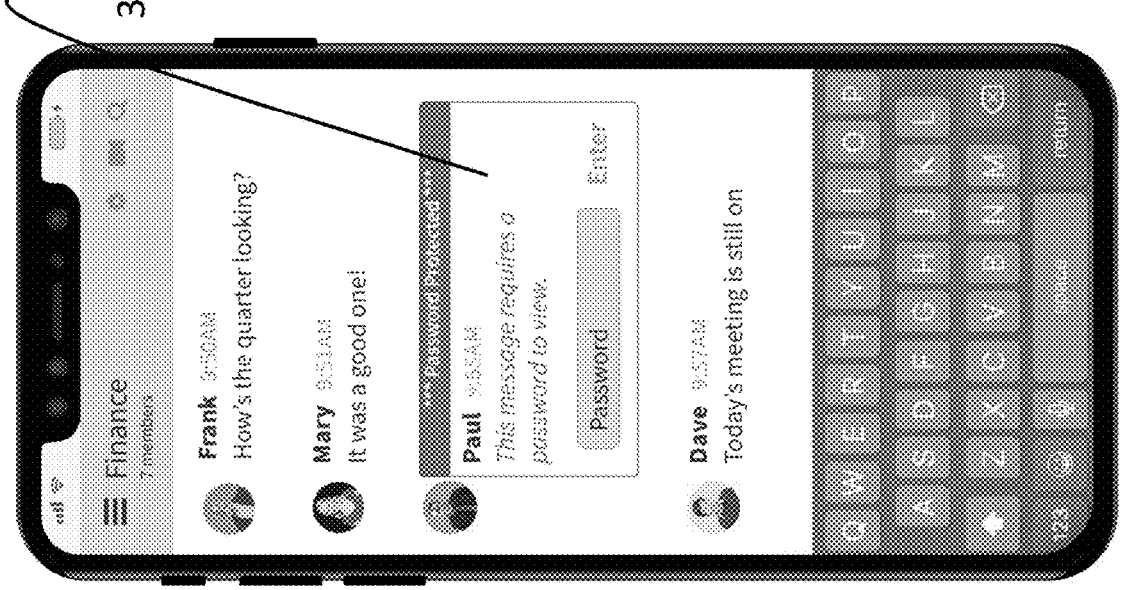

FIG. 51 shows an embodiment of a messaging system from the point of view of a recipient of Paul's Password Protected Message (Frank is the message recipient in this example). In this embodiment the Password Protected Message is posted in accordance with default Password Protected Message attribute settings (3518). In this embodiment among the default attribute setting is to include a password entry field with the control message. In this embodiment the majority of the message content is hidden awaiting password entry. In this embodiment the password is the recipient's user password associated with the messaging app. In this embodiment, once a password has been validated the associated and previously hidden message content is displayed superimposed on top of the partially obscured channel message stream. In this embodiment a password is required every time the recipient wishes to review the content of the message in the future.

In one exemplary embodiment, at least a portion (e.g., a prompt associated with the message available for interaction, metadata, content of the message) of the Password Protected message is transmitted to the recipient, and when the recipient enters a correct password, the message (or portion, thereof) is available to the recipient (for viewing, for example). In another exemplary embodiment, the Password Protected message (or portion thereof, e.g., a prompt associated with the message available for interaction, metadata, content of the message) is transmitted to the recipient and when the recipient enters a correct password (e.g., Touch ID, password, PIN, order number), a further at least a portion of the message is transmitted and/or is then available to the recipient (for viewing, for example). For example, in an exemplary embodiment a Password Protected message is transmitted to the recipient and after the user enters her messaging application password, a further portion of the message (for example content of the message and/or an attached document) is caused to be transmitted and the Password Protected message (or portion thereof and/or further at least a portion thereof) is then available to the recipient (for viewing, for example). In some embodiments, the "further at least a portion of the message" can include retransmission of all or part of the message (or portion thereof) previously transmitted.

Figure 52:
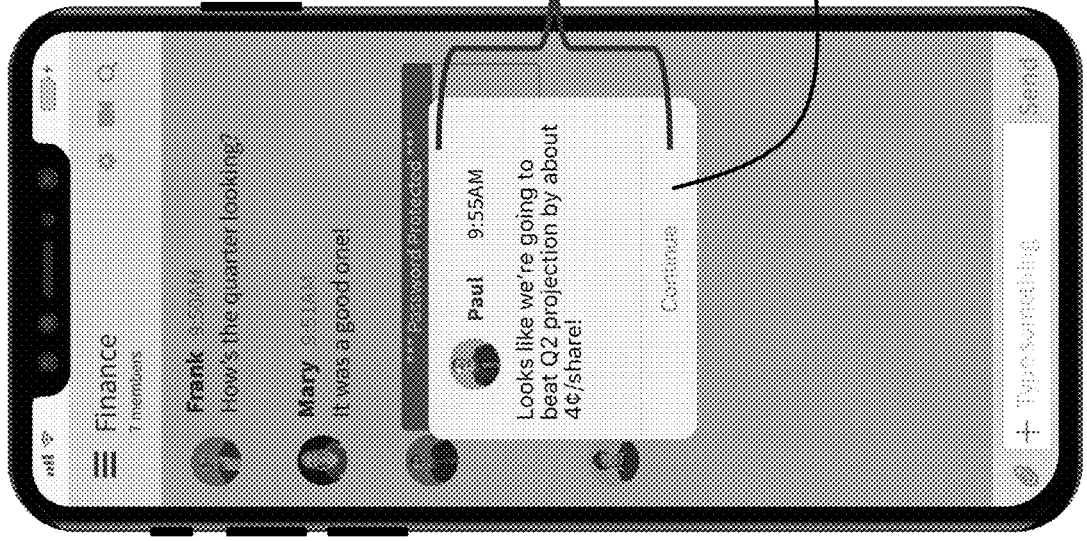

FIG. 52 shows an embodiment of a messaging system from the point of view of a recipient of Paul's Required Reading message (Frank is the message recipient in this example). In this embodiment the Password Protected Message is posted in accordance with default Password Protected Message attribute settings. In this embodiment among the default attribute settings is a default to superimpose the Password Protected Message along with its previously hidden content on top of the partially obscured channel message stream (3520). In this embodiment further messages are posted to the stream but obscured until a qualified further interaction with the Password Protected Message occurs (e.g., tapping the "Continue" button (3521)).

Figure 53:
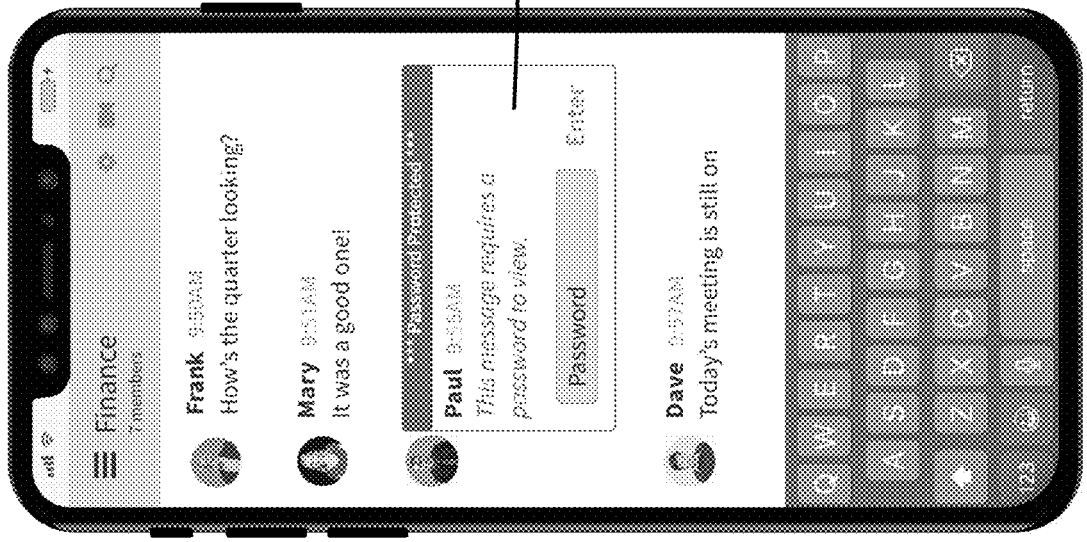

FIG. 53 shows an embodiment of a messaging system from the point of view of a recipient of Paul's Required Reading message (Frank is the message recipient in this example). In this embodiment Frank has been presented with the content of Paul's Password Protected Message (FIG. 52 #3520) and by having tapped on the "Continue" button (FIG. 52 #3521), has been returned to the Finance message channel. In this embodiment the recipients have to enter a password each time they want to view the content of Paul's message (3522). In some embodiments, other rules can be applied such as only having to enter the password only once ever, or only once a day, etc.

FIGS. 54-61 show various embodiments of "Password Protected Message" control type messages. In some embodiments of Protected Message type messages, "password" refers to a unique identifier such as a unique user password, biometric identification, order number or customer number. In some embodiments a "password" is more general, for example an area code, zip code, year, group number, series number or an answer to a question.

Figure 55:
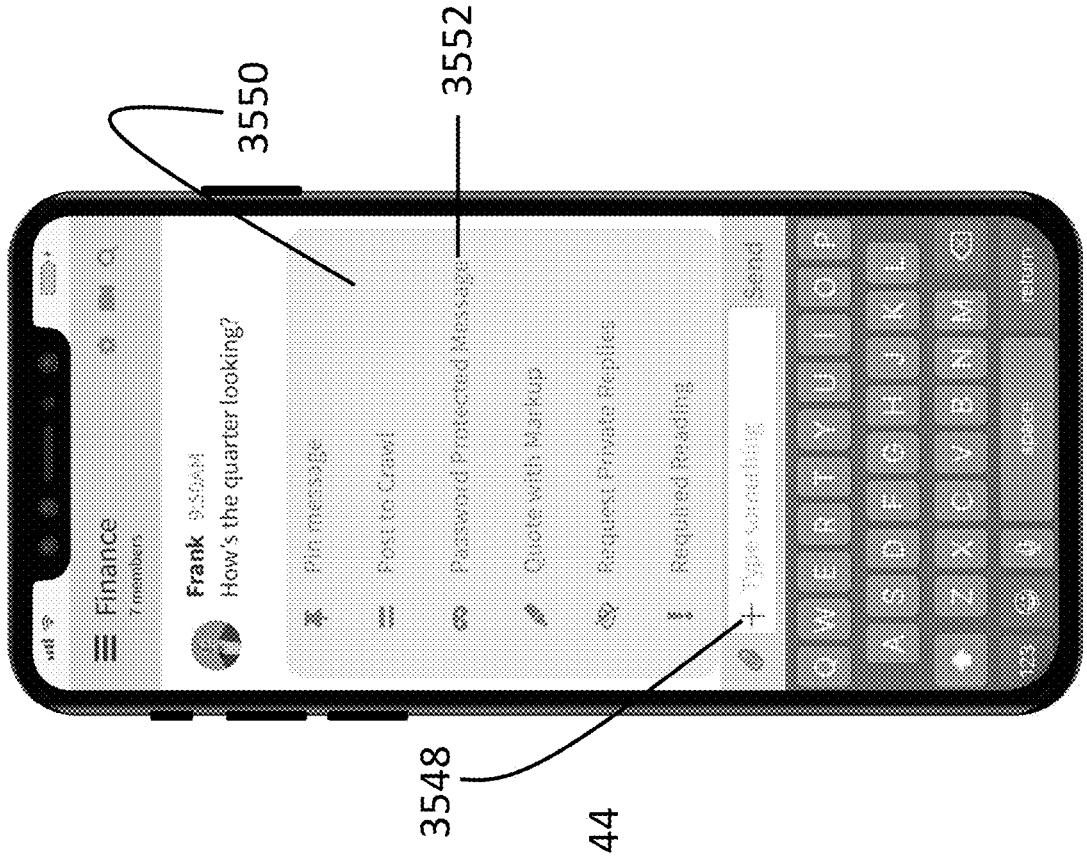
FIGS. 54-61 are screenshots of one or more exemplary embodiments of the present invention.
Figure 54:
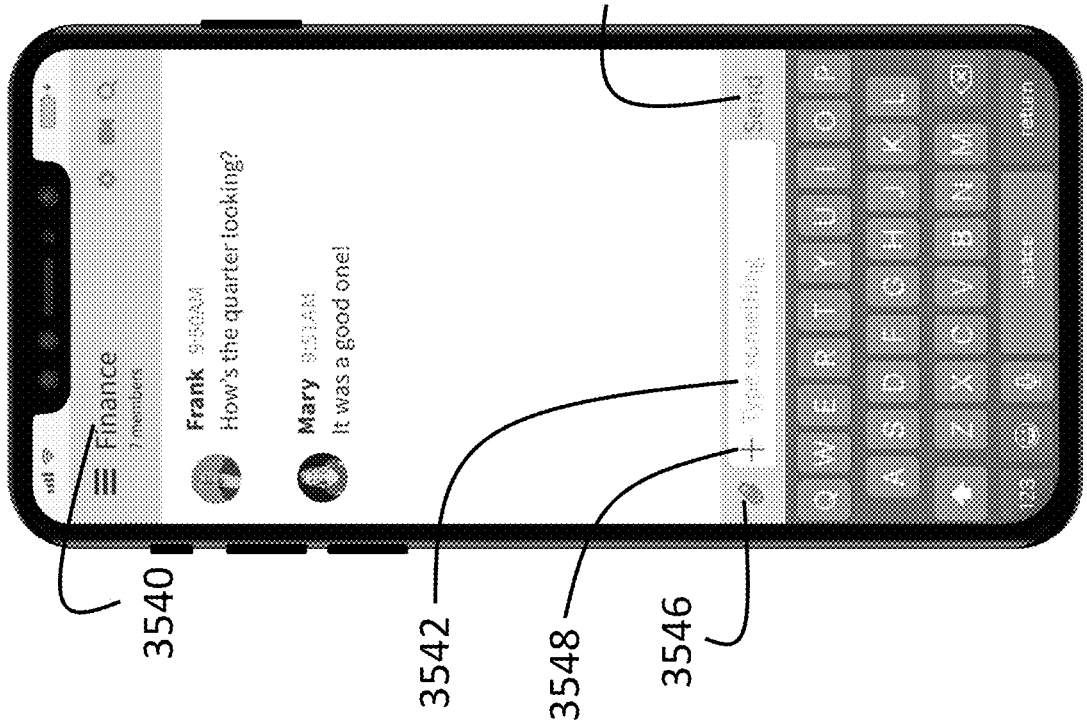

FIG. 54 shows an embodiment of a messaging system from the point of view of Paul (first group user). Paul is viewing a group channel (messaging channel) named "Finance" (3540), which channel has 7 members. In this embodiment, Paul can enter the text of a message he wishes to send to the group in the text entry bar (3542). In some embodiments additional and/or other means of message entry are provided such as via stylus and/or voice. In some embodiments, Paul could specify specific group channel members to receive his message (thereby excluding other channel members). In this embodiment, by tapping on the paperclip icon (3546), Paul can optionally add one or more attachments, such as image/s or file/s to his message. In this embodiment, tapping on the "+" icon (3548) causes a text entry bar associated menu to be displayed (FIG. 55 #3550). The menu allows Paul to add "control" functionality to the message he is preparing to send. In this manner, the message can be constructed to, for example, enable (or possibly require) a private response, or for example, require that message recipients interact with Paul's message prior to further messages being permitted to be seen by these recipients in the selected channel, or for example, require that these recipients verify their identity or enter a password prior to being permitted to view all or a portion of the content of Paul's message. In this embodiment, tapping on "Send" (3544) causes the transmission of Paul's message to the channel.

FIG. 55 shows an embodiment of a messaging system from the point of view of Paul. In this example, Paul is preparing to send a control type message and access to the "control message type" selection menu (3550) is caused by Paul tapping on an icon, which in this example is a "+" icon (3548) associated with the text entry area. In other embodiments, the ability to select or define a control access message type can be accomplished in other ways, for example by tapping on an icon, button, hypertext, by speaking or by using a device gesture such as swiping, double tapping, or long pressing on an area of the display screen, or by other means such as entering trigger data such as a text "trigger character" or "trigger sequence", whether visible or not, such as "/pw/" or "/©/" into, for example, a text entry bar, which trigger data can be interpreted by the system as a command to make the message a control message of an associated type (and applying the type's default attributes). For example, typing "/pw/Confidential Q3 projection attached" followed by an instruction to transmit the message (such as by tapping on "Send") may result in a control message of the "Password Protected Message" type being sent to the channel.

In some embodiments the trigger data can be interpreted by the system as a command to make the message a control message of an associated type and to apply default attributes. In some embodiments the trigger data can be interpreted by the system as a command to make the message a control message of an associated type along with additional or other than that control type's default attributes. For example, typing "/bio/Confidential Q3 projection attached" followed by an instruction to transmit the message may result in a control message being sent to the channel of the "Password Protected Message" type but with "biometric/Touch ID" being applied as an override to the control type's default method of verification (i.e., password).

In some Password Protected Message embodiments there is no need to proactively identify recipient identification data, because the Password Protected Message may be intended for all channel members, and the trigger data can be used without need for deliberate user specification of recipient identification data, e.g., "/pw/" (Password Protected Message control message to be sent to all channel members). So, for example, in this embodiment, recipient identification data is inferred to be "all" due to the absence of user specified recipient identification data. In some Password Protected Message embodiments trigger data and recipient identification data can be used to specify recipients and/or render messages private to recipients e.g., "/pw/jeff" (Password Protected Message message to be sent privately to Jeff).

Figure 56:
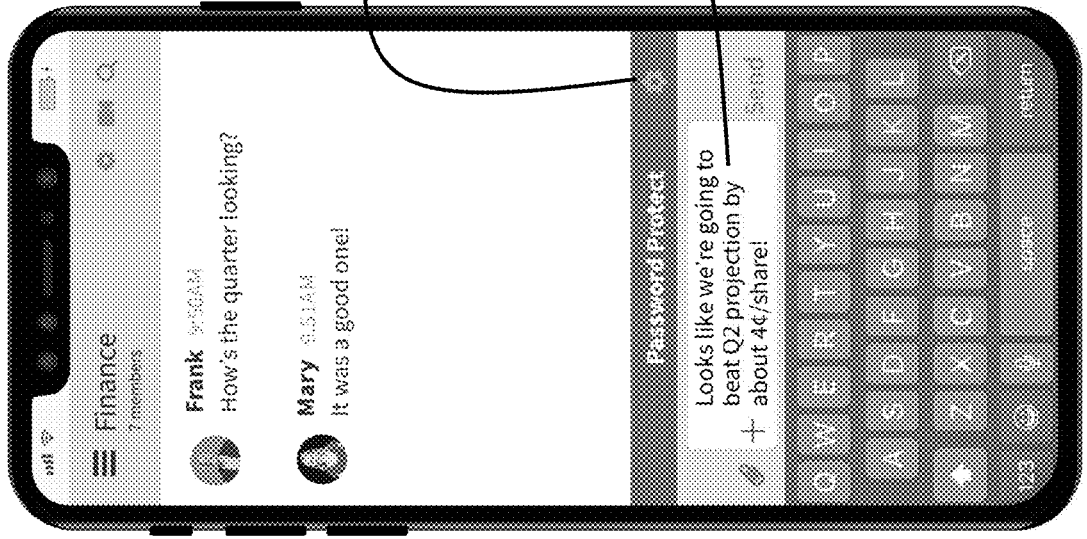

FIG. 56 shows an embodiment of a messaging system from the point of view of Paul (first group user). Paul is viewing a group channel (messaging channel) named "Finance" which channel has 7 members. In this embodiment, Paul specified his desire to create a message of the control type "Password Protected Message" (FIG. 55 #3552) which selection caused the display of this screen (FIG. 56). In this embodiment an indication of the selected message control type is indicated (3560). There are many other ways that an indication of the selected message control type could be provided, some immediate, some delayed, some persistent, some ephemeral. In some embodiments no indication of the selected message control is provided.

In this embodiment, a settings icon (3570) is displayed and tapping on this icon will cause a "Set Passcode" settings menu to be displayed.

Figure 57:
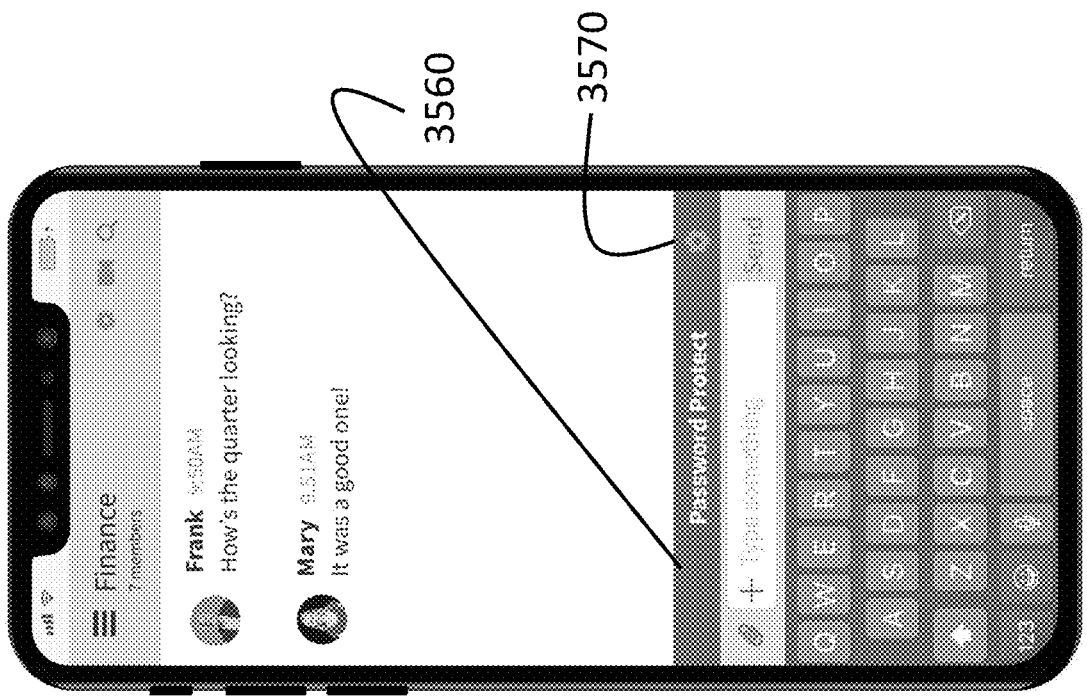

FIG. 57 shows an embodiment of a messaging system from the point of view of Paul (first group user). In this embodiment, Paul has crafted a message that reads, "Looks like we're going to beat Q2 projection by about 40/share!" (3572). In this embodiment, Paul can tap on the "Send" text to transmit his Password protected control message. In this embodiment, tapping "Send" at this point will post Paul's message to the channel and apply the default system settings associated with the "Password Protected Message" control message type to the message. For example, in this embodiment the default system settings for "Password Protected Message" may be: a) acceptable password=user's messaging application password; b) password required timing="Before" access to message content; c) Encrypt message="Yes"; d) Auto delete message=no. In some embodiments additional and/or other default attributes can be applied.

In some embodiments, such as the embodiment shown here, the user is able to override the control message type default settings and specify the "Password Protected Message" settings to be associated with the message being prepared. In this embodiment, tapping on the Setting icon (3570) icon will cause a "Set Passcode" settings menu to be displayed. In some embodiments access to, and specification of, control message type settings is achieved in other ways.

Figure 58B:
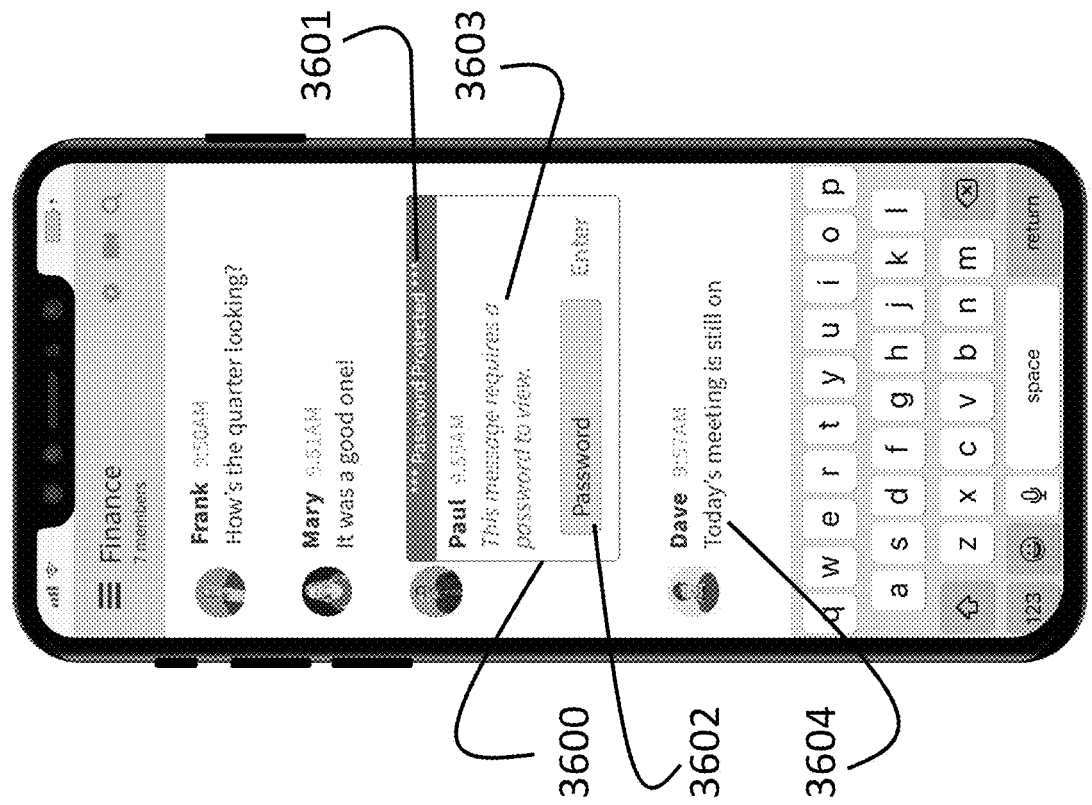
Figure 58A:
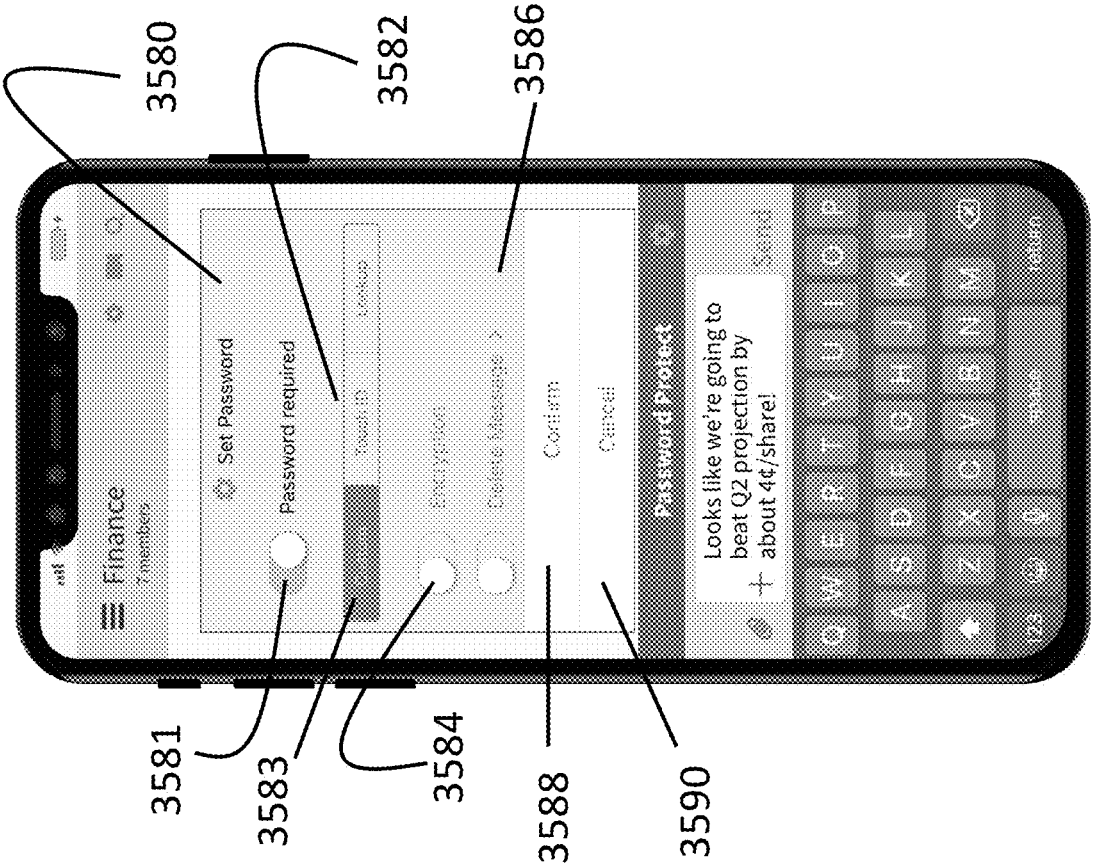

FIG. 58A shows an embodiment of a messaging system from the point of view of Paul (first group user). This embodiment shows an example of a "Set Password" control message attribute specification menu (3580) that was caused to appear as a result of the user tapping on the settings icon (FIG. 57 #3570). In this example the "Passcode required" toggle is set to "on" (3581). In this example, the user can select one of three password types: 1) Custom, 2) Touch ID, or 3) Lookup (3582). In some embodiments additional or other verification/password methods are applied such as face recognition, gesture, spoken password, key, UDID verification, two-factor authentication). In this example, the user selected "Touch ID" which will require that recipients verify their identity by placing their thumb over a biometric thumbprint reader associated with their messaging device in order for each respective Password Protected Message recipient to view the content of the password protected message. In this example, the "Custom" password type was selected (3583).

In this embodiment the user (Paul in this example) may elect to have his message encrypted (3584).

In this embodiment the user (Paul in this example) may set a time and/or other condition related to auto deletion of his Password Protected message (3586).

FIG. 58B shows an embodiment of a messaging system from the point of view of a group user message recipient, e.g., Frank (second group user or second user). In this embodiment, Paul's password protected message is posted in the channel, is visible on Frank's second device, and requires that respective recipients enter a password in order to view the full or partial content of the password protected message. In some embodiments password protected messages are presented in other ways such as being placed outside of the channel, in other channels, or superimposed on top of another screen. In some embodiments password protected messages are imbued with accompanying attributes such as an attribute that asks for a password after the message is displayed (instead of, or in addition to, before) or an attribute that automatically deletes the message a specified period of time after the password is entered. In this embodiment only certain elements of the message are posted while other elements are hidden pending entry of a valid password (correct password) by respective recipients. In this embodiment several indications are provided to alert the recipient that the message is a password protected message including a visually distinct message format (3600) which includes the message header "* Password Protected *" (3601), text that reads, "This message requires a password to view" (3603) and a password entry field (3602).

In this embodiment, if Frank enters a second user password that is the correct password, access to Paul's message (or a portion thereof) is allowed.

In this embodiment, messages posted subsequent to Paul's posting of his 9:55 AM password protected message are posted and displayed normally (e.g., Dave's 9:57 AM message (2604)). In some embodiments, subsequent (and/or prior) messages (or the message channel itself) may be prevented from being displayed until the recipient has entered a valid password.

In some embodiments, prior to allowing access to Paul's text message on Frank's device, access is allowed to less than all of Paul's text message on Frank's device. In some embodiments, more of the message is displayed after access is allowed to that text message than before access is allowed to that text message.

In some embodiments, Paul's text message is sent to fewer than all of the participants in the group channel.

Figure 59B:
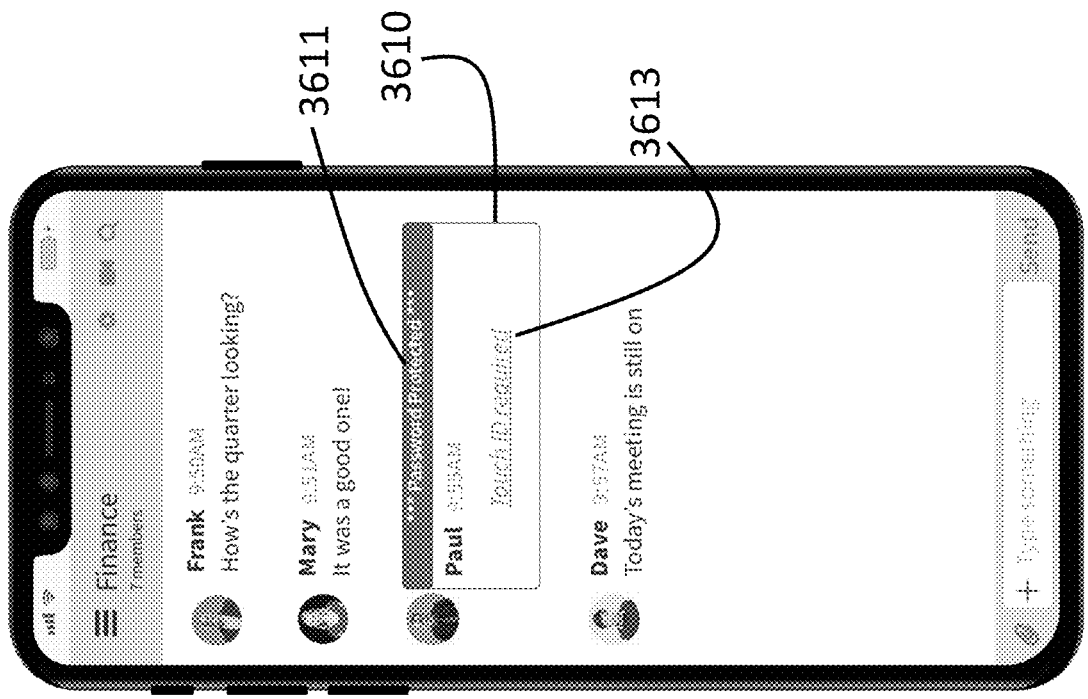
Figure 59A:
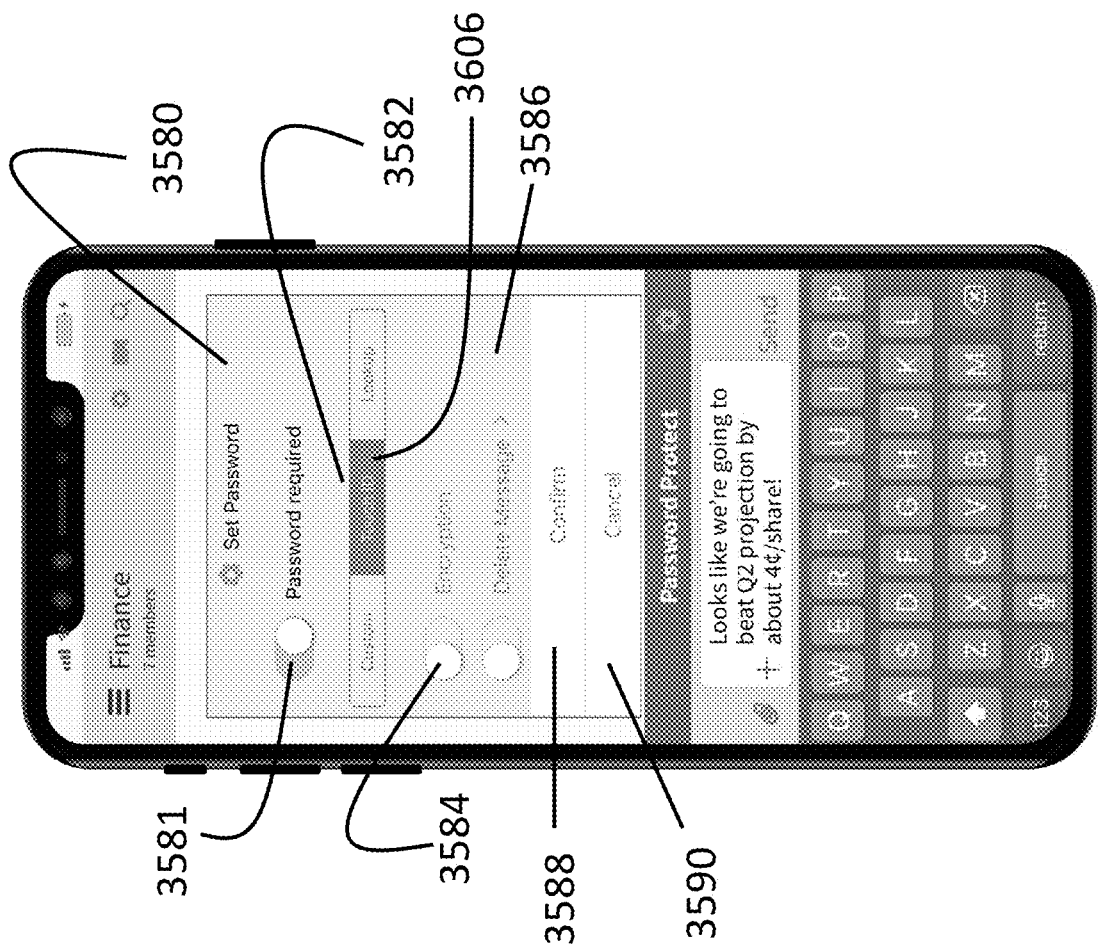

FIG. 59A: shows an embodiment of a messaging system from the point of view of Paul (first group user). This embodiment shows an example of a "Set Password" control message attribute specification menu (3580) that was caused to appear as a result of the user tapping on the settings icon (FIG. 57 #3570). In this example the "Passcode required" toggle is set to "on" (3581). In this example, the user can select one of three password types: 1) Custom, 2) Touch ID, or 3) Lookup (3582). In some embodiments additional or other verification/passcode methods are applied such as face recognition, gesture, spoken password, key, UDID verification, two-factor authentication. In this example, the user selected "Touch ID" which will require that recipients verify their identity by placing their thumb over a biometric thumbprint reader associated with their messaging device in order for each respective Password Protected Message recipient to view the content of the password protected message. In this example, the "Biometric" Touch ID passcode type was selected (3606). In some embodiments, secondary passcode methods are allowed.

In this embodiment the user (Paul in this example) may elect to have his message encrypted (2584).

In this embodiment the user (Paul in this example) may set a time and/or other condition related to auto deletion of his password protected message (2586).

FIG. 59B shows an embodiment of a messaging system from the point of view of a group user message recipient, e.g., Frank. In this embodiment, Paul's password protected message is posted in the channel. In some embodiments a password need be entered and validated only once before making the full contents of that password protected message permanently visible in the message channel. In some embodiments a password needs be entered and validated every time the recipient wants to view the full contents of that password protected message. In some embodiments a password needs be entered and validated in order to reveal successive, dynamic or varied elements of context associated with the password protected message.

In this embodiment only certain elements of the message are posted while other elements are hidden pending entry of a valid password by respective recipients. In this embodiment several indications are provided to alert the recipient that the message is a password protected message including a visually distinct message format (3610) which includes the message header "* Password Protected *" (3611), and text that reads, "Touch ID required" (3613). In this embodiment respective recipients tap on the "Touch ID required" text (3613) to cause the display of the Touch ID modal FIG. 59C).

In one exemplary embodiment, at least a portion (e.g., a prompt associated with the message available for interaction, metadata, content of the message) of the Password Protected message is transmitted to the recipient, and when the recipient enters a correct password, the message (or portion, thereof) is available to the recipient (for viewing, for example). In another exemplary embodiment, the Password Protected message (or portion thereof, e.g., a prompt associated with the message available for interaction, metadata, content of the message) is transmitted to the recipient and when the recipient enters a correct password (e.g., Touch ID, password, PIN, order number), a further at least a portion of the message is transmitted and/or is then available to the recipient (for viewing, for example). For example, in an exemplary embodiment a Password Protected message is transmitted to the recipient and after the user enters her messaging application password, a further portion of the message (for example content of the message and/or an attached document) is caused to be transmitted and the Password Protected message (or portion thereof and/or further at least a portion thereof) is then available to the recipient (for viewing, for example). In some embodiments, the "further at least a portion of the message" can include retransmission of all or part of the message (or portion thereof) previously transmitted. FIG. 59C shows an embodiment of a messaging system from the point of view of a group user message recipient, e.g., Frank. In this embodiment the recipient, is instructed to use Touch ID to verify his identity (3616). In this embodiment, tapping on the "Cancel" button (3615) will cancel the password/Touch ID validation process and return the user to the previously viewed display screen. In some embodiments pressing cancel will cause the user to be prompted for a secondary allowable form of password/ID verification.

Figure 59D:
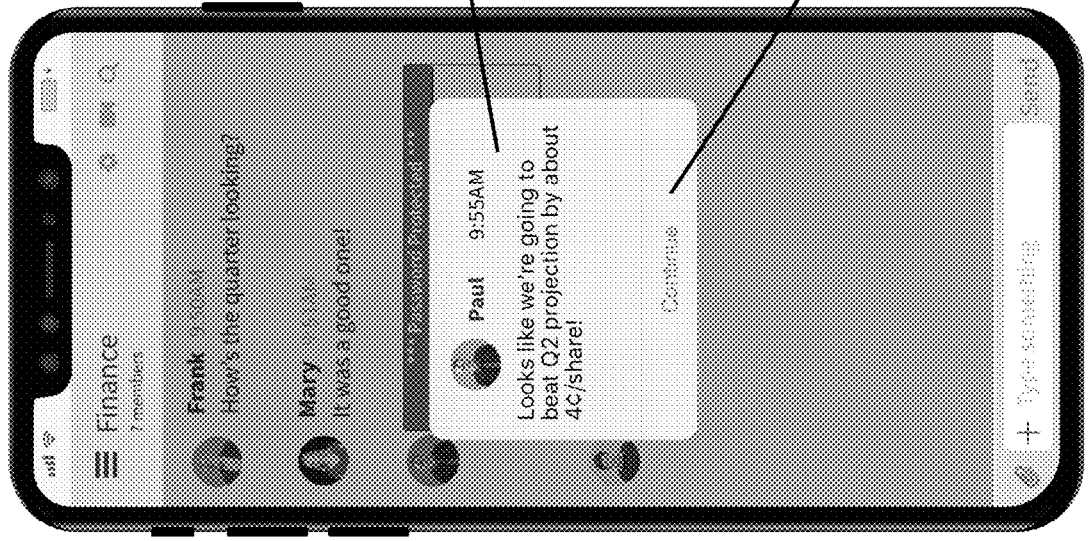
Figure 59C:
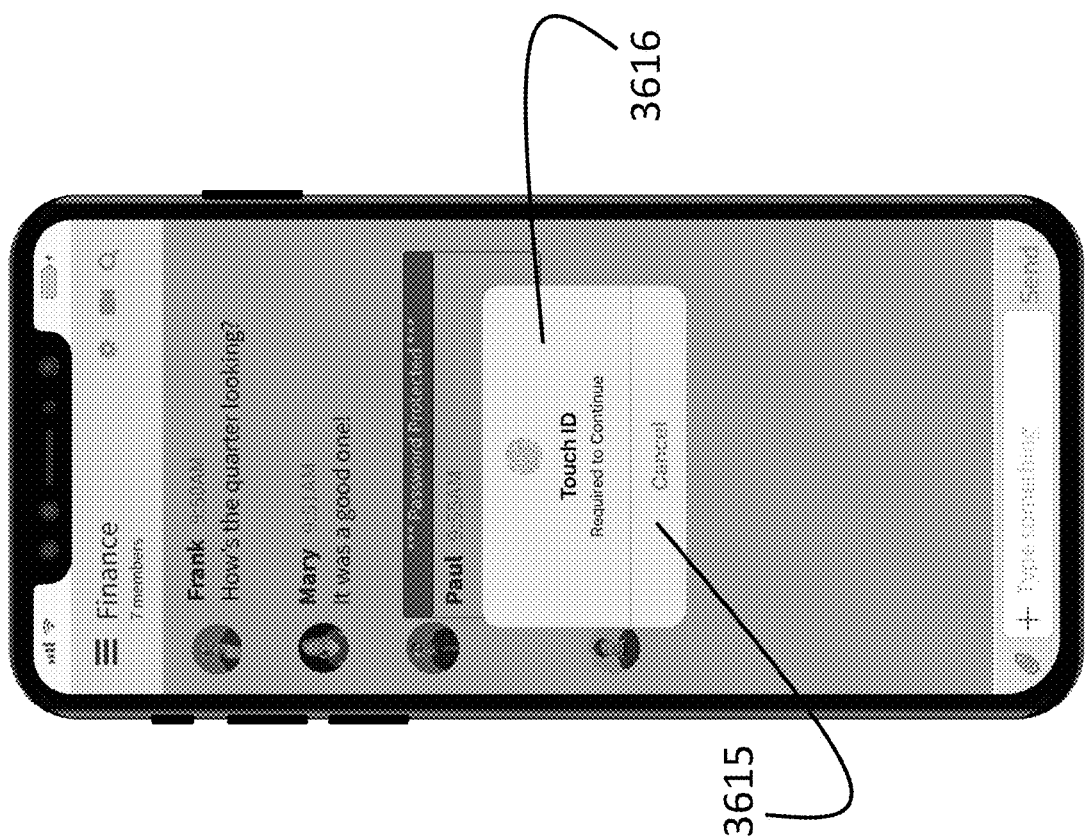

FIG. 59D shows an embodiment of a messaging system from the point of view of a group user message recipient, e.g., Frank. In this embodiment validation of Frank's thumbprint (Touch ID) shown in FIG. 59C caused the full content of Paul's password protected message to be displayed (3617). In this embodiment, the full content of the password protected message is displayed and superimposed on top of the underlying message channel. In this embodiment the message recipient is prevented from accessing the underlying channel until he has tapped the "Continue" (3618) button. In this embodiment, Frank's thumbprint is the "second user password" and the "correct password." In some embodiments, continued access to the underlying channel (or other channels) is provided. In this embodiment, tapping on the "Continue" button dismisses the message and returns the user to the Finance channel (FIG. 59E).

In some embodiments the password protected control message is deleted after the recipient interacts with the message in some form, e.g., tapping Continue. In some embodiments, after a recipient's interaction with the password protected control message, the message is added to and/or updated in the associated message channel message stream. In some embodiments, after a recipient's interaction with the password protected control message, the message is added to (alone or in addition to being posted to the associated channel) another message channel message stream. In some embodiments, after a recipient's interaction with the password protected control message, the message is shared with (alone or in addition to being posted to the associated channel) another application.

Figure 59E:
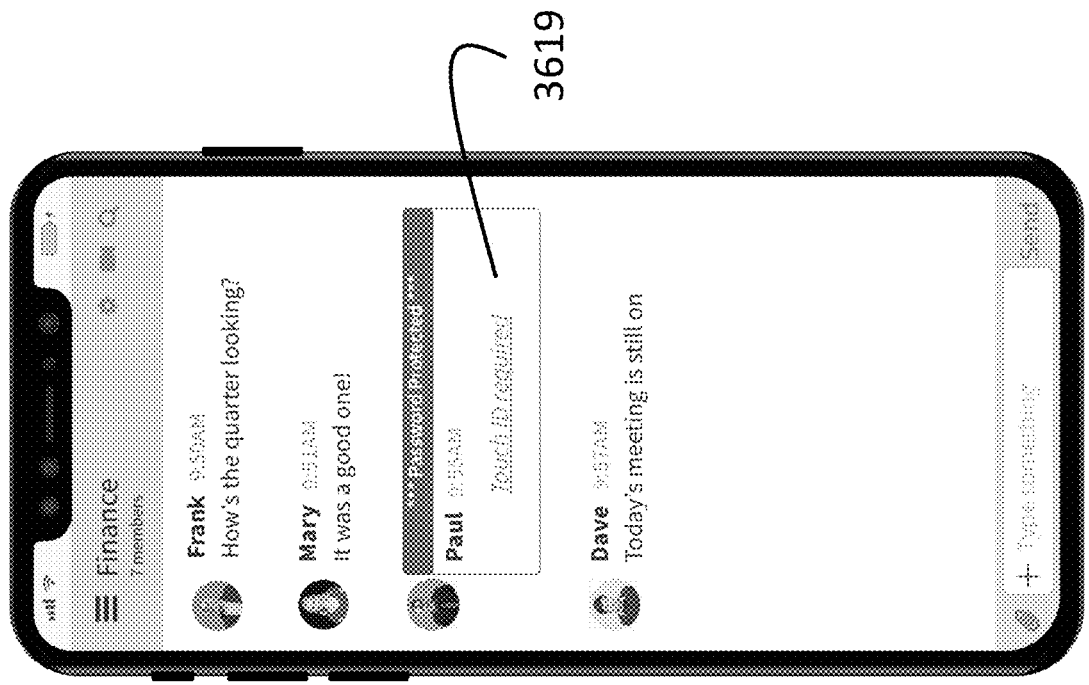

FIG. 59E shows an embodiment of a messaging system from the point of view of a group user message recipient, e.g., Frank. In this embodiment only certain elements of Paul's message are posted to the message channel while other elements are hidden pending Touch ID validation of respective recipients. In this embodiment a Touch ID action is required every time a recipient wants to view Paul's message (3619).

Figure 60:
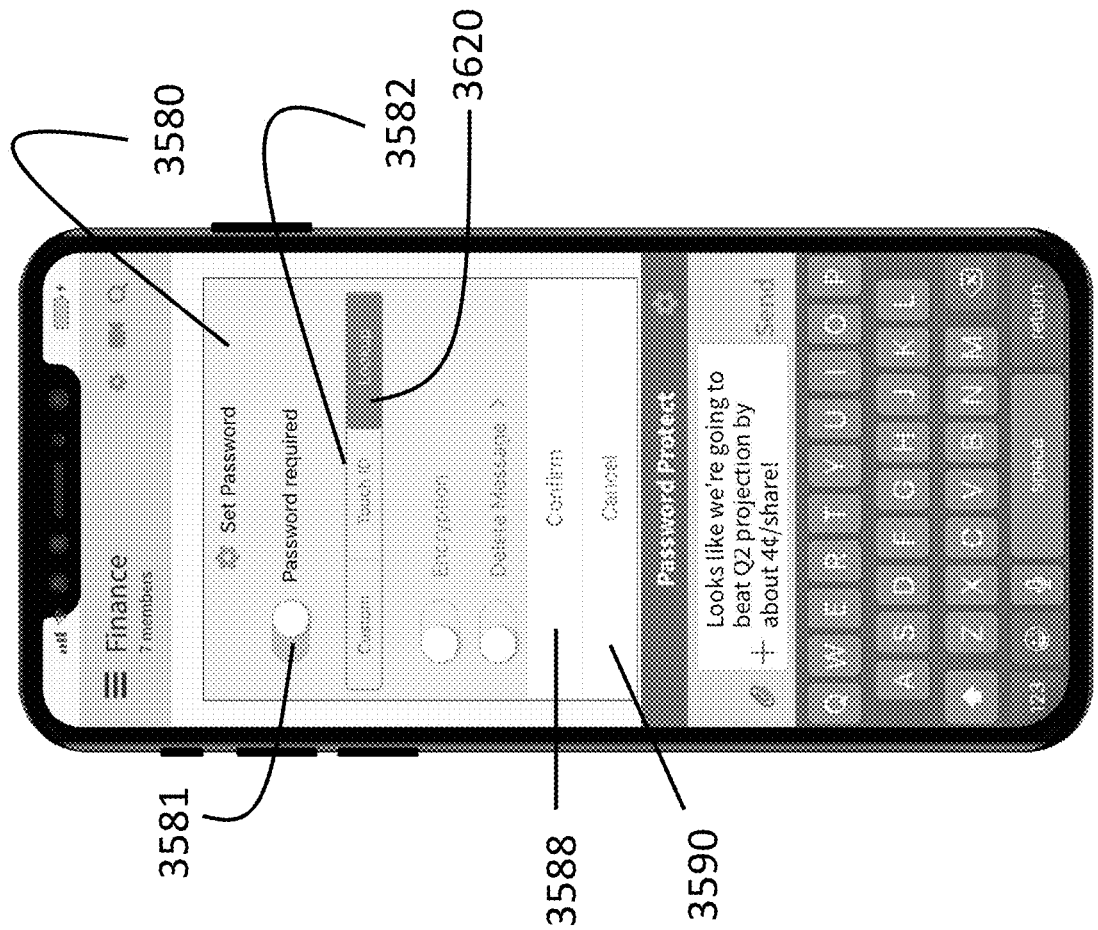

FIG. 60 shows an embodiment of a messaging system from the point of view of Paul (first group user). This embodiment shows an example of a "Set Password" control message attribute specification menu (3580) that was caused to appear as a result of the user tapping on the settings icon (FIG. 57 #3570). In this example the "Passcode required" toggle is set to "on" (3581). In this example, the user can select one of three password types: 1) Custom, 2) Touch ID, or 3) Lookup (3582). In some embodiments additional or other verification/passcode methods can be applied such as face recognition, gesture, spoken password, key, UDID verification, two-factor authentication, department code, user ID, order number. In this example, the user selected "Lookup" (3620) which will require that message recipients enter a password into a Password Protected Message control type message associated entry field. After a message recipient enters a password (in this example a department code), the application will compare the entry to the specified lookup rules and act in accordance with the rules, which in this example are to display Paul's message along with matched department specific text to the message recipient.

Figure 61:
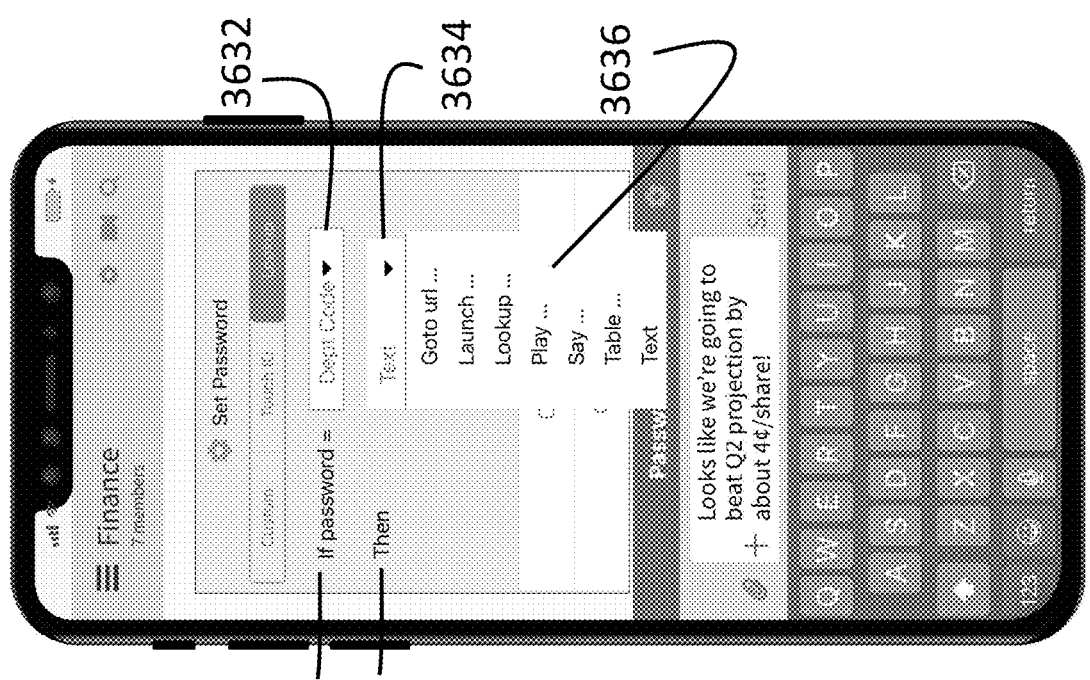

FIG. 61 shows an embodiment of a messaging system from the point of view of Paul (first group user). In this embodiment, by interacting with the "Lookup" settings display, Paul is able to specify actions that will occur upon entry of specific passwords (e.g., User ID, Dept. Code, Order number, [sender specified constant). For example, in one embodiment, Paul may specify that when a user enters a certain department code, certain department specific text is included and displayed with his message.

In some embodiments, the system applies default attributes to certain control type messages. For example, in some embodiments, the default attributes of a "Password Protected Message" control message specify that only limited information about the message is placed in the channel message stream along with a notice that the user must provide a password to view the full content of the message.

In this embodiment, the user is able to specify rules that are applied based on specified conditions. For example, "If password is equal to" (3631) "Then" (3633) perform the prescribed action (3634). In this embodiment a dropdown menu (3632) is provided from which Paul can select one or more "If" conditions. For example, the "If" dropdown menu could include selection options such as (User ID, Dept Code, Order Number, [a specified constant #]). In some embodiments certain "If" and/or "Then" menu selections trigger sub-selection or selection-associated fields or options. For example, in this embodiment, if the message sender selects the "Then" option "Text", the sender is presented with a text entry field in which "Then"-specific text can be entered, and which text will be added to the posted message contingent upon the "if" condition being met. In this embodiment, the sender (Paul) is able to specify the action that should occur when an "if" condition is met. In this embodiment a dropdown "Then" selection menu can be caused to be displayed (3636) by tapping on the chevron down in the "Then" field (3634). In this embodiment, "Then" menu selection options include: "Goto url . . . ", "Launch . . . ", "Lookup . . . ", "Play . . . ", "Say . . . ", "Table . . . ", and "Text". In this embodiment Paul specified that "If password=Dept Code" then "Text". In this embodiment Paul's message may include additional text based upon the Department code entered by each respective "Password Protected Message" control type recipient.

FIGS. 62-68 show various embodiments of "Pin message" control type messages.

FIG. 62 shows an embodiment of a messaging system from the point of view of Paul (first group user). Paul is viewing a group channel (messaging channel) named "Finance" (3630), which channel has 7 members. In this embodiment, Paul can enter the text of a message he wishes to send to the group in the text entry bar (3632). In some embodiments additional and/or other means of message entry are provided such as via stylus and/or voice. In some embodiments, Paul could specify specific group channel members to receive his message (thereby excluding other channel members). In this embodiment, by tapping on the paperclip icon (3636), Paul can optionally add one or more attachments, such as image/s or a file/s to his message. In this embodiment, tapping on the "+" icon (3638) causes a text entry bar associated menu to be displayed (FIG. 63 #3642). The menu allows Paul to, add "control" functionality to the message he is preparing to send. In this manner, the message can be constructed to, for example, enable (or possibly require) a private response, or for example, require that message recipients interact with Paul's message prior to further messages being permitted to be seen by these recipients in the selected channel, or for example, require that these recipients verify their identity or enter a password prior to being permitted to view the contents of Paul's message. In this embodiment, tapping on "Send" (3634) causes the transmission of Paul's message to the channel.

FIG. 63 shows an embodiment of a messaging system from the point of view of Paul (first group user). In this example, Paul is preparing to send a control type message and access to the "control message type" selection menu (3642) is caused by Paul tapping on an icon, which in this example is a "+" icon (3638) associated with the text entry area. In other embodiments, the ability to select or define a control access message type can be accomplished in other ways, for example by tapping on an icon, button, hypertext, selection from a menu, speaking or by using a device gesture such as swiping, double tapping, or long pressing on an area of the display screen, or by other means such as entering trigger data such as a text "trigger character" or "trigger sequence" such as "/pin/" directly into, for example, a text entry bar, which trigger data can be interpreted by the system as a command to make the message a control message of an associated type (and applying the type's default attributes). For example, typing "/pin/I need everyone's final numbers by 5 PM" followed by an instruction to transmit the message (e.g., tapping on "Send" (3634)) may result in a control message being sent to the channel of the "Pin message" type. In some embodiments the trigger data can be interpreted by the system as a command to make the message a control message of an associated type to include specific attributes. For example, typing "/pin60/I need everyone's final numbers by 5 PM" followed by an instruction to transmit the message may result in the Pin Message control message being posted to the channel and remaining pinned to the top of the display of channel messages for 60 minutes.

In some Pin message type embodiments there is no need to proactively identify recipient identification data, because the Pin Message may be intended for all channel members, and the trigger data can be used without need for deliberate user specification of recipient identification data, e.g., "/pin/" (Pin message control message to be sent to all channel members). So, for example, in this embodiment, recipient identification data is inferred to be "all" due to the absence of user specified recipient identification data. In some Pin message embodiments trigger data and recipient identification data can be used to specify recipients and/or render messages private to recipients e.g., "/pin/jeff" (Pin message to be sent privately to Jeff (i.e., exclude other channel members)).

Figure 64:
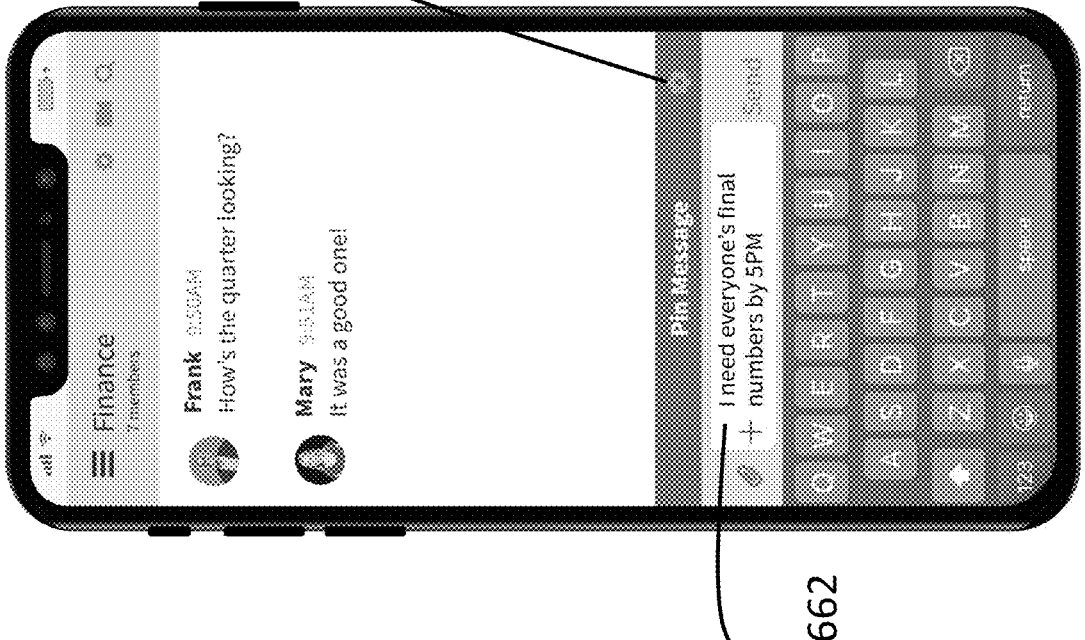

FIG. 64 shows an embodiment of a messaging system from the point of view of Paul (first group user). Paul is viewing a group channel (messaging channel) named "Finance" which channel has 7 members. In this embodiment, Paul specified his desire to create a message of the control type "Pin Message" (FIG. 63 #3640) which selection caused the display of this screen (FIG. 64). In this embodiment an indication of the selected control type is shown (3650). There are many other ways that an indication of the selected message control type could be provided, some immediate, some delayed, some persistent, some ephemeral. In some embodiments no indication of the selected message control is provided.

In this embodiment, a settings icon (3660) is displayed. In this embodiment, tapping on this icon will cause a "Pin Message" attribute settings menu to be displayed.

Figure 65:
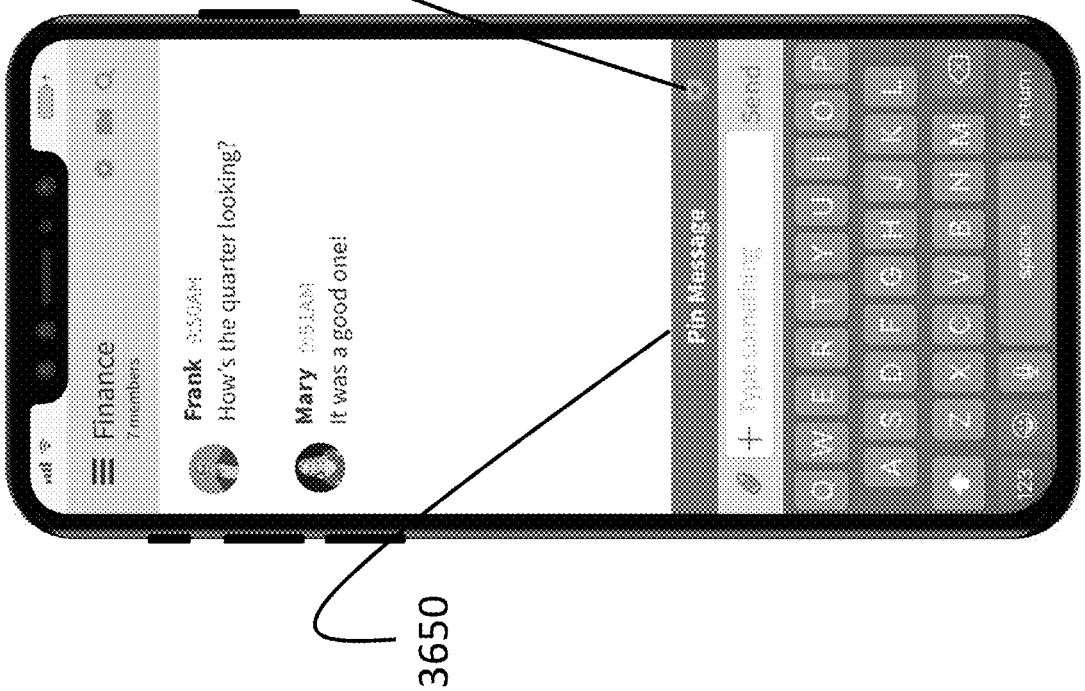

FIG. 65 shows an embodiment of a messaging system from the point of view of Paul (first group user). In this embodiment, Paul has crafted a message that reads, "I need everyone's final numbers by 5 PM" (3662). In this embodiment, Paul can tap on "Send" to transmit his "Pin Message" type control message. In this embodiment, tapping "Send" at this point will post Paul's message to the channel and apply the default system settings associated with the "Pin Message" control message type to the message. For example, in this embodiment the default system settings for "Pin Message" are: a) pin location=top; b) pin until=dismissed; c) pin to channel=local. In some embodiments additional and/or other default attributes can be applied.

In some embodiments, such as the embodiment shown here, the user is able to override the control message type default settings and specify the "Pin Message" settings to be associated with the message being prepared. In this embodiment, tapping on the Setting icon (3660) icon will cause a "Pin Message" settings menu to be displayed. In some embodiments access to, and definition of control message type settings is achieved in other ways.

FIG. 66 shows an embodiment of a messaging system from the point of view of Paul (first group user). This embodiment shows an example of a "Pin Message" control message attribute settings menu (3670) that was caused to appear as a result of the user tapping on the settings icon (FIG. 65 #3660). In this example, the user can select the pin placement location, e.g., top, bottom, nth message, etc. (3672). In this example, the user can specify the duration of the pin, e.g., until dismissed, 1 hour, until [time], until [date], etc. (3674). In this example, the user can select the pin channel, e.g., local, all, specify channel/s, etc. (3676).

In this embodiment Paul posts his Pin Message type control message by tapping on "Send" (3684).

FIG. 67 shows an embodiment of a messaging system from the point of view of a group user message recipient, e.g., Frank. In this embodiment, Paul's message is visually distinct and is posted to the Finance Channel and is pinned to the top of the channel message display (3690) above the channel message stream (3694). In this embodiment, Pin Message type control message recipients can dismiss the pinned message, i.e., un-pin the message by tapping on "OK". In some embodiments additional and/or other buttons can be defined and included with Pin Messages, for example, in some embodiments buttons with labels such as Accept, Reject, Yes and No can be specified along with associated further actions. In some embodiments a Password or other form of recipient verification may be combined with the Pin Message type of control message to create and facilitate more complex interactions.

Figure 68:
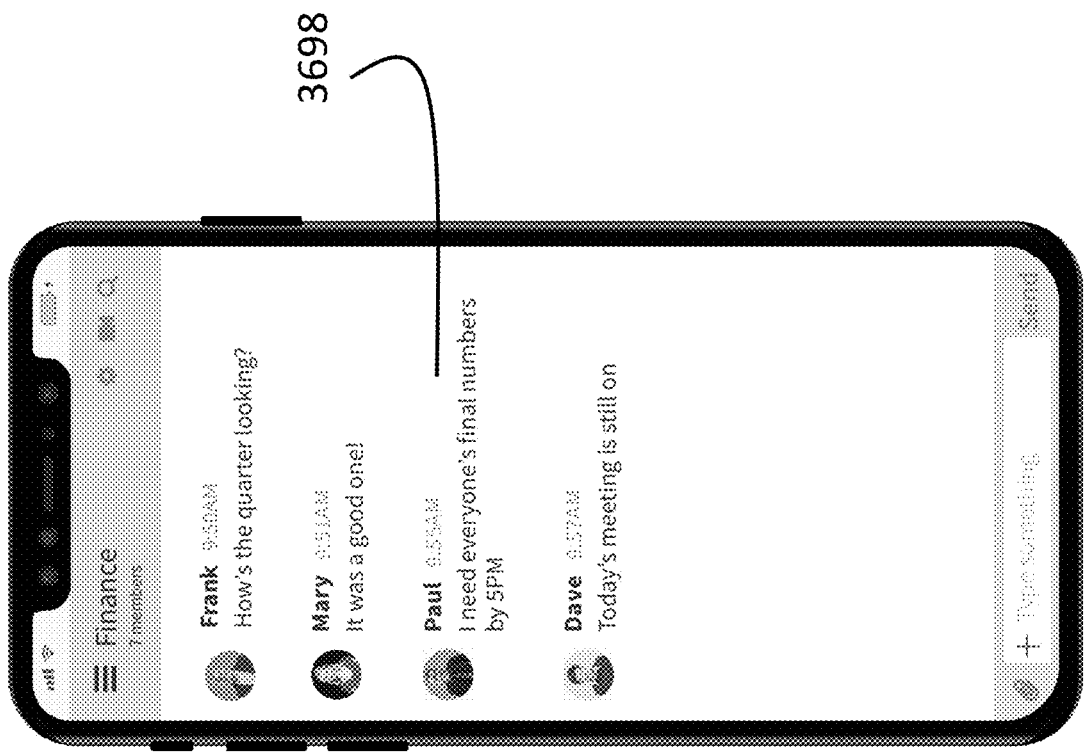

FIG. 68 shows an embodiment of a messaging system from the point of view of a group user message recipient, e.g., Frank. In this embodiment, once Paul's pinned message is unpinned, it is placed into the message stream in the order (e.g., chronological) that it was posted (3698). In some embodiments unpinned messages are, for example, deleted, placed in another channel, placed in the message stream in accordance with a rule relating to the time the message was unpinned, etc.

The aforementioned description has included the use of the word "device" and "devices" throughout. In addition, many of the figures are screenshots of a single smart-phone (a type of "device"). Furthermore, the word "device" or "devices" has been introduced by itself or modified with adjectives throughout the aforementioned description e.g., "a device", "the device", "the devices", "the remaining devices", "Rachel's device"). When "device" is used throughout the specification, in a preferred embodiment, a single electronic apparatus (e.g. a single smartphone or a single laptop computer) is being described. In some embodiments, however, a user may be logged into an account (such as a messaging account) on multiple electronic apparatuses. For example, a user may be logged onto a single account on both a smartphone and on a laptop computer. When a user is logged onto multiple electronic apparatuses, message content is mirrored on both apparatuses. Furthermore, and in this manner, a user can see a message arrive on his account (in a channel) on one electronic apparatus (his smartphone) and he can then send a message (or send a message in reply to the earlier arrived message) on another electronic apparatus (in the channel in which the message was received). Again, this is possible because the two devices in this situation are mirroring the contents of the channel. Thus, for purposes of this application, when two (or more) apparatuses are mirroring each other, the two apparatuses are effectively "a device." Put another way, in such a situation, if display of a message is prevented to "a device," then display is prevented on the two apparatuses mirroring each other. Similarly, if a reply to a message is limited to two apparatuses that are mirroring each other, the reply is again limited to "a device."

Some portions of the detailed descriptions are presented in terms of algorithms and symbolic representations of operations on data bits within a computer memory. These algorithmic descriptions and representations are the means used by those skilled in the video processing arts to most effectively convey the substance of their work to others skilled in the art. An algorithm is here, and generally, conceived to be a self-consistent sequence of steps leading to a desired result. The steps are those requiring physical manipulations of physical quantities.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "receiving", "determining", "associating", "updating", "providing", "integrating", "selecting", "executing", "processing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

While various exemplary embodiments have been described, it is understood that embodiments may be combined. Also, aspects of one embodiment may be combined with aspects of another embodiment.

The methods and illustrative examples described herein are not inherently related to any particular computer or other apparatus. Various general-purpose systems may be used in accordance with the teachings described herein, or it may prove convenient to construct more specialized apparatus to perform methods 300 and 400 and/or each of its individual functions, routines, subroutines, or operations. Examples of the structure for a variety of these systems are set forth in the description above.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

The invention claimed is:

1. A method comprising the steps of:
receiving, from a first device based on input from a first user and by a second device for presentation in a messaging channel that includes a plurality of messages, a first message that requires one specified interaction or one or more of a plurality of specified interactions;
in response to receiving said first message that requires said one specified interaction or said one or more of said plurality of specified interactions:
providing, on a display, indication that said first message is available for said one specified interaction or said one or more of said plurality of specified interactions;
allowing interaction with said indication of said first message; and
adding a restriction to at least some functionality i) of said messaging channel ii) other than interaction with said first message;
receiving, through said indication of said first message, data indicating a second user interaction by a second user responsive to said indication;
determining whether said second user interaction is said one specified interaction or said one or more of said plurality of specified interactions; and
removing said restriction to said at least some functionality i) of said messaging channel ii) other than interaction with said first message in response to determining that said second user interaction is said one specified interaction or said one of said plurality of specified interactions.

2. The method according to claim 1, said method further comprising the steps of, in response to determining that said second user interaction is said one specified interaction or said one of said plurality of specified interactions:
causing display of said first message, and
removing said restriction to said at least some functionality i) of said messaging channel ii) other than interaction with said first message.

3. The method according to claim 1, wherein:
said plurality of messages from said messaging channel are presented on three or more devices including said first device and said second device; and
receiving said first message comprises receiving, by said second device, said first message that was transmitted by said first device to a proper subset of said three or more devices, said proper subset comprising said second device and not comprising a third device from said three or more devices that is a different device from said first device, said method further comprising the steps of:
receiving, by said second device, input indicating entry of a second message; and
transmitting, by said second device in said messaging channel and to each of said three or more devices including said first device and said third device, said second message.

4. The method according to claim 1, wherein:
providing said indication that said first message is available for said one specified interaction or said one or more of said plurality of specified interactions comprises providing, for presentation and before determining that said second user interaction is said one specified interaction or said one or more of said plurality of specified interactions, a first sub-portion of said first message, said method further comprising the steps of:

after determining whether said second user interaction is said one specified interaction or said one or more of said plurality of specified interactions:
   providing, for presentation, a second, different sub-portion of said first message that was not provided for presentation in said first sub-portion, and
   removing said restriction to said at least some functionality i) of said messaging channel ii) other than interaction with said first message.

5. The method according to claim 1, said method further comprising the step of providing, for presentation, a first sub-portion of content from a body of said first message that is a different sub-portion of content from said body than a second sub-portion of content from said body provided for presentation by a third device i) different from said second device ii) that received said first message.

6. The method according to claim 1, wherein:
   said plurality of specified interactions includes a first specified interaction and a second specified interaction,
   said determining whether said second user interaction is said one specified interaction or said one or more of said plurality of specified interactions comprises determining whether said second user interaction is said first specified interaction or said second specified interaction, and
   said removing said restriction comprises selectively i) removing a first functionality restriction of said messaging channel or ii) removing a second functionality restriction of said messaging channel using a result of the determination whether said second user interaction is said first specified interaction or said second specified interaction.

7. The method according to claim 1, wherein after removing said restriction to said at least some functionality i) of said messaging channel ii) other than interaction with said first message, said first message or a portion thereof is visible either within said messaging channel or outside of said messaging channel.

8. The method according to claim 1, wherein providing said indication that said first message is available for said one specified interaction or said one or more of said plurality of specified interactions comprises providing, for presentation by said second device, said first message or a portion of said first message outside of said messaging channel, said method further comprising the steps of:
   after receiving said data indicating said second user interaction:
      determining to not present said first message in said plurality of messages for said messaging channel; and
      presenting said messaging channel that includes said plurality of messages without said first message.

9. The method according to claim 1, said method further comprising the steps of:
   receiving, by said second device and prior to determining whether said second user interaction is said one specified interaction or said one or more of said plurality of specified interactions, a second message;
   preventing access to said second message; and
   in response to determining that said second user interaction is said one specified interaction or said one of said plurality of specified interactions, enabling access to said second message.

10. The method according to claim 1, wherein receiving said first message comprises receiving said first message that requires said one specified interaction or said one or more of said plurality of specified interactions that was input by at least one of menu selection, selecting an icon displayed on said first device, gesture, voice command, or entering a trigger input into said first device.

11. The method according to claim 1, wherein receiving said first message comprises receiving said first message that was input a) with an identity for said second device as a recipient device or b) without an identity for said second device as a recipient device.

12. The method according to claim 1, wherein prior to removing said restriction, presenting, by said second device, less than all of said first message.

13. The method according to claim 1, further comprising the step of recording that said second user interaction which is said one specified interaction or said one or more of said plurality of specified interactions has occurred and one or more of a user name for said second device, a date when said second user interaction occurred, a time when said second user interaction occurred, an identifier for said first message, or said second user interaction.

14. The method according to claim 1, wherein one or more attributes are applied to said first message without user input from a user of said first device specifying that said one or more attributes are to be applied to said first message.

15. The method according to claim 1, wherein receiving said first message comprises receiving said first message that includes one or more attributes that include at least a) one attribute set by user input or b) one attribute overridden by user input.

16. The method according to claim 1, wherein receiving comprises receiving, from said first device and by said second device, one portion of said first message before receiving said interaction, said method further comprising the step of:
   in response to determining that said second user interaction is said one specified interaction or said one or more of said plurality of specified interactions, receiving, from said first device and by said second device, another portion of said first message.

17. The method according to claim 1, wherein providing said indication that said first message is available comprises presenting, superimposed on top of said messaging channel, at least a portion of said first message.

18. The method according to claim 17, wherein presenting, superimposed on top of said messaging channel, at least a portion of said first message comprises at least partially obscuring other messages presented in said messaging channel.

19. The method according to claim 17, said method further comprising the steps of:
   after receiving said data indicating said second user interaction:
      removing said superimposition of said at least said portion of said first message; and
      presenting said messaging channel that includes said plurality of messages including said first message.

20. The method according to claim 1, wherein providing said indication that said first message is available comprises presenting, outside of said messaging channel, i) at least a portion of said first message and ii) an indication that said first message includes required reading for which said one specified interaction or said one or more of said plurality of specified interactions is required before said second device removes said restriction to said at least some functionality i) of said messaging channel ii) other than interaction with said first message.

21. The method according to claim 1, wherein:
adding said restriction to at least some functionality of said messaging channel comprises restricting access to messaging in said messaging channel other than said first message; and
providing said indication that said first message is available comprises presenting, outside of said messaging channel, i) at least a portion of said first message and ii) an indication that said first message includes required reading for which said one specified interaction or said one or more of said plurality of specified interactions is required before said second device removes said restriction to said messaging channel other than to said first message.

22. The method according to claim 1, said method further comprising the steps of:
after receiving, through said indication of said first message, said data indicating said second user interaction by said second user responsive to said indication:
selecting, using said one or more of said plurality of specified interactions, a first sub-portion of content from said first message;
determining, using said one or more of said plurality of specified interactions, to skip selection of a second, different sub-portion of content from said first message and to not provide said second, different sub-portion of content for presentation; and
providing, for presentation, said first sub-portion of content without providing said second, different sub-portion of content for presentation.

23. The method according to claim 1, wherein adding said restriction to said at least some functionality i) of said messaging channel ii) other than interaction with said first message further comprises:
determining that said first message that requires said one specified interaction or said one or more of said plurality of specified interactions; and
in response to determining that said first message requires said one specified interaction or said one or more of said plurality of specified interactions, adding said restriction to said at least some functionality i) of said messaging channel ii) other than interaction with said first message.

24. The method according to claim 1, wherein receiving said first message comprises receiving, from said first device, said first message that includes, as recipients of said first message, one or more users of said messaging channel other than a user operating said first device.

25. The method according to claim 1, wherein receiving said first message comprises receiving, from said first device, said first message that:
includes, as recipients of said first message, two or more users of said messaging channel including a user operating said first device, and
requires, from each of said two or more users other than said user operating said first device, one specified interaction or one or more of a plurality of specified interactions before a corresponding recipient device removes a corresponding restriction to said at least some functionality i) of said messaging channel ii) other than interaction with said first message.

26. The method according to claim 1, wherein receiving said first message comprises receiving, from said first device, said first message that:
includes, as recipients of said first message, two or more users of said messaging channel including a user operating said first device, and
requires, from each of said two or more users including said user operating said first device, one specified interaction or one or more of a plurality of specified interactions before a corresponding recipient device removes a corresponding restriction to said at least some functionality i) of said messaging channel ii) other than interaction with said first message.

27. The method according to claim 1, wherein:
receiving said first message comprises receiving, from said first device and for presentation in said messaging channel, said first message that was created for presentation in a second messaging channel that is a different messaging channel than said messaging channel; and
providing said indication comprises providing, on said display and in said messaging channel, said indication that said first message is available for said one specified interaction or said one or more of said plurality of specified interactions.

28. The method according to claim 1, wherein providing said indication that said first message is available for said one specified interaction or said one or more of said plurality of specified interactions comprises providing, for presentation by said second device, said first message or a portion of said first message within said messaging channel, said method further comprising the steps of:
after receiving said data indicating said second user interaction:
removing, from said presentation of said messaging channel, said first message; and
presenting said messaging channel that includes said plurality of messages without said first message.

29. The method according to claim 1, wherein:
the messaging channel includes a plurality of members that includes the first user and the second user; and
corresponding devices for each of the plurality of members enable the respective member to post one or more messages to the messaging channel.

30. The method according to claim 1, said further comprising the steps of, in response to receiving said first message that requires said one specified interaction or said one or more of said plurality of specified interactions, adding a restriction to said first message.

31. An apparatus comprising one or more computers and one or more storage devices on which are stored instructions that are operable, when executed by the one or more computers, to cause the one or more computers to perform operations comprising:
receiving, from a first device based on input from a first user and by a second device for presentation in a messaging channel that includes a plurality of messages, a first message that requires one specified interaction or one or more of a plurality of specified interactions;
in response to receiving said first message that requires said one specified interaction or said one or more of said plurality of specified interactions:
providing, on a display, indication that said first message is available for said one specified interaction or said one or more of said plurality of specified interactions;
allowing interaction with said indication of said first message; and
adding a restriction to at least some functionality i) of said messaging channel ii) other than interaction with said first message;

receiving, through said indication of said first message, data indicating a second user interaction by a second user responsive to said indication;

determining whether said second user interaction is said one specified interaction or said one or more of said plurality of specified interactions; and removing said restriction to said at least some functionality i) of said messaging channel ii) other than interaction with said first message in response to determining that said second user interaction is said one specified interaction or said one of said plurality of specified interactions.

32. The apparatus according to claim 31, said operations further comprising, in response to determining that said second user interaction is said one specified interaction or said one of said plurality of specified interactions:

causing display of said first message, and removing said restriction to said at least some functionality i) of said messaging channel ii) other than interaction with said first message.

33. The apparatus according to claim 31, said operations further comprising providing, for presentation, a first sub-portion of content from a body of said first message that is a different sub-portion of content from said body than a second sub-portion of content from said body provided for presentation by a third device i) different from said second device ii) that received said first message.

34. The apparatus according to claim 31, said operations further comprising:

receiving, prior to determining whether said second user interaction is said one specified interaction or said one or more of said plurality of specified interactions, a second message;

preventing access to said second message; and in response to determining that said second user interaction is said one specified interaction or said one of said plurality of specified interactions, enabling access to said second message.

35. The apparatus according to claim 31, wherein:

providing said indication that said first message is available for said one specified interaction or said one or more of said plurality of specified interactions comprises providing, for presentation and before determining that said second user interaction is said one specified interaction or said one or more of said plurality of specified interactions, a first sub-portion of said first message, said operations further comprising:

after determining whether said second user interaction is said one specified interaction or said one or more of said plurality of specified interactions:

providing, for presentation, a second, different sub-portion of said first message that was not provided for presentation in said first sub-portion, and removing said restriction to said at least some functionality i) of said messaging channel ii) other than interaction with said first message.

36. The apparatus according to claim 31, wherein receiving comprises receiving, from said first device and by said second device, one portion of said first message before receiving said interaction, said operations further comprising:

in response to determining that said second user interaction is said one specified interaction or said one or more of said plurality of specified interactions, receiving, from said first device and by said second device, another portion of said first message.

37. The apparatus according to claim 31, wherein providing said indication that said first message is available for said one specified interaction or said one or more of said plurality of specified interactions comprises providing, for presentation by said second device, said first message or a portion of said first message outside of said messaging channel, said operations further comprising:

after receiving said data indicating said second user interaction:

removing, from said plurality of messages for said messaging channel, said first message; and presenting said messaging channel that includes said plurality of messages without said first message.

38. The apparatus according to claim 31, said operations further comprising:

after receiving, through said indication of said first message, said data indicating said second user interaction by said second user responsive to said indication:

selecting, using said one or more of said plurality of specified interactions, a first sub-portion of content from said first message;

determining, using said one or more of said plurality of specified interactions, to skip selection of a second, different sub-portion of content from said first message and to not provide said second, different sub-portion of content for presentation; and providing, for presentation, said first sub-portion of content without providing said second, different sub-portion of content for presentation.

39. The apparatus according to claim 31, wherein adding said restriction to said at least some functionality i) of said messaging channel ii) other than interaction with said first message further comprises:

determining that said first message requires said one specified interaction or said one or more of said plurality of specified interactions; and in response to determining that said first message requires said one specified interaction or said one or more of said plurality of specified interactions, adding said restriction to said at least some functionality i) of said messaging channel ii) other than interaction with said first message.

40. The apparatus according to claim 31, wherein receiving said first message comprises receiving, from said first device, said first message that:

includes, as recipients of said first message, two or more users of said messaging channel including a user operating said first device, and requires, from each of said two or more users other than said user operating said first device, one specified interaction or one or more of a plurality of specified interactions before a corresponding recipient device removes a corresponding restriction to said at least some functionality i) of said messaging channel ii) other than interaction with said first message.

* * * * *